US008047908B2

(12) United States Patent
Walker et al.

(10) Patent No.: US 8,047,908 B2
(45) Date of Patent: Nov. 1, 2011

(54) METHODS AND SYSTEMS FOR DETERMINING AND SELLING WAGERING GAME OUTCOMES FOR A PLURALITY OF PLAYERS

(75) Inventors: Jay S. Walker, Ridgefield, CT (US); Robert C. Tedesco, Huntington, CT (US); James A. Jorasch, New York, NY (US); Michael W. Patterson, New York, NY (US)

(73) Assignee: IGT, Reno, NV (US)

( * ) Notice: Subject to any disclaimer, the term of this patent is extended or adjusted under 35 U.S.C. 154(b) by 708 days.

(21) Appl. No.: 11/391,843

(22) Filed: Mar. 29, 2006

(65) Prior Publication Data

US 2006/0240890 A1 Oct. 26, 2006

Related U.S. Application Data

(60) Provisional application No. 60/666,393, filed on Mar. 29, 2005, provisional application No. 60/685,604, filed on May 27, 2005.

(51) Int. Cl.
*A63F 9/24* (2006.01)
*A63F 13/00* (2006.01)
*G06F 17/00* (2006.01)
*G06F 19/00* (2006.01)

(52) U.S. Cl. .......................................... 463/16; 463/43

(58) Field of Classification Search .................... 463/17, 463/18, 19, 21, 16, 43
See application file for complete search history.

(56) References Cited

U.S. PATENT DOCUMENTS

| | | | | |
|---|---|---|---|---|
| 4,764,666 | A * | 8/1988 | Bergeron | 463/25 |
| 5,178,389 | A | 1/1993 | Bentley et al. | 273/138 A |
| 5,569,082 | A * | 10/1996 | Kaye | 463/17 |
| 5,653,444 | A * | 8/1997 | Dahl | 273/274 |
| 5,709,603 | A | 1/1998 | Kaye | 463/17 |
| 5,800,268 | A | 9/1998 | Molnick | |
| 5,810,664 | A * | 9/1998 | Clapper, Jr. | 463/17 |
| 6,099,408 | A * | 8/2000 | Schneier et al. | 463/29 |
| 6,508,709 | B1 * | 1/2003 | Karmarkar | 463/42 |
| 6,645,075 | B1 | 11/2003 | Gatto et al. | 463/25 |
| 6,709,331 | B2 | 3/2004 | Berman | 463/16 |
| 6,780,564 | B2 | 8/2004 | Lawandy et al. | 430/270.1 |
| 6,863,608 | B1 | 3/2005 | LeMay et al. | 463/24 |
| 6,918,831 | B2 | 7/2005 | Nguyen et al. | 463/20 |
| 6,929,546 | B2 | 8/2005 | Moore et al. | 463/30 |

(Continued)

OTHER PUBLICATIONS

Slot Advisor, "Slot Rounaments," http://www.slotadvisor.com/slot-tournaments.html, Accessed Nov. 19, 2008, Created Oct. 13, 2002.*

(Continued)

*Primary Examiner* — Pierre Eddy Elisca
*Assistant Examiner* — Reginald A Renwick
(74) *Attorney, Agent, or Firm* — K&L Gates LLP

(57) ABSTRACT

In accordance with some embodiments, a plurality of outcomes are generated and used to create a video presentation of representative outcomes for one or more players. The video presentation is recorded onto a tangible medium (e.g., DVD or CD-ROM) or otherwise provided to one or more players (e.g., a player may access the video presentation online). This allows one or more players to purchase a video presentation of (e.g., predetermined) outcomes in a jurisdiction in which gambling is legal yet view the presentation at the player's convenience (e.g., from any jurisdiction and at any time). At least one player who is associated with such a video presentation may subsequently redeem it for a redemption value associated therewith.

8 Claims, 40 Drawing Sheets

U.S. PATENT DOCUMENTS

| | | | | |
|---|---|---|---|---|
| 6,935,949 | B1 | 8/2005 | Murphy | 463/20 |
| 6,964,609 | B2 | 11/2005 | Haag et al. | 463/20 |
| 7,033,271 | B2 * | 4/2006 | Gerow | 463/17 |
| 2004/0022520 | A1 | 2/2004 | Kinzer et al. | 386/69 |
| 2004/0152504 | A1 | 8/2004 | Herrmann et al. | 463/16 |
| 2004/0229677 | A1 | 11/2004 | Gray et al. | 463/17 |
| 2004/0235550 | A1 | 11/2004 | McNally et al. | 463/16 |
| 2005/0059493 | A1 | 3/2005 | Tyson et al. | 463/42 |
| 2005/0114272 | A1 | 5/2005 | Herrmann et al. | 705/67 |
| 2005/0119042 | A1 | 6/2005 | Chamberlain et al. | 463/19 |
| 2005/0170881 | A1 | 8/2005 | Muskin | 463/20 |
| 2005/0193209 | A1 | 9/2005 | Saunders et al. | 713/182 |
| 2005/0277459 | A1 | 12/2005 | Haag et al. | 463/13 |
| 2006/0068895 | A1 * | 3/2006 | Nguyen et al. | 463/25 |

OTHER PUBLICATIONS

Brochure: "Unlock the power of DVD with Optreve", www.screenlifedve.com, undated.

Overview: "DVD Manufacturing Process", Technicolor, a Thomson Service, undated.

Press Release: "Correction—Legal iGaming—LV NV", PR Newswire, Apr. 4, 2004.

Nice, Karim, "How DVDs Work", [online], [retrieved Apr. 8, 2005], Retrieved from the Internet: <http://electronics.howstuffworks.com/dvd.htm/printable>.

McQueen, Patricia A., "New game in town—Electronic Game Card hopes gaming and promotional innovation leads to casino and lottery inroads", Casino Journal, May 2005, pp. 40,42 and 50.

"DVD 8800S", [online], [retrieved May 24, 2005], Retrieved from the Internet: <http://www.convactech.com/product/dvd8800mid.html>.

"Kansas Lottery presents eScratch", [online], [retrieved Jun. 8, 2005], Retrieved from the Internet: <http://www.escratchks.com/escratch/postHome.do>.

"Welcome to the Future of Gaming . . . ", Legal iGaming, [online], [retrieved Jun. 13, 2005], Retrieved from the Internet: <http://www.legaligaming.com/main.htm>.

"Products", Legal iGaming, [online], [retrieved Jun. 13, 2005], Retrieved from the Internet: <http://www.legaligaming.com/products.htm>.

"Quarter Play: The Instant-Scratch Game Goes Electronic", Iowa Lottery Press Room, [online], [retrieved Jun. 13, 2005], Retrieved from the Internet: <http://www.ialottery.com/PressRoom/N10-01-04.html>.

"Remote Access Gaming", Legal iGaming, [online], [retrieved Jun. 13, 2005], Retrieved from the Internet: <http://www.legaligaming.com/remote.htm>.

"Introducing Foxwoods Playaway", [online], [retrieved Jul. 19, 2005], Retrieved from the Internet: <http://www.foxwoods.com/playaway/>.

Welch, Sara, "Foxwood's new Playway game stirs up controversy", WTNH.com, [online], [retrieved Jul. 20, 2005], Retrieved from the Internet: <http://www.wtnh.com/Global/story.asp?S=3615729>.

* cited by examiner

700A

| SESSION IDENTIFIER: 01927 705A | | |
|---|---|---|
| WAGER AMOUNT: $0.25/ GAME PLAY 710A | GAME: BIG TEXAS OIL HUNT 715A | SESSION DURATION: 1,000 GAME PLAYS 720A |
| PRICE: $20.00 725A | FINAL SESSION BALANCE: $63.25 730A | |

| | GAME PLAY NUMBER 735A | WAGER 740A | INDICIA 745A | INDICIA IDENTIFIER 750A | PAYOUT 755A |
|---|---|---|---|---|---|
| R700-1 | 1 | $0.25 | NONWINNING COMBINATION | O-000001 | 0 |
| R700-2 | 2 | $0.25 | NONWINNING COMBINATION | O-000001 | 0 |
| R700-3 | 3 | $0.25 | CHERRY/CHERRY/CHERRY | O-000007 | 20 |
| R700-4 | 4 | $0.25 | NONWINNING COMBINATION | O-000001 | 0 |
| R700-5 | 5 | $0.25 | NONWINNING COMBINATION | O-000001 | 0 |
| R700-6 | 6 | $0.25 | NONWINNING COMBINATION | O-000001 | 0 |
| R700-7 | 7 | $0.25 | ANY/ANY/CHERRY | O-000003 | 2 |
| R700-8 | 8 | $0.25 | NONWINNING COMBINATION | O-000001 | 0 |
| R700-9 | 9 | $0.25 | ORANGE/ORANGE/BAR | O-000009 | 10 |

FIG. 7A

700B

| SESSION IDENTIFIER: 01927 MP 705B | PRICE: $30.00 725B | |
|---|---|---|
| WAGER AMOUNT: $0.25/ GAME PLAY 710B | GAME: BIG TEXAS OIL HUNT 715B | SESSION DURATION: 1,000 GAME PLAYS 720B |
| RED PLAYER FINAL SESSION BALANCE: $0.75 730B | BLUE PLAYER FINAL SESSION BALANCE: $9.50 732B | GREEN PLAYER FINAL SESSION BALANCE: $22.25 734B |

| | GAME PLAY NUMBER 735B | PLAYER IDENTIFIER 738B | WAGER 740A | INDICIA 745B | INDICIA IDENTIFIER 750B | PAYOUT 755B |
|---|---|---|---|---|---|---|
| R700B-1 → | 1 | RED | $0.25 | NONWINNING COMBINATION | O-000001 | 0 |
| R700B-2 → | 2 | RED | $0.25 | NONWINNING COMBINATION | O-000001 | 0 |
| R700B-3 → | 3 | RED | $0.25 | CHERRY/CHERRY/CHERRY | O-000007 | 20 |
| R700B-4 → | 4 | BLUE | $0.25 | NONWINNING COMBINATION | O-000001 | 0 |
| R700B-5 → | 5 | BLUE | $0.25 | NONWINNING COMBINATION | O-000001 | 0 |
| R700B-6 → | 6 | BLUE | $0.25 | NONWINNING COMBINATION | O-000001 | 0 |
| R700B-7 → | 7 | GREEN | $0.25 | ANY/ANY/CHERRY | O-000003 | 2 |
| R700B-8 → | 8 | GREEN | $0.25 | NONWINNING COMBINATION | O-000001 | 0 |
| R700B-9 → | 9 | GREEN | $0.25 | ORANGE/ORANGE/BAR | O-000009 | 10 |

FIG. 7B

800

| | GAMING DEVICE IDENTIFIER 805 | GAMING DEVICE TYPE IDENTIFIER 810 | DEVICE STATUS 815 | AVAILABLE GAME(S) 820 |
|---|---|---|---|---|
| R800-1 | GD-000001 | DT-000001 | IN USE | BIG TEXAS OIL HUNT |
| R800-2 | GD-000002 | DT-000001 | NOT IN USE | DOUBLE TROUBLE, SANDS OF TIME |
| R800-3 | GD-000003 | DT-000001 | IN USE | DOUBLE TROUBLE |
| ⋮ | ⋮ | | | ⋮ |
| R800-N | GD-N | DT-N | NOT IN USE | SANDS OF TIME, LOVE MATCH |

FIG. 8

900

| | SESSION IDENTIFIER 905 | GAMING DEVICE IDENTIFIER 910 | GAME TYPE 915 | WAGER PER GAME PLAY 920 | ACTIVE PAY COMBOS 925 | NUMBER OF GAME PLAYS REMAINING 930 | TIME REMAINING 935 |
|---|---|---|---|---|---|---|---|
| R900-1 | S-102001 | GD-000054 | 3-REEL (5 PAYLINE) | $0.25 | ALL | 15 | N/A |
| R900-2 | S-704034 | GD-000054 | 5-REEL (1 PAYLINE) | $0.25 | BAR-BAR-BAR | 10 | N/A |
| R900-3 | S-102002 | ANY | DRAW POKER | $0.25 | ALL EXCEPT ROYAL FLUSH | N/A | 5 MINS. |
| R900-4 | S-102103 | GD-000001, GD-000999 | BLACKJACK | N/A | N/A | 2 | N/A |

FIG. 9

1000

| | DISC IDENTIFIER 1005 | PAYOUT 1010 | PRICE 1015 | DATE SOLD 1018 | ACTIVATION CODE 1020 | PLAYER IDENTIFIER 1025 | STATUS 1030 |
|---|---|---|---|---|---|---|---|
| R1000-1 | D-1003210-87912487 | $15.00 | $20.00 | 1/6/06 12:22 PM | XY90-ZF42-9962-0651 | N/A | PURCHASED |
| R1000-2 | D-1003210-87912487 | $18.00 | $20.00 | 1/6/06 12:38 PM | Z410-9124-BC21-EG3X | P-10421087 | PURCHASED |
| R1000-3 | D-891266-101421011 | $0.00 | $25.00 | 1/6/06 12:40 PM | BB12-4XQ2-GF33-47WY | P-71032109 | PURCHASED |
| R1000-4 | D-001247-891333415 | $72.50 | $25.00 | 1/6/06 12:56 PM | XXF9-417B-GAB3-DY06 | P-71032100 | REDEEMED |
| R1000-5 | D-771043-213412879 | $72.50 | $20.00 | -- | -- | -- | AVAILABLE |
| R1000-6 | D-153478-567481254 | $35.00 | $40.00 | 1/6/06 1:01 PM | LGA4-2564-C17N-87R5 | P-25874125; P-64527158 | REDEEMED |

FIG. 10

1100A

| | GAME: G-10421 "BIG TEXAS OIL HUNT" 1105A | | | |
|---|---|---|---|---|
| | GAME TYPE FILE: M-9148712 1110A | GAME BRAND FILE: M-4170892 1115A | CASINO BRAND FILE: M-9148766 1120A | |
| | OUTCOME IDENTIFIER 1125A | OUTCOME 1130A | MEDIA FILE 1135A | DURATION 1135A |
| R1100A-1 → | O-000001 | NONWINNING COMBINATION | M-000001 | 4 SEC. |
| R1100A-2 → | O-000002 | CHERRY/ANY/ANY | M-000002 | 4 SEC. |
| R1100A-3 → | O-000003 | ANY/ANY/CHERRY | M-000003 | 4 SEC. |
| R1100A-4 → | O-000004 | CHERRY/CHERRY/ANY | M-000004 | 4 SEC. |
| R1100A-5 → | O-000005 | ANY/CHERRY/CHERRY | M-000005 | 4 SEC. |
| R1100A-6 → | O-000006 | CHERRY/ANY/CHERRY | M-000006 | 4 SEC. |
| R1100A-7 → | O-000007 | CHERRY/CHERRY/CHERRY | M-000007 | 4 SEC. |
| R1100A-8 → | O-000008 | BAR/ORANGE/ORANGE | M-000008 | 4 SEC. |
| R1100A-9 → | O-000009 | ORANGE/ORANGE/BAR | M-000009 | 6 SEC. |

FIG. 11A

1100B

| GAME: G-70418 "SANDS OF GOLD" 1105B | | | |
|---|---|---|---|
| | GAME TYPE FILE: M-9148712 1110B | GAME BRAND FILE: M-4170892 1115B | CASINO BRAND FILE: M-9148766 1120B |
| | PAYOUT 1125B | MEDIA FILE 1130B | DURATION 1135B |
| R1100B-1 | 0 | M-000001, M-000002,... | 4 SEC. |
| R1100B-2 | 1 | M-000109, M-000110,... | 4 SEC. |
| R1100B-3 | 2 | M-000123, M-000124,... | 4 SEC. |
| R1100B-4 | 3 | N/A | 4 SEC. |
| R1100B-5 | 4 | M-000135 | 4 SEC. |
| R1100B-6 | 5 | M-000136, M-000137,... | 4 SEC. |
| R1100B-7 | 6 | M-000152, M-000153,... | 4 SEC. |
| R1100B-8 | 7 | N/A | 4 SEC. |
| R1100B-9 | 8 | M-000158, M-000159 | 4 SEC. |
| | ∘∘∘ | ∘∘∘ | ∘∘∘ |
| R1100B-N | N | M-000NNN | 6 SEC. |

FIG. 11B

1200

| | SESSION IDENTIFIER: GC-01927 1205 | | |
|---|---|---|---|
| | MEDIA FILE ORDER 1210 | MEDIA FILE 1215 | MEDIA FILE DESCRIPTION 1220 |
| R1200-1 → | 1 | M-000001 | INTRO SCREEN |
| R1200-2 → | 2 | M-000001 | GAME BRAND |
| R1200-3 → | 3 | M-000007 | CASINO |
| R1200-4 → | 4 | M-000008 | OUTCOME |
| R1200-5 → | 5 | M-000004 | OUTCOME |
| R1200-6 → | 6 | M-000005 | OUTCOME |
| R1200-7 → | 7 | M-000003 | CONGRATULATIONS MESSAGE |
| R1200-8 → | 8 | M-000002 | OUTCOME |
| R1200-9 → | 9 | M-000009 | ADVERTISEMENT A123 |
| | ⋮ | ⋮ | ⋮ |

FIG. 12

1300

| | ORDER NO. 1305 | CUSTOMER IDENTIFIER 1310 | DISC IDENTIFIER 1315 | GAME BRAND 1320 | CASINO 1325 | DENOMINATION 1330 |
|---|---|---|---|---|---|---|
| R1300-1 | 099-4170-3218-22 | 099 | D-100321089912487 | SANDS OF TIME | STALLION CASINO | NICKEL |
| R1300-2 | 099-4170-3218-23 | 099 | D-100321087912488 | SANDS OF TIME | STALLION CASINO | PENNY |
| R1300-3 | 085-3210-4710-01 | 085 | D-100321087912489 | BIG TEXAS OIL HUNT | FRENCH RIVIERA CASINO | QUARTER |

FIG. 13A 1300 (CONT.)

| | WAGER PER PLAY 1335 | PAYOUT SCHEDULE IDENTIFIER 1340 | NUMBER OF GAME PLAYS 1345 | STARTING CREDIT METER BALANCE 1350 | END CREDIT METER BALANCE 1355 | SESSION IDENTIFIER 1360 |
|---|---|---|---|---|---|---|
| R1300-1 | $0.25 | PS-104 | 500 | $20.00 | $15.00 | S-789104 |
| R1300-2 | $0.25 | PS-104 | 500 | $25.00 | $37.50 | S-009142 |
| R1300-3 | $1.00 | PS-333 | 1,000 | $40.00 | $37.25 | S-412069 |

FIG. 13B 1300 (CONT.)

| | | ORDER SUBMISSION TIME 1365 | PRODUCTION START TIME 1370 | PRODUCTION STEP 1 TIME 1375 | PRODUCTION STEP N TIME 1380 | PRODUCTION COMPLETED TIME 1385 | SHIPPED TIME 1390 |
|---|---|---|---|---|---|---|---|
| R1300-1 | | 12/28/05 4:18 PM | 12/29/05 1:23 AM | 12/29/05 2:06 AM | 12/29/05 3:59 AM | 12/29/05 4:01 AM | 1/4/06 12:22 PM |
| R1300-2 | | 12/28/05 4:18 PM | 12/29/05 1:25 AM | 12/29/05 1:58 AM | 12/29/05 3:09 AM | 12/29/05 3:14 AM | 1/4/06 12:22 PM |
| R1300-3 | | 12/29/05 1:25 PM | 12/30/05 2:39 PM | 12/30/05 3:18 PM | 12/30/05 5:30 PM | 12/30/05 5:36 PM | 1/4/06 12:22 PM |

FIG. 13C

1400

| GAME IDENTIFIER: 91468 1405 | NUMBER OF GAME PLAYS: 500 1410 | | WAGER PER GAME PLAY: $0.50 1415 | |
|---|---|---|---|---|
| | FINAL CREDIT METER BALANCE 1420 | FIRST SET OF OUTCOMES 1425 | SECOND SET OF OUTCOMES 1430 | NTH SET OF OUTCOMES 1435 |
| R1400-1 | $0.00 | O-000001, O-000002,... | O-658741, O-489014,... | O-211442, O-366255,... |
| R1400-2 | $0.25 | O-000009, O-0000010,... | O-254719, O-1597532,... | O-473251, O-476325,... |
| R1400-3 | $0.50 | O-000123, O-000124,... | O-456721, O-351246,... | O-998753, O-999122,... |
| R1400-4 | $0.75 | N/A | N/A | N/A |
| R1400-5 | $1.00 | O-000135 | O-578931 | S-823541 |
| R1400-6 | $1.25 | O-000136, O-000137,... | O-617528, O-614759,... | O-136547, O-258978,... |
| R1400-7 | $1.50 | O-000152, O-000153,... | O-641573, O-741369,... | O-647138, O-582193,... |
| R1400-8 | $1.75 | N/A | N/A | N/A |
| R1400-9 | $2.00 | O-000158, O-000159 | O-963147, O-456713 | O-973146, O-753159 |
| | ⋮ | ⋮ | ⋮ | ⋮ |
| R1400-N | $8,000.00 | O-00NNNN | – | – |

FIG. 14

1500

| | RANDOM NUMBER (RANGE) 1505 | OUTCOME IDENTIFIER 1510 |
|---|---|---|
| R1500-1 → | 1-8570 | O-000001 |
| R1500-2 → | 8571-9250 | O-000002 |
| R1500-3 → | 9251-9930 | O-000003 |
| R1500-4 → | 9931-10130 | O-000004 |
| R1500-5 → | 10131-10330 | O-000005 |
| R1500-6 → | 10331-10398 | O-000006 |
| R1500-7 → | 10399-10418 | O-000007 |
| R1500-8 → | 10419-10460 | O-000008 |
| R1500-9 → | 10461-10466 | O-000009 |
| R1500-10 → | 10467-10508 | O-000010 |
| R1500-11 → | 10509-10528 | O-000011 |
| R1500-12 → | 10529-10533 | O-000012 |
| R1500-13 → | 10534-10583 | O-000013 |
| R1500-14 → | 10584-10587 | O-000014 |
| R1500-15 → | 10588-10607 | O-000015 |
| R1500-16 → | 10608-10627 | O-000016 |
| R1500-17 → | 10628-10647 | O-000017 |
| R1500-18 → | 10648 | O-000018 |

FIG. 15

1600

| | OUTCOME IDENTIFIER 1605 | OUTCOME 1610 | PAYOUT 1615 |
|---|---|---|---|
| R1600-1 | O-000001 | NONWINNING COMBINATION | 0 |
| R1600-2 | O-000002 | CHERRY/ANY/ANY | 2 |
| R1600-3 | O-000003 | ANY/ANY/CHERRY | 2 |
| R1600-4 | O-000004 | CHERRY/CHERRY/ANY | 5 |
| R1600-5 | O-000005 | ANY/CHERRY/CHERRY | 5 |
| R1600-6 | O-000006 | CHERRY/ANY/CHERRY | 5 |
| R1600-7 | O-000007 | CHERRY/CHERRY/CHERRY | 20 |
| R1600-8 | O-000008 | BAR/ORANGE/ORANGE | 10 |
| R1600-9 | O-000009 | ORANGE/ORANGE/BAR | 10 |
| R1600-10 | O-000010 | ORANGE/ORANGE/ORANGE | 20 |
| R1600-11 | O-000011 | BAR/PLUM/PLUM | 14 |
| R1600-12 | O-000012 | PLUM/PLUM/BAR | 14 |
| R1600-13 | O-000013 | PLUM/PLUM/PLUM | 20 |
| R1600-14 | O-000014 | BAR/BELL/BELL | 18 |
| R1600-15 | O-000015 | BELL/BELL/BAR | 18 |
| R1600-16 | O-000016 | BELL/BELL/BELL | 20 |
| R1600-17 | O-000017 | BAR/BAR/BAR | 50 |
| R1600-18 | O-000018 | 7/7/7 | 100 |

FIG. 16

3500

GAMING DEVICE IDENTIFIER: GD-104672 3505

DATA TYPE: PAYOUTS (CONSECUTIVE) 3510

3515

0, 2, 0, 0, 1, 0, 2, 0, 1, 4, 0, 0, 0, 1, 0, 1, 0, 0, 0, 0,1, 0, 1, 0, 2, 1, 2, 0, 0, 2, 1, 0, 1, 0, 0, 0, 1, 0, 0, 0, 3, 1, 0, 1, 1, 1, 0, 0, 2, 0, 3,
0, 6, 1, 1, 0, 0, 1, 4, 0, 0, 2, 0, 0, 0, 0, 9, 3, 0, 0, 0, 0, 0, 3, 0, 3, 2, 1, 0, 0, 0, 1, 1, 0, 0, 2, 1, 1, 0, 2, 1, 1, 0, 1, 2, 0, 2, 2, 0, 0, 0, 0, 1,
3, 0, 0, 9, 1, 0, 1, 1, 3, 1, 0, 0, 50, 0, 0, 1, 9, 1, 0, 2, 2, 1, 1, 0, 0, 0, 0, 1, 0, 800, 0, 1, 3, 1, 0, 0, 0, 1, 1, 0, 0, 3, 0, 0, 2, 3, 1, 3, 0, 2,
4, 2, 0, 0, 1, 0, 1, 0, 1, 2, 3, 1, 0, 0, 1, 2, 0, 0, 0, 2, 0, 0, 2, 1, 0, 1, 1, 2, 1, 0, 0, 0, 0, 0, 0, 9, 2, 3, 3, 3, 1, 1, 0, 0, 0, 0, 0, 2, 0, 0, 3, 2,
0, 1, 0, 0, 2, 1, 0, 0, 1, 2, 1, 1, 1, 1, 1, 0, 9, 1, 1, 0, 2, 0, 0, 0, 0, 1, 0, 0, 0, 0, 0, 0, 0, 2, 3, 0, 3, 4, 0, 1, 0, 0, 1, 0, 0, 2, 0, 0, 0, 0, 0, 0,
1, 0, 0, 0, 0, 2, 0, 1, 6, 2, 0, 0, 0, 1, 25, 0, 0, 1, 1, 3, 0, 0, 1, 1, 0, 1, 1, 2, 0, 2, 0, 0, 0, 0, 0, 2, 0, 2, 1, 0, 1, 0, 0, 1, 4, 0, 0, 2, 1, 0, 0,
1, 2, 2, 6, 1, 0, 0, 3, 0, 2, 0, 0, 1, 0, 0, 1, 1, 0, 1, 0, 9, 3, 2, 1, 0, 0, 0, 6, 2, 0, 0, 0, 0, 0, 0, 1, 0, 6, 1, 3, 4, 0, 0, 6, 0, 0, 1, 0, 0, 1, 1, 0,
3, 0, 9, 1, 2, 2, 0, 1, 0, 0, 0, 3, 3, 0, 0, 0, 1, 0, 3, 0, 2, 1, 2, 0, 2, 0, 1, 0, 0, 0, 0, 3, 2, 2, 2, 0, 0, 0, 0, 0, 0, 0, 0, 0, 0, 1, 0, 3, 9, 0, 0, 2,
0, 0, 0, 0, 0, 0, 0, 0, 2, 0, 1, 2, 0, 3, 4, 2, 0, 0, 0, 0, 0, 0, 0, 1, 0, 0, 2, 2, 0, 50, 2, 2, 1, 1, 1, 3, 0, 3, 2, 1, 0, 0, 0, 0, 2, 1, 0, 1, 0, 0, 0,
1, 0, 0, 0, 1, 1, 0, 4, 2, 0, 1, 0, 3, 3, 2, 3, 0, 2, 0, 1, 0, 3, 3, 0, 0, 0, 0, 0, 0, 0, 1, 0, 0, 0, 0, 0, 1, 3, 2, 0, 0, 0, 0, 9, 0, 1, 0, 4, 0, 1, 0, 1,
1, 0, 6, 0, 3, 0, 0, 2, 3, 0, 0, 0, 0, 0, 0, 4, 1, 0, 0, 0, 0, 1, 2, 3, 0, 3, 0, 0, 0, 0, 3, 1, 0, 0, 0, 0, 2, 0, 0, 0, 0, 0, 0, 2, 1, 0, 2, 1, 2, 3, 3,...

FIG. 35

METHODS AND SYSTEMS FOR DETERMINING AND SELLING WAGERING GAME OUTCOMES FOR A PLURALITY OF PLAYERS

The present application claims the benefit of U.S. Provisional Application Ser. No. 60/666,393, filed Mar. 29, 2005, and entitled METHODS, SYSTEMS AND APPARATUS FOR PROVIDING GAMBLING RESULTS THAT MAY BE VIEWED REMOTELY. The entirety of the above-identified application is incorporated by reference herein for all purposes.

The present application claims the benefit of U.S. Provisional Application Ser. No. 60/685,604, filed May 27, 2005, and entitled METHODS, SYSTEMS AND APPARATUS FOR PROVIDING GAMBLING RESULTS THAT MAY BE VIEWED REMOTELY. The entirety of the above-identified application is incorporated by reference herein for all purposes.

A. BRIEF DESCRIPTION OF THE FIGURES

Various embodiments of the present invention are described herein with reference to the accompanying drawings. In the drawings, like reference numerals indicate identical or functionally similar elements. The leftmost digit(s) of a reference numeral typically identifies the figure in which the reference numeral first appears. As will be understood by those skilled in the art, the drawings and accompanying descriptions presented herein indicate some exemplary arrangements for stored representations of information. A number of other arrangements may be employed besides the tables shown. Similarly, the illustrated entries represent exemplary information, but those skilled in the art will understand that the number and content of the entries can be different from those illustrated herein. A brief description of the drawings follows.

FIG. 7A is a table illustrating an example record of an example session database in accordance with some embodiments described herein.

FIG. 7B is a table illustrating an example record of another example session database in accordance with some embodiments described herein.

FIG. 8 is a table illustrating an example GD database in accordance with some embodiments described herein.

FIG. 9 is a table illustrating an example active sessions database in accordance with some embodiments described herein.

FIG. 10 is a table illustrating an example available DVDs database in accordance with some embodiments described herein.

FIG. 11A is a table illustrating an example record of an example media file database in accordance with some embodiments described herein.

FIG. 11B is a table illustrating an example record of another example media file database in accordance with some embodiments described herein.

FIG. 12 is a table illustrating an example record of an example session media file database in accordance with some embodiments described herein.

FIG. 13A-13C are a table illustrating an example embodiment of a DVD production queue database in accordance with some embodiments described herein.

FIG. 14 is an example record of an example outcome sets database in accordance with some embodiments described herein.

FIG. 15 is an example of a probability database in accordance with some embodiments described herein.

FIG. 16 is an example of a payout database in accordance with some embodiments described herein.

Figure 33:
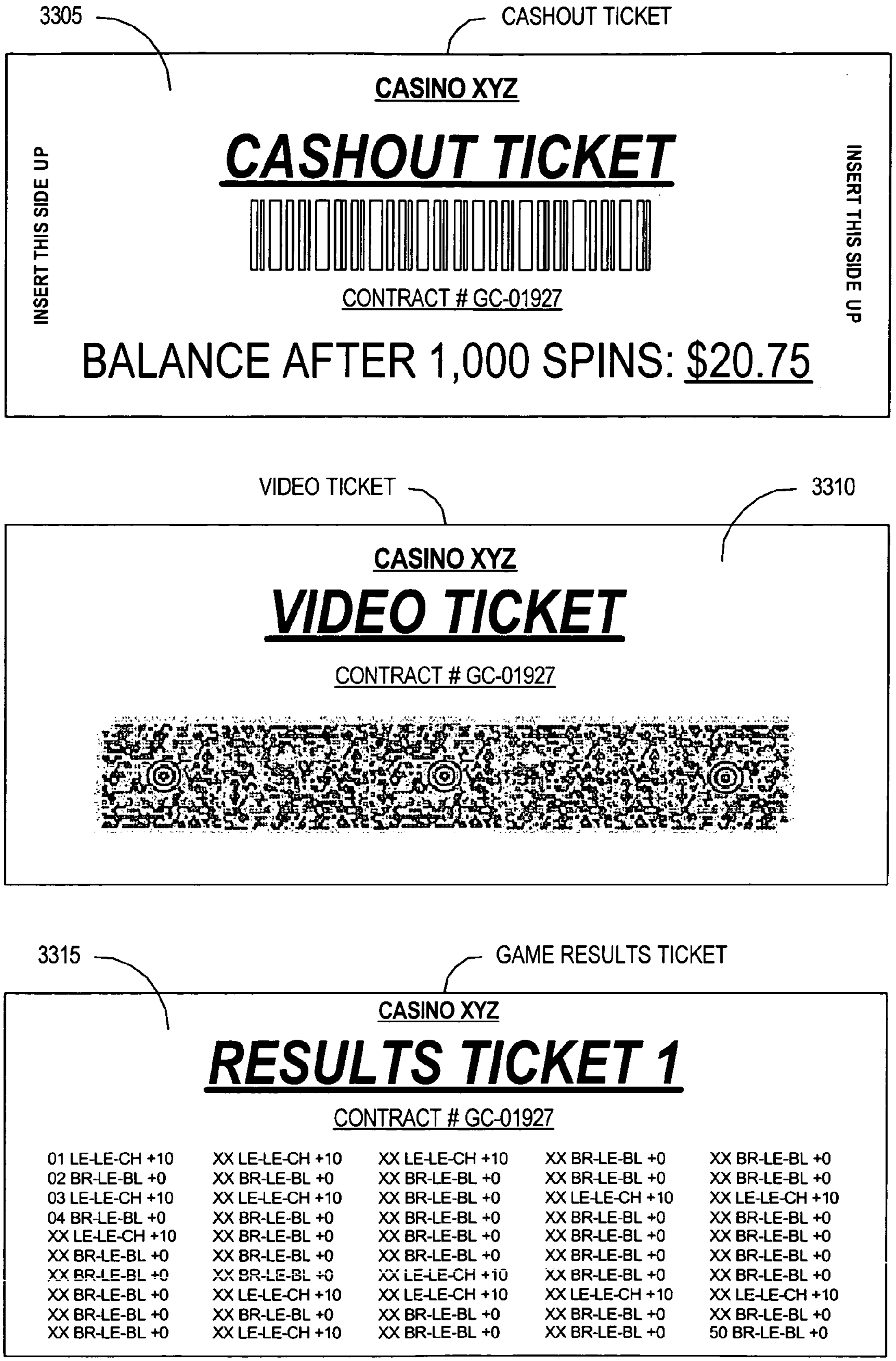

FIG. 33 includes several examples of a ticket that may be output in accordance with some embodiments described herein.

Figure 34:
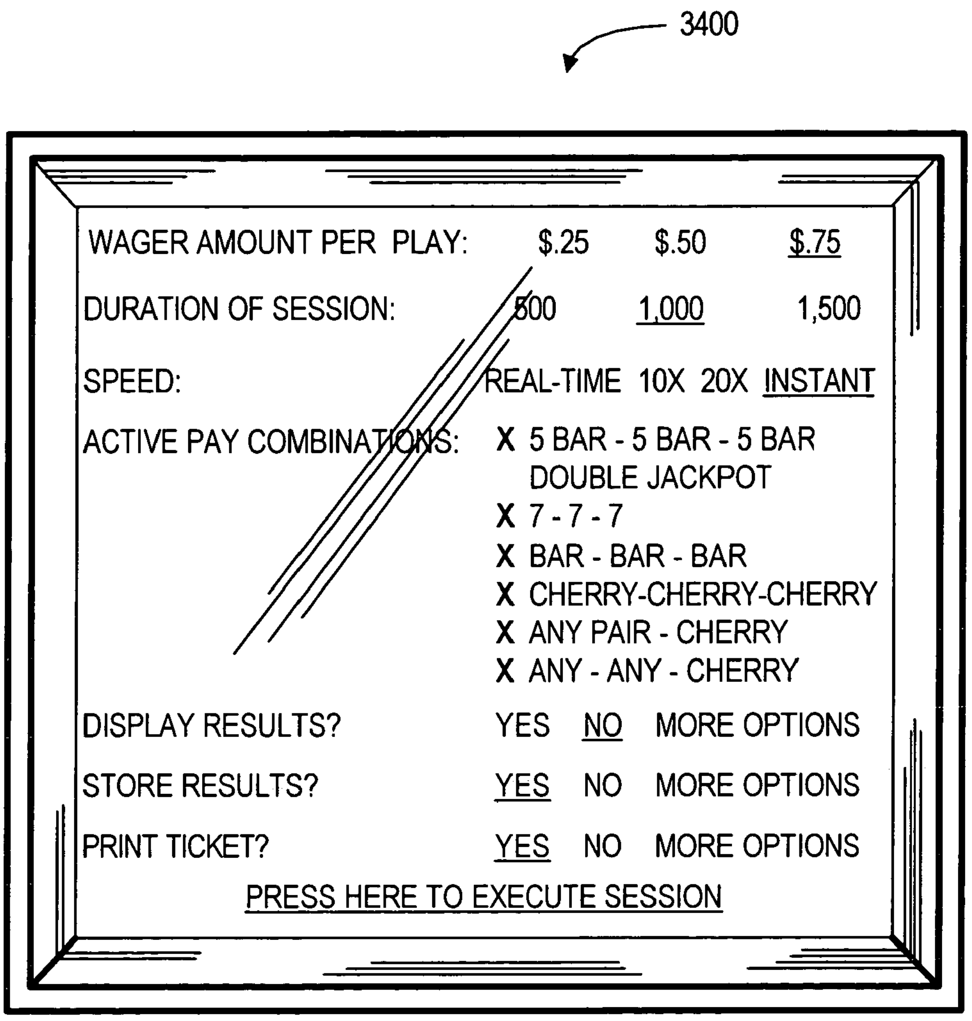

FIG. 34 is an example screen of information that may be output in accordance with some embodiments described herein.

FIG. 35 is an example record of a database that may store an indication of payouts determined during a session that may be output in accordance with some embodiments described herein.

B. DETAILED DESCRIPTION OF EMBODIMENTS

1. Introduction to Some Embodiments

In accordance with one or more embodiments, a method provides for determining a plurality of outcomes of a wagering game and storing an indication of the plurality of outcomes.

The method optionally further provides for associating at least one of the plurality of outcomes with a first player and optionally further provides for associating at least one of the plurality of outcomes with a second player.

The method further provides for selling, after the last of the plurality of outcomes has been generated, the plurality of outcomes to a purchaser (e.g., a player) in exchange for a price or other value. The plurality of outcomes may be provided to a player, for example, by being recorded on a tangible medium (e.g., a DVD), the tangible medium being provided to the player. In another embodiment, the plurality of outcomes may be provided to the player by being stored on a server device and providing the player access to the server device (e.g., such that the player may access the outcomes via the Internet).

A purchaser, as the term is used herein unless indicated otherwise, may refer to any person or other entity providing value in exchange for a plurality of outcomes. A purchaser may refer to, for example, a player, a customer who intends to give the plurality of outcomes to another as a gift, a retailer, or a casino. For convenience, several exemplary embodiments are described in this disclosure with respect to a player; it will be understood that any such embodiments may be applicable to other types of purchasers.

A player, as the term is used herein unless indicated otherwise, may refer to an actual person who is a player (e.g., one who might purchase or otherwise receive a purchased plurality of outcomes and/or one who may redeem value associated with a set of purchased outcomes), to a simulated player (e.g., a "RED" player represented or identified on a game disc in association with a particular set of game results or outcomes), and/or to a simulated player associated with an actual person or player (e.g., for purposes related to purchasing outcomes, game play/viewing of purchased outcomes, and I or redemption of value).

An outcome, as the term is used herein unless indicated otherwise, refers to a result of a game play, which may be indicated by a payout (i.e., a prize or benefit to be provided as a result of the game play) and/or one or more indicia representative of the result. For example, an outcome may comprise the set of indicia (or payout corresponding thereto) that may be displayed along a payline of a reeled slot machine. In another example, an outcome may comprise a roulette number that is a result of a roulette spin. In some embodiments, more than one set of indicia may represent the same result or outcome.

In accordance with one or more embodiments, a method provides for causing a plurality of actual outcomes to be generated on a computing device operable to simulate play of a wagering game, in which generating a first actual outcome of the plurality of actual outcomes is based on a previously generated second actual outcome of the plurality of actual outcomes, and in which the first actual outcome is associated with a first player and the second actual outcome is associated with a second player. In one embodiment, the method further provides for determining data indicative of the plurality of actual outcomes; determining, based on the data, a plurality of representations (e.g., images and/or other video and/or audio), each representation representing an outcome to be stored on a tangible medium, each representation thereby comprising a representative outcome; causing the plurality of representative outcomes to be stored on a tangible medium; and making the tangible medium available for sale.

In one embodiment, an outcome may be represented via indicia of a media file. A media file may comprise graphical and/or audio data. The graphical data may comprise a still or animated image of one or more indicia. In some embodiments, more than one media file may correspond to a particular outcome or result. For example, more than one media file may correspond to an outcome that results in zero credits being added to a credit meter balance.

A game, as the term is used herein unless indicated otherwise, comprises a wagering activity conducted in accordance with a particular set of rules via which a prize or benefit may be won in exchange for consideration.

A game play, as the term is used herein unless indicated otherwise, refers to a single instance or round of a game. A game play may result in a single outcome (e.g., set of indicia and corresponding payout, if any).

A type of game, as the term is used herein unless indicated otherwise, refers to a category of games that share one or more characteristics.

In accordance with one or more embodiments, a method provides for causing a plurality of actual outcomes to be generated on a gaming device operable to facilitate a wagering game and determining data indicative of the plurality of actual outcomes. The method further provides for determining, based on the data, a plurality of representations (e.g., images and/or other video and/or audio), each representation representing an outcome to be stored on a tangible medium, each representation thereby comprising a representative outcome. The method further provides for causing the plurality of representative outcomes be stored on a tangible medium and making the tangible medium available for sale.

An actual outcome, as the term is used herein unless indicated otherwise, is an outcome directly determined by a GD. For example, an actual outcome may comprise the random number determined by the random number generator of a GD, the particular set of indicia that corresponds to the random number based on the probability table used by the GD and/or the payout that corresponds to the random number.

A representative outcome, as the term is used herein unless indicated otherwise, is an indication of an actual outcome, the representation being determined based on the actual outcome and, in some embodiments, by a device other than a GD. For example, an AS may determine, based on a random number determined by a GD, a media file to represent the actual outcome determined by the GD. The media file may comprise a graphical representation of a set of indicia and this set of indicia may be a representative outcome corresponding to the actual outcome determined by the GD.

It should be understood that, for a particular set of outcomes, the set of actual outcomes may correspond to the same sum of payouts as does the corresponding set of representative outcomes.

In some embodiments, the outcome in a set of actual outcomes that corresponds to a set of representative outcomes may (i) differ in number; (ii) differ in order (i.e., the actual outcomes may have been generated in a first order while the representative outcomes may be presented in a second order); and/or (iii) differ in indicia or form of indicia.

A session, as the term is used herein unless indicated otherwise, is a plurality of game plays conducted for the purpose of determining a plurality of outcomes to be sold (e.g., to a player or other type of purchaser). For example, a session may refer to a plurality of game plays executed by a GD, based on which plurality of game plays (e.g., representative outcomes and/or actual outcomes) a video representation of outcomes is created and recorded onto a DVD or other tangible medium, or based on which plurality of game plays the video presentation is otherwise made available to a player. A session may be completed over a plurality of distinct time periods (e.g., some of the outcomes comprising the session may be generated at a first date and/or time while more of the outcomes comprising the session may be generated at a second date and/or time). Further, a session may be executed on a plurality of GDs (e.g., simultaneously or in parallel fashion and/or at various times). A session may be deemed to be completed once an end event defining the end of the session has occurred (e.g., a predefined number of outcomes has been generated, outcomes have been generated for a predefined period of time, a credit meter balance has reached a predefined value, etc.). In some embodiments, a session may be deemed to be completed once one of a plurality of possible end events occurs, whichever end event occurs first.

According to some embodiments, a session may refer to a plurality of game plays conducted for the purpose of determining a plurality of outcomes, in which the plurality of (representative and/or actual) outcomes may be associated with, or correspond to, one or more (real and/or simulated) players. In one example, one or more players may request a session that is executed to determine a plurality of outcomes that are then sold to the player(s). In another example, a video representation of outcomes is created that includes at least one outcome corresponding to one simulated and/or actual player, and at least one outcome corresponding to a different simulated and/or actual player.

It should be noted that although the terms DVD and game disc are used herein to refer to a tangible medium on which an indication of a plurality of outcomes may be recorded and which tangible medium may be sold to a player, these terms are used for purposes of brevity only and should not be taken in a limiting fashion. All references to DVD or game disc likewise include any other form of tangible medium that may be appropriate and practicable for recording an indication of outcomes (e.g., a video presentation) for subsequent remote viewing by a player. For example, paper (e.g., a flip-through book), a CD-ROM, a VHS tape, flash memory, a memory stick, a digital video tape, an MP3 file, or any other tangible medium for recording information may be used. Further, practicable variations of such media are contemplated (e.g., DVD-R, CD-R, CD-RW, etc.). It should be understood that the use of the term DVD or game disc is a reference to any and all such tangible mediums.

In accordance with one or more embodiments, a method provides for receiving, from a player, a request for a payout corresponding to a plurality of outcomes previously sold to the player, wherein the payout is a function of a sum of payouts of the plurality of outcomes, and wherein the plurality of outcomes had been sold to the player as a package without providing to the player an indication of the payout. A payout corresponding to a DVD that is a function of a sum of payouts of the plurality of outcomes or an aggregate of the payouts may be, in some embodiments, the "redemption value" of the DVD or other medium via which session information is remotely viewable. The method further provides for verifying a legitimate purchase of the plurality of outcomes by the player, verifying the payout and providing the payout to the player. In some embodiments, the method may further provide for storing an indication of the payout having been provided to the player and/or verifying that the payout has not previously been provided to the player.

The term "redemption value" is used herein to refer to a monetary amount or prize that a player may redeem a purchased DVD for. This term refers, unless indicated otherwise, to a value that is a function of a sum of payouts (which may be a single payout in some instances), the payouts being the payouts corresponding to the outcomes represented on the DVD. The value may be, for example, a function of (i) the starting credit meter balance at the beginning of the session executed to determine the outcomes represented on the DVD, (ii) a sum of wagers posted for the game plays comprising the session; and (iii) the payouts won as a result of game plays comprising the session. For example, assuming a session is executed with a starting balance of $5.00, twenty game plays are executed during the session at a wager of $0.25 per game play, and three of these game plays result in a payout greater than zero (the first payout being $4.00, the second payout being $12.00 and the third payout being $3.00), the ending credit meter balance at the end of the session is $19.00. Thus in some embodiments the redemption value of the DVD may be the ending credit meter balance, which is $19.00 in the above example. In other words, a player who purchases this DVD for $20.00 may redeem the DVD for $19.00.

In accordance with one or more embodiments, a method provides for selling a plurality of outcomes as a package, wherein the plurality of outcomes is based on at least one random number result generated by a gaming device operable to facilitate a wagering game, and wherein the selling occurs after the at least one result has been generated and prior to a payout for any outcome of the plurality of outcomes having been provided to a player.

In accordance with some embodiments, provided are apparatus, systems and methods for enabling casino patrons to view gambling results remotely. In one or more embodiments, a player may purchase a session of game plays from a casino. Using a gaming device located within the casino, the session may then be executed on the player's behalf according to parameters of the session (e.g., number of game plays, wager per game play, payout combinations active, game, gaming device or type of gaming device, etc.). For example, a slot machine may be configured to rapidly generate a plurality of outcomes on the player's behalf. In some embodiments, files representing the generated outcomes may then be stored on media (e.g., a CD-ROM or DVD). The player may then remotely view the previously generated outcomes at a later time (e.g., using one or more devices such as home computers, televisions, DVD players, PDAs, cellular phones, and so on), so as to experience wins and losses associated with the session.

Some embodiments will now be described with reference to FIGS. 1-29.

Figure 1:
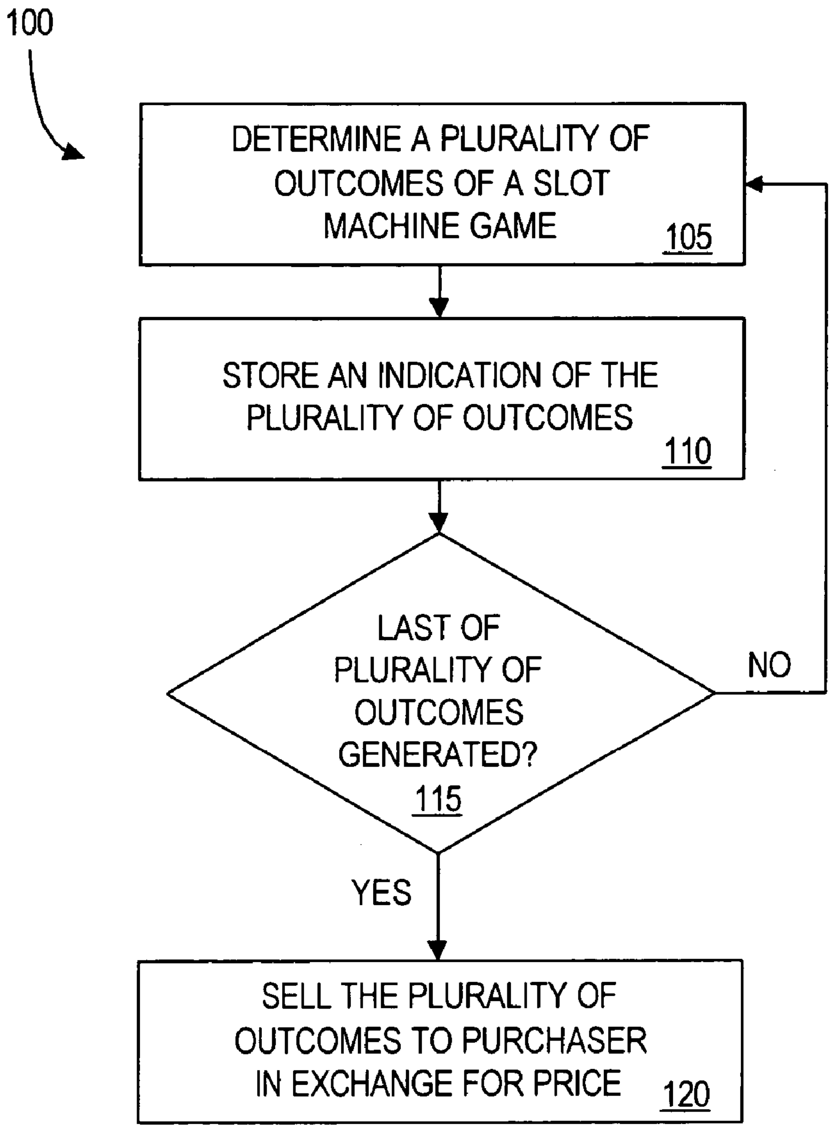
FIG. 1 is a flowchart of an example process according to some embodiments described herein.

Referring now to FIG. 1, illustrated therein is a flowchart of an example process 100 that may be performed in accordance with one or more embodiments. It should be noted that, as is true for all processes described herein, process 100 may, in some embodiments, be performed by a variety of devices and/or persons. For example, one or more of the steps described may be performed by a GD (described in detail with reference to FIG. 6), one or more of the steps may be performed by a CS (described in detail with reference to FIG. 4), one or more of the steps may be performed by a AS (described in detail with reference to FIG. 5), one or more steps may be performed by another device (e.g., CPD, POS, or another device) and/or one or more of the steps may be performed by a person (e.g., a casino attendant or player). Further, the steps may be performed in an order different from that described. Further still, additional or different steps may be included and some steps may be omitted or modified, as appropriate and/or practicable.

In step 105, a plurality of outcomes of a slot machine game is determined. Determining the plurality of outcomes may comprise, for example, determining a plurality of actual outcomes. For example, if step 105 is being performed by a GD, determining a plurality of outcomes may comprise generating a plurality of random numbers, each random number comprising an outcome. If step 105 is being performed by another device (e.g., CS 305 or AS 310, both described below with respect to FIG. 3), step 105 may comprise determining an indication of a plurality of actual outcomes generated by a GD. For example, such an indication may be received via an electronic transmission from a device (e.g., a GD may transmit such an indication to a CS and/or AS via a network connection). In another example, such an indication may be received via a printed document (e.g., a session results ticket, described below (particularly with reference to FIG. 33)) may include a bar code or other encoded information readable by a CS and/or AS, for determining the indication.

An indication of the plurality of outcomes may comprise, for example, one or more of the following information:

(i) a sum of payouts won as a result of the plurality of outcomes;

(ii) an ending credit meter balance at the end of a session comprising the plurality of outcomes;

(iii) a set of indicia representative of one of the plurality of outcomes (e.g., a result of a roulette spin, a plurality of symbols representing a hand of video poker, a plurality of symbols that may be displayed along a payline of a reeled slot machine, etc.);

(iv) a game for which the plurality of outcomes was determined;

(v) a sum of wagers posted for the plurality of outcomes;

(vi) a price of the session;

(vii) a beginning credit meter balance at the beginning of a session comprising the plurality of outcomes;

(viii) a player associated with at least one of the plurality of outcomes (e.g., in embodiments in which a player requests a session prior to it being executed, or in embodiments in which a first player is associated with a first subset of the plurality of outcomes and a different player is associated with a different subset of the plurality of outcomes);

(ix) a casino attendant associated with the plurality of outcomes (e.g., the casino attendant who authorized, supervised and/or executed the session comprising the plurality of outcomes);

(x) a unique identifier of a session comprising the plurality of outcomes (e.g., such that information regarding the plurality of outcomes may be determined by accessing an appropriate database based on the unique identifier);

(xi) a unique identifier corresponding to an outcome of the plurality of outcomes;

(xii) an identifier of a media file corresponding to an outcome of the plurality of outcomes;

(xiii) a time and/or date at which an outcome of the plurality of outcomes was generated;

(xiv) a gaming device on which the plurality of outcomes was generated;

(xv) a type of gaming device on which the plurality of outcomes was generated;

(xvi) an activation ID used to determine sale of a session; and (xvii) a redemption ID used to determine redemption of a session.

As described herein, in some embodiments determining an indication of a plurality of outcomes may comprise determining one or more players corresponding to the plurality of outcomes. In some embodiments, a first player may be associated with a subset of the plurality of outcomes, and a second player may be associated with a different subset of the plurality of outcomes. In some embodiments, a player may be associated with more than one subset. Some methods and systems provide for associating at least one of the plurality of outcomes with a first player and for associating at least one of the plurality of outcomes with a second player.

In some embodiments, determining a plurality of outcomes may comprise determining a plurality of representative outcomes. For example, if step 105 is being performed by an AS, determining a plurality of outcomes may comprise determining an indication of a plurality of outcomes (e.g., the payouts corresponding to each outcome of the plurality of outcomes, a sum of payouts corresponding to the plurality of outcomes, or any other of the information listed above) and selecting representative outcomes to represent a plurality of actual outcomes generated by a GD.

It should be understood that in some embodiments a plurality of outcomes are generated (e.g., a session of game plays is executed to determine a plurality of outcomes to be recorded on a DVD) prior to any player expressing any interest in purchasing the plurality of outcomes. For example, an entity (e.g., casino, GD manufacturer and/or other entity) may create (or cause to be created) DVDs, each DVD having recorded therein a video representation of a plurality of outcomes, and place the created DVDs on a casino floor for purchase by players.

In some embodiments, a player may purchase, request or otherwise agree to a session (e.g., the player may request or order a DVD of outcomes to be created on behalf of the player). In such embodiments, methods for providing gaming contracts and/or flat rate gaming sessions may be applied to embodiments described herein. Many such methods are described in commonly-owned, co-pending U.S. Provisional Application No. 60/627,670, filed Nov. 12, 2004, entitled “GAMING DEVICE OFFERING A FLAT RATE PLAY SESSION AND METHODS THEREOF”; U.S. Provisional Application No. 60/600,211, filed Aug. 10, 2004, entitled “SYSTEMS, METHODS AND APPARATUS FOR ADMINISTERING GAMING CONTRACTS”; U.S. application Ser. No. 10/636,520, filed Aug. 7, 2003, entitled “SYSTEM AND METHOD FOR COMMUNICATING GAME SESSION INFORMATION”; U.S. application Ser. No. 10/635,986, filed Aug. 7, 2003, entitled “SYSTEM AND METHOD FOR REMOTE AUTOMATED PLAY OF GAMING DEVICES”; U.S. patent application Ser. No. 10/001,089, filed Nov. 2, 2001, entitled “GAME MACHINE FOR A FLAT RATE PLAY SESSION AND METHOD OF OPERATING SAME”; and U.S. Pat. No. 6,077,163, filed Jun. 23, 1997, entitled “GAMING DEVICE FOR A FLAT RATE PLAY SESSION AND METHOD OF OPERATING SAME”; the entirety of each are incorporated herein by reference for all purposes.

For example, a player may request a session by (i) actuating an input device of a gaming device, kiosk or other device described herein (e.g., the player actuates an icon of a touch-sensitive display screen advertising “Purchase a DVD” or other similar text), (ii) indicating such a desire verbally to a casino representative (e.g., in person or over the phone), (iii) filling out and submitting forms or other paperwork, and so on.

In some embodiments, a session may comprise a remote session, wherein a player need not be present to execute one or more game plays associated with the session (e.g., a player purchases 1,000 spins of a slot machine for a flat price of $15). For example, after receiving a request to execute such a remote session, a casino attendant may execute (or cause to be executed) the session on the player’s behalf using a GD on casino premises. The player may then remotely view data associated with the session (e.g., representative outcomes determined based on the results of the session) at a later time without necessarily gambling outside of casino premises (e.g., the player simply views results which have already been generated in a legal jurisdiction). Those familiar with the current legal framework concerning gambling in the Unites States will appreciate the advantages of such a system (e.g., it allows players to place legal slot machine bets and watch the results from home).

Irrespective of whether a session is executed on behalf of a player after the player requests the session or whether the session is executed prior to any player expressing an interest in the session, several parameters and values thereof may be associated with (e.g., define) a session. For example, a session may be defined by one or more parameters, including but not limited to (i) a number of players with whom the session is associated (e.g., the session will be used to generate a video representation that simulates game play by four different players);

(ii) a game and/or type of game for which the game plays of the session are to be conducted (e.g., “Big Texas Oil,” keno, roulette, “Crazy Triple Joker Poker,” 5-reeled slot machine game) that may be helpful in determining how the session(s) should be executed (e.g., for a multiplayer bingo game, a device operable to simulate multiplayer play may be required);

(iii) an average, minimum, maximum or specified wager amount per game play (e.g., a session parameter specifies that $0.25 will be wagered per game play);

(iv) one or more gaming devices on which game play may occur (e.g., any video slot machine, any video poker machine except “Crazy Triple Joker Poker,” any “Big Texas Oil” machine, the “Big Texas Oil” machine in Room Z numbered GD-BTO-0012, and so on);

(v) active pay combinations and/or a payout schedule to be used during the execution of game plays comprising the session (e.g., a session parameter specifies that an outcome of “BAR-BAR-BAR” pays 1,500 coins, and so on);

(vi) a date and/or a time (e.g., of day) during which the session may be executed (e.g., between 6 and 10 a.m. on Jan. 01, 2006);

(vii) a refund rate or amount payable to a player (e.g., the player will receive a refund of 50% of net losses incurred due to the session);

(viii) a manner in which game play or the game results thereof will be made available to players (e.g., the casino will provide a DVD comprising video renderings of outcomes generated previously by a gaming device on the casino floor; the casino will enable the player to play one or more gaming devices on the casino floor in person, such that the player may be present when game play occurs; the casino will provide a code which a player may later use online to access video renderings of outcomes previously generated by a gaming device on the casino floor; etc.);

(ix) a price, which may represent, for example, how much the player pays in exchange for gaining access to the plurality of outcomes determined as a result of a session (e.g., how much a player pays for a DVD on which a video representation of the outcomes is recorded);

(x) a session duration, which may be defined, for example, in time, number of game plays (e.g., the session ends after two hours or the session ends after 1,000 game plays) or another ending event (e.g., the session ends when the credit meter balance reaches zero or another predetermined value); and (xi) other stipulations related to game play (e.g., a number of paylines of a slot machine game that should be bet on, a strategy for holding/discarding cards in a poker game, wager per payline, etc.).

In embodiments in which a session is executed on behalf of a particular player, a player may select, purchase or otherwise agree to such parameters when requesting a session (e.g., the player uses an input device of a GD to select certain parameters, the player selects certain parameters by checking off appropriately labeled boxes of a paper form, the player verbally instructs a casino attendant that he agrees to certain parameters, and so on). It should be noted that, as described in the above-referenced commonly owned patents and patent applications, the parameters a player selects may have an affect on the session price (e.g., generally, more game plays, higher wager amounts and more active pay combinations may require higher session prices).

In this manner, a player may request that a session characterized by certain parameters be executed. For example, a player may provide a session price of $15, and in turn, a casino may agree to provide 1,000 game plays of a particular GD at a wager amount of 25¢ per game play. Further, a manner in which game play or game results may be provided may be stipulated (e.g., the casino will provide a DVD comprising a video presentation of outcomes generated by a GD on the casino floor). In some embodiments, additional parameters may define a session and may be set by a player, casino and/or other entity. For example, a time during which game play may occur may be stipulated (e.g., game play will be generated on the player’s behalf at any time deemed appropriate by the casino before Thursday night). Still further, a time/date when game results may be provided to a player may be stipulated (e.g., the player agrees to allow 1-2 weeks for the delivery of a DVD comprising a video presentation of outcomes generated by a GD on the casino floor). Accordingly, a system of the present invention may receive a request to execute a session, such as a remote session, wherein a GD may be configured to execute a plurality of game plays on the players behalf while the player is not present, with the results of said game plays being provided to a player in a manner such that the player may view the results remotely.

It should be noted that, in some embodiments, when requesting that a session be executed, a player may provide various contact information (e.g., postal address, phone number, e-mail address, and so on), such that players may be provided with the results of the session via the contact information (e.g., a code my be e-mailed to the e-mail address, the code for accessing the results online or a DVD may be mailed to the postal address, etc.).

In embodiments in which a session is executed prior to any player expressing an interest in the session (e.g., embodiments in which DVDs of sessions are massively produced and made available for purchase), an entity such as a casino, GD manufacturer and/or other entity may define the parameters and values thereof defining a session. For example, such an entity may program a GD to execute 1000 sessions, each session being defined by a set of particular parameters (and values thereof).

In some embodiments, step 105 (or another or additional step) may comprise storing an indication of parameters defining a session in association with the session (e.g., in association with a unique session identifier in a record of an appropriate database). In one or more embodiments, a unique session identifier (e.g., numeric or alphanumeric identification code) may be associated with each session that is executed or that is scheduled for execution. In some embodiments, such information may be stored electronically. For example, various parameters and values thereof may be stored in a record of a database, each record defining a session executed, available for execution and/or scheduled to be executed. It should be noted that such a database may be stored in a variety of locations, including but not limited to within a GD and/or CS. Alternately or additionally, a physical, non-electronic record of such session parameters may be kept. For example, if a player has filled out a paper form indicating various session parameters, the form may be filed away or saved such that it may later be used when executing the session. In another example, both a physical and an electronic record may be kept (e.g., a casino attendant may enter desired session parameters and values thereof using a computing device such that they are recorded in a database, then use a software application of the computing device to print a physical piece of paper indicating the desired parameters and values thereof).

In summary, irrespective of whether a session is prompted by a request from a player or is produced without a player request (e.g., as part of a mass production process), step 105 comprises determining a plurality of outcomes comprising the session. The step may comprise one or more subroutines, such as a subroutine for (i) determining one or more parameters (and values thereof) defining a session comprising the plurality of outcomes; (ii) generating the plurality of outcomes; (iii) determining an indication of the plurality of outcomes (which may comprise determining an indication of a plurality of actual outcomes and/or determining an indication of a plurality of representative outcomes); (iv) decoding or interpreting the indication to determine a plurality of representative outcomes; and/or (v) selecting a plurality of media files, each media file corresponding to an outcome of the plurality of outcomes. Such subroutines and others are described in detail below, particularly with respect to FIGS. 19-26.

It should be noted that when reference is made to an "outcome" herein, such reference may refer to an actual outcome and/or a representative outcome. In step 110, an indication of the plurality of outcomes is stored. Storing an indication of the outcomes may comprise, for example, one or more of (i) storing an indication of the outcomes in a memory (e.g., a mass storage device) of a device such as a GD, CS or AS; (ii) recording (or causing to be recorded) an indication of the plurality of outcomes on a DVD; and (iii) printing (or causing to be printed) an indication of the plurality of outcomes on a document (e.g., a session results ticket). It should be understood that an indication of a plurality of outcomes may comprise any and all of the information described with respect to step 105.

For example, storing an indication of outcomes may comprise a GD transmitting an indication of the plurality of outcomes to a CS and the CS in turn transmitting the indication (or another indication based on the indication received from the GD) to an AS. Step 110 may further comprise the AS creating a video representation of the plurality of outcomes (e.g., by selecting a plurality of media files, each media file corresponding to one of the plurality of outcomes) and recording the media files onto a DVD.

In one embodiment, storing an indication of the plurality of outcomes may comprise storing a representative outcome for each of the plurality of outcomes. In one embodiment, storing an indication of the plurality of outcomes may comprise recording a plurality of media files onto a DVD, each media file corresponding to one outcome of the plurality of outcomes or, alternatively, combining the plurality of media files into a single media file and storing that to the DVD. In one embodiment, storing an indication of the plurality of outcomes may comprise storing an indication of each outcome of the plurality of outcomes.

In one embodiment, storing an indication of the plurality of outcomes may comprise populating a record of an appropriate database (e.g., with an indication of each outcome of the plurality of outcomes) for subsequent creation of a video presentation of the plurality of outcomes. For example, a first program of a device may receive an indication of the plurality of outcomes and determine particular representative outcomes (e.g., particular payouts and the order thereof, particular media files and the order thereof, and/or particular sets of indicia, each set corresponding to an outcome of the plurality of outcomes). This first program may cause the determined information to be stored in a database. A second program may then create a video representation of the outcomes. A third program may then cause the video presentation to be recorded onto a DVD. Of course, a single program may be used or the first, second and third program may be combined in any manner practicable and desirable. Further, the first, second and third program may each be performed by different devices or the same device, and the devices may or may not be geographically proximate to each other, depending on what is practicable and desirable.

In one or more embodiments, step 110 may comprise storing a result of a session (e.g., an indication of outcomes determined for the session) in an electronic manner. For example, as described, data associated with a session may be stored electronically in a session database (e.g., a session database 425, an example record of which is illustrated in FIGS. 7A and 7B). In some embodiments, session data may be stored on a smart card (e.g., a smart card inserted into a reader device in communication with a GD) or another portable storage medium.

Storage and/or transmission of an indication of the plurality of outcomes may occur at any time. For example, some indication of the plurality of outcomes may be stored and/or transmitted prior to the execution of a session corresponding to the plurality of outcomes (e.g., an indication of the session identifier and/or parameters of the session may be stored in a record of a database upon the session being scheduled and/or ordered). In another example, some indication of the plurality of outcomes may be stored and/or transmitted during or after the execution of a session (e.g., game play results are individually stored as they are generated; game play results are stored in RAM while they are being generated, then written to ROM and erased from RAM; and so on). Thus, step 110 may comprise transmitting and/or storing an indication of a plurality of outcomes electronically to a memory.

It should be appreciated that such data may be stored electronically in a variety of formats. For example, as depicted by FIGS. 7A and 7B, various data may be stored as records of a database entry associated with a session identifier. For example, in one embodiment, a database may store text indicating any or all of a wager amount, outcome, outcome identifier and payout amount associated with a particular game play number (e.g., the first game play of a session is game play "1"). In some embodiments, an indication of a plurality of outcomes or other data associated with a session may be stored electronically in an encoded fashion. For example, a bit function representing an outcome may be stored in a database (e.g., "BAR-LEMON-CHERRY" is stored as 0129-2938-3847, each four-digit sequence representing a particular symbol).

In some embodiments, storing an indication of the plurality of outcomes may comprise accessing a media file database (e.g., an example embodiment of which is depicted in FIGS. 11A and 11B, respectively) to determine a media file (e.g., a media file associated with a result of a game play), and then storing an indication of a game play number along with an associated media file.

Alternately or additionally, storing an indication of the plurality of outcomes may comprise outputting the indication in some physical, non-electronic fashion. For example, in some embodiments, a GD may actuate a printer device to print a bar code encoding the indication of the plurality of outcomes (e.g., an indication of a session result). For example, a GD may print upon a conventionally sized TITO ticket a high-density barcode encoding an indication of the plurality of outcomes associated with an executed session. For example, text, numerals or other symbols stored within a session database (e.g., a series of outcome identifiers) may be encoded such that they are represented graphically by a barcode such as a high-density barcode. Various methods of encoding such text and/or numerals graphically using a high-density barcode are contemplated. In further embodiments, encoding an indication of the plurality of outcomes as a printed barcode may comprise accessing a media file database (e.g., see FIG. 12) to determine a media file associated with an outcome, and then encoding a game play number along with an associated media file or indication of an associated media file (e.g., an identifier that uniquely identifies a media file).

Accordingly, in various embodiments, storing an indication of the plurality of outcomes may comprise outputting and/or storing the indication in an electronic and/or physical fashion. As described, in some embodiments, a session may have been executed without interaction from a user (e.g., agent), as an electronic signal instructing a GD to execute a session defined by certain parameters and values thereof may be sent by a separate device. Accordingly, in some embodiments, a person (e.g., a casino attendant or player) may approach a GD and access or attain an indication of the plurality of outcomes corresponding to the session. For example, a casino attendant may be dispatched to collect a cashout ticket, video ticket and/or session results ticket from a GD. In another embodiment, a casino attendant may be dispatched with a smart card or other portable memory device (e.g., a CPD). The casino attendant may insert the smart card into a reader device of a GD, and the indication of the plurality of outcomes may be transferred or copied from a memory of the GD to a memory of the smart card or other portable memory device. For example, in one embodiment, an indication of the plurality of outcomes may be stored temporarily in GD memory until it is retrieved by a casino attendant or player (and, e.g., transferred to a smart card) and/or transmitted to another device.

In step 115, it is determined whether the last of the plurality of outcomes has been generated. In some embodiments, a session is not considered to be completed (and thus the results of the session not ready for sale or other provision to a player) until the last of the outcomes comprising the session has been generated. Accordingly, it may be determined whether the last of the outcomes has been generated. For example, a parameter of a session defining the duration of the session may be determined (e.g., a number of outcomes) and compared to the data comprising the indication of the plurality of outcomes. If the data indicates that the number of outcomes defined by the parameter is the same as the number of outcomes indicated by the indication, it may be determined that the last of the plurality of outcomes has been generated. In another example (e.g., one in which step 115 is being performed by a GD), determining whether the last of the plurality of outcomes has been generated may comprise determining whether the session has been completed by determining whether the end event defined by a parameter of the session has occurred (e.g., determining an elapsed time since a beginning of the session).

In some embodiments an indication of a plurality of outcomes may not be received by a particular device performing step 115 unless and until the last of a plurality of outcomes has been generated. In such embodiments, step 115 may be superfluous. Alternatively, an affirmative determination to step 115 may be determined if it is determined that the indication of the outcomes has been received.

In one embodiment, step 115 may further comprise determining whether the last of representative outcomes corresponding to actual outcomes of a session have been determined. For example, if step 115 is being performed by a device creating a video representation of the outcomes or selecting media files for the plurality of outcomes, each media file comprising a representative outcome, step 115 may comprise determining whether the last of the representative outcomes has been determined (e.g., whether a representative outcome for each of a plurality of actual outcomes comprising a session has been determined).

If it is determined that the last of the plurality of outcomes has not been generated (e.g., the session comprising the plurality of outcomes is not yet complete), the process returns to step 105, in which the remainder of the plurality of outcomes (or more of the plurality of outcomes) are determined. Otherwise, the process 100 continues to step 120.

In step 120, the plurality of outcomes is sold to a purchaser in exchange for a price. Of course, it should be understood that in some embodiments the plurality of outcomes may be provided to a player or other recipient without receiving a price therefore. For example, the plurality of outcomes may be provided as a reward (e.g., for loyalty to a casino or certain desirable play behavior), gift or incentive. Further, it should be understood that any price received in exchange for the plurality of outcomes may be a monetary amount (e.g., U.S. dollars) or may be in another form of consideration. For example, a recipient may agree to perform an activity or engage in a behavior in exchange for the plurality of outcomes. For example, a recipient may answer survey or marketing questions and/or commit to returning to a casino within a predetermined time frame.

Selling the plurality of outcomes to a purchaser in exchange for a price may comprise, for example, selling a DVD to a player, the DVD having recorded thereon a video representation of the plurality of outcomes. Additional detail on such an embodiment is provided below. In another example, selling the plurality of outcomes to a player may comprise providing access to the player to the plurality of outcomes in another manner. For example, a code may be provided to the player, the code being associated with an indication (e.g., a video presentation) of the plurality of outcomes as it is stored on a server device (e.g., a server device operable to facilitate a Web site). The player may enter the code (e.g., online) and thus gain access to the indication of the outcomes. Additional detail on such an embodiment is provided below.

In some embodiments, selling the plurality of outcomes to a player may comprise providing an indication of the plurality of outcomes to a player who has previously ordered or requested that the plurality of outcomes be generated, and may have already paid for the outcomes. In such embodiments, selling the plurality of outcomes to the player may comprise communicating (e.g., transmitting) an indication of the outcomes (or an indication of an availability of the outcomes) to the player. For example, a DVD may be mailed to the player or a code or other information (e.g., an executable file that displays representative outcomes when opened or run) may be e-mailed to the player.

In one embodiment, selling the plurality of outcomes to a player may occur at a POS of a casino. For example, a player may request to purchase a DVD of outcomes at the POS. The sale of the DVD may involve various procedures for ensuring the security and legitimate sale of the DVD. Such procedures are described in detail herein (e.g. particularly with respect to FIG. 34).

As described, in one embodiment selling a plurality of outcomes to a player may comprise providing the player access to a video presentation representing the outcomes, such that the player may view game results from a location that is remote from a casino (though the results themselves may have been generated within a casino). In some embodiments, player contact information received when a player purchases a session or video presentation based on the session (e.g., address, phone number, e-mail address) may be used in providing the player access to the video presentation.

In some embodiments, providing the player access to a video presentation may comprise storing or transmitting the video presentation electronically such that it may be accessed or viewed by the player. For example, in one embodiment, providing (and, e.g., creating) a video presentation may comprise storing various media files on a server that may be accessible by purchasers via computing devices such as personal home computers (of course, other computing devices, such as PDAs, cellular phones, and so on are contemplated). Accordingly, providing access to a video presentation may comprise allowing a player to access such stored files. For example, in one embodiment, a player may be provided with a code that may be entered (e.g., using a form of a Web page) to gain access to such a video presentation. Such a code may comprise a session identifier. For example, after being given a code, the player may visit a Web page and enter the code. If the code is valid (e.g., as determined by a server, the session has been executed and the code has been legitimately provided to the player and is associated with the session), the player may then use a Web interface (e.g., a virtual slot machine created using Macromedia Flash or a similar program) to view the stored video presentation associated with the purchased session. For example, the player may press a "spin" button of such a virtual slot machine, and upon doing so, a server may be operable to (i) determine a game play number (e.g., if it is the first time the player has pressed the spin button, the game play number is "1," and so on), (ii) access a database or other memory structure based on the session identifier so as to determine one or more media files in association with the game play number, and (iii) output the appropriate media files via the Web interface.

In other embodiments, as already described, a video presentation may be transmitted electronically to a player, such as via electronic mail (e.g., an executable software application is mailed electronically to players such that they may open the application and view outcomes comprising a purchased session) or video broadcasting.

In some embodiments, as also described, a video presentation of a plurality of outcomes comprising a session may be output via tangible media such as a DVD or CD-ROM. Accordingly, in some embodiments, such tangible media may be provided, shipped or mailed to a purchaser of a session. For example, the tangible media may be handed to the player upon the player purchasing the session, may be mailed to a mailing address indicated by a player, may be stored in a centrally-accessible database or in written form, etc.

Figure 2:
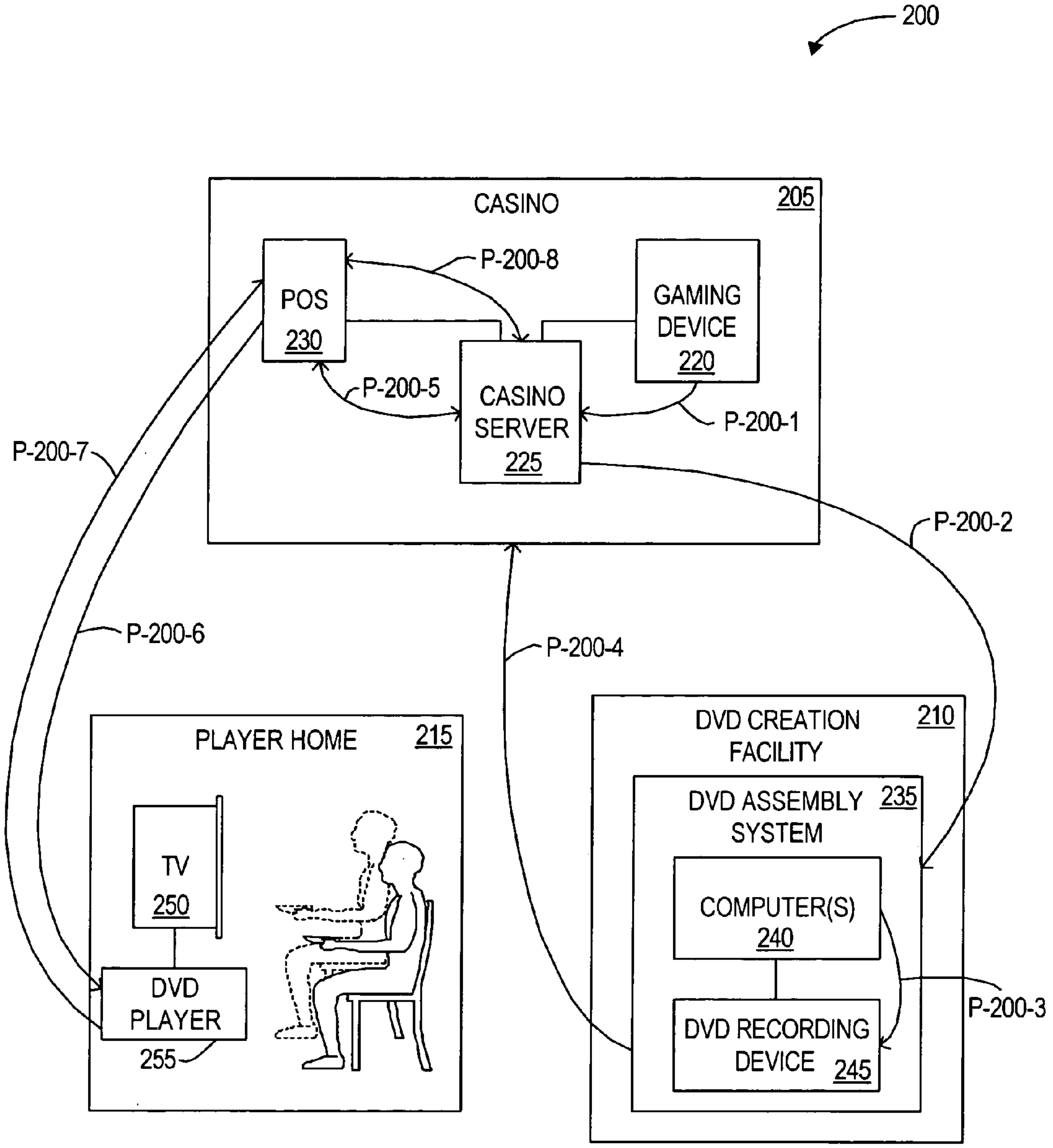
FIG. 2 is a block diagram of an example "life cycle" of a DVD according to some embodiments described herein.

It should be understood that the various steps of process 100 may occur at different locations. For example, a plurality of outcomes may be generated at a casino and transmitted to a DVD assembly facility that is remote from the casino. The DVD assembly facility may then create a DVD having recorded therein a video representation of the plurality of outcomes. Various processes for how such a DVD may be created are described in detail herein. The DVDs assembled at such a DVD assembly facility may then be transported to another location (e.g., to a casino, to be made available for sale to players or directly to a player's home if the player has previously ordered a DVD). FIG. 2, described below, illustrates the various processes and locations that may be involved in some embodiments of the present invention.

Referring now to FIG. 2, illustrated therein is a block diagram of an example "life cycle" of a DVD according to some embodiments described herein. The block diagram illustrates the various entities and processes that may be involved in at least one embodiment described herein. It should be noted that each of the processes described briefly with respect to FIG. 2 is described in detail herein. FIG. 2 is provided herein to illustrate one possible implementation of some embodiments.

As illustrated in FIG. 2, in accordance with some embodiments three distinct locations may be involved in providing a DVD of outcomes to a player. The first location is a casino 205, at which a player may purchase and redeem a DVD. The second location is a DVD creation facility 210, at which a DVD of outcomes may be created based on outcomes determined by a GD. The third location is a player's home 215 or other location remote from a casino, at which location one or more players may view a DVD of outcomes.

The casino 205 may include a CS 225 that facilitates the sale and redemption of DVDs of outcomes. The CS 225 is in communication with a GD 220 at which outcomes are created, based on which outcomes a video presentation of outcomes for the DVD will be created. The CS 225 is also in communication with a POS 230, at which a player may purchase a DVD of outcomes.

The DVD creation facility includes a DVD assembly system 235 (DVD AS 235). The DVD AS 235 is comprised of a computer 240 and a DVD recording device 245.

The player home 215 may include a TV 250 in communication with a DVD player 255. It should be understood, of course, that if a tangible medium other than a DVD is used to provide a video presentation of outcomes to a player, the player home 215 may include devices appropriate for reading and outputting the video presentation to a player (e.g., if the outcomes are stored on a CD-ROM, the player home may include a PC operable to read and output the information recorded on the CD-ROM).

A player's obtainment of a DVD of outcomes may begin with a process P-200-1, in which GD 220 generates a plurality of outcomes for a session and communicates (e.g., transmits) an indication of the plurality of outcomes to CS 225. In an alternate embodiment, GD 220 may communicate an indication of the plurality of outcomes directly to DVD AS 235 (e.g., in lieu of or in addition to communicating the indication to CS 225). It should be noted that, as described, a player (or players) may have requested the plurality of outcomes or session prior to the outcomes being generated. In such embodiments, a player's obtainment of a DVD of outcomes may instead begin with a process in which a player approaches a POS 230 to request the plurality of outcomes (and, e.g., provides the desired parameters and values thereof for the session comprising the plurality of outcomes). However, for purposes of simplicity, FIG. 2 illustrates an embodiment in which DVDs are mass produced, without the creation of a DVD being dependent on a player requesting a purchase of a particular session.

Once the GD 220 (or another device since, as described herein, any reference to a particular device performing a particular function is not meant to be limiting since the function may be performed by another device, as desired and practicable) transmits an indication of the plurality of outcomes, which may be referred to as session result data, the CS 225 communicates the session result data to DVD AS 235 in a process P-200-2. For example, the CS 225 may electronically communicate the session result data in an encrypted fashion to DVD AS 235. The session result data may include, for example, an indication of one or more of (i) a game for which the plurality of outcomes were generated; (ii) a price of the session; (iii) a beginning credit meter balance for the session; (iv) an ending credit meter balance for the session; (iv) a number of game plays included in the session; (v) a wager per game play; (vi) a sum of payouts obtained for the session; (vi) particular outcomes (e.g., sets of indicia and/or payouts) obtained during the session; (vii) a strategy employed during the session (e.g., if any decision-making is required during a game play); (viii) a session identifier; and/or (ix) a number of players associated with the session.

The computer 240 may then create a video presentation based on the received session result data. For example, the computer 240 may select or create appropriate media files (e.g., video clips, each video clip corresponding to a particular representative outcome to be included in the video presentation) based on the received session result data. The computer 240 may also determine an order in which the media files are to be put together in the video presentation. Such an order may be determined, for example, based on an order in which outcomes were generated by GD 220 (which order may be included in the session result data received). In another example, the order may be determined based on another desired characteristic. For example, it may be desirable to represent the outcomes such that the majority of outcomes corresponding to large payouts occur towards the end of the video presentation or such that payouts that correspond to payouts greater than zero are substantially evenly interspersed among outcomes that correspond to payouts of zero credits. It should be understood that a video presentation created in accordance with some embodiments may include data other than the mere representation of outcomes obtained as a result of a session. For example, inserted pauses to mimic a time at which a player would normally pull a slot machine handle or otherwise initiate the next game play may be interspersed between each video clip representing an outcome, to approximate the experience a player may have while playing a GD on a casino floor. This additional data may be, in some embodiments, additional video data, or in other embodiments, navigation data such as DVD pause commands. In another example, audio and/or video of messages may also be included (e.g., congratulatory messages appear upon an outcome corresponding to a large payout being displayed).

According to some embodiments discussed further herein, a video presentation may be based on the number of players associated with the session. For example, a video presentation may be organized to display results for each of a plurality of simulated players simultaneously, in succession, alternately, etc.

Once the computer 240 creates a video presentation (e.g., selects the media files to be included in the video presentation and the order thereof), the computer 240 may, in process P-200-3, direct the DVD recording device to record the video presentation onto a DVD. The DVD recording device records (e.g., stamps) the video presentation onto a DVD.

Once the DVD is created (which, in some embodiments, may include storing the DVD in a jewel case, including marketing materials with the DVD, labeling the DVD with unique identifiers (e.g., in the form of barcodes) as appropriate, and wrapping the DVD in secure packaging), the DVD is transported from the DVD creation facility 210 to the casino 205 in process P-200-4. For example, a shipment of DVDs created in accordance with the above processes may be shipped to the casino. Additionally, data indicative of the DVDs created and being shipped may be communicated to the casino 205. For example, an indication of a unique DVD identifier that corresponds to a unique session identifier of a session based on which the DVD was created may be communicated. Such information may be communicated electronically and/or via printed form (e.g., as documents included in the shipment).

Once the DVD arrives at the casino 205, it is made available for purchase to players. For example, the DVD may be placed on a display of DVDs on a casino floor (e.g., next to a GD that is operable to facilitate a game based on which the outcomes of the DVD were generated), behind a casino counter, in a casino hotel room, etc. Information regarding the DVD is stored in CS 225. For example, the unique DVD identifier (which may also be included on the DVD and/or DVD packaging) may be stored in an available DVDs database 445, along with other information associated with the DVD (e.g., a redemption value of the DVD and a status of the DVD (e.g., whether it has yet been sold and/or redeemed)).

A player who desires to purchase the DVD may then request to purchase the DVD at POS 230. For example, a player may select the DVD from a display on a casino floor and bring it to POS 230. In another example, the DVD may be available at a merchant associated with the casino and POS 230 and the player may select the DVD from a shelf of the merchant and present it for purchase at POS 230. In yet another example, the DVD may be located behind an employee counter of a POS 230 and the player may request to purchase the DVD by informing a casino attendant, who selects the DVD from behind the counter for the player. The purchase of the DVD is facilitated in process P-200-5, in which process the POS 230 communicates with CS 225 to verify that the DVD has not previously been purchased and is available for sale. The process P-200-5 may include other steps for ensuring that the DVD is sold in a secure manner, as described in detail herein. For example, an identifier of the player may be received and/or an activation code for the DVD may be received from CS 225. Once the player provides the appropriate price for the DVD, the player is provided with the receipt and DVD and the purchase is complete.

The player may then take the DVD home in process P-200-6 and view the video presentation of outcomes at his leisure (alone or with other players). The player (and/or one or more other players associated with the DVD) may subsequently return to the casino and request a payment of a redemption value of the DVD (all or or some portion of a total redemption value), in process P-200-7. For example, the player may visit POS 230 in order to redeem the DVD. For example, if the ending credit meter balance of a session, which the DVD redemption value is a function of, is greater than zero, the player may obtain the redemption value by returning to the casino with the DVD and receipt.

Upon receiving a request to collect a redemption value of a DVD at a POS 230, a process is performed for verifying and authorizing the provision of the redemption value to the player. For example, a legitimate purchase by the player of the DVD may be verified. In another example, the association of the player with the DVD may be verified. Additionally, it may be verified that the redemption value has not previously been collected. An example redemption process for redeeming a redemption value of a DVD is described in detail herein with respect to FIG. 27.

Of course, it should be understood that a player need not view the video presentation in order to collect the DVD redemption value. As described herein, in some embodiments a player may be allowed to collect the redemption value of a purchased DVD without ever opening the DVD and/or viewing the video presentation of the DVD. Further, it should be noted that, in some embodiments, a player need not return to the casino in order to collect the DVD redemption value. As is described herein, in some embodiments the DVD redemption value may be provided to the player who purchased the DVD after a predetermined period of time from the purchase of the DVD passes (e.g., one month after the DVD is purchased, a check for the redemption value is mailed to the player if the player has not yet collected the redemption value). In some embodiments, a player may request to collect the redemption value of a DVD without being required to visit the casino (e.g. a player may call or e-mail the casino or send in his DVD and receipt therefor via postal mail in order to collect the redemption value).

In some embodiments, as described herein, a player may be provided with a benefit for returning to a casino after purchasing a DVD even if the DVD redemption value is zero or the credit meter balance associated with the session based on which the DVD was created was zero. For example, a player may be provided with free game plays, comp points, discounts, or other prizes.

2. Rules of Interpretation

Numerous embodiments are described in this disclosure, and are presented for illustrative purposes only. The described embodiments are not intended to be limiting in any sense. The invention is widely applicable to numerous embodiments, as is readily apparent from the disclosure herein. These embodiments are described in sufficient detail to enable those skilled in the art to practice the invention, and it is to be understood that other embodiments may be utilized and that structural, logical, software, electrical and other changes may be made without departing from the scope of the present invention. Accordingly, those skilled in the art will recognize that the present invention may be practiced with various modifications and alterations. Although particular features of the present invention may be described with reference to one or more particular embodiments or figures that form a part of the present disclosure, and in which are shown, by way of illustration, specific embodiments of the invention, it should be understood that such features are not limited to usage in the one or more particular embodiments or figures with reference to which they are described. The present disclosure is thus neither a literal description of all embodiments of the invention nor a listing of features of the invention that must be present in all embodiments.

The terms "an embodiment", "embodiment", "embodiments", "the embodiment", "the embodiments", "an embodiment", "some embodiments", "an example embodiment", "at least one embodiment", "one or more embodiments" and "one embodiment" mean "one or more (but not necessarily all) embodiments of the present invention(s)" unless expressly specified otherwise. The terms "including," "comprising" and variations thereof mean "including but not limited to", unless expressly specified otherwise.

The term "consisting of" and variations thereof mean "including and limited to," unless expressly specified otherwise.

The enumerated listing of items does not imply that any or all of the items are mutually exclusive. The enumerated listing of items does not imply that any or all of the items are collectively exhaustive of anything, unless expressly specified otherwise. The enumerated listing of items does not imply that the items are ordered in any manner according to the order in which they are enumerated.

The term "comprising at least one of" followed by a listing of items does not imply that a component or subcomponent from each item in the list is required. Rather, it means that one or more of the items listed may comprise the item specified. For example, if it is said "wherein A comprises at least one of: a, b and c" it is meant that (i) A may comprise a, (ii) A may comprise b, (iii) A may comprise c, (iv) A may comprise a and b, (v) A may comprise a and c, (vi) A may comprise b and c or (vii) A may comprise a, b and C.

The terms "a," "an" and "the" mean "one or more," unless expressly specified otherwise.

The term "based on" means "based at least on," unless expressly specified otherwise.

The methods described herein (regardless of whether they are referred to as methods, processes, algorithms, calculations, and the like) inherently include one or more steps. Therefore, all references to a "step" or "steps" of such a method have antecedent basis in the mere recitation of the term "method" or a like term. Accordingly, any reference in a claim to a "step" or "steps" of a method is deemed to have sufficient antecedent basis.

Headings of sections provided in this document and the title are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required, or that each of the disclosed components must communicate with every other component. On the contrary a variety of optional components are described to illustrate the wide variety of possible embodiments of the present invention.

Further, although process steps, method steps, algorithms or the like may be described in a sequential order, such processes, methods and algorithms may be configured to work in alternate orders. In other words, any sequence or order of steps that may be described in this document does not, in and of itself, indicate a requirement that the steps be performed in that order. The steps of processes described herein may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

It will be readily apparent that the various methods and algorithms described herein may be implemented by, e.g., appropriately programmed general purpose computers and computing devices. Typically a processor (e.g., a microprocessor or controller device) will receive instructions from a memory or like storage device, and execute those instructions, thereby performing a process defined by those instructions. Further, programs that implement such methods and algorithms may be stored and transmitted using a variety of known media.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article.

The functionality and/or the features of a device may be alternatively embodied by one or more other devices which are not explicitly described as having such functionality/features. Thus, other embodiments of the present invention need not include the device itself.

The term "computer-readable medium" as used herein refers to any medium that participates in providing data (e.g., instructions) that may be read by a computer, a processor or a like device. Such a medium may take many forms, including but not limited to, non-volatile media, volatile media, and transmission media. Non-volatile media include, for example, optical or magnetic disks and other persistent memory. Volatile media may include dynamic random access memory (DRAM), which typically constitutes the main memory. Transmission media may include coaxial cables, copper wire and fiber optics, including the wires or other pathways that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying sequences of instructions to a processor. For example, sequences of instruction (i) may be delivered from RAM to a processor, (ii) may be carried over a wireless transmission medium, and/or (iii) may be formatted according to numerous formats, standards or protocols, such as Transmission Control Protocol, Internet Protocol (TCP/IP), Wi-Fi, Bluetooth, TDMA, CDMA, and 3G.

Where databases are described, it will be understood by one of ordinary skill in the art that (i) alternative database structures to those described may be readily employed, and (ii) other memory structures besides databases may be readily employed. Any schematic illustrations and accompanying descriptions of any sample databases presented herein are illustrative arrangements for stored representations of information. Any number of other arrangements may be employed besides those suggested by the tables shown. Similarly, any illustrated entries of the databases represent exemplary information only; those skilled in the art will understand that the number and content of the entries can be different from those illustrated herein. Further, despite any depiction of the databases as tables, other formats (including relational databases, object-based models and/or distributed databases) could be used to store and manipulate the data types described herein. Likewise, object methods or behaviors of a database can be used to implement the processes of the present invention. In addition, the databases may, in a known manner, be stored locally or remotely from a device that accesses data in such a database.

For example, as an example alternative to a database structure for storing information, a hierarchical electronic file folder structure may be used. A program may then be used to access the appropriate information in an appropriate file folder in the hierarchy based on a file path named in the program.

It should also be understood that, to the extent that any term recited in the claims is referred to elsewhere in this document in a manner consistent with a single meaning, that is done for the sake of clarity only, and it is not intended that any such term be so restricted, by implication or otherwise, to that single meaning.

In a claim, a limitation of the claim which includes the phrase "means for" or the phrase "step for" means that 35 U.S.C. §112, paragraph 6, applies to that limitation.

In a claim, a limitation of the claim which does not include the phrase "means for" or the phrase "step for" means that 35 U.S.C. §112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. §112, paragraph 6, applies to the step(s) referenced.

With respect to a means or a step for performing a specified function in accordance with 35 U.S.C. §112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. §112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

3. Systems

Figure 3:
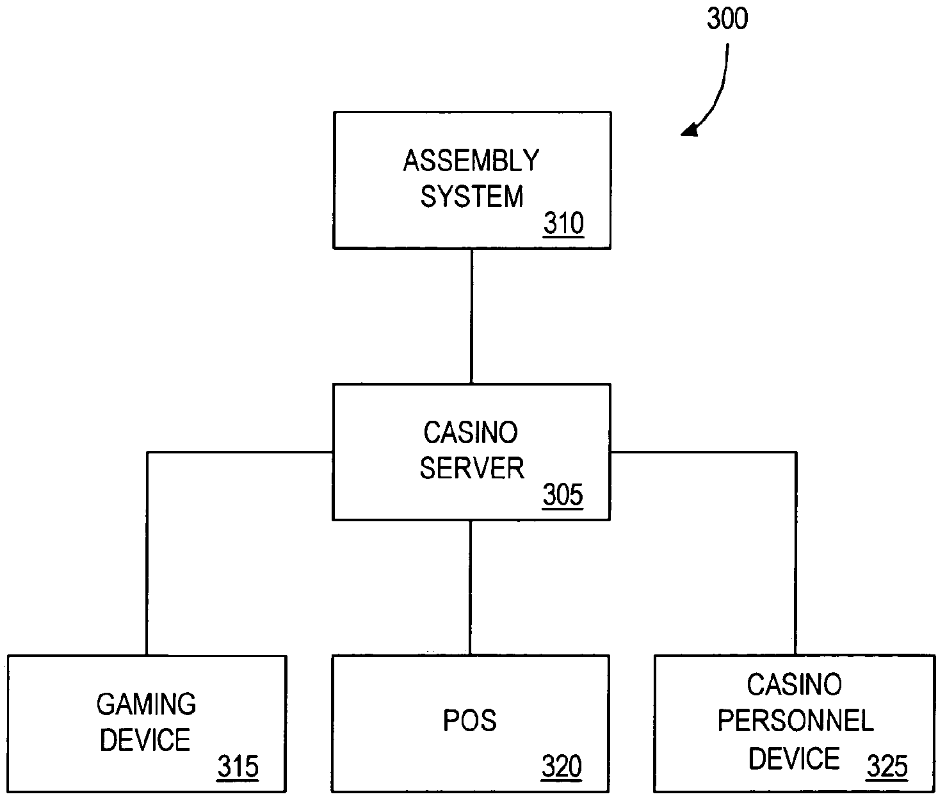
FIG. 3 is a block diagram of an example system in accordance with some embodiments described herein.

Referring now to FIG. 3, illustrated therein is a block diagram of an embodiment 300 of an example system that may be utilized to implement one or more embodiments described herein. Embodiment 300 is referred to as system 300 herein. The system 300 comprises a casino server 305 (CS 305). An example embodiment of CS 305 is described in detail herein with respect to FIG. 4.

The CS 305 is operable to communicate with an assembly system 310 (AS 310). The AS 310 may be operable, for example, to assemble or otherwise create or facilitate DVDs or other tangible media storing outcomes in accordance with embodiments described herein. An example embodiment of AS 310 is described herein with respect to FIG. 5. In one embodiment, AS 310 may be located in a location remote from a casino in which a CS 305 is located. In other embodiments, AS 310 may be located in the same location as CS 305. In one embodiment, some or all of the functions described herein as being performed by AS 310 may instead or in addition be performed by CS 305 and/or another device. In some embodiments CS 305 and AS 310 are operated by the same entity, irrespective of whether they are each located in the same location or remote locations (e.g., a casino may operate both). In other embodiments, CS 305 is operated by a first entity (e.g., a casino) while AS 310 is operated by a second entity (e.g., a manufacturer of gaming devices).

The CS 305 is further operable to communicate with one or more gaming devices 315 (GD 315). A GD 315 may be operable, for example, to generate a plurality of outcomes in accordance with embodiments described herein. A GD 315 may comprise, in one embodiment, a GD on a casino floor that is also operable to be used by a player in a conventional manner. In other embodiments, GD 315 may comprise a modified GD (MGD) that is described in detail herein with respect to FIG. 6. Although only a single GD is shown, any number of GDs may be used. An example embodiment of a GD 315 is described herein with respect to FIG. 6.

The CS 305 is further operable to communicate with a Point-of-Sale 320 (POS 320). Although only a single POS is shown, any number of POSs may be used. The CS 305 is further operable to communicate with a casino personnel device 325 (CPD 325). A CPD may be used, for example, by an employee of a casino to facilitate one or more embodiments described herein. Although only a single CPD is shown, any number may be used.

In some embodiments, various casino locations (e.g., change booths, customer service counters, kiosks, shops, restaurants, etc.) may utilize POS terminals to facilitate various processes described herein. For example, in some embodiments, a player may purchase a DVD containing a plurality of outcomes previously generated by a GS 315 via a POS 320. In another example, a player may request at a POS 320 that a plurality of outcomes be generated in accordance with one or more parameters specified by the player and stored on a DVD to be provided to the player. Thus, in some embodiments, a POS may be utilized to (i) receive from a player a request to purchase a DVD of outcomes; (ii) verify and/or authorize the sale of the DVD; (iii) accept payment in exchange for the DVD; and/or (iv) provide a payout corresponding to the DVD upon a players authorized redemption of the DVD. In some embodiments, a POS 320 may be operable to communicate with CS 305 to authorize the sale and/or redemption of a DVD. In some embodiments, a POS 320 may be configured to read from and/or write to one or more databases of the present invention (e.g., an available DVDs database). In some embodiments, a POS 320 may comprise various hardware and software described herein with respect to other devices (e.g., a keyboard, processor, display, etc.). In some embodiments, a POS 320 may be operable to communicate with a device in addition to CS 305. For example, POS 320 may be operable to communicate with an inventory/reservation system (e.g., a computer terminal at a theatre communicates with an inventory database to determine a number of unsold seats for a certain event). In some embodiments, CS 305 may function as an inventory/reservation system.

In some embodiments, various casino employees may be equipped with or otherwise utilize one or more CPDs. A CPD 325 may comprise, for example, a PDA or other computing device (e.g., a personal computer terminal). A CPD 325 may comprise various input devices (e.g., a keypad, a touch-sensitive display screen, a card reader, an infrared bar code scanner, etc.), various output devices (e.g., an LCD screen), a processor, a memory and/or a communications port, as described herein with respect to other devices. In some embodiments, a CPD 325 may be operable to communicate with a GD 315, CS 305, another server, a kiosk, a peripheral device, AS 310 and/or an inventory/reservation system of a casino-maintained property (e.g., a hotel). Thus, a CPD 325 may be configurable to, among other things, (i) read from and/or write to one or more databases of the present invention, (ii) assist in payments made to players (e.g., a representative “scans” a receipt for a purchased DVD and determines a value associated with the receipt, and if the receipt is valid, provides payment equal to the value), (iii) assist in payment made by players (e.g., a casino representative may receive a payment from a player for purchasing a DVD as described herein and obtain an activation code for the DVD to provide to the player); (iv) cause a GD to generate a plurality of outcomes for storage on a DVD in accordance with embodiments described herein; and/or (v) execute or assist in the execution of various other processes described herein. In one or more embodiments, a CPD may be operable to read data from and/or write data to one or more of the databases described herein. A memory of a CPD may store a program for executing processes described herein, or portions thereof.

The CS 305 may communicate with any and all of AS 310, GD 315, POS 320 and CPD 325 directly or indirectly, via a wired or wireless medium such as the Internet, LAN, WAN or Ethernet, Token Ring, or via any appropriate communications means or combination of communications means. For example, in one embodiment communication among any and all of the devices of system 300 may occur over the Internet through a Web site maintained by computer on a remote server or over an on-line data network including commercial on-line service providers, bulletin board systems and the like. In yet other embodiments, communication among any of the devices of system 300 may occur over RF, cable TV, satellite links and the like.

It should be noted that the lines connecting the various devices of system 300 do not imply that the devices are operable to communicate via a particular network. For example, AS 310 may not be located on a network that CS 305, GD 310, POS 320 and CPD 325 are located on.

Further, any and all of the CS 305, AS 310, GD 315, POS 320 and CPD 325 may comprise a computing device (or one or more computing devices), such as those based on the Intel® Pentium® processor.

In some embodiments, communication among some or all of the devices 300 may occur over a network. Some, but not all, possible communication networks that may comprise the system 300 include: a LAN, a WAN, the Internet, a telephone line, a cable line, a radio channel, an optical communications line, and a satellite communications link. For example, GD 315 may communicate with CS 305 over a LAN while CS 305 may communicate with AS 310 over a WAN or via a cable line.

Possible communications protocols that may be part of the system 300 include: Ethernet (or IEEE 802.3), SAP, ATP, Bluetooth™, and TCP/IP. Communication may be encrypted to ensure privacy and prevent fraud in any of a variety of ways well known in the art.

A variety of communications protocols may be part of the system 300 or another system operable to facilitate the embodiments described herein, including but not limited to: Ethernet (or IEEE 802.3), SAP, SAS™, SuperSAS™, ATP, Bluetooth™, and TCP/IP. Further, in some embodiments, various communications protocols endorsed by the Gaming Standards Association of Fremont, Calif., may be utilized, such as (i) the Gaming Device Standard (GDS), which may facilitate communication between a gaming device and various component devices and/or peripheral devices (e.g., printers, bill acceptors, etc.), (ii) the Best of Breed (BOB) standard, which may facilitate communication between a gaming device and various servers related to play of one or more gaming devices (e.g., servers that assist in providing accounting, player tracking, content management, ticket-in/ticket-out and progressive jackpot functionality), and/or (iii) the System-to-System (S2S) standard, which may facilitate communication between game-related servers and/or casino property management servers (e.g., a hotel server comprising one or more databases that store information about booking and reservations). Communication may be encrypted to ensure privacy and prevent fraud in any of a variety of ways well known in the art.

In some embodiments, a CS 305 may not be necessary and/or may not be preferred. For example, one or more embodiments may be practiced on a stand-alone GD 315 (e.g., one operable to output a DVD of outcomes, and/or one associated with a device operable to output a DVD of outcomes) and/or a GD 315 operable to communicate with AS 310 directly. In such embodiments, any functions described as performed by the CS 305 or data described as stored on the CS 305 may instead be performed by or stored on one or more GD 315 and/or AS 310.

It should be understood that referring to CS 305 as a "casino" server is not meant to imply that a casino controls, or exclusively controls, this device or all functions thereof. For example, in one embodiment CS 305 is a device operated by an entity other than a casino (e.g., an entity that also operates AS 310 or controls some functions of AS 310). CS 305 may be any device operable to facilitate the creation of a DVD that stores a plurality of outcomes in accordance with embodiments described herein.

In one embodiment, CS 305 may in turn be in communication with another electronic device that is distinct from a GD 315 and/or AS 310, which electronic device may be operable to (i) direct the CS 305 to perform certain functions and/or (ii) read data from and/or write data to the CS 305. For example, the CS 305 may comprise a slot server or Data Collection Unit (DCU) that controls and/or communicates with a bank of slot machines, which slot server or DCU is in turn in communication with a casino server that is in communication with a plurality of such slot servers or DCUs.

In another embodiment, the CS 305 may be operable to communicate with a GD 315 via another electronic device (e.g., a DCU), such as a server computer operable to communicate with a plurality of slot machines. For example, in one embodiment, the CS 305 may be operable to communicate with a plurality of computing devices, each computing device operable to communicate with a respective plurality of gaming devices.

It should be noted that, in some embodiments, one or more of the devices described with respect to system 300 may be combined (or the functions described with respect to may be combined as being performed by) a single device. For example, CS 305 and AS 310 may comprise the same device or a single device may perform the functions described herein as being performed by the two devices as embodying two distinct devices. In another example, GD 315 may comprise CS 305 and/or AS 310 and may, in some embodiments, perform some or all of the functions described herein as being performed by CS 305 and/or AS 310, and vice versa.

Figure 4:
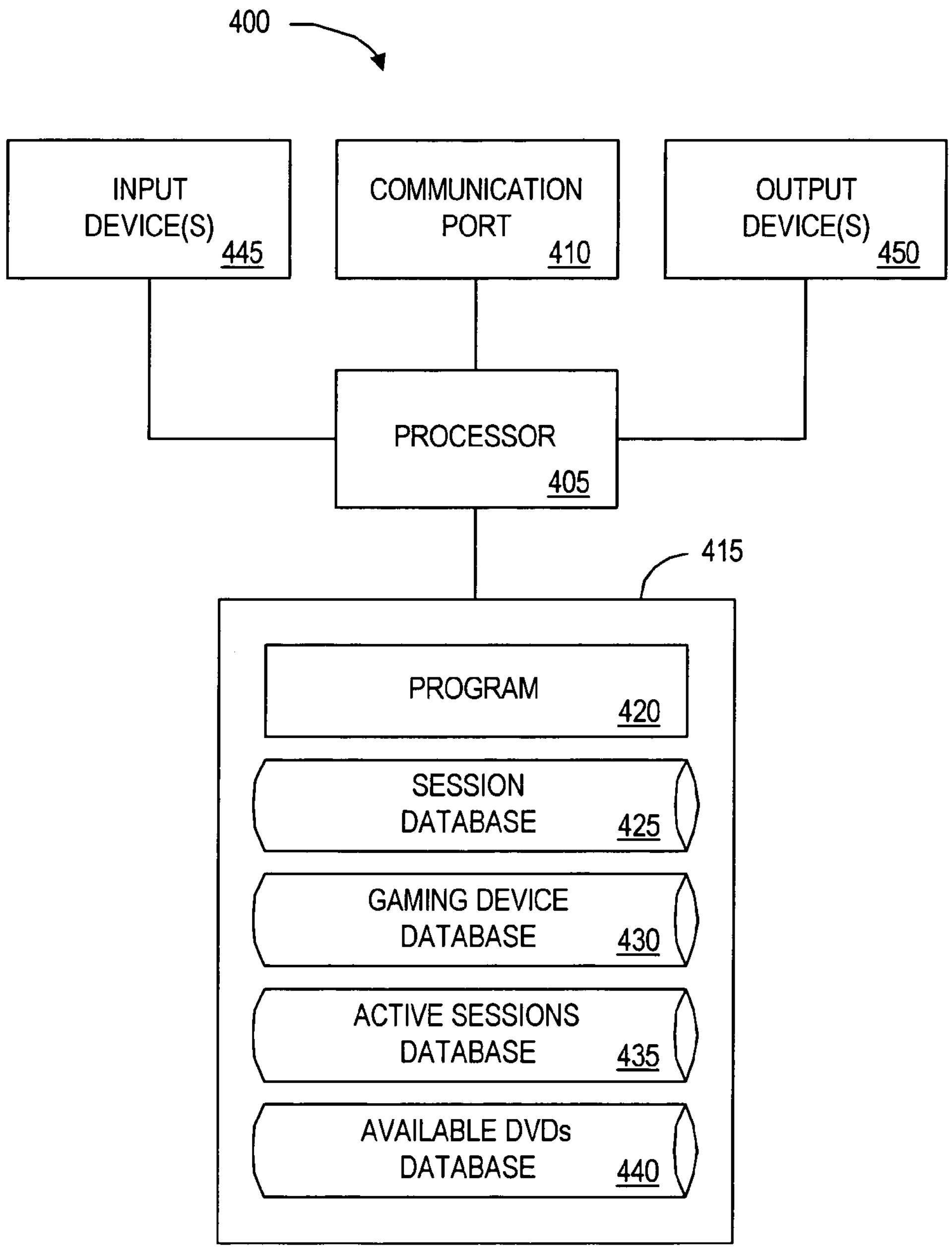
FIG. 4 is a block diagram of an example casino server (CS) in accordance with some embodiments described herein.

Referring now to FIG. 4, illustrated therein is a block diagram of an example embodiment 400 of a CS (e.g., the CS 305 of FIG. 3). The embodiment 400 is referred to herein as CS 400. The CS 400 may be implemented as a system controller, a dedicated hardware circuit, an appropriately programmed general-purpose computer, or any other equivalent electronic, mechanical or electromechanical device. The CS 400 may comprise, for example, one or more server computers operable to communicate with one or more client devices, such as one or more GDs, an AS, one or more kiosks, one or more POSs, one or more peripheral devices, and/or one or more CPDs. The CS 400 may be operative to manage the system 300 or at least to facilitate some functions or procedures described herein.

In operation, the CS 400 may function under the control of a casino, another merchant, an entity that may also control use of the GD 315, and/or a GD manufacturer. For example, the CS 400 may be a slot server in a casino. In some embodiments, the CS 400 and a slot server may be different devices. In some embodiments, the CS 400 may comprise a plurality of computers operating together. In some embodiments, the CS 400 and a GD 315 may be the same device.

The CS 400 comprises a processor 405, such as one or more Intel® Pentium®) processors. The processor 405 is in communication with a communication port 410 (e.g., for communicating with one or more other devices, such as one or more GDs 315 and/or AS 310) and a memory 415. The memory 415 may comprise an appropriate combination of magnetic, optical and/or semiconductor memory, and may include, for example, Random Access Memory (RAM), Read-Only Memory (ROM), a compact disc and/or a hard disk. The processor 405 and the memory 415 may each be, for example: (i) located entirely within a single computer or other device; or (ii) connected to each other by a remote communication medium, such as a serial port cable, telephone line or radio frequency transceiver. In one embodiment, the CS 400 may comprise one or more devices that are connected to a remote server computer for maintaining databases.

The memory 415 stores a program 420 for controlling the processor 405. The processor 405 performs instructions of the program 420, and thereby operates in accordance with at least some of the methods described in detail herein. The program 420 may be stored in a compressed, uncompiled and/or encrypted format. The program 420 furthermore includes program elements that may be necessary, such as an operating system, a database management system and "device drivers" for allowing the processor 405 to interface with computer peripheral devices. Appropriate program elements are known to those skilled in the art, and need not be described in detail herein. The program 420 may include computer program code that allows the CS 400 to employ the communication port 410 to communicate with a GD (e.g., GD 600, described below with respect to FIG. 6) and/or an AS (e.g., AS 500, described below with respect to FIG. 5) in order to, for example:

1. track gambling or other activity performed at the GD;
2. instruct a GD to generate a plurality of outcomes in accordance with one or more parameters;
3. receive an indication of a plurality of outcomes generated by a GD;

4. transmit an indication of a plurality of outcomes generate by a GD to an AS;
5. receive an indication of a DVD of outcomes that is available for sale;
6. receive a request from a player to create a DVD of outcomes;
7. instruct a gaming device to perform one or more functions (e.g., output a message to a player, interrupt play, etc.);
8. authorize a sale of a DVD to a player;
9. authorize a redemption of a DVD by a player; and/or
10. determine an activity status of a GD.

According to some embodiments, CS 400 may be operable to perform some of the processes (or portions thereof) described herein. For example, CS 400 may be operable to perform at least a portion of (i) process 100 (described with respect to FIG. 1, above), (ii) process 1900 (described with respect to FIG. 19, below); (iii) process 2200 (described with respect to FIG. 22, below); (iv) process 2600 (described with respect to FIG. 26, below); and/or any other process described herein.

According to an embodiment, the instructions of the program 420 may be read into a main memory from another computer-readable medium, such as from a ROM to RAM. Execution of sequences of the instructions in program 420 causes processor 405 to perform the process steps described herein. In alternate embodiments, hard-wired circuitry may be used in place of, or in combination with, software instructions for implementation of the processes of the present invention. Thus, embodiments of the present invention are not limited to any specific combination of hardware and software.

The memory 415 also stores (i) a session database 425; (ii) a gaming device database 430; (iii) an active sessions database 435; and (iv) an available DVDs database 440. Each of the databases 425 through 440 is described in more detail below (with reference to FIGS. 7-10, respectively).

In some embodiments (e.g., in an embodiment in which CS 400 manages downloadable games playable on one or more GDs), the memory 415 may store additional databases. Examples of such additional databases include, but are not limited to, (i) a game database that stores information regarding one or more games playable on and/or downloadable to one or more GDs, and (ii) a scheduling and/or configuration database useful for determining which games are to be made available on which GDs at what times. In other embodiments, some or all of these functions may be handled by a device distinct from CS 400.

Similarly, in one embodiment CS 400 may be operable to configure a GD (and/or another device, such as a kiosk, POS, CDP, etc.) remotely, update software stored on a GD and /or to download software or software components to a GD. For example, CS 400 may be operable to apply a hot fix to software stored on a GD, modify a payout and/or probability table stored on a GD and/or transmit a new version of software and/or a software component to a GD. The CS 400 may be programmed to perform any or all of the above functions based on, for example, an occurrence of an event (e.g., a scheduled event), receiving an indication from a qualified casino employee and/or other person (e.g., a regulator) and/or receiving a request from a player. In other embodiments, some or all of these functions may be handled by a device distinct from CS 400.

Although the databases 425 through 440 are described as being stored in a memory of CS 400, in other embodiments some or all of these databases may be partially or wholly stored, in lieu of or in addition to being stored in a memory of CS 400, in a memory of one or more other devices. Such one or more other devices may comprise, for example, one or more peripheral devices, one or more GDs, an AS, a slot server (if different from the CS 400), another device, or a combination thereof. Further, some or all of the data described as being stored in the memory 415 may be partially or wholly stored (in addition to or in lieu of being stored in the memory 415) in a memory of one or more other devices. Such one or more other devices may comprise, for example, one or more peripheral devices, one or more GDs, an AS, a slot server (if different from CS 400), another device, or a combination thereof.

The processor 405 is also operable to communicate with one or more input devices 445. An input device may comprise any device operable to facilitate input to the CS 400 (e.g., input by a person, such as a keyboard or mouse). An input device, as the term is used herein, may be any device, element or component (or combination thereof) that is capable of receiving an input (e.g., from a player or another device). An input device may communicate with or be part of another device (e.g., an AS, a GD, etc.). Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a universal serial bus (USB) port, a GPS receiver, a radio frequency identification (RFID) receiver, an RF receiver, a thermometer, a pressure sensor, an infrared port, and a weight scale. For example, in one embodiment an authorized person may use an input device 450 to program or re-program CS 400 to perform a function and/or to write data to one of the databases stored in memory 415.

The processor 405 is further operable to communicate with one or more output devices 450. An output device may comprise any device operable to output information from the CS 400. An output device, as the term is used herein, may be any device, element or component (or combination thereof) that is capable of outputting an output (e.g., to a person or another device). Examples of an output device include, but are not limited to, a display (e.g., in the form of a touch screen), an audio speaker, an infra-red transmitter, a radio transmitter, an electric motor, a printer, a coupon or product dispenser, an infra-red port, a Braille computer monitor, and a coin or bill dispenser.

In some embodiments, CS 400 may comprise components capable of facilitating both input and output functions (i.e., input/output devices). In one example, a touch-sensitive display screen comprises an input/output device (e.g., the device outputs graphics and receives selections from an authorized person).

Figure 5:
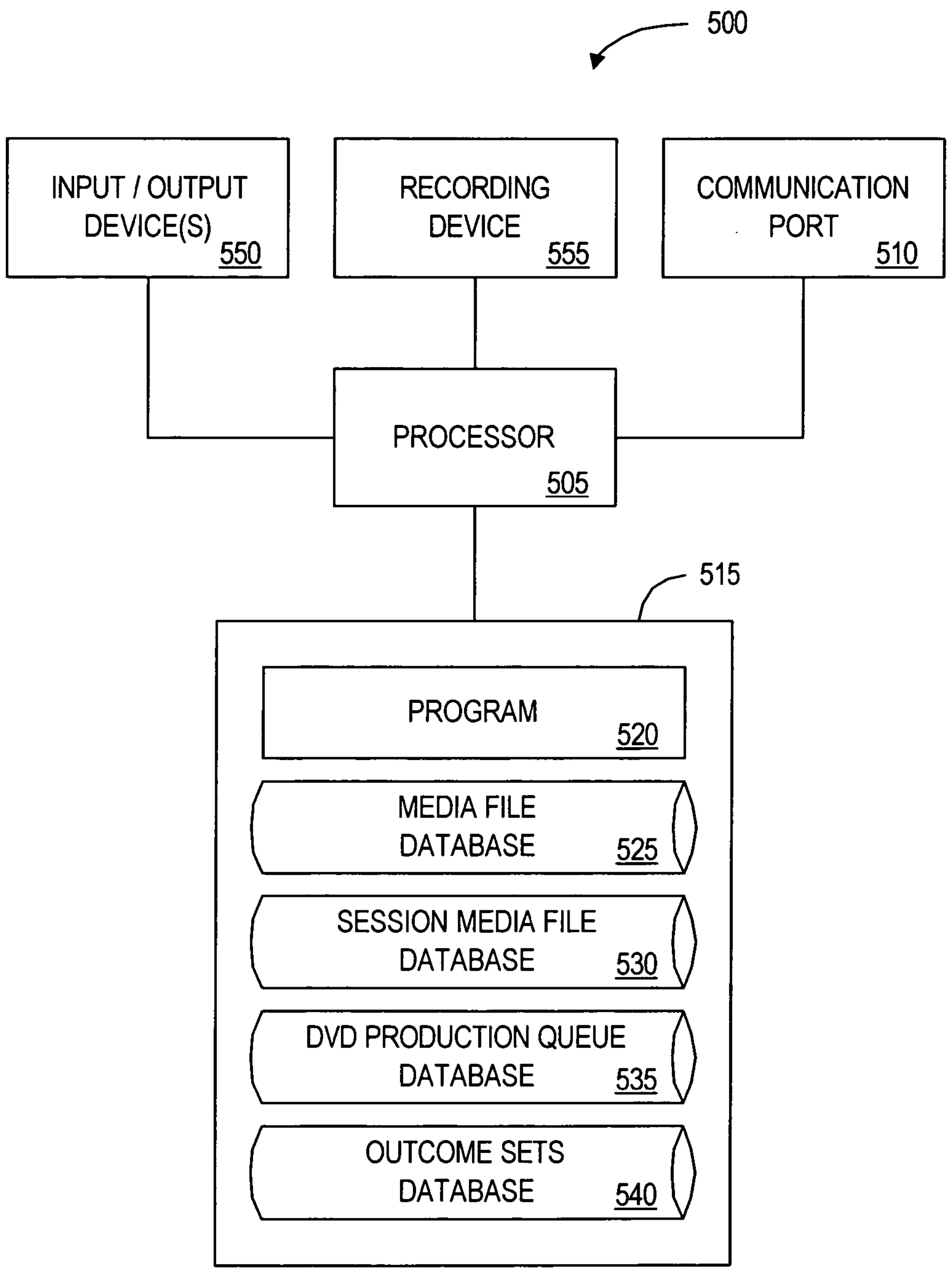
FIG. 5 is a block diagram of an example assembly system (AS) in accordance with some embodiments described herein.

Referring now to FIG. 5, illustrated therein is a block diagram of an example embodiment 500 of an AS (e.g., AS 310). Embodiment 500 is referred to as AS 500 herein. The AS 500 may be implemented as a system controller, a dedicated hardware circuit, an appropriately programmed general-purpose computer, or any other equivalent electronic, mechanical or electromechanical device. The AS 500 may comprise, for example, one or more computer and one or more DVD recording devices operating together. The AS 500 may be an example of AS 235 (FIG. 2) and/or AS 310 (FIG. 3).

The AS 500 may be operable, for example, to receive session result data (e.g., an indication of a plurality of outcomes generated for a session) and to create a video representation based on this data. It should be understood that a video presentation may include both video and audio elements. The AS 500 may further be operable to cause a DVD recording device to record (e.g., stamp) the video presentation onto a DVD. Of course, if the video presentation is being stored on a tangible medium other than a DVD (e.g., a CD-ROM), the AS may be operable to cause a recording device to record the video presentation on the appropriate tangible medium (e.g., to cause a CD-ROM recording device to record the video presentation onto a CD-ROM). In some embodiments, as described, an indication of outcomes may be made available to a player from a server device on which the indication is stored. For example, a video presentation of outcomes may be streamed to a player via a computer in communication with the server. In such embodiments, AS 500 may be operable to facilitate the output of the video presentation in an appropriate manner.

The AS 500 comprises a processor 505. The processor 505 is in communication with a communication port 510 and a memory 515. The memory 515 may comprise an appropriate combination of magnetic, optical and/or semiconductor memory, and may include, for example, Random Access Memory (RAM), Read-Only Memory (ROM), a compact disc and/or a hard disk. The memory 515 may comprise or include any type of computer-readable medium. The processor 505 and the memory 515 may each be, for example: (i) located entirely within a single computer or other device; or (ii) connected to each other by a remote communication medium, such as a serial port cable, telephone line or radio frequency transceiver. In one embodiment, AS 500 may comprise one or more devices that are connected to a remote server computer for maintaining databases.

The memory 515 stores a program 520 for controlling the processor 505. The processor 505 performs instructions of the program 520, and thereby operates in accordance with at least some embodiments, and particularly in accordance with the methods described in detail herein.

The program 520 may include computer program code that allows the AS 500 to employ the communication port 510 to communicate with another device (e.g., CS 305) in order to, for example:

(i) receive an indication of a plurality of outcomes generated by a GD (e.g., receive session result data for one or more sessions);

(ii) communicate information about a DVD that has been created by the AS 500; and/or (iii) receive information regarding the creation of a video presentation (e.g., receive media files, instructions regarding how media files are to be assembled into a video presentation, etc.).

The memory 515 may also store one or more databases. For example, memory 515 stores (i) a media file database 525; (ii) a session media file database 530; (iii) a DVD production queue database 535; and (iv) an outcome sets database 540. Of course, other databases may be stored in memory 515.

In one or more embodiments, as described, data may be stored in a memory of another device (e.g., a database of CS 305 or a database of another device). In one or more embodiments, AS 500 may be operable to access the data thereof or have information associated with the data stored therein downloaded or otherwise made available to AS 500 as necessary and/or appropriate. For example, AS 500 may access a memory of another device to determine one or more parameters for generating a plurality of outcomes in accordance with one or more embodiments (e.g., how many outcomes were generated for a particular session). In some embodiments, AS 500 may be operable to write data to a memory of another device.

Note that, although the databases 525, 530, 535 and 540 are described as being stored in AS 500, in other embodiments some or all of these databases and/or data thereof may be partially or wholly stored (in addition to or in lieu of being stored in the memory 515) in another device. Such other device may comprise, for example, CS 305, a POS 320, a CPD 325, another device and/or a combination thereof.

As described, the processor 505 is operable to communicate with a communication port 510. The communication port 510 may be utilized, for example, to transmit information to (or receive information from) another device, such as CS 305, a GD 315, a CPD 325, a POS 320, another device, or a combination thereof.

The processor 505 is also operable to communicate with one or more input devices, output devices and/or input/output devices 550. The input device(s) of AS 500 may comprise any or all of the input devices described herein. Similarly, the output device(s) and/or input/output device(s) of AS 500 may include any and all of such devices described herein.

The processor 505 is further operable to communicate with one or more recording devices 555. A recording device 555 may comprise any device operable to (i) record a video presentation onto a DVD or onto another tangible medium, (ii) transfer data or information to a DVD or other tangible medium, and/or (iii) facilitate disc image transfer, as appropriate and practicable. For example, if a video presentation is stamped onto a DVD, the recording device 555 may comprise a DVD stamping device. In another embodiment, DVD-R or DVD+R burners may use relatively high-powered lasers to darken inks inside a recordable DVD media to simulate the pits of traditional mass-produced DVDs. Examples of such technologies are readily available, such as DVD recorders from Plextor™ or Panasonic™. In some of these embodiments, the DVD recording device may have multiple recording devices and a robotic mechanism for disc movement into and out of the drives. Examples of this technology include Rimage's Protoge Plus™, or Microtech's™ product lines. In one embodiment, AS 500 may comprise a computer device in communication with a barcode scanning device (i.e., input device), such as the PowerScan® SR/HD made by PSC Products™ of Eugene, Oreg.

An operator of AS 500 may access session result data by scanning a barcode of a video ticket (such as one depicted in FIG. 33, described below). Such a barcode may encode, for example, a session identifier, an indication of a plurality of outcomes generated for the session identified by the session identifiers (e.g., a series of outcome identifiers) and one or more associated GD identifiers).

As described, AS 500 may store one or more programs for creating a video presentation to be recorded onto a DVD, based on the received session result data. In some embodiments, AS 500 may be operable to receive session result data associated with a session without communicating via an electronic network with a casino. Rather, AS 500 may be operable to receive session result data via barcoded tickets, other printed documents or via other tangible media having session result data stored thereon.

In some embodiments, AS 500 may be part of the same electronic network as CS 305, a GD 315, a CPD 325, and a POS 320, or be otherwise operable to communicate electronically with one or more of these devices and receive session result data in electronic form from one or more of these devices.

In some embodiments, AS 500 may access session result data by accessing a database storing the session result data (e.g., a session database 425). For example, in some embodiments, AS 500 may access a session database maintained on CS 305 to determine if there are any executed sessions for which DVDs have not yet been created (e.g., a record of a session database may indicate whether or not a DVD has yet been created for a particular session). In another embodiment, a device (e.g., CS 305, CPD 325 and/or a GD 315) may send a signal transmitting session result data and/or transmitting an indication that session result data should be accessed or is available. Accordingly, AS 500 may then access or receive the session result data.

In one embodiment, AS 500 may access session result data by accessing a smart card or other tangible medium (e.g., memory stick, flash memory, floppy disc, printed ticket, CD-ROM, DVD, etc.) with session result data stored thereon. For example, AS 500 may comprise a card reader device, such that when a card bearing session result data is inserted, session result data may be accessed. Such data may then be used to create a video presentation recorded onto a DVD or otherwise provided to a player.

In one example of how a video presentation may be provided to a player, AS 500 may store and/or transmit media files electronically, such that they may be accessed or viewed by a purchaser of a session (e.g., using a home computer or other user device). For example, AS 500 may create an entry in a database (which may be maintained by any of the devices described herein), the entry being associated with a session identifier. One or more game play numbers and media files may be associated with the session identifier and an indication of these may be stored in the record. Such a database may be accessed when a purchaser of a session requests to view the video presentation associated with the session (e.g., a player accesses a Web page, and the appropriate entry of the database is accessed to determine an order in which to present media files). In some of these embodiments, the video may be created simultaneously to the viewing of the video presentation.

In another example, as described in detail herein, AS 500 may be operable to create a DVD or CD-ROM using the media files. Accordingly, in one embodiment, a software program stored in the memory of AS 500 may be operable to (i) determine an order in which media files are to be presented, and (ii) instruct a recording device (e.g., a DVD recording device) to transfer the information of the media files to an appropriate tangible media (e.g., a DVD) such that they may be viewable in the appropriate order. In some embodiments, such a software program may operate to output such video presentations substantially automatically (e.g., without requiring input from an operator or with minimum input from an operator). For example, AS 500 may be operable to (i) receive or otherwise access session result data, (ii) determine media files associated with the data, and (iii) output video presentations based on the media files to a tangible medium. In other embodiments, an operator may provide input instructing AS 500 to perform various tasks (e.g., an operator selects media files, scans barcodes, etc.). In either case, in some embodiments, a video presentation may be output via tangible media.

In embodiments wherein a tangible medium comprises a DVD, such a disc may be formatted according to a DVD encoding process as is known in the art. For example, one or more media files may be segmented into "chapters" that are individually accessible by players. For example, a DVD having recorded thereon a video presentation of a 1,000-game play session may be segregated into 20 chapters of 50 game plays each that a player may watch. In one example, game plays may be segregated based on which player (e.g., of a plurality of players associated with the DVD) is associated with them. In another example, each media file (i.e., game play) may be encoded as its own chapter, such that a player may use an "enter" button of a DVD player remote control much like a "spin" button of a slot machine, launching each video presentation or segment of a video presentation much like actuating a game play of a slot machine. It should be noted that one advantage of such a DVD format of creating a video presentation is that many of the convenient navigation features associated with watching video using a DVD player may be utilized. For example, a player may stop, pause, fast-forward or rewind the video presentation, or skip chapters entirely.

In embodiments wherein physical media comprises a CD-ROM, a video presentation may be incorporated into a software program that is executable by a purchaser of a session using a computing device. Thus, in some embodiments, creating a video presentation may comprise creating an executable software application. For example, creating a video presentation may comprise creating a software program that lets purchasers of sessions interact with the video presentation in a similar manner to a software application of an online casino using a home computer. For example, a purchaser of a session may insert a CD-ROM into an appropriate drive of a home computer, and then click on a graphic of a "spin" button when he desires to view another outcome (e.g., the software program written to the CD-ROM is operable to receive user input, and based on the input, access and display a stored media file as is known in the art). Various software applications that may at least assist in the creation of such DVD and CD-ROM discs may be available commercially. In some embodiments, the user receives data that represents the outcome and a software program, which may or may not be delivered on the same media as the outcomes, and which animate a video presentation.

It should be noted that in some embodiments, the order in which media files are written to tangible media and/or stored electronically in a database or other memory structure may be immaterial (e.g., such that a player later viewing outcomes remotely may not necessarily watch them in the order in which they were generated). For example, media files of a video presentation may appear in a random order.

Figure 6:
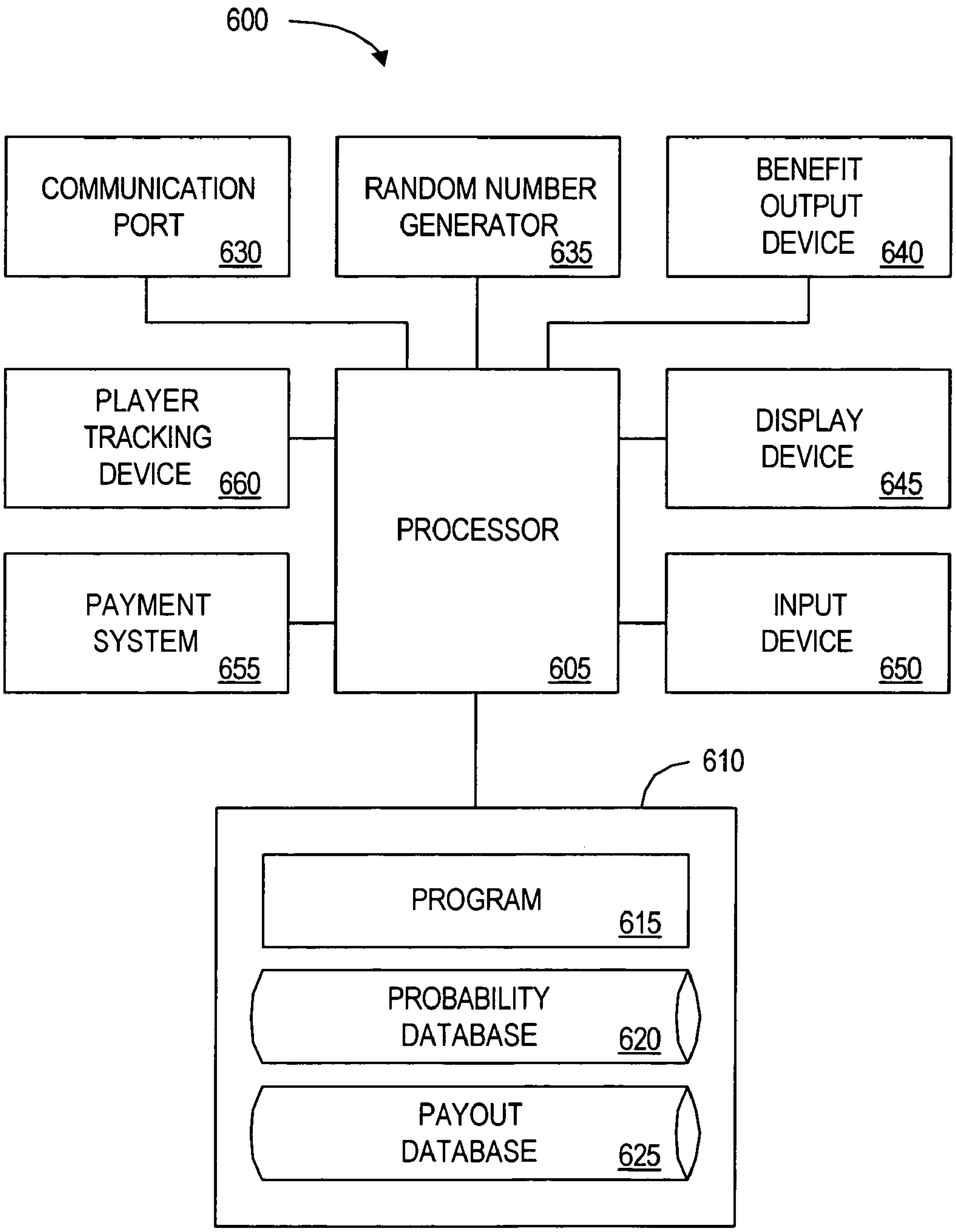
FIG. 6 is a block diagram of an example gaming device (GD) in accordance with some embodiments described herein.

Referring now to FIG. 6, illustrated therein is a block diagram of an example embodiment 600 of a GD (e.g., GD 315). Embodiment 600 is referred to herein as GD 600. The GD 600 may be implemented as a system controller, a dedicated hardware circuit, an appropriately programmed general-purpose computer, or any other equivalent electronic, mechanical or electromechanical device. The GD 600 may comprise, for example, a slot machine, a video poker terminal, a video blackjack terminal, a video keno terminal, a video lottery terminal, a pachinko machine or a table-top game. In some embodiments, the term "slot machine" is used to refer to a GD and is meant to encompass any and all of the example devices listed herein. In various embodiments, a GD may comprise, for example, a personal computer (e.g., which communicates with an online casino Web site), a telephone (e.g., to communicate with an automated sports book that provides gaming services), or a portable handheld gaming device (e.g., a personal digital assistant, Nintendo™ GameBoy™ device, Sony™ PSP™ device, or other appropriate device). In some embodiments, the GD 600 may comprise a device operable to facilitate a table game (e.g., a device operable to monitor a blackjack game, such as size of a players wager, cards received and/or decisions made). In some embodiments, a user device such as a PDA or cell phone may be used in place of, or in addition to, some or all of the GD 600 components depicted in FIG. 6.

Further, a GD 600 may comprise a personal computer or other device operable to communicate with an online casino and facilitate game play at the online casino. In one or more embodiments, the GD 600 may comprise a computing device operable to execute software that simulates play of a reeled slot machine game, video poker game, video blackjack game, video keno game, video roulette game, or lottery game.

The example GD 600 comprises a processor 605, such as one or more Intel® Pentium® processors. The processor 605 is in communication with a memory 610. The memory 610 may comprise an appropriate combination of magnetic, optical and/or semiconductor memory, and may include, for example, Random Access Memory (RAM), Read-Only Memory (ROM), a compact disc and/or a hard disk. The memory 610 may comprise or include any type of computer-readable medium. The processor 605 and the memory 610 may each be, for example: (i) located entirely within a single computer or other device; or (ii) connected to each other by a remote communication medium, such as a serial port cable, telephone line or radio frequency transceiver. In one embodiment, GD 600 may comprise one or more devices that are connected to a remote server computer for maintaining databases.

The memory 610 stores a program 615 for controlling the processor 605. The processor 605 performs instructions of the program 615, and thereby operates in accordance with embodiments of the present invention, and particularly in accordance with the methods described in detail herein. The program 615, as well as any other program for controlling a processor described herein, may be stored in a compressed, uncompiled and/or encrypted format. The following description of program 615 applies equally to all programs for directing a processor described herein. The program 615 includes program elements that may be necessary, such as an operating system, a database management system and "device drivers" for allowing the processor 605 to interface with computer peripheral devices. Appropriate program elements are known to those skilled in the art, and need not be described in detail herein.

According to an embodiment, the instructions of the program 615 may be read into a main memory from another computer-readable medium, such from a ROM to RAM. Execution of sequences of the instructions in program 615 may cause processor 605 to perform one or more process steps described herein. In alternate embodiments, hard-wired circuitry may be used in place of, or in combination with, software instructions for implementation of the processes of the present invention. Thus, embodiments described herein are not limited to any specific combination of hardware and software. In some embodiments, the execution of sequences of the instructions in a program of a peripheral device associated with GD 600 may cause processor 605 to perform some or all of the process steps described herein.

The memory 610 may also store one or more databases. For example, memory 610 may store one or more of a probability database, such as probability database 620, and one or more of a payout database, such as payout database 625.

In one or more embodiments, as described, data may be stored in a memory of another device (e.g., a database of CS 305 or a database of another device). In one or more embodiments, GD 600 may be operable to access the data thereof or have information associated with the data stored therein downloaded or otherwise made available to GD 600 as necessary and/or appropriate. For example, GD 600 may access a memory of another device to determine one or more parameters for generating a plurality of outcomes in accordance with one or more embodiments (e.g., how many outcomes are to be generated for a particular session). In some embodiments, GD 600 may be operable to write data to a memory of another device.

Note that, although the databases 620 and 625 are described as being stored in GD 600, in other embodiments some or all of these databases and/or data thereof may be partially or wholly stored (in addition to or in lieu of being stored in the memory 610) in another device. Such other device may comprise, for example, CS 305; a POS 320, a CPD 325, another device and/or a combination thereof.

The processor 605 is operable to communicate with a communication port 630. The communication port 630 may be utilized, for example, to transmit information to (or receive information from) another device, such as CS 305, another GD, a CPD 325, a POS 320, AS 310, another device, or a combination thereof.

The processor 605 is also operable to communicate with a random number generator 635 (RNG 635), which may be a component of GD 600. The RNG 635 (as well as any other random number generator described herein), in accordance with at least one embodiment, may generate data representing random or pseudo-random values (referred to as "random numbers" herein). The RNG 635 may generate a random number every predetermined unit of time (e.g., every second) or in response to an initiation of a game on the gaming device. In the former embodiment, the generated random numbers may be used as they are generated (e.g., the random number generated at substantially the time of game initiation is used for that game) and/or stored for future use.

A RNG, as used herein, may be embodied as a processor separate from but working in cooperation with processor 605. Alternatively, a RNG may be embodied as an algorithm, program component, or software stored in the memory of a GD or other device and used to generate a random number.

Note that, although the generation or obtainment of a random number is described herein as involving a RNG of a GD, other methods of determining a random number may be employed. For example, a GD owner or operator may obtain sets of random numbers that have been generated by another entity. HotBits™, for example, is a service that provides random numbers that have been generated by timing successive pairs of radioactive decays detected by a Geiger-Muller tube interfaced to a computer. A blower mechanism that uses physical balls with numbers thereon may be used to determine a random number by randomly selecting one of the balls and determining the number thereof.

The processor 605 is also operable to communicate with a benefit output device 640, which may be a component of GD 600. The benefit output device 640 may comprise one or more devices for outputting a benefit to a player of GD 600. For example, in one embodiment, GD 600 may provide coins and/or tokens as a benefit. In such an embodiment the benefit output device 640 may comprise a hopper and hopper controller, for dispensing coins and/or tokens into a coin tray of GD 600.

In another example, GD 600 may provide a receipt or other document on which there is printed an indication of a benefit or other information (e.g., a cashless gaming receipt that has printed thereon a monetary value, which is redeemable for cash in the amount of the monetary value, a check cashable for monetary value, etc.). In such an embodiment, the benefit output device 640 may comprise a printing and document dispensing mechanism. In yet another example, GD 600 may provide electronic credits as a benefit (which, e.g., may be subsequently converted to coins and/or tokens and dispensed from a hopper into a coin tray). In such an embodiment, the benefit output device 640 may comprise a credit meter balance and/or a processor that manages the amount of electronic credits that is indicated on a display of a credit meter balance. The processor may be the processor 605 or another processor. In yet another example, GD 600 may credit a monetary amount to a financial account associated with a player as a benefit provided to a player. The financial account may be, for example, a credit card account, a debit account, a charge account, a checking account, and/or a casino account. In such an embodiment the benefit output device 640 may comprise a device for communicating with a server on which the financial account is maintained.

Note that, in one or more embodiments, GD 600 may include more than one benefit output device 640 even though only one benefit output device is illustrated in FIG. 6. For example, GD 600 may include both a hopper and hopper controller combination and a credit meter balance. Such a GD may be operable to provide more than one type of benefit to a player of the GD. A single benefit output device 640 may be operable to output more than one type of benefit. For example, a benefit output device 640 may be operable to increase the balance of credits in a credit meter and communicate with a remote device in order to increase the balance of a financial account associated with a player.

The processor 605 is also operable to communicate with a display device 645, which may be a component of GD 600. The display device 645 may comprise, for example, one or more display screens or areas for outputting information related to game play on the gaming device, such as a cathode ray tube (CRT) monitor, liquid crystal display (LCD) screen, or light emitting diode (LED) screen.

In one or more embodiments, GD 600 may comprise more than one display device 645. For example, GD 600 may comprise an LCD display for displaying electronic reels and a display device that comprises a viewing window behind which are located mechanical reels and which displays the rotation of the mechanical reels during game play. In one embodiment, a display device 645 may be operable to display a message to a player. In one embodiment, a display device may be operable to display a menu to a player and/or casino attendant, the menu for inputting parameter values defining a session or plurality of outcomes to be generated by the gaming device. An example of such a menu is described below with respect to FIG. 34.

The processor 605 may also be in communication with one or more other devices besides the display device 645, for outputting information (e.g. to a player or another device). Such other one or more output devices may also be components of GD 600. Such other one or more output devices may comprise, for example, an audio speaker (e.g., for outputting a message to a player, in addition to or in lieu of such a message being output via a display device 645), an infra-red transmitter, a radio transmitter, an electric motor, a printer (e.g., such as for printing cashless gaming vouchers), a coupon or product dispenser, an infra-red port (e.g., for communicating with a second GD or a portable device of a player), a Braille computer monitor, and a coin or bill dispenser. For certain types of GDs, common output devices include a CRT monitor on a video poker machine, a bell (e.g., that rings when a player wins), an LED display of a player's credit balance, and an LCD display of a PDA for displaying keno numbers.

The display device 645 may comprise, for example, one or more distinct display areas and/or one or more distinct display devices. For example, one of the display areas may display outcomes of games played on the GD (e.g., electronic reels of a gaming device). Another of the display areas may display rules for playing a game of the GD. Yet another of the display areas may display the benefits obtainable by playing a game of the GD (e.g., in the form of a payout table). Yet another of the display areas may display messages to the player (e.g., messages advertising the availability of a DVD featuring outcomes of a game currently being played by a player) and/or a casino attendant. For example, a message may indicate a summary of at least some session information regarding a session that has been executed on the GD. In one or more embodiments, GD 600 may include more than one display device, one or more other output devices, or a combination thereof (e.g., two display devices and two audio speakers).

The processor 605 is also operable to communicate with an input device 650, which is a device that is capable of receiving an input (e.g., from a player, casino personnel or a device) and which may be a component of GD 600. An input device may communicate with or be part of another device (e.g. a CS 305, AS 310, POS 320, CPD 325, another GD, etc.). Some examples of input devices include: a bar-code scanner, a magnetic stripe reader, a computer keyboard or keypad, a button (e.g., mechanical, electromechanical or "soft", as in a portion of a touch-screen), a handle, a keypad, a touch-screen, a microphone, an infrared sensor, a voice recognition module, a coin or bill acceptor, a sonic ranger, a computer port, a video camera, a motion detector, a digital camera, a network card, a USB port, a GPS receiver, a RFID receiver, an RF receiver, a thermometer, a pressure sensor, an infrared port (e.g., for receiving communications from with a second gaming device or a another device such as a smart card or PDA of a player), and a weight scale. For certain types of GDs, common input devices include a button or touch screen on a video poker machine, a lever or handle connected to the GD, a magnetic stripe reader to read a player tracking card inserted into a GD, a touch screen for input of player selections during game play, and a coin and bill acceptor. Input device 650 may comprise any of the above-described input devices or any combination thereof (i.e., input device 650 may comprise more than one input device).

In some embodiments, a GD 600 may comprise components capable of facilitating both input and output functions (i.e., input/output devices). In one example, a touch-sensitive display screen comprises an input/output device (e.g., the device outputs graphics and receives selections from players). In another example, processor 605 may communicate with a "ticket-in/ticket-out" device configured to dispense and receive cash-out tickets. Such a device may also assist in (e.g., provide data so as to facilitate) various accounting functions (e.g., ticket validation and redemption). For example, any or all of a GD, POS, kiosk and CPD maintained at a cashier cage may (i) comprise such a benefit input/output device, and/or (ii) communicate with a central server (e.g., CS 305) that manages the accounting associated with such ticket-in/ticket-out transactions (e.g., so as to track the issuance, redemption and expiration of such tickets). One example of ticket-in/ticket-out technology that may be adapted or utilized to implement embodiments described herein is the EZ Pay™ system, is manufactured by International Gaming Technology, headquartered in Reno, Nevada.

Of course, as would be understood by one of ordinary skill in the art, GD 600 may comprise various combinations of any or all of the component devices described herein. For example, in one or more embodiments, the gaming device may include more than one display device, one or more other output devices, several input devices, and so on (e.g., two display screens, two audio speakers, a headset, a ticket-in/ ticket-out device and several buttons). Further, GD 600 may include additional or different components from those described herein.

The processor 605 is further operable to communicate with a payment system 655, which may be a component of GD 600. The payment system 655 is a device capable of accepting payment from a player (e.g., a bet or initiation of a balance) and/or providing payment to a player (e.g., a payout). Payment is not limited to currency, but may also include other types of consideration, including products, services, and alternate currencies. Payment system 655 may be considered to be an example of an input device 650 and/or an example of a benefit output device 640 in some embodiments.

Exemplary methods of accepting payment by the payment system 655 include (i) receiving hard currency (i.e., coins or bills), and accordingly the payment system 655 may comprise a coin or bill acceptor; (ii) receiving an alternate currency (e.g., a paper cashless gaming voucher, a coupon, a non-negotiable token), and accordingly the payment system 655 may comprise a bar code reader or other sensing means; (iii) receiving a payment identifier (e.g., a credit card number, a debit card number, a player tracking card number) and debiting the account identified by the payment identifier; and (iv) determining that a player has performed a value-added activity.

Processor 605 is further operable to communicate with a player tracking device 660, which may be a component of GD 600. Player tracking device 660 may, in some embodiments, be considered an example of an input device 650 and/or an example of a payment system 655 (e.g., in embodiments in which a player provides a payment by providing a player identifier that also functions as a monetary account identifier). Player tracking device 660 may, in one or more embodiments, comprise a reader device operable to read information from and/or write information to a card such as a smart card and/or a player tracking card, such that (i) players may be identified, and (ii) various data associated with players may then be determined. For example, previous wagering, coin-in and/or cash-out behaviors previously engaged in by the player may be determined based on information associated with the player identifier. In another example, previous strategies employed in a video poker game may be similarly determined. In yet another example, DVDs previously purchased by a player may be determined (e.g., for purposes of providing a player a payment associated with the DVD). Similarly, a number of cashable credits available to the player may be determined, a number of promotional credits that may not be redeemed for cash but that are associated with the player may be determined, a code or other indication of a benefit to be provided to the player may be determined, a number of accumulated loyalty points associated with the player may be determined, a number of accumulated game elements such as symbols, cards or hands associated with the player may be determined, etc.

In one example, a card reader device comprising a player tracking device 660 may determine an identifier associated with a player (e.g., by reading a player tracking card comprising an encoded version of the identifier), such that the gaming device may then access data (e.g., of a player database, a session database) associated with the player. In another example, a smart card reader device may determine data associated with a player directly by accessing a memory of an inserted smart card.

Although not illustrated herein, a player database may be used, for example, to store player wager data (e.g., such that players wagering over a given threshold in a given amount of time may be rewarded for their patronage, qualify for certain features, be identified as a potential problem gambler, and so on). The player database may also contain other information that may be useful in, for example, promoting and managing player behaviors (e.g., information about the player's gaming preferences, lodging arrangements, and the like). Further, the player database may store data regarding a given player's standing in a game session and/or a bonus game. A player database may also store information regarding DVDs previously purchased, ordered and/or redeemed by a player. Such player data may be stored in a relational database and retrieved or otherwise accessed by the processor after receiving a "key" data point from the player, such as a unique identifier read from the player's player tracking card or cash-out ticket.

In one embodiment the player tracking device 660 may comprise (i) a card reader (e.g., a port into which player tracking cards may be inserted), (ii) various input devices (e.g., a keypad, a touch-screen), (iii) various output devices (e.g., a small, full-color display screen), and/or (iv) combinations thereof (e.g., a touch-sensitive display screen that accommodates both input and output functions). Various commercially available devices may be suitable for such an application, such as the NextGen™ interactive player tracking panel manufactured by IGT™ or the iVIEW™ display screen manufactured by Bally Gaming and Systems™.

As known in the art, "smart cards" may incorporate (i) a memory, and (ii) means for accessing such a memory. For example, in one embodiment, the memory may store data related to embodiments of the present invention. In one embodiment, data may be written to the smart card as a player plays one or more GDs (e.g., such that various data may be updated on a continuous, periodic or event-triggered bases). Accordingly, in one or more embodiments one or more devices operable to carry out various processes of the present invention (e.g., a GD 600, CS 305 and/or AS 310) may have associated therewith a smart card reader device, such that data may be read from the smart card pursuant to the execution of such processes. An example of a smart card system that may be used to implement one or more embodiments of the present invention is the s-Choice™ Smart Card Casino Management System from Smart Card Integrators, Inc. ™.

Of course, other non-card-based methods of identifying players are contemplated. For example, a unique identification code may be associated with the player. The player may then be identified upon entering the code. For example, the code may be stored (e.g., within a database maintained within a GD 600 and/or CS 305) such that the player may enter the code using an input device of a GD, and accordingly allow the player to be uniquely identified. In other embodiments, player biometrics may serve as identification means (e.g., a player is identified via a thumbprint or retinal scan of the player). In further embodiments, a barcode of a cashless gaming ticket may encode a player identifier.

Thus, as described, various data associated with a player may be tracked and stored (e.g., in an appropriate record of a centrally-maintained database), such that it may be accessed as desired. Further, various statistics may be measured in association with a player (e.g., coin-in statistics, win/loss statistics, buy-in amount for a play session) and similarly accessed.

Various systems for facilitating such monitoring of player behavior and activity are contemplated. For example, a two-wire system such as one offered by IGT™ may be used. Similarly, a protocol such as the IGT™ SAS™ protocol or the IGT™ SuperSAS™ protocol may be used. The SAS™ protocol and the SuperSAS™ protocol each allows for communication between gaming machines and slot accounting systems and provides a secure method of communicating all necessary data supplied by the gaming device to the online monitoring system. One aspect of the SAS™ protocol and the SuperSAS™ protocol that may be beneficial in implementing aspects of the present invention is the authentication function which allows operators and regulators to remotely interrogate gaming devices for important memory verification information, for both game programs, and peripheral devices. In another example, a one-wire system such as the OASIS™ System offered by Aristocrat Technologies™ or the SDS™ slot-floor monitoring system offered by Bally Gaming and Systems™ may be used. Each of the systems described above is an integrated information system that (e.g., continually) monitors slot machines and customer gaming activity. Thus, for example, any one of these systems may be used to monitor a player's gaming activity in order to determine player outcomes, buy-in amounts, coin-in statistics, win/loss statistics and/or any other data deemed relevant.

In one embodiment, a player may operate a plurality of GDs. For example, a player may simultaneously play two side-by-side GDs, a player may play one GD and then continue his gaming session at another GD, and a player may remotely operate a GD, possibly by using a telephone, PDA or other device (i) to transmit commands (directly or indirectly) to the GD, such as wager amounts and commands to select certain cards; and/or (ii) to receive output (directly or indirectly) from the GD.

In one embodiment, a GD may allow a player to play a game of skill rather than a game of chance. Such an embodiment may be more appealing to certain players or may be permitted in areas where it is illegal to gamble on games of chance.

In one embodiment, GD 600 may be operable to facilitate downloadable games such that games available for play on GD 600 may be stored on a server device (e.g., CS 305 or another device) and downloaded to the GD 600. In one embodiment, software components of GD 600 may be remotely modified and/or updated by another device (e.g., CS 305 or another device). For example, a payout or probability table stored in the memory of GD 600 may be altered, modified or updated remotely, hot fixes may be applied to software stored by GD 600 and/or new versions of software may be downloaded to GD 600. Similarly, GD 600 may be programmed to retrieve any or all such updates from another device, as appropriate and preferred. Any of the above (e.g., downloading of a game, updating of software, modification of a payout or probability table) may occur, for example, based upon an occurrence of an event (e.g., a scheduled event), an indication being received from qualified casino personnel or other personnel (e.g., a regulator), and/or upon a request from a player. In one embodiment, GD 600 may comprise a thin client device controlled be a server device (e.g., CS 305 or another device).

In one or more embodiments, aspects of the present invention, such as generating a plurality of outcomes for storage on a DVD, may be practiced by replacing and/or augmenting one or more components (e.g., hardware and/or software components) of an existing GD. Thus, in one or more embodiments, embodiments may be applied as a retrofit or upgrade to existing GDs currently available for play within various casinos.

For example, a memory (e.g., computer chip) of GD 600 may be replaced or added, the replacement or additional memory storing a program for instructing the processor of GD 600 to operate in accordance with one or more embodiments. In another example, data output via GD 600 (e.g., graphical and/or textual data displayed on GD 600) may be replaced or added, the replacement or additional data indicating to a player information relevant to one or more aspects of the present invention.

In a specific example, GD 600 may comprise various electronic components mounted to one or more printed circuit boards (PCBs). Such components may include various hardware described herein, such as a communications port and various controllers of peripheral devices (e.g., a display controller), as well as a memory for storing programming instructions (software) and a processor for carrying out such instructions. Forms of memory that may be found in a gaming device include electronically erasable programmable read-only memory (EEPROM), erasable programmable read-only memory (EPROM) and flash memory. Thus, in one or more embodiments of the present invention, an EPROM storing software with instructions for carrying out aspects of the present invention (as well as instructions for carrying out other functions traditionally performed by the GD) may replace an EPROM previously installed in GD 600 or may be reprogrammed in accordance with one or more embodiments described herein, such that GD 600 may be configured to operate in accordance with various processes (or portions thereof) described herein.

For example, a "DVD outcome generation" module may be made available for purchase to various casino operators. The module, which may comprise various hardware and software (e.g., an EEPROM storing software instructions), may be installed in an existing GD (e.g., a video-reel slot machine, a video poker machine, etc.), such that when the module is installed, players of the device may elect (i) to play the GD in a manner that does not incorporate embodiments described herein, or (ii) to play the GD in a manner that incorporates embodiments described herein (e.g., input a request for a plurality of outcomes to be generated and stored on a DVD, for future viewing at a remote location).

Similarly, in addition to or in lieu of a player being able to select a mode of operation of the GD, in some embodiments a casino operator may be able to do so. For example, a casino operator or other entity may be able to select whether the GD is to operate in a conventional mode or in a "DVD outcome generation" mode.

Accordingly, a GD may be configured to allow a player, casino operator or other entity to select one of at least two "modes" of the GD and to enable the selected mode. If a "standard" mode is selected, the GD may be configured to operate in a manner similar to how it operated before the installation of the module (e.g., the GD operates in a conventional manner, such that embodiments described herein may not be utilized). If a "DVD outcome generation" mode is selected, the gaming device may then be operable to execute game play in accordance with one or more embodiments described herein.

In one example of allowing an entity to select one or more modes, a touch-sensitive display screen may be configured to output a prompt to select a mode of operation. Such a prompt may be output upon occurrence of any of various trigger conditions (e.g., coins, bills or tickets are inserted; a credit balance increases from zero to some other number; a player presses a "play" button; a motion, weight, infrared or other sensor detects the presence of a player; the gaming device being turned on, initiated, re-configured and/or rebooted, etc.). Accordingly, an entity may select a mode of operation (e.g., by pressing an appropriately labeled icon of a touch-sensitive display screen), and upon receiving the entity's selection, the GD may be configured to operate in the selected mode.

In another embodiment, a GD may be operable to automatically determine whether it should switch modes from a standard mode to a "DVD outcome generation" mode. A GD may perform such a determination, for example, by evaluating data received from a player and/or another device and/or by querying another device. For example, a GD may be operable to enter a "DVD outcome generation mode" upon an occurrence of one or more predetermined events and/or upon determining that one or more predetermined conditions have been satisfied. For example, a GD may be operable to enter a "GD outcome generation mode" upon an occurrence of a predetermined time, if the GD is idle during that time (e.g., between 2 am and 7 am) and/or upon being directed to do so by another device (e.g., by CS 305).

In one embodiment, a GD may be operable to output an indication that it is currently in "DVD outcome generation" mode (e.g., to inform a player that outcomes currently being generated by a gaming device are for a DVD to be made available for sale or a DVD that has been requested). For example, the GD may turn on or change a color of a light, change graphics, output a sound, etc.

In other embodiments, as described herein, a peripheral device may be useful for implementing one or more embodiments of the present invention into the operation of a GD. For example, in order to avoid or minimize the necessity of modifying or replacing a program already stored in a memory of a GD, an external or internal module that comprises a peripheral device may be inserted in, connected to or otherwise associated with the GD. Such a peripheral device may be operable to, for example, monitor and/or transmit information about the gaming device to another device (e.g., CS 305).

In still further embodiments, rather than (or in addition to) configuring a GD to execute embodiments described herein by physically installing or connecting new hardware and/or software, software may be downloaded into an existing memory of one or more GDs. U.S. Pat. No. 6,805,634 to Wells et al. teaches methods for downloading data to GDs in such a manner The entirety of U.S. Pat. No. 6,805,634 is incorporated by reference herein for all purposes. Thus, in some embodiments, a GD may be reprogrammed to accommodate new functionality of the present invention without the need, or by minimizing the need, to remove and replace hardware within the GD.

In some embodiments, a GD comprises a "simplified gaming device" or SGD. An SGD, as the term is used herein, may comprise a device operable to generate an outcome based on a random number but that is not designed to be located on a casino floor for interaction with a player. For example, an SGD may be programmed to perform functions different from that of a more conventional type of GD and/or to not perform some of the functions conventionally performed by a GD (e.g., display an indication of an outcome determined based on a random number). Further, a SGD may include components different from those normally included in a more conventional type of GD and/or fewer such components. For example, in some embodiments an SGD may not include a benefit output device 640 and/or player tracking device 660. For example, in some embodiments Applicants envision that a plurality of outcomes for storage and sale via a DVD may be generated by a SGD that comprises a processor running in conjunction with an emulator of a wagering game, the SGD being located in a location other than a casino floor frequented by players. Such an SGD may not, for example, include a cabinet designed to attract a player and may not be operable to output coins, tokens or other benefits. Such an SGD may, however, be programmed to generate a large number of outcomes (e.g., substantially simultaneously) without displaying any of the outcomes so generated, which is unlike a conventional type of gaming device.

4. Databases

Various databases that may be useful in one or more embodiments will now be described. Example structures and sample contents of each of (i) the session database 425, (ii) the gaming device database 430, (iii) the reference session results database 435, (iv) the active sessions database 440, (v) the available DVDs database 445, (vi) media file database 525, (vii) session media file database 530, (viii) DVD production queue database 535, (ix) outcome sets database 540, (x) probability database 620, and (xi) payout database 625 are shown in FIGS. 7 through 16. The specific data and fields illustrated in these drawings represent only some embodiments of the records stored in the databases described herein. The data and fields of these databases can be readily modified, for example, to include more or fewer data fields. A single database also may be employed to combine one or more of these databases. Note that in the databases, a different reference numeral is employed to identify each field of each database. However, in at least one embodiment, fields that are similarly named (e.g., session identifier fields) may store similar or the same data in a similar or in the same data format.

As will be understood by those skilled in the art, the schematic illustrations and accompanying descriptions of the sample databases presented herein are exemplary arrangements for stored representations of information. Any number of other arrangements may be employed besides those suggested by the tables shown. For example, even though ten (10) separate databases are illustrated, the embodiments described herein could be practiced effectively using fewer or more functionally equivalent databases. Similarly, the illustrated entries of the databases represent exemplary information only; those skilled in the art will understand that the number and content of the entries can be different from those illustrated herein. Further, despite the depiction of the databases as tables, an object-based model could be used to store and manipulate the data types of one or more embodiments and likewise, object methods or behaviors can be used to implement the processes of one or more embodiments.

Referring now to FIG. 7A, illustrated therein is a tabular representation 700A of an embodiment of a record of session database 425, such as may be stored in a memory of CS 400 and/or a memory of another device. Tabular representation 700A is referred to herein as session database record 700A.

Session database record 700A includes a number of example records or entries, including entries R700A-1 through R700A-9, each defining a game play of a particular session. Those skilled in the art will understand that the record 700A may include any number of entries.

The session database record 700A also defines a number of fields. The fields specify: (i) a unique session identifier 705A; (ii) a wager amount per game play 710A (e.g., a specific wager per game play wherein the wager is the same for each game play of the session, an average wager per game play, etc.); (iii) a game 715A that specifies a game for which the game plays of the session are conducted; (iv) a session duration 720A that defines a duration of the session or an end event that causes the session to end; (v) a price 725A to be paid in exchange for the game plays of the session; (vi) a final session balance 730A that may comprise an indication of a number of credits or monetary value of a credit meter balance upon completion of a session (also referred to as an end credit meter balance herein); (vii) a game play number 735A that identifies each particular game play of the session; (ix) a wager 740A that was posted for each particular game play (if the wager per game play does not vary, this field may be omitted in light of field 710A); (x) an indicia 745A that is determined as a result of each game play; (xi) an indicia identifier 750A that identifies (e.g., uniquely) the indicia of field 745A (alternatively, this may be an outcome identifier); and (xii) a payout 755A that corresponds to a benefit, prize or monetary value won as a result of a corresponding game play.

In one embodiment, a session identifier may comprise indications of various session result data. For example, an indication of a payout amount, outcome identifier, wager amount, game play number, session identifier and/or other information related to a session may be included in or discernable from a session identifier. For example, a session identifier "01927-012-01-25-000001-0" may indicate that a first game play of contract "01927" occurred on GD "012" with a wager amount of "25," yielding an outcome of "000001" and a payout of "0".

It should be noted, with respect to fields 745A and 750A, that the indicia and indicia identifier may correspond to indicia determined by a GD based on a random number determined for the corresponding game play (e.g., using a payout table such as the one illustrated in FIG. 16). For example, the record 700A may be populated by a GD 600 and/or CS 400 based on the outcome determined for each game play of a session. In other embodiments, the indicia in field 745A and indicia identifier 750A may correspond to indicia determined for a representative outcome, as determined by a device other than a GD (e.g., as determined by AS 310). For example, the session database record 700A may be utilized by AS 310 to store the indicia determined for each game play of a session based on an indication of a plurality of outcomes (e.g., an indication of a result of a session) received by AS 310. In some embodiments, both an indication of indicia of an actual outcome and an indication of indicia of a representative outcome may be stored for a particular game play.

It should further be understood that the payout of field 755A may comprise a payout as determined by a GD based on a random number. For example, the record 700A may be populated based on the payouts as determined by the GD. It should be noted that, in some embodiments, a video presentation of payouts may be created based on the data in record 700A. In such embodiments, the order in which payouts are presented via the video presentation may differ from the order in which the payouts are stored in record 700A and/or the order in which the payouts were determined by a GD.

In some embodiments, the payout field 755A may store payouts as determined by another device (e.g., AS 310) based on an indication of a plurality of outcomes (e.g., based on an indication of a result of a session). For example, as described in detail herein, in some embodiments AS 310 may receive an indication of (i) a beginning credit meter balance for a session; (ii) an ending credit meter balance for the session; (iii) an indication of wagers posted for the session; and (iv) a number of game plays comprising the session. The AS 310 may then determine a plurality of payouts and, in some embodiments, the order in which the payouts are to be presented via a video presentation, based on such data. Accordingly, in such embodiments AS 310 may utilize session database record 700A to store the determined payouts and/or the order of the payouts as they are to be presented via a video presentation.

It should be understood that a payout field in any of the databases described herein may store a value of a payout amount corresponding to a particular outcome and it may be stored in any form practicable and desirable. For example, a payout value may be represented as a number of credits. Alternatively, a payout value may be stored to represent a dollar value.

Accordingly, it should be understood that in various embodiments the session database record 700A may be populated by a GD, a CS and/or a AS. Further, it should be understood that in various embodiments the record 700A may be utilized by a GD, CS and/or AS for different purposes. For example, a GD and/or CS may utilize record 700A to store an actual outcome of each game play of a session. In another example, an AS may utilize record 700A to store representative outcomes determined for a session.

Referring now to FIG. 7B, illustrated therein is a tabular representation 700B of an embodiment of a record of session database 425, such as may be stored in a memory of CS 400 and/or a memory of another device. Tabular representation 700B is referred to herein as session database record 700B.

In particular, session database record 700B includes information about a plurality of players associated with the same session (e.g., for a single DVD or game disc). It will be readily understood that a session for a plurality of players may comprise outcomes and/or payouts determined in two or more respective sessions (e.g., gaming sessions executed at different gaming devices, or otherwise separate from one another). In some embodiments, discussed herein, sessions may be interdependent (e.g., for some types of multiplayer games). Thus, in some embodiments a session may comprise two or more other sessions. In some embodiments, such a session may be referred to as a reference run, in which a plurality of sessions are executed (e.g., using the same parameters and corresponding values).

Session database record 700B includes a number of example records or entries, including entries R700B-1 through R700B-9, each defining a game play of a particular session. Those skilled in the art will understand that the record 700B may include any number of entries.

The session database record 700B also defines a number of fields, most of which are similar to those described with respect to database record 700A (e.g., field 710A corresponds to field 710B of record 700B, and so on). In addition, session database record 700B includes respective final session balances 730B, 732B, and 734B for each of the "RED," "BLUE," and "GREEN" players (e.g., simulated players who will be represented on a DVD as being associated with respective images of credit meters, slot indicia, credit meters, etc.). In the example session database 700B, the "GREEN" player has the highest final session balance, and thus may be eligible to collect some redemption value for the session, as discussed herein. Of course, in accordance with various embodiments, any number of the plurality of players may be eligible to redeem some value, based on the particular rules and criteria for the purchased product.

Session database record 700B further includes player identifier 738B, which includes an identifier that identifies which player (e.g., a real or simulated player) is associated with the corresponding game play. Although fictitious player labels (e.g., "REO") are used in the session database record 700B, it will be readily understood that such identifiers may include, for example, the name of an actual player (e.g., one who requested the session), or some other identifier that identifies an actual player. In some embodiments, the associated simulated players may have names of actual people (e.g., celebrities, popular card players)—some types of purchasers may find it desirable, for example, to purchase a product in which play is simulated as if by famous individuals.

Referring now to FIG. 8, illustrated therein is a tabular representation 800 of an example embodiment of gaming device database 430, as it may be stored in a memory of CS 400 and/or a memory of another device. Tabular representation 800 is referred to herein as GD database 800.

The GD database 800 includes a number of example records or entries, including records R800-1 through R800-*n*, each defining a gaming device that may be in communication (e.g., over a LAN or WAN) with CS 305 or otherwise available for embodiments of the present invention. Those skilled in the art will understand that the GD database 800 may include any number of entries. The GD database 800 also defines fields for each of the entries or records. The fields specify: (i) a gaming device identifier 805 that uniquely identifies a particular gaming device (e.g., uniquely identifies a particular slot machine on a casino floor or a PC communicating with an online casino), (ii) a gaming device type 810 that stores a description or designation of the type of gaming device, (iii) a gaming device status 815 that stores an indication of the corresponding gaming device (e.g., whether the gaming device is currently being used or not, whether the gaming device is off-line or on-line, whether the gaming device is available to generate outcomes for a DVD, etc.); and (iv) available games 820 that stores an indication of the one or more games the corresponding gaming device is operable to facilitate or run. It should be noted that, as with any database described herein, any and all of the information stored in a field of the database may be stored in machine-readable format and/or human-readable format (which, in certain circumstances, may be the same format).

The GD database 800 may be used, for example, to communicate with one or more GDs and to identify a GD that data is being transmitted to or received from (e.g., based on the GD identifier). In one embodiment, the GD database 800 may be used to select a particular GD, in order to direct the GD to generate a plurality of outcomes for a DVD. Such a selection may be made, for example, based on a type of GD desired (e.g., five reeled slot machine or video poker machine), a current status of the GD (e.g., currently inactive but turned on and operational) and/or the games available on the GD. Of course, information in addition to or different from that illustrated in GD database 800 may be stored in a GD database. For example, a location of a GD (e.g., to allow a casino employee to find the GD), an address for electronically communicating with the GD may be stored (e.g., for use in directing the GD to perform certain functions) and/or a manufacturer of the GD may be stored.

Referring now to FIG. 9, illustrated therein is a tabular representation 900 of an example embodiment of an active sessions database 435 (e.g., such as one that may be stored in a memory of a CS 400 or a memory of another device). Tabular representation 900 is referred to herein as active sessions database 900.

The active sessions database 900 includes a number of example records or entries, including records R900-1 through R900-4, each defining a session that is currently active (e.g., is in the process of being executed or has been scheduled to be executed). Those skilled in the art will understand that the active sessions database 900 may include any number of entries. The active sessions database 900 also defines fields for each of the entries or records. The fields specify: (i) a session identifier 905 that uniquely identifies a session; (ii) a GD identifier 910 that identifies a GD or type of GD on which the session is to be executed (which, in some embodiments, may include a plurality of GDs or types of GDs); (iii) a game type identifier 915 that identifies the game for which the outcomes of the session are to be determined; (iv) a wager per game play 920; (v) active payout combinations 925; (iv) a number of game plays remaining 930 (which may, in other embodiments, store another indication of a remaining duration of the corresponding session); and (v) a time remaining 935 that stores an indication (e.g., estimate) of how much time remains before the session is completely executed.

The active sessions database 900 may be utilized, for example, to track information about sessions that have begun to be executed and/or that are scheduled to be executed on a GD. For example, a GD or CS may use such a database to track an indication of results of a session. Once the session has been completed, the GD or CS may then communicate the indication to an AS.

Referring now to FIG. 10, illustrated therein is a tabular representation 1000 of an example embodiment of an available DVDs database 440 (e.g., as it may be stored in a memory of a CS 400 and/or in a memory of another device). Tabular representation 1000 is referred to herein as available DVDs database 1000.

The available DVDs database 1000 includes a number of example records or entries, including records R1000-1 through R1000-6, each defining a DVD that is available for purchase or that was available for purchase. Those skilled in the art will understand that the available DVDs database 1000 may include any number of entries. The available DVDs database 1000 also defines fields for each of the entries or records. The fields specify: (i) a disc identifier 1005 that uniquely identifies a DVD; (ii) a redemption value 1010 that indicates a payment that may be provided to a player who purchases the corresponding DVD, upon redemption of the DVD; (iii) a price 1015 to be paid by a player for the DVD; (iv) a date sold 1018 that indicates a date and/or time on which the corresponding DVD was sold; (v) an activation code 1020 that may be provided, in some embodiments, to a player upon the player purchasing the DVD; (vi) a player identifier 1025 that identifies one or more players who purchases the corresponding DVD (in some embodiments DVDs may be purchased anonymously and this information may not be stored) and/or one or more players otherwise associated with the DVD (e.g., a person who did not actually purchase the DVD may be potentially be eligible to receive some or all of the redemption value of the DVD by registering as a player of the DVD); and (vii) a status 1030 of the DVD (e.g., an indication of whether the DVD is "available" for purchase or otherwise available to be provided to a player, has been "purchased" or otherwise provided to a player, or has been "redeemed" such that the redemption value of the DVD, if any, has been provided to a player).

The available DVDs database 1000 may be utilized, for example, to track DVDs available for purchase at a casino. For example, as a DVD is provided by AS 310 or otherwise made available for sale or other provision to a player, a new record may be created in the database based on the unique DVD identifier of the DVD. The redemption value associated with the DVD may also be recorded in the newly created record (e.g., the redemption value that corresponds to the DVD identifier may be received from AS 310). The status of the DVD may be set to "available."

In one embodiment, the available DVDs database 1000 may be utilized again when a player requests to purchase a DVD. For example, the database may be queried based on the DVD identifier on the packaging of the DVD that the player desires to purchase. It may be verified that the DVD has not previously been purchased, based on the status 1030 associated with the DVD in the database. Further, an activation code may be determined (e.g., by CS 305, which may generate or select an activation code for each DVD as it is sold via a POS 320) and the activation code may be recorded in the appropriate record of the available DVDs database. For example, POS 320 may communicate with CS 305 in order to determine the activation code and verify that the DVD is available for purchase.

It should be noted that an activation code may, in some embodiments, be necessary to activate a DVD (e.g., the player may be required to input the activation code when inserting the DVD into a DVD player). In other embodiments, the activation code may only be necessary for redemption of the DVD but not for viewing the video presentation of the DVD. The activation code may also be printed on a receipt provided to the player for the purchase of the DVD, or otherwise provided to the player upon the DVD being provided to the player in a legitimate manner.

The available DVDs database 1000 may be accessed yet again when one or more players attempt to redeem a DVD (e.g., collect the redemption value associated with the DVD). For example, as described in detail herein (e.g., particularly with reference to FIG. 27), it may be verified that the DVD was legitimately purchased and that the DVD has not previously been redeemed (e.g., the status associated with the DVD is "purchased").

With respect to entry R1000-6, it should be noted that a plurality of players are associated with the corresponding disc "D-153478-567481254." In some embodiments, the available DVDs database 1000 may store an indication of which at least one of a plurality of associated players has redeemed some value associated with the DVD (e.g., in status 1030).

Referring now to FIG. 11A, illustrated therein is a tabular representation 1100A of an example embodiment of a record of a media file database 525 (e.g., as it may be stored in a memory of AS 500 and/or a memory of another device). Tabular representation 1100A is referred to herein as media file record 1100A.

The media file record 1100A includes a number of example entries, including entries R1100-1 through R1100-9, each defining a media file available for inclusion in a video presentation depicting outcomes for a session (e.g., a current session). The term "current session," as used with respect to the description of FIG. 11A, refers to a session for which a video presentation is currently being created based on the information in media file record 1100A.

Those skilled in the art will understand that the media file record 1100A may include any number of entries. The media file record 1100A also defines fields for each of the entries or records. The fields specify:

(i) a game 1105A that indicates a game to which the media files correspond (e.g., the identifier may be in an alphanumeric or text form; the identifier may be in machine and/or human readable form; the identifier may comprise a brand name of a game (e.g., IGT™ Double Diamonds™ game) or another identifier that uniquely identifies the game within a system);

(ii) a game type file 1110A, which stores a media file comprising data indicating a type of game for which the outcomes of a current session were determined (e.g., reeled slot machine vs. draw video poker or 3-reeled slot machine vs. 5-reeled slot machine);

(iii) a game brand file 1115A, which stores a media file comprising data indicating a brand of the game (e.g., a logo of the manufacturer of the game and/or a logo of the title of the game) for which the outcomes of a current session were determined;

(iv) a casino brand file 1120A, which stores a media file comprising data indicating a casino at which the outcomes of a current session were determined and/or a casino that ordered the DVD corresponding to the session (e.g., the logo of the casino, an aerial shot of the casino, a drawing or picture of the outside of the casino, etc.);

(v) an outcome identifier 1125A that uniquely identifies an outcome;

(vi) an outcome 1130A that describes the set of indicia corresponding to the outcome identifier;

(vii) an outcome media file 1135A that stores a media file comprising data indicating the outcome corresponding to the outcome identifier (e.g., an animation of the appropriate number of reels starting to spin from a stopped position and stopping to depict the appropriate symbols along a payline, accompanied by appropriate sounds of the slot machine);

(viii) a duration 1140A that indicates a duration of the corresponding outcome media file.

It should be understood that, with respect to fields 111A, 1115A, 1120A and 1135A, in one embodiment, the fields may store one or more of (i) the files themselves; (ii) an indication of where a file is stored (e.g., a file path); (iii) video and/or audio data; (iv) a large file name plus start/stop time codes for the file, such that the large file may include an indication of a plurality of outcomes and the start/stop times may be used to select the particular portion of the large file that depicts the desired outcome.

It should be understood that, in some embodiments, AS 500 may be operable to manufacture multiple video sessions and/or multiple DVDs simultaneously.

A media file may comprise graphical and/or audio data. Further, the graphical data may be still and/or animated.

The duration 1140A of a media file may vary from a first outcome to a second outcome. For example, outcomes corresponding to larger payouts may comprise a longer duration that includes a longer pause at the end of an animation showing the reels stopping to display a winning combination of symbols along a payline, to allow a player to enjoy the win and/or to help ensure that the player recognizes the win.

The media file record 1100A may, in some embodiments, include different and/or additional data. For example, a media file depicting the wager amount per game play may be stored. In another example, an indication of the number of frames included in each media file may be stored.

The number of frames information may be used, for example, to determine a portion of a media file into which another media file may be overlaid. For example, in some embodiments a changing credit meter balance may be indicated during each represented game play. For example, for a reeled slot machine game, each time an outcome is revealed during the presentation by depicting an animation of reels spinning, a media file comprising a credit meter balance value may be overlaid in a specific portion of each frame, and the credit meter balance may be depicted as changing within a certain number of frames from the beginning of the media file depicting the spinning reels. For example, assuming a media file depicting the spinning reels is 900 frames long; at the $50^{th}$ frame, an overlay of the credit meter balance graphic may be depicted as decreasing due to the wager posted for the game play and, during the $800^{th}$ frame, the overlay of the credit meter balance graphic may be depicted as increasing due to a payout won, if any, as a result of the game play. Accordingly, a program for creating the video presentation may be programmed to overlay certain graphics at certain frames of a media file.

The media file record 1100A may, in some embodiments, include information related to one or more players. For example, the media file record 1100A may include an indication of a number of players depicted in one or more media files. In another example, an indication or identification of one or more (e.g., real, fictitious, or simulated) players represented in each media file may be stored. For instance, an entry may include an indication that the corresponding media file represents respective outcomes allocated to two simulated players identified as "RED PLAYER" and "BLUE PLAYER."

The media file record 1100A may be accessed, for example, by AS 500 to select media files to include in a video presentation. For example, in one embodiment AS 500 may access the record 1100A and select media files based on session result information for a particular session received from CS 305 or another device. For example, the AS 500 may determine, from the session result information, the game for which outcomes comprising the session were determined. The AS 500 may thus select the appropriate record of a media file database based on the game (i.e., in some embodiments each record may correspond to a different game). The AS 500 may then create a video presentation by putting together the following media files in the following order: (i) the game type file; (ii) the game brand file; (iii) the casino brand file; and (iv) the appropriate outcome media files, selected based on the outcomes determined for the session and put together in an appropriate order. The outcomes depicted in the outcome media files may be referred to as the representative outcomes for the session.

With respect to item (iv), as described in detail herein, in some embodiments the outcomes for the session may be selected by AS 500 based on session result information or an indication of a plurality of outcomes determined for the session. Similarly, in some embodiments the order of the outcomes may be selected by AS 500. Accordingly, AS 500 may perform a routine for selecting the outcomes (e.g., outcome identifiers) and order thereof prior to accessing the media file database. In other embodiments, the outcomes and/or order thereof may be determined by another device (e.g., CS 305 or GD 315). In such embodiments, AS 500 may access the media file database to select the appropriate outcome media files and the order in which they should be put together in the video presentation based on the received information that indicates the particular outcomes and particular order thereof.

In some embodiments, media files of additional information may be stored in media file record 1100A. For example, a media file depicting a payout schedule active for a current session may be stored. In another example, a message congratulating a player on obtaining a particularly large payout (e.g., a payout greater than 100 credits) may be depicted in a media file. Accordingly, in some embodiments AS 500 (or another device operable to create a video presentation for a session) may be programmed to select such a media file and place it in the video presentation in an appropriate location (e.g., immediately following a media file depicting the particularly large payout). In some embodiments such messages may be generic such that they are not dependent on the player(s) or number of players depicted in the video presentation, and/or not dependent on the game or game type being played. Accordingly, in such embodiments such messages may be stored in a distinct database that is accessed by AS 500 as appropriate.

It should be noted that, in creating a video presentation based on media files, the media files may not necessarily be put together in a sequential order such that only a single media file is depicted at any given time, followed by another media file. The media files may be put together in any manner that is desirable and practicable (e.g., the media files may be overlaid together, merged, depicted simultaneously on a screen, etc.). For example, some media files (e.g., payout schedule media file, casino brand media file, wager per game play media file, game brand media file) may be depicted in one or more frames or portions of frames of one or more media files (e.g., along with each outcome media file). For example, a video presentation may be created such that the casino logo, game logo, credit meter balance graphic and/or a number of spins remaining graphic is always displayed along a portion of the screen as the animation of reels spinning to reveal an outcome is depicted along another portion of the screen.

In some embodiments, the overlay of a graphic or first media file onto one or more frames (or portions of a frame) of a second media file may be performed during the production process (e.g., as the video presentation and corresponding DVD are being created). In other embodiments, the appropriate information may be stored on a DVD and an appropriately programmed DVD player in a player's home may be operable to overlay the information when playing the video presentation.

In some embodiments, distinct media files depicting outcomes may be created for each casino or other customer who may order a DVD in accordance with embodiments described herein. For example, a particular outcome for a Double Diamonds™ machine at Stallion casino may be stored in a distinct media file from the same outcome for a Double Diamonds™ machine at the French Riviera™ casino. This may save resources (e.g., time) producing a DVD in that a graphic of the game brand and/or casino need not be overlaid onto each frame or media file depicting an outcome. Rather, the appropriate record for the appropriate combination of game brand and casino may be accessed to determine the media files to be used in creating the video presentation, and the media files may already be customized for the game brand and/or casino. In such embodiments; the game brand file 1215 and/or the casino brand file 1220 may include an identifier of a game brand and/or an identifier of a casino brand, for purposes of accessing the appropriate record.

In some embodiments, an indication of a payout corresponding to each set of indicia comprising an outcome may also be stored in table 1100A. In other embodiments, the corresponding payout (e.g., for determined how to adjust a credit meter balance graphic) may be stored in a separate database (e.g., the payout may be determined based on the outcome identifier, wherein the subject database correlates each payout to an outcome identifier).

Of course, it should be understood that more than one such media file may be associated with an outcome identifier, and that a variety of such media formats are contemplated. For example, in one embodiment, files indicated and stored by a media file database may be of a format commonly used for storing video on a DVD. Other formats for digitally storing video or audio/video (e.g., MPEG, MPEG2, AVI, MOV, DivX, etc.) are contemplated, as well as other formats for storing audio (e.g., MP3, WAV, etc.). Such media files may comprise video animations, video recordings or any other graphic renderings that otherwise recreate or approximate the entertainment that a GD commonly outputs when communicating game results. For example, if an outcome of a GD is "BELL-BELL-BELL," a media file corresponding to the outcome (or a plurality of media files that are overlaid, interlaced or otherwise combined to represent the outcome) may comprise a graphic animation of the spinning reels, changes in credit balance and other visuals commonly output by a display screen of the GD, as well as accompanying sound effects. In another example, a media file may comprise a video recording of an actual GD producing such a game result (e.g., a video camera is used to capture the GD outputting such a result). Various combinations and modifications of such embodiments are also contemplated.

Additionally, it should be understood that such a media file database may be structured in a variety of manners. For example, rather than storing outcome identifiers and associated media files as records of entry associated with a particular game, outcome identifiers themselves may comprise an embedded indication of a game (e.g., an outcome identifier is "GD-BTO-012-O-000001" or "012-000001," with "GD-BTO-012" or "012" identifying a game for which the outcome was generated), such that a media file database need not comprise separate entries for each of a plurality of possible games.

It should also be noted that in the above-described embodiment, each non-winning outcome is represented by the same outcome identifier (e.g., "BELL-BAR-ORANGE" is the same as "7-BAR-PLUM"). Of course, alternative methods of representing such outcomes are contemplated (e.g., each non-winning outcome and winning outcome is associated with a unique outcome identifier). Further, it should be understood that various "substitute" or "alternate" media files may be used in place of an identified outcome. For example, a database may indicate a number of appropriate media files from which one may be selected randomly (or based on another rule) to represent the identified outcome.

In one embodiment, only payout (and, in some embodiments, game play number) information associated with a session may be utilized (e.g., by AS 500) in creating a video presentation to be recorded onto a DVD. For example, session result data may indicate only that a first game play yielded a payout of 0 coins, a second game play yielded a payout of 5 coins, and so on. In this manner, AS 500 may select from a variety of appropriate media files (e.g., media files may be archived according to the occurrence of a payout amount that the file represents). Such an embodiment may be beneficial in that, for example, AS 500 may choose one of a variety of different gaming device "skins" or visual motifs when determining a media file associated with an outcome (e.g., AS 500 may select a media file themed after a slot machine a player has indicated a preference for). Such an embodiment is described below with reference to embodiment 1100B of a media file database.

Still further methods of determining media files pursuant to creating a video presentation of session are contemplated. In one embodiment, rather than determine an associated media file based on an outcome identifier or other identifier, AS 500 may simply access, in association with a session, (i) a game play number and (ii) an associated media file. For example, in some embodiments, in outputting session result data (e.g., to a session database 425 and/or to a printed ticket), a GD may simply output (i) a session identifier, (ii) one or more game play numbers, and (iii) one or more associated media files. In this manner, AS 500 may determine which media files are to be used in the creation of a video presentation without, for example, the need access a database such as a media file database 525. For example, simply by scanning a video ticket, AS 500 may learn which media files are appropriate—and perhaps even the order which they may be assembled, as indicated by a game play number—to create a video presentation associated with a session.

In summary, in some embodiments AS 500 (and/or another device) may (i) receive session result data associated with an executed session, and (ii) determine media files based on the session result data. In some embodiments, as a game play number may be associated with an outcome indicated in session result data, an order in which media files may be assembled to create a video presentation may be determined as well.

Referring now to FIG. 11B, illustrated therein is a tabular representation 1100B of another example embodiment of media file database 525 (e.g., as it may be stored in a memory of AS 500 and/or a memory of another device). Tabular representation 1100B is referred to herein as media file record 1100B.

The media file record 1100B includes a number of example entries including entries R1100-1 through R1100-9, each defining a media file available for inclusion in a video presentation depicting outcomes for a session. Those skilled in the art will understand that the media file record 1100B may include any number of entries. The media file record 1100B also defines fields for each of the entries or records. The fields specify: (i) a game 1105B that indicates a game to which the media files correspond (the identifier may be in an alphanumeric or text form; the identifier may be in machine and/or human readable form); (ii) a game type file 1110B, which stores a media file comprising data indicating a type of game for which the outcomes of a current session were determined; (iii) a game brand file 1115B, which stores a media file comprising data indicating a brand of the game (e.g., a logo of the manufacturer of the game and/or a logo of the title of the game) for which the outcomes of a current session were determined; (iv) a casino brand file 1120B, which stores a media file comprising data indicating a casino at which the outcomes of a current session were determined (e.g., the logo of the casino, an aerial shot of the casino, a drawing or picture of the outside of the casino, etc.); (v) a payout 1125B, which indicates a particular amount of a payout; (vi) a payout media file 1130B, which stores a media file comprising data indicating the indicia corresponding to the amount of the payout; and (vii) a duration 1135B that indicates a duration of a corresponding payout media file.

Media record 1100B is included herein to illustrate another embodiment of a media file database, one in which media files are selected based on payout amounts instead of outcome identifiers. For example, AS 500 may perform processes very similar to those described with respect to FIG. 11A for creating a video presentation. However, rather than selecting outcome media files based on outcomes and the order thereof determined for a session, AS 500 may instead select payout media files and put them together in a particular order to create a video presentation based on payout data that is determined based on session result data for a particular session. For example, as described in detail herein, in one embodiment AS 500 may receive an indication of (i) a starting credit meter balance for a session, (ii) a wager per game play, (iii) a number of game plays comprising the session, and (iv) an ending credit meter balance for the session. Based on this information, AS 500 may determine the particular payouts, and the order thereof, to be depicted in a video presentation created for the session. The AS 500 may then access record 1100B and select the appropriate payout media files 1130B. In another embodiment, AS 500 may receive the information of the particular payouts obtained for a session and, in some embodiments, the order thereof, and may access record 1100B based on this information.

The fields 1105B through 1120B, as well as field 1135B, correspond to the fields of the same name in FIG. 11A. Accordingly, the descriptions thereof need not be repeated. Similarly, the description of additional and/or different data that may be stored in record 1100A applies equally to record 1100B and need not be repeated.

Referring to both FIGS. 11A and 11B, in accordance with some embodiments a device (e.g., AS 500) may be operable to create a database of media files for use in creating a video presentation. For example, once certain parameters (e.g., one or more of game type, game brand, casino brand, wager per game play, number of players, a payout schedule to be used, etc.) are entered (e.g., by an operator of the device), the device may be operable to (i) generate each possible outcome or payout combination (which step may include determining the set of indicia comprising each outcome);

(ii) for each outcome:

animate the code depicting the outcome;

encode to a specific format desired; and store the resulting media file to a database (e.g., the database of FIG. 11A or FIG. 11B).

In some embodiments, the above process is performed in association with each of the possible outcomes. In other embodiments, each possible outcome is determined once for each of a plurality of possible starting credit meter balances.

In some embodiments, the device may further be operable to update a media file database with the location of a particular file created and/or the media file itself if the media file is stored in the database. The device may also be further operable to create audio for each video media file simultaneously with the process described above. In other embodiments, the device (or another device) may be operable to create appropriate audio for a video media file in a separate process. For example, there may be a smaller number of distinct audio files required than there are video files (e.g., each winning outcome, although it depicts different indicia and corresponds to a different payout, may include the same audio file). In some embodiments, the audio is stored (e.g., multiplexed and/or interleaved) with a video file while in other embodiments an audio file and video file are stored as separate files.

Once media files have been determined, a video presentation may be created using the media files. Various processes for creating a video presentation based on media files are described herein (e.g., particularly with reference to FIGS. 17, 20 and 21A and 21B). For example, in some embodiments, a video presentation may comprise a series of media files (e.g., animations of slot machine reels spinning and accompanying sounds) that a player may view (e.g., in succession or individually). Thus, a player may remotely watch a video presentation of a session, and learn of a plurality of outcomes comprising the session by watching recreations or renderings of the outcomes, though the actual generation of such outcomes may have occurred previously (e.g., in a legal jurisdiction, such as a casino).

Referring now to FIG. 12, illustrated therein is a tabular representation 1200 of an example embodiment of a record of a session media file database 530 (e.g., as it may be stored in a memory of AS 500 and/or a memory of another device). Tabular representation 1200 is referred to herein as session media file record 1200. The session media file database 530 may be utilized, for example, to store the media files selected (and, e.g., the order thereof) for a particular session. For example, as AS 500 accesses a record 1100A or 1100B to select the media files for a video presentation to be created for a session, AS 500 may create a new record in a session media file database 530 for the session. Then, as AS 500 selects files for the video presentation of the session from the record 1100A or 1100B, it may populate the newly created record of the session media file database 530 to store an indication of the media files selected and the order in which these media files are to be put together in the resulting video presentation.

The session media file record 1200 includes a number of example entries, including entries R1200-1 through R1200-9, each defining a media file to be included in a video presentation for a current session. The term "a current session", as the term is used with respect to FIG. 12, refers to the session for which a video presentation is being created and for which media files are being selected. Those skilled in the art will understand that the session media file record 1200 may include any number of entries. The session media file record 1200 also defines fields for each of the entries or records. The fields specify: (i) a session identifier 1205 that uniquely identifies a session; (ii) a media file order indicator 1210 that indicates the order in which the media files selected for the video presentation are to be put together in the video presentation; (iii) a media file 1215, which stores a media file or an indication of the media file; and (iv) a media file description 1220 that describes what is included in the corresponding media file.

As described herein, in some embodiments a video presentation may include content in addition to video/audio representations of outcomes. For example, a video presentation may begin with an animated logo of a game and casino associated with a session based on which the video presentation was created. Accordingly, a media file of the game brand may begin the video presentation (as depicted in entry R1200-1 of record R1200), followed by a media file of the casino logo (as depicted in entry R1200-2 of record R1200). The video presentation may then continue by presenting, in sequential order, a plurality of outcomes (as depicted in entries R1200-3 through R1200-5). In some embodiments, a message may be included in the video presentation, in between the depiction of representative outcomes (as depicted in entry R1200-6). It should be understood that, although the media files of session S-01927 are depicted as being ordered in sequence, in some embodiments two or more media files or the contents thereof may be presented simultaneously in one or more frames of a video presentation (as described above with reference to FIG. 11A). For example, the game and/or casino logo may persist from frame to frame as different representative outcomes are presented during the video presentation.

As described herein, some types of presentations may include a plurality of (e.g., simulated) players. Accordingly, in some embodiments the media file description 1220 may include an indication of which of at least one of a plurality of players are depicted in the media file (e.g., a media file may be described as "OUTCOMES FOR RED AND BLUE PLAYERS").

Referring now to FIGS. 13A-13C, collectively, illustrated therein is a tabular representation 1300 of an example embodiment of a DVD production queue database 535 (e.g., as it may be stored in a memory of AS 500 and/or in the memory of another device). Tabular representation 1300 is referred to herein as DVD production queue database 1300.

The DVD production queue database 1300 includes a number of example records or entries, including records R1300-1 through R1300-3, each defining a DVD that has been placed in a production queue (e.g., a production queue of AS 500). Those skilled in the art will understand that the DVD production queue database 1300 may include any number of records or entries. The DVD production queue database 1300 also defines fields for each of the entries or records. The fields specify:

(i) an order number 1305 that stores a unique order number identifying the order in which the request for the DVD of the particular record was received (e.g., a casino or other entity may place an order for 1,000 DVDs and each of the DVDs may be associated with the same order number; in another embodiment, each DVD may be associated with a distinct and unique order number);

(ii) a customer identifier 1310 that stores an identifier of a customer who ordered the DVD of the record (e.g., casino, GD manufacturer, player or other entity);

(iii) a disc identifier 1315 that uniquely identifies a DVD of the record;

(iv) a game brand 1320 that stores an indication of the game for which the outcomes to be represented in the video presentation to be recorded on the DVD of the record were determined;

(v) a casino 1325 that identifies the casino associated with the outcomes to be represented in a video presentation to be recorded on the DVD of the record;

(vi) a denomination 1330 of the GD to be represented in a video presentation to be recorded on the DVD of the record;

(vii) a wager per game play 1335 used in generating the outcomes to be represented in a video presentation to be recorded on the DVD of the record;

(viii) a payout schedule identifier 140 that identifies the payout schedule (i.e., active payout combinations) utilized in determining the outcomes to be represented in a video presentation to be recorded on the DVD of the record;

(ix) a number of game plays 1345 to be represented in the video presentation to be recorded on the DVD of the record;

(x) a starting credit meter balance 1350 that indicates the value of the credit meter balance prior to any outcomes being determined for the session to be represented in the video presentation to be recorded on the DVD of the record (which, in some embodiments, may be the price of the DVD);

(xi) an end credit meter balance 1355 that indicates the value of the credit meter balance once the last of the outcomes comprising the session to be represented in the video presentation to be recorded on the DVD of the record has been generated (which, in some embodiments, may be the redemption value of the DVD);

(xii) a session identifier 1360 that uniquely identifies the session to be represented in a video presentation to be recorded on the DVD of the record (which session identifier may be used to access records of other databases, such as a record of a session media file database (an example of which is described with respect to FIG. 12));

(xiii) an order submission time 1365 that indicates a date and/or time at which the order for the DVD of the record was submitted (e.g., received by the AS 500);

(xiv) a production start time 1370 that indicates a date and/or time at which production of the DVD was begun (in some embodiments, the beginning of the production of the DVD may be considered to be the time at which the video presentation to be recorded on the DVD is begun to be determined (e.g., by selecting appropriate media files to be included on the DVD); in other embodiments this time may be considered to be the time at which the recording of the video presentation onto the DVD is begun, or another event);

(xv) a production step 1 time 1375 that indicates the date and/or time at which a first step of a process to produce or create the DVD of the record was begun (alternatively or additionally, the time at which the first step was completed may be stored);

(xvi) a production step n time 1380 that indicates the date and/or time at which an $n^{th}$ step of a produces to produce or create the DVD of the record was begun (alternatively or additionally, the time at which the $n^{th}$ step was completed may be stored; it should be understood that the number of fields for recording the beginning time of each step in a DVD production process is based on the number of steps included in the process);

(xvii) a production completed time 1385 that indicates the date and/or time at which the production of the DVD was completed (in some embodiments, the completion of production may be considered to be the video presentation being recorded onto the DVD; in other embodiments, the completion of production may be considered to be when the DVD is appropriately packaged and is ready for shipment, or another event);

(xviii) a shipped time 1390 that indicates a date and/or time at which the DVD of the record was shipped (e.g., to the customer indicated in field 1310).

The DVD production queue database 1300 may be utilized, for example, to track the process of producing each DVD. For example, a new record may be created in the DVD production queue database 1300 upon an order for a DVD being received. For example, an employee associated with AS 500 may enter the information into the database upon receiving an order. In another embodiment, CS 305 or another device may be operable to write data to the DVD production queue database 1300. A particular record may be updated (e.g., based on the disc identifier and/or session identifier) as the corresponding DVD moves through the production process. Of course, additional and/or different information may be stored in the DVD production queue database 1300.

A DVD may be created using a combination of databases. Example processes for using various databases to create a DVD and track the progress thereof are described in detail herein.

Referring now to FIG. 14, illustrated therein is a tabular representation 1400 of a record of an example embodiment of an outcome sets database 540 (e.g., as it may be stored in a memory of AS 500 and/or a memory of another device). The tabular representation 1400 is referred to herein as outcome sets database record 1400. It should be noted that, in the embodiment depicted via FIG. 14, a record may be created in an outcome sets database 540 for each desired combination of the following parameters and values thereof: (i) a game; (ii) a number of game plays; and (iii) a wager per game play. Thus, for example, if a casino or other entity desires to sell, for a given game, (i) some DVDs having 500 outcomes depicted at a wager of $1.00 per game play, (ii) some DVDs having 500 outcomes depicted at a wager of $0.50 per game play, (iii) some DVDs having 1,000 outcomes depicted at a wager of $1.00 per game play, and (iv) some DVDs having 1,000 outcomes depicted at a wager of $0.50 per game play, there may be four distinct records created for the game. Each record corresponds to a unique combination of: (i) game, (ii) number of game plays; and (iii) wager per game play. Of course other parameters may be included in creating such combinations of parameters, such as a particular payout schedule to be used, a number of players, etc. Varying the number of parameters characterizing a record will affect the number of records that are appropriate for a given game.

The outcome sets database 1400 includes a number of example records or entries, including records R1400-1 through R1400-*n*, each defining a plurality of sets of outcomes corresponding to a particular end credit meter balance for a particular combination of game, number of game plays and wager per game play. Those skilled in the art will understand that the outcome sets database 1400 may include any number of records or entries. The outcome sets database 1400 also defines fields for each of the entries or records. The fields specify: (i) a game identifier 1405 that indicates (e.g., in alphanumeric form) a particular game to which the sets of outcomes correspond; (ii) a number of game plays 1410 characterizing a current session (i.e., the session for which a set of outcomes is being determined); (iii) a wager per game play 1415 that indicates the wager posted for each game play of the current session; (iv) a final credit meter balance 1420 that indicates the end credit meter balance of a current session; (v) a first set of outcomes 1425 that corresponds to a particular end credit meter balance; (vi) a second set of outcomes 1430 that corresponds to a particular end credit meter balance; and (vii) an $n^{th}$ set of outcomes 1435 that corresponds to a particular end credit meter balance. It should be understood that any number of sets of outcomes may be used.

The database 540 may be used, for example, to determine a set of representative outcomes to be included in a video presentation to be recorded onto a DVD. As described herein, in some embodiments, AS 500 (or another device operable to create a video presentation to be recorded onto a DVD) may receive an indication of a plurality of outcomes comprising a session (i.e., session result data) that includes an indication of (i) the game for which the outcomes of the session were determined; (ii) the number of game plays comprising the session; (iii) the wager per game play; (iv) the end credit meter balance at the completion of the session. Based on such session result data, the AS 500 may determine a set of representative outcomes to be included in a video presentation to be recorded on a DVD, for indicating the session result data to the player in a player friendly format.

In one embodiment, selecting the set of representative outcomes may be based on an end credit meter balance of the session. In such an embodiment, the outcome sets database illustrated via record 1400 may be used. For example, for each possible end credit meter balance of a session corresponding to a particular combination of a game, number of game plays and wager per game play, there may be associated several possible sets of outcomes. AS 500 may thus access the appropriate record of the outcome sets database based on the combination of game, number of game plays and wager per game play indicated in the session result data. The AS 500 may then determine the appropriate sets of outcomes based on the end credit meter balance included in the session result data.

In some embodiments, the AS 500 may then further select one of the sets of outcomes to include in a video presentation based on a predetermined rule (e.g., randomly, in sequence such that each set of indicia sets is cycled through in an orderly basis, or based on another rule). In one embodiment, each set of outcomes includes an indication of the indicia comprising each outcome and the order in which the outcomes are to be presented. In another embodiment, each set of outcomes includes an indication of the payouts to be represented in the video presentation and the order in which the payouts are to be presented in the video presentation (each payout being presented by presenting a media file depicting the appropriate set of indicia representing the payout).

In some embodiments, the AS 500 may, after selecting a set of outcomes from the plurality of sets of outcomes corresponding to a particular end credit meter balance, determine the appropriate media file for each outcome of the set by accessing a media file database (e.g., media file database 525). For example, AS 500 may access the media file database 1100A of FIG. 11A if the outcome set includes a set of outcome identifiers, or the media file database 1100B of FIG. 11B if the outcome set includes a set of payout identifiers.

In some embodiments the media file is searched. If it does not yet exist it is created. After creation, the media file is stored in a manner that allows searching (e.g., a file and a pointer to the file in a database). In this manner, should the same outcome be needed in the future, the system does not need to create the media file yet again. In this manner, the database of prepared media files will grow over time.

It should be noted, with respect to each of fields 1425, 1430 and 1435, that although only a few outcomes are illustrated in each set, in practice the number of outcomes may be equal to the number of game plays comprising the session (i.e., if the session comprises 500 game plays, each set of outcomes may comprise 500 outcomes).

It should further be noted, also with respect to each of fields 1425, 1430 and 1435, that each set of outcomes corresponding to a particular end credit meter balance may be populated via a program designed to determine an appropriate set of outcomes and corresponding payouts based on the desired combination of parameters (e.g., such as game, number of players, number of game plays and wager per game play). Such a program may be run and the sets of outcomes determined for each possible end credit meter balance prior to any DVD being created in accordance with embodiments of the present invention. In other embodiments, such a program may be run in order to determine one or more appropriate sets of outcomes based on the desired combination of parameters once session result data indicating a value for each of the desired parameters is received.

Referring now to FIG. 15, illustrated therein is a tabular representation 1500 of a probability database 620 (which may be stored in GD 600 or in another device). Tabular representation 1500 is referred to herein as probability database 1500. It should be noted that, in some embodiments, a plurality of probability databases may be stored and/or used. For example, a first probability database may be used for a first game and a second probability database may be used for a second game. In another example, a first probability database may be used when a GD is operating in a conventional mode (e.g., a player is playing the GD to obtain and view outcomes one-by-one) and a second probability database may be used when a GD is operating in a "session outcome generation mode" (e.g., the GD is generating a plurality of outcomes to be stored on a DVD and sold to a player for remote viewing of the outcomes at a subsequent time). A first probability database may be different from a second probability database, for example, by including (i) more, fewer or different ranges of random numbers; (ii) a shorter or longer total range of available random numbers; and/or (iii) different outcomes. The probability database 1500 is thus an illustration of one example probability database that may be stored for use in some embodiment.

Probability database 1500 includes a number of example records or entries, including records R1500-1 through R1500-18, each defining an outcome available for a game on a gaming device. Those skilled in the art will understand that the probability database 1500 may include any number of entries. The probability database 1500 also defines fields for each of the entries or records. The fields specify: (i) a random number (or range of random numbers) 1505 that may be generated by a random number generator; and (ii) an outcome identifier 1510 that indicates the one or more indicia comprising the outcome that corresponds to the random number or range of random numbers of a particular record.

A probability database 1500 may be utilized, for example, to determine what outcome corresponds to a random number generated by a random number generator. For a three-reeled slot machine, for example, the outcomes may comprise the three symbols to be displayed along a payline. Other arrangements of probability databases are possible. For example, the book "Winning At Slot Machines" by Jim Regan (Carol Publishing Group Edition, 1997) illustrates examples of payout and probability tables and how they may be derived. The entirety of this book is incorporated by reference herein for all purposes.

Referring now to FIG. 16, illustrated therein is a tabular representation 1600 of a payout database 625 that may be stored in a GD 600 or in another device. Tabular representation 1600 is referred to as payout database 1600. It should be noted that, in some embodiments, a plurality of payout databases may be stored and/or used. For example, a first payout database may be used for a first game and a second payout database may be used for a second game. In another example, a first payout database may be used when a GD is operating in a conventional mode (e.g., a player is playing the GD to obtain and view outcomes one-by-one) and a second payout database may be used when a GD is operating in a "session outcome generation mode" (e.g., the GD is generating a plurality of outcomes to be stored on a DVD and sold to a player for remote viewing of the outcomes at a subsequent time). A first payout database may be different from a second payout database, for example, by including (i) different payouts for the same outcome; (ii) different payout combinations; and/or (iii) different indicia corresponding to a payout. The payout database 1600 is thus an illustration of one example probability database that may be stored for use in some embodiment.

Payout database 1600 includes a number of example records or entries, including records R1600-1 through R1600-18, each defining a payout for a particular outcome or payout combination available for a game on a gaming device. Those skilled in the art will understand that the payout database 1600 may include any number of entries. The payout database 1600 also defines fields for each of the entries or records. The fields specify: (i) an outcome identifier 1605 that uniquely identifies an outcome; (ii) an outcome 1610 that corresponds to the outcome identifier (e.g., the set of indicia comprising the outcome); and (ii) a payout that corresponds to the outcome.

It should be noted that, in some embodiments, information illustrated as stored in a payout database and a probability database may be combined and/or some information may be unnecessary and thus not stored. For example, in one embodiment, a probability database and payout database may be combined such that the resulting database stores (i) a random number of range of random numbers field; (ii) a payout that corresponds to each random number or range of random numbers; and (iii) a payout identifier that uniquely identifies each payout. As described, in some embodiments a GD or SGD may generate a plurality of random numbers, each random number being an outcome or result of a game play for a session. However, there may not be a need to determine a set of indicia corresponding to each outcome or result. All that may be desired and/or necessary is to determine the payout corresponding to each random number so generated. Accordingly, a database such as described in this paragraph may be appropriate for use in such embodiments. A GD or other device may use such a database to determine the individual payouts for a session (based on the random numbers generated for the session) and/or a sum of payouts for the session, without determining or being able to determine a set of indicia that corresponds to any particular random number. In some embodiments, as described, the individual payouts and/or sum of payouts determined for a session may be transmitted or communicated to another device, such as AS 310, for translation and storage onto a DVD. A set of indicia may be determined by this other device, for example, during a translation process that determines at least one set of indicia based on the individual payouts and/or sum of payouts of the session.

5. Processes

Figure 17:
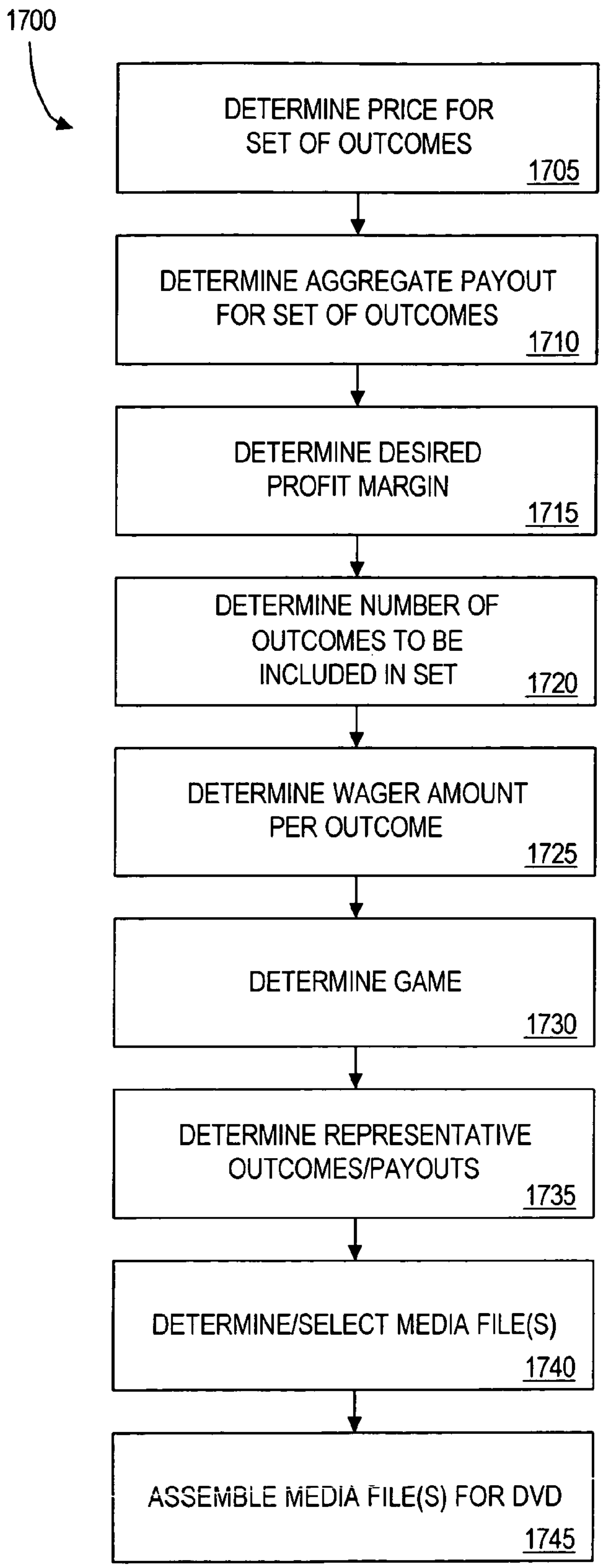
FIG. 17 is a flowchart of an example process for determining a set of outcomes and/or payouts to be represented in a video presentation, in accordance with some embodiments described herein.

Referring now to FIG. 17, illustrated therein is a flowchart of an example process 1700 for determining representative outcomes to be included in a video presentation to be recorded onto a DVD. The process includes a sub-process for selecting the media files to be assembled into the video presentation, which in some embodiments may be a separate process. The process 1700 may be performed, for example, by AS 500. Of course, as described herein, any process described herein may be performed by any device or combination of devices that is practicable and desirable. Further, as also applies to all processes described herein, the steps may be performed in an order different from that illustrated and additional or different steps may be included. Similarly, some steps may be omitted or combined.

The process 1700 may begin, for example, upon receiving session result data and/or a DVD order based on which a DVD is to be created. Based on the received session result data and/or order information, various information is determined, for use in determining a set of representative outcomes to be represented in a video presentation to be recorded onto a DVD. The information may further be used to select particular media files (e.g., video and/or audio files) for use in creating the video presentation.

In step 1705 a price for the set of outcomes (e.g., representative outcomes) to be included on the DVD is determined. In some embodiments, the price may comprise the initial credit meter balance for the session, to be represented in the video presentation. In some embodiments, this price is the price to be charged to a player (or other purchaser) for purchasing the DVD.

The aggregate payout for the set of outcomes (and thus for the session) is determined in step 1710. The aggregate payout for the session is the sum of all payouts determined by a GD when generating the actual outcome for the session. For example, if five actual outcomes were generated and three of them corresponded to a payout of zero, while one corresponded to a payout of three (3) credits while the fifth corresponded to a payout of four (4) credits, the aggregate payout for the session is seven (7) credits. It should be understood that the aggregate payout determined in step 1710 may be indicated in any format or denomination desired (e.g., number of credits and the corresponding value of each credit, dollar value, etc.).

A desired profit margin for the DVD is determined in step 1715. In some embodiments, the desired profit margin may inherently be programmed into a GD that creates the actual outcomes for the session, as part of the house advantage that a probability table used in determining the actual outcomes is based on. In such embodiments, a separate determination of the desired profit margin in process 1700 may be unnecessary, as this may inherently be included in the session result data (e.g., price, aggregate payout, wager per game play, etc.).

The number of representative outcomes to be included in the video presentation (typically the number of actual outcomes determined by a GD, on which the session result data is based) is determined in step 1720. For example, the session result data may include the number of game plays, and thus the number of outcomes, comprising the session.

The wager amount per game play is determined in step 1725. This may be, for example, an actual wager amount per game play, an average wager amount per game play for the number of game plays, etc. In some embodiments (e.g., embodiments in which the wager amount per game play does not vary from one game play to another in a given session), the wager amount per game play may be determined by dividing up the price of the set of outcomes (determined in step 1705) by the number of outcomes to be included (determined in step 1720) in other embodiments, the wager amount(s) may be explicitly included in the session result data. For example, the session result data may specify that the wager amount per game play is "$0.50" or, even more specifically, list each game play and the corresponding wager amount.

The game to which the outcomes correspond (the game for which a video presentation is to be recorded onto the DVD) is determined in step 1730. Again, this information may be included in the session result data or DVD order.

Based on the above information, a set of representative outcomes is determined in step 1735. For example, a database may be accessed and the set of representative outcomes retrieved from an appropriate record of the database.

For example, in one embodiment the set of representative outcomes may be determined from an outcome sets database 540 (e.g., such as the one depicted in FIG. 14). A particular record of the database may be accessed based on the number of outcomes or game plays, and the wager per game play. The appropriate plurality of sets of outcomes may be determined based on an ending session balance (which may be included in the session result data or calculated based on the price, aggregate payout, number of game plays and wager per game play information). Then one of the sets of outcomes may be selected (e.g., randomly or based on another rule). In some embodiments, a process of determining a set of outcomes or set of payouts based on session result information such as an ending credit balance may be a distinct process performed separately from the reminder of process 1700 (e.g., by the same device or a different device from the device performing other steps of process 1700).

In another example, a program may generate a representative set of outcomes based on the parameters determined in steps 1705-1720. In yet another example, the set of outcomes may be included in the session result data (e.g., another device, such as CS 305 may have determined the representative outcomes and/or the actual outcomes determined by the GD may be used as the representative outcomes directly).

In one embodiment, determining the set of outcomes may include determining an order in which the outcomes are to be represented in a video presentation (e.g., which may differ from an order in which corresponding actual outcomes were generated by a GD).

In one embodiment, determining the set of representative outcomes may comprise determining a set of payouts (and, e.g., the payout identifier corresponding to each payout and/or the order in which the payouts are to be presented in the video presentation).

Once the set of representative outcomes is determined in step 1735, the process 1700 continues to steps 1740 and 1745. It should be noted that, in some embodiments, the process 1700 may end at step 1735 and another process (e.g., performed by another device) may comprise steps 1740 and 1745. For example, part of process 1700 may be to store the set of representative outcomes determined in step 1735 (e.g., in a record of a database, accessible by the unique session identifier, a unique disc identifier and/or an order identifier). For example, the outcome identifier (e.g., and/or payout identifier, as appropriate and desired) for each outcome determined in step 1735 may be stored in such a database. This database may be subsequently accessed for purposes of performing steps 1740 and 1745 or similar steps.

In step 1740, media files are determined and/or selected based on the set of representative outcomes determined in step 1735. For example, a media file database 525 (e.g., such as the one illustrated in FIG. 11A or the one illustrated in FIG. 11B) may be accessed. For example, a particular record may be selected from the database based on the game (in some embodiments the record may be selected based on the game and casino, if, for the same game, there are different media files stored for different casinos). Then the appropriate media files may be selected based on the outcome identifiers of the outcomes determined in step 1735. Determining the media files may include determining media files in addition to media files storing an image or animation of the outcomes. For example, a media file storing an image or animation of a payout schedule, a congratulatory message, an advertisement, a credit meter balance and/or other material may also be selected and assembled into the video presentation. Of course, determining media files may include selecting audio data files as well as video or image files and/or selecting files which later drive a software program.

In step 1745, the media files determined in step 1745 are assembled into a video presentation. A particular process for assembling media files into a video presentation is described with reference to FIGS. 22A and 22B. For example, the media files may be assembled into an order based on an order in which the outcomes are to be presented.

Figure 18:
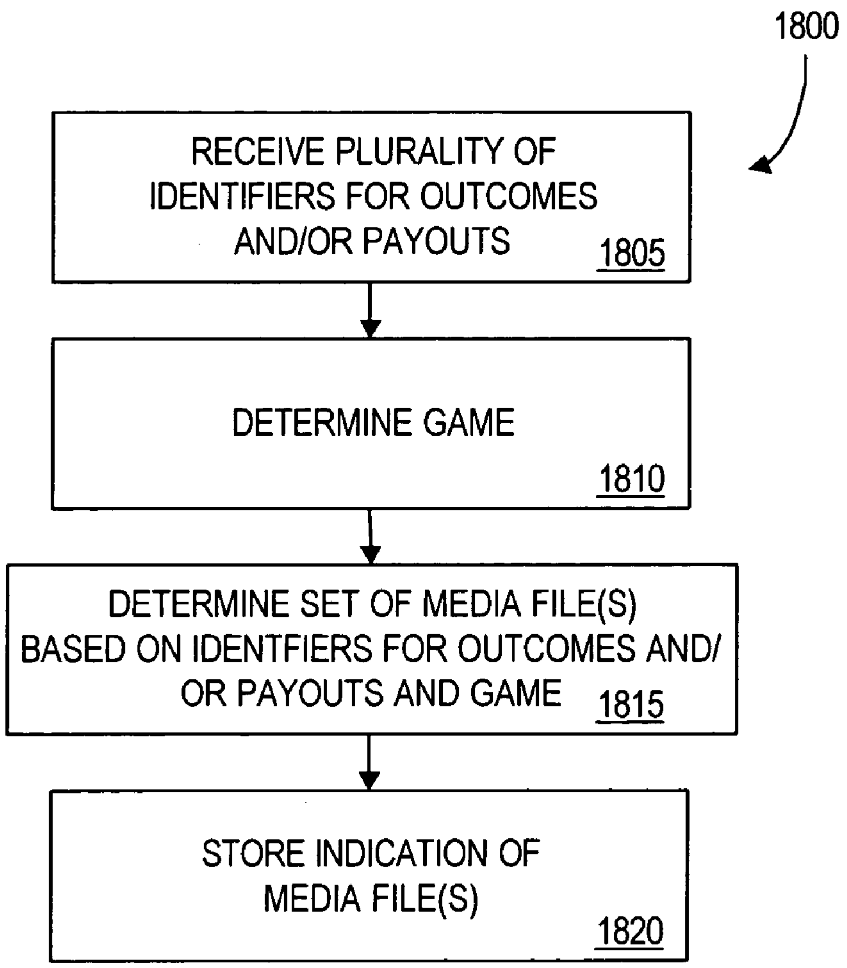
FIG. 18 is a flowchart of an example process for determining a set of media files for a DVD, in accordance with some embodiments described herein.

Referring now to FIG. 18, illustrated therein is a flowchart of an example process 1800 for determining a set of media files based on an indication of a set of desired payouts (or a set of desired outcomes), in accordance with some embodiments. The process 1800 may be utilized, for example, in embodiments in which AS 310 (or another device operable to determine media files to be included in a video presentation) receives a plurality of outcome identifiers and/or a plurality of payout identifiers and determines the media files based on these identifiers. For example, unlike the embodiment described with respect to FIG. 17, in which general data defining a session is received and representative outcomes are determined based on this data, in the embodiment of process 1800 the identifiers of the actual outcomes may be received (or the identifiers of the payouts corresponding to the actual identifiers) from CS 305 or another device, thus requiring less processing on the part of AS 310. The AS 310 may simply select the appropriate media files based on the received identifiers. Of course, the embodiment of process 1800 may require substantially more data to be transmitted from CS 305 to AS 310 in the embodiment of process 1800 than in the embodiment of process 1700. For example, in process 1700, it may be sufficient for CS 305 to transmit to AS 310 the following information regarding a particular session: (i) a price of the session, (ii) an ending credit meter balance of the session, (iii) an indication of the payout schedule used for the session, and (iv) an indication of the ending credit meter balance for the session. The AS 310 may then determine a plurality of representative outcomes based on this information. In the embodiment of process 1800, however, more information may be transmitted; the outcome identifier and/or payout identifier for each game play (which may be a substantial number of identifiers, as a session may comprise, for example, 500 or 1,000 outcomes) may be transmitted.

In step 1805, a plurality of identifiers, each identifier identifying an outcome and/or payout of a session, is received. For example, the identifiers may be received from CS 305. In one embodiment, the identifiers may be stored in a database and subsequently retrieved. In one embodiment, the identifiers of payouts may comprise the values of the payouts. For example, a record (e.g., such as the one illustrated in FIG. 26 described below) may be used to store the plurality of payout values for a session. In one embodiment, the information received in step 1805 may include an indication of an order in which the outcomes and/or payouts are to be represented in a video presentation for the session. In one embodiment, for example, some or all of the information stored in a record of a session database 425 (e.g., such as the record 700A of FIG. 7A) may be received by AS 310 as part of step 1805.

In step 1810, the game, for which the outcomes and/or payouts of step 1805 were received, is determined. This information may be used to access an appropriate record of a media file database. For example, as described with respect to FIG. 11A and FIG. 11B, a distinct set of media files may be stored for each available game. In one embodiment, process 1800 may further comprise receiving an indication of a casino to be represented in the video presentation (e.g., a casino in which the actual outcomes of the session were generated, a casino that placed the order for the DVD and/or the casino in which the DVD is to be sold). As described with reference to FIG. 11A and FIG. 11B, in some embodiments media files of outcomes for a particular game may be further customized to reflect a particular casino. In such embodiments, an appropriate record of a media file database may be accessed based on a desired combination of game and casino.

In step 1815, the media files for the video presentation to be created are determined based on (i) the outcome identifiers and/or payout identifiers received in step 1805 and (ii) the game determined in step 1810. For example, a media file database such as the one depicted in FIG. 11A may be accessed and the appropriate media files selected based on the outcome identifiers.

In step 1820, an indication of the media files (or file) determined in step 1815 (and, in some embodiments, the media files themselves or copies thereof) may be stored in association with a session identifier or other unique identifier associated with the session (e.g., a disc identifier identifying the DVD on which the media files are to be included as part of a video presentation to be recorded onto the DVD). Storing the media files may comprise, for example, creating or opening a previously created record of the session media file database 530. For example, a record such as the record 1200 (FIG. 12) of such a database may be created (e.g., during the execution of process 1800) and populated with the media files (or indications or copies thereof) determined in step 1815, in an order in which the media files are to be assembled into the video presentation. It should be understood that a step similar to step 1820 may be performed in process 1700 or any other process described herein that involves the creation of a video presentation.

Figure 19:
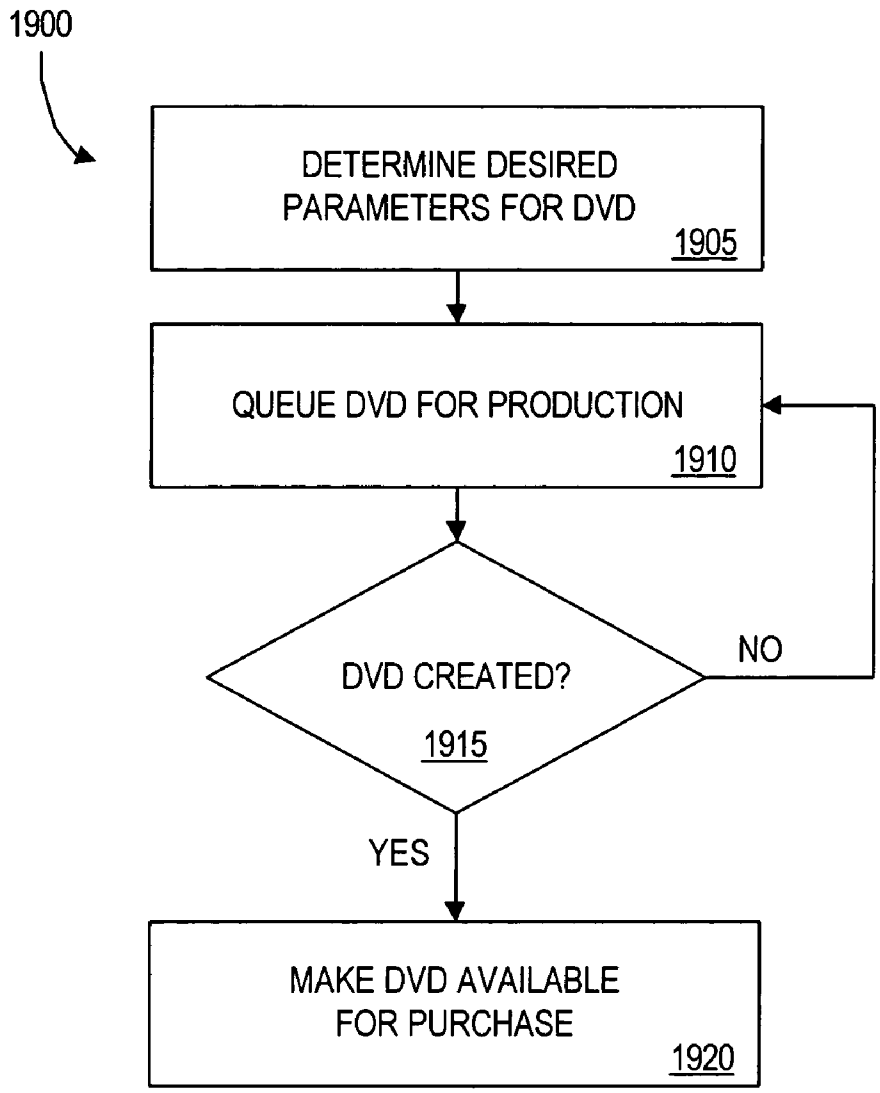
FIG. 19 is a flowchart of an example process for making a DVD available for purchase, in accordance with some embodiments described herein.
Figure 20:
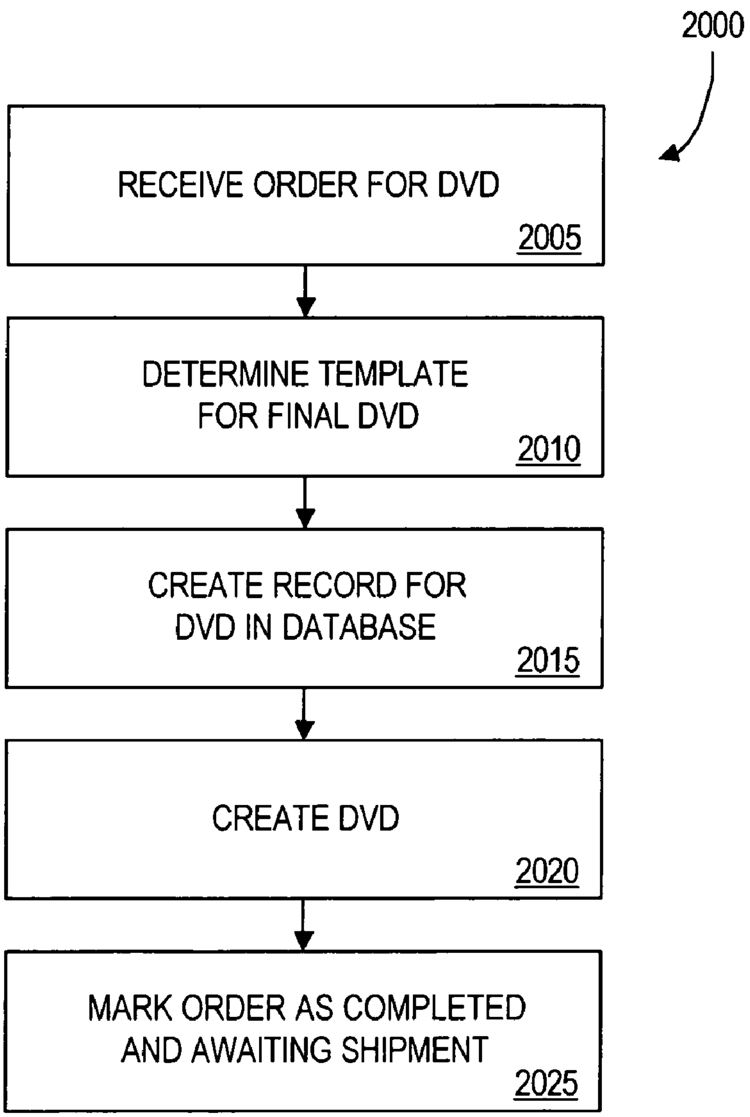
FIG. 20 is a flowchart of an example process for determining processing an order for a DVD, in accordance with some embodiments described herein.
Figure 21A:
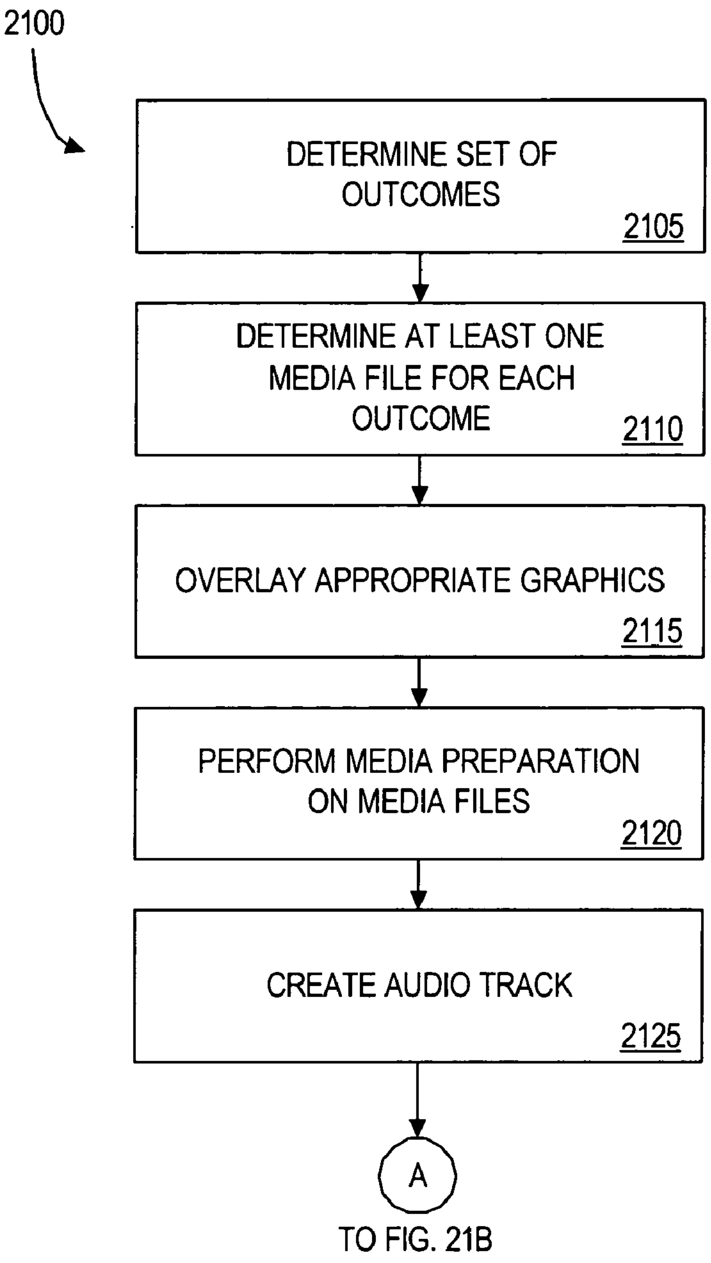
FIGS. 21A and 21B are a flowchart of an example process for creating a DVD, in accordance with some embodiments described herein.
Figure 21B:
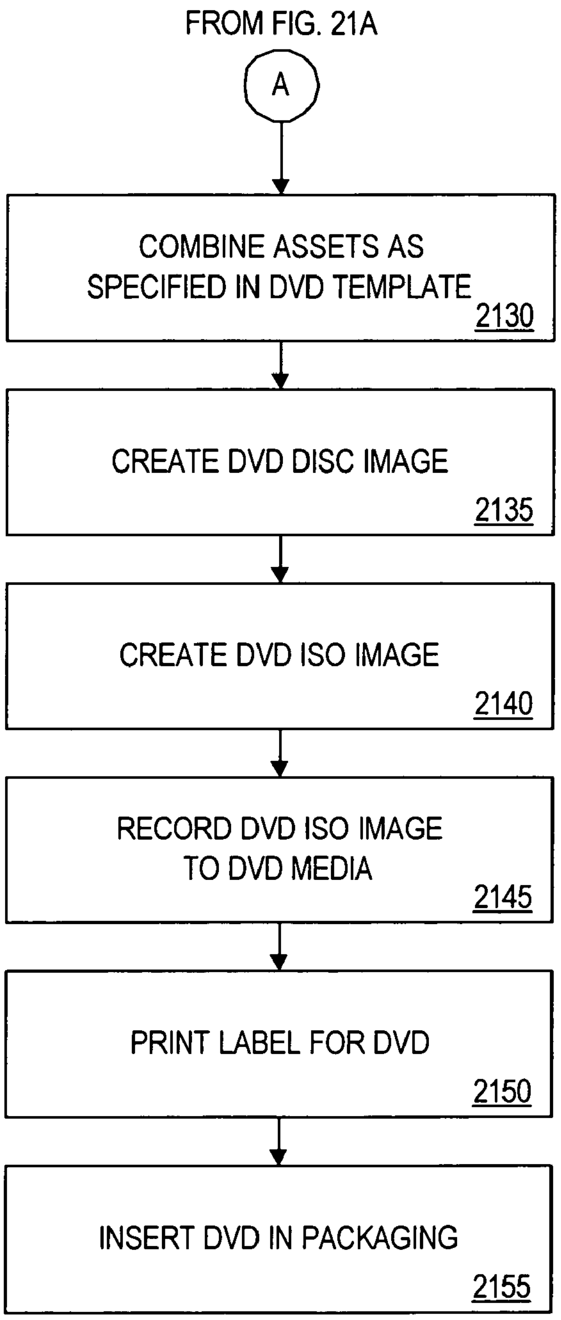

Referring now to FIG. 19, illustrated therein is a flowchart of an example process 1900 for creating a DVD. The process 1900 is meant as an overview of the process of creating a DVD and does not include many detailed steps or sub-routines that may be involved in such a process. FIG. 20 and FIGS. 21A and 21B illustrate more detailed example processes for creating a DVD.

In step 1905, the desired parameters for a DVD to be created are determined. For example, an order for a DVD and/or session result data may be received. In one embodiment, some or all of the information in a session database 425 (such as the one embodied in the example record 700A of FIG. 7A) may be communicated in step 1905 as an indication of the parameters of the DVD to be created.

Examples of parameters that may be determined in step 1905 include, without limitation, (i) a price of the DVD (which may, in some embodiments, be the starting credit meter balance of the session based on which the DVD is to be created; (ii) a game; (ii) a gaming device; (iii) a casino; (iv) a payout schedule; (v) a strategy to be employed in making decisions on behalf of a player; (vi) an ending credit meter balance; (vii) a number of game plays or outcomes to be represented; (viii) a wager per game play; (ix) outcomes to be represented; (x) an order of outcomes to be represented; (xi) advertisements, promotional or other material to be included in the video presentation to be included on the DVD; (xii) audio to be included on the DVD; (xiii) a language preference in which the material in the DVD is to be presented; (xiv) a number of players to be represented; and/or (xv) one or more payouts to be represented on the DVD. It should be understood that some of the above items may be redundant with other items. It should further be understood that not all of the above-listed parameters are required to be known in order to create a DVD.

It should still further be understood that, in some embodiments, some of the parameters (and values thereof) may be determined by a first device (e.g., CS 305) and transmitted to a second device (e.g., AS 310) performing step 1905, while other parameters (and values thereof) may be determined directly by the second device. The second device may determine such additional parameters (and values thereof), for example, based on information received from the first device and/or based on a program or instructions stored in a memory of the second device.

In other embodiments, all of the parameters (and values thereof) may be determined by the first device and transmitted to the second device, the second device having minimal processing capabilities and merely serving to assemble the video presentation and record it onto a DVD.

In step 1910, the DVD is queued for production. For example, a record may be created in a DVD production queue database 535 (an example embodiment of which is illustrated in DVD production queue database 1300 of FIGS. 13A-13C). For example, a unique disc identifier may be determined and used to create a new record. At least some of the parameters determined in step 1905 (and values thereof) may be stored in the record. The disc identifier may be placed in a DVD production queue. A device for producing the DVDs (or at least the device performing a first step in the production process), such as AS 500, may select the DVDs to be created on a first-come-first-serve basis (e.g., based on the order submission time, based on the disc identifier, etc.).

In step 1915 it is determined whether the DVD has been created. For example, it may be determined whether a record for the DVD in a DVD production queue database indicates that the production process for the DVD has been completed. In a more particular example, the DVD production queue database 1300 may be accessed to determine whether there is an entry in the production completed time field 1385.

If it is determined that the DVD has been created, the DVD is made available for purchase in step 1920. For example, the DVD may be packaged in a shipment of a plurality of DVDs intended for a particular destination (e.g., a casino identified in customer identifier field 1310 of the DVD production queue database 1300) and shipped to the destination. Otherwise, the process 1915 loops until it is determined that the DVD has been created.

In some embodiments, session result data may be generated and stored in advance of the receipt of a request to produce a game disc. For example, session result data may be "warehoused" (e.g., generated and then stored en masse), such that at a later point, a disc may be created using the historic results. In other embodiments, a device may be configured to generate game play results for a session on demand (e.g., upon receiving a signal from another device). In still further embodiments, a device may be configured to continuously produce game play results (e.g., the device produces one result every second, continually), which game play results may be utilized when game play results are desired pursuant to the creation of a video presentation for a DVD (e.g., when a disc comprising 500 outcomes is desired, the next 500 seconds worth of game play results generated by the device are monitored, accessed, recorded and/or otherwise utilized to create the disc).

Such a device may then itself produce a disc, or communicate with one or more devices configured to product such a disc. For example, a memory of a device may store a program for determining one or more media files based on session result data, as described. Thus, a number of media files (e.g., audio and/or video clips or recordings of various slot machine animations) may be determined in association with a disc. As described, in one embodiment, a device that generates game play results may itself be configured to produce a video presentation and/or DVD having the video presentation recorded therein. For example, the device may comprise a program for determining which media files to encode on a DVD, as well as hardware for storing such files on a DVD and formatting the DVD in a manner such that the DVD may be viewable by conventional devices (e.g., the device comprises hardware and software that allows for the production of DVDs). In other embodiments, session result data and/or media files may be accessed by or transmitted to one or more separate devices (e.g., via a communications network) from the device that generates the game play results, such that the one or more separate devices may then produce the video presentations and/or discs. For example, in one embodiment, a central computer may receive blocks of game play results from a plurality of devices (e.g., GDs and/or MGDs). For example, each such device my produce a plurality of game play results, and transmit the results (perhaps along with a session identifier) to the central computer (e.g., CS 305 and/or AS 310). The central computer may comprise a program for accessing appropriate media files based on the game play results and encoding them onto a DVD, as well as hardware for transferring such files to a DVD (e.g., an optical laser, etc.). Thus, one or more devices of such an automated facility may produce en masse discs according to various parameters, as described herein.

In one embodiment, a secure facility may comprise one or more GDs for producing game play results (e.g., MGDs that generate game play results in an automated fashion, with little or no human involvement). Additionally, such a facility may comprise various hardware and software for producing DVDs based on the results generated by the GDs. For example, an "assembly line" of computerized and/or mechanized devices may be configured to (i) store appropriate media content on DVDs based on game play results generated by the GDs, (ii) label such DVDs, (iii) package such DVDs (e.g., including adding barcodes, graphics, etc.) and/or (iv) shrink-wrap such packaging. Thus, such a facility may comprise a variety of devices, one or more of which may communicate with one or more databases for determining necessary information for producing such DVDs. For example, each DVD may be unique (e.g., the game play results thereof may be based on a session generated for that particular DVD), and therefore when producing each DVD, it may be necessary for various devices to communicate with one or more GDs (or otherwise obtain data generated by one or more GDs) and/or databases so as to determine appropriate content for the DVD. For example, an assembly unit may comprise a computer system in communication with a mechanized or robotic arm that accesses physical media (e.g., lifts a "blank" DVD from a spindle of DVDs and places it into an area in which the DVD may subsequently be written to by an optical device). The computer system may also be configured to instruct an optical device to encode the DVD with various content (e.g., indications of game play results, a menu interface, etc.). The computer system itself may or may not generate the game play results that are used to determine the content for the DVD. Accordingly, the assembly unit (e.g., the computer system in communication with the mechanized hardware, optical device, etc.) may communicate with one or more devices and/or databases that store session results and/or media files for creating a video presentation to be recorded onto a DVD.

In one embodiment, because numerous game play results may be generated in a rapid or substantially instantaneous manner, game play results may be generated as required for the production of a particular DVD (e.g., as each DVD becomes ready for content, a GD is instructed to generate game play results). In other embodiments, game play results and/or associated media files may be stored in a database, and then accessed as needed.

In this manner, an assembly unit may produce a DVD storing indications of game play results in association with a particular session. For example, the DVD may be encoded with audio and/or video files depicting an animated slot machine producing various arrays of symbols, a credit meter balance adjusting after each game play, etc. The DVD may further be encoded electronically with a session identifier and/or other session information, a player identifier, and/or a code (e.g., an activation code, a disc identifier, etc.), etc., such that when the DVD is inserted into an appropriate reader device, such information may be accessed. Thus, in some embodiments, a plurality of DVDs may be manufactured, each DVD comprising indications of unique session results.

In some embodiments, a facility for producing DVDs may further be configured to uniquely mark the packaging or labeling of such DVDs with one or more identifiers or codes. For example, a session identifier, player identifier, and/or activation code may be uniquely marked on the packaging or labeling of a DVD, such that the code or identifier may be used to facilitate various steps described herein with respect to the sale, activation and redemption of such DVDs. Thus, in one example, after a DVD has been uniquely encoded with content by a first assembly unit, the DVD may then be transferred to one or more second assembly units that may assist in the labeling and/or packaging of the DVD. For example, a second assembly unit may comprise a computer system in communication with various hardware for applying graphics or other labeling to the top side of a DVD (e.g., a pressing unit applies permanent color or grayscale images to the top side of the DVD). Such a unit may then communicate with one or more databases, such that one or more identifiers associated with the DVD may then be determined (e.g., a "Disc Activation Number"). In one embodiment, a master computer system may keep track of each DVD's position within a series of assembly units, such that when a DVD reaches a second assembly unit, the unit may be instructed to label the DVD with one or more identifiers. In another example, the unit may determine an identifier by reading the DVD (e.g., if the DVD was previously encoded with an identifier). In either case, the identifier may then be marked upon the DVD. In some embodiments, the identifier may be machine-readable (e.g., a barcode is labeled upon the top of the DVD). Alternately or additionally, a human-readable identifier may be labeled upon the DVD (e.g., a numeric code is imprinted). In some embodiments, the labeled and encoded DVD may then be transported to one or more further assembly units. For example, yet another assembly unit may be responsible for inserting the DVD into a jewel case, and/or for shrink-wrapping a jewel case, etc. Other processes such as printing packaging materials (e.g., paper inserts or other paper materials that accompany jewel cases) may or may not take place in such a facility. For example, in one embodiment, a separate press may receive instructions for imprinting a paper cover to be inserted into a jewel case with graphics and a unique identifier (e.g., associated with a particular DVD). The paper cover may then later be merged and/or otherwise incorporated into such an assembly process (e.g., the cover is matched to a jewel case containing the appropriate DVD).

It should be noted that various efforts may be made to ensure that the production of video presentations and/or DVDs on which such video presentations are recorded in such an automated facility occurs without tampering. For example, such devices and/or various components thereof may be equipped with devices that indicate whether physical tampering has occurred (e.g., the casing of a device for generating game play results comprises a tamper-evident seal). In other embodiments, a central computer or server may authenticate or verify that the software of a device has not been tampered with, via a checksum or one or more other such authentication procedures known in the art.

Further, gaming regulators may require various steps, for example, to prove that when creating DVDs, operators of a system may not purposefully create "losing" video presentations and/or DVDs (i.e., ones that correspond to a redemption value of zero) by selecting losing outcomes, or manipulate the random nature of game play result generation in any fashion (e.g., physical or electronic tampering, which may be monitored by a third party, would be evident). In some embodiments, it may be desirable for a system to ensure that all of the game play results generated are used in the creation of a video presentation (such that operators may not "pick and choose" which game play results to incorporate) or that the aggregate payout for the actual outcomes generated equals the aggregate payout for the representative outcomes comprising a video presentation. For example, the system may authenticate that if 100,000 game play results have been generated by one or more GDs (e.g., during a period of time, since the inception of the device, etc.), all 100,000 of such game play results have been incorporated into the production of one or more DVDs. In a more specific example, an electronic record may be kept of all the (uniquely identified) game play results generated by all GDs pursuant to the execution of sessions, as well as all the game play results used to render videos of one or more DVDs (e.g., such that an auditor may check the results of the DVDs against the generated results).

In further embodiments, to help ensure fairness of production of DVDs, an operator of a system producing DVDs and/or video presentations therefore may certify a payback percentage for an aggregate number of DVDs (e.g., DVDs are produced in a manner such that for every 1,000 DVDs made, the 1,000 DVDs will on average pay out a certain sum to customers). It should be appreciated that manners of auditing such claims are well known in the art (e.g., much as how a slot machine payback percentage is audited).

In alternate embodiments, a system of the present invention may be configured similar to a system for producing "instant-win" or "scratch-off" lottery tickets, in that for every set of DVDs produced (e.g., every group of 500), it may be predetermined that certain DVDs will yield certain final credit meter balances or credit meter balances within a certain range (e.g., in the batch of 500, there will be one DVD with a final credit meter balance of 12,783 credits, four DVDs with final credit meter balance of 476, and so on). Thus, a final session balance associated with each of a set of DVDs may be determined similarly to a roll of instant-win lottery tickets (e.g., according to a predetermined matrix). As with a roll of instant-win lottery tickets, it may be advantageous to distribute "winning" DVDs in a manner such that a series of DVDs produced and sold in sequence (e.g., DVDs characterized consecutive numeric identification codes) do not result in almost all losses. For example, a common game structure used in instant-win lottery tickets is known as "guaranteed low end prize structure" or GLEPS. In this structure, tickets are provided to the ticket-selling agents in numbered "books," with each book containing a predetermined number of tickets. Each book of GLEPS game tickets contains a predetermined number of low end, or small award, winning tickets. For example, small award winners may include awards up to, and including, ten dollars. In addition, ticket books may also contain additional winning tickets that have larger prize values and are not part of the GLEPS structure. The ticket books are arranged in "pools" and these larger-amount tickets are distributed over the ticket book pools in a truly random manner and are much less numerous than the GLEPS winning tickets. Thus, in some embodiments, DVDs may be produced in a similar manner (e.g., a matrix of final contract/session balances may be associated with a pool of DVDs in a non-random manner, but the final credit/session balances may be distributed to serially identified DVDs within the pool in at least a partially random manner).

Referring now to FIG. 20, illustrated therein is a flowchart of an example process 2000 for creating a DVD. The process 2000 is described with particular reference to the embodiment of the DVD production queue database 535 illustrated in FIGS. 13A-13C.

In step 2005, an order for a DVD is received. For example, an order from a casino for a plurality of DVDs may be received electronically and/or via paper or other tangible medium. For example, a casino or other customer may transmit session result data for a plurality of sessions, thus ordering a DVD corresponding to each of the sessions. In some embodiments, an order may specify that a plurality of DVDs be created based on session result data for a particular session. In one example, the session result data of an order may be transmitted to AS 310 electronically or be called in by a casino representative. In another example, a document corresponding to one or more of the sessions may be received. For example, as described herein, in some embodiments one or more session results tickets may be printed by a GD for a session executed by the GD. In one embodiment, step 2005 may include receiving the session results tickets (or copies thereof) for each session included in the order. In some embodiments, each session may be received as a separate order.

In step 2010 a template is determined for the final DVD. As would be understood by one of ordinary skill in the art of producing DVDs, a template for a DVD may include an indication of information to be included in the DVD and may include items that are constant across a batch of DVDs. A template may further include programming commands (pause here, skip to there if this button is pushed, etc.) for manipulating the assets (i.e., content) of the DVD. In some embodiments, the same template may be used for all DVDs of the same game, casino, number of game plays and wager per game play. Thus, there may be a plurality of templates stored in a memory (e.g., a memory of AS 500) and step 2010 may comprise selecting the appropriate template for use, based on the session result information determined in step 2005. A particular template may include, for example, an opening menu design, buttons, graphics, and advertising material. In some embodiments, some of the data in a template may be variable (e.g., a first advertisement may be selected for inclusion in an advertising portion of a first DVD while a second advertisement may be selected for inclusion in an advertising portion of a second DVD).

In step 2015, a record for the DVD of the order is created in a database (e.g., DVD production queue database 1300). A record in the DVD production queue database 1300 may be created based on the receipt of the order. For example, a unique order number may be determined (e.g., the order number may be received as part of the order or assigned to the order upon the order being received) and stored in the newly created record. The customer identifier for the order may also be recorded. A disc identifier may be determined and stored as well. Additional information regarding parameters of the DVD to be created may also be determined from the session result information of the order and stored in the record (e.g., game brand, casino, denomination, wager per game play, payout schedule, number of game plays, starting credit meter balance, end credit meter balance, session identifier). The order submission time (e.g., the time at which the order was received) may also be stored.

In step 2020, the DVD is created via a production process that may comprise one or more steps. The steps may comprise, for example, (i) creating a video presentation to be recorded onto the DVD, (ii) recording the video presentation onto the DVD, (iii) packaging the DVD, and (iv) readying the DVD for shipment to the customer who ordered the DVD. Process 2100, described in detail with respect to FIGS. 21A-21B, is one example process for how a DVD may be created. In some embodiments, as a DVD proceeds through a production process comprising several steps, the appropriate record of the DVD production queue database 1300 is updated upon the completion of each step, to track the progress of the DVD creation.

In step 2025 it is determined that the DVD has been successfully created and the order is marked as ready for shipment. For example, production completed time field 1385 may be updated to reflect the time at which the production process was completed, thus marking the DVD (or record of the DVD) to reflect that the DVD is ready for shipment.

Referring now to FIGS. 21A-21B, illustrated therein is a flowchart of an example process 2100 for creating a DVD. The process 2100 may, in some embodiments, comprise an example of step 2020 of process 2000.

In step 2105, a set of representative and/or actual outcomes to be included in a video presentation are determined. For example, a process similar to that described with respect to FIG. 17 or a process similar to that described with respect to FIG. 18 may be utilized. In one example, representative outcomes may be determined based on session result data received or identifiers of the representative outcomes may be received.

In step 2110, at least one media file is determined for each of the outcomes determined in step 2105. Determining a media file may comprise, for example, generating a new media file or retrieving a previously created media file from a media file database or other memory structure.

In some embodiments, step 2110 may further comprise determining (e.g., generating or retrieving) any other appropriate media files. For example, one or more media files comprising a graphic depicting one or more of a meter of number of game plays remaining, a credit meter balance and/or a payout schedule may be determined.

Step 2110 may comprise animating the media files. Animation of the media files may comprise, for example, creating a sequence of frames which, when viewed together in rapid succession, simulate motion. Such a sequence may comprise, for example, creating the frames pixel by pixel, copying the frames from a database, or any method on a continuum between these two processes.

In step 2115, graphics are overlaid onto the media files depicting the outcomes determined in step 2105, as appropriate. For example, a graphic of a credit meter balance or a meter depicting a number of spins remaining may be overlaid onto particular portions of each frame of a media file.

In some embodiments, step 2115 may further comprise determining an order or other layout of the media files. For example, it may be determined which frame or portion of a frame a particular graphic is to be overlaid on. In another example, an order in which the representative outcomes are to be determined (and thus an order in which the media files depicting the representative outcomes are to be output in the video presentation) may be determined.

In step 2120, media preparation (e.g., such as MPEG compression) is performed on the media files. In one example, MPEG compression is performed on animation (e.g., media files that have been animated). Of course, if the media files are to be stored in a format other than MPEG, another procedure may be performed on the media files to convert them to the appropriate format. For example, another compression algorithm other than MPEG compression may be performed.

In step 2125, an audio track is created for the DVD. In some embodiments (e.g., embodiments in which a media file includes both video and audio data), this step may be unnecessary. For example, the creation of the audio track may be performed synchronously with the determination of the media files or video files. In some embodiments, creating an audio track comprises selecting the appropriate audio media files and assembling them into an appropriate order based on the planned video content for the video presentation.

In step 2130, the assets for the DVD (i.e. content to be included in the DVD, including video and audio content) are combined as specified in a DVD template being used to create the DVD. In some embodiments, process 2100 may include a step of selecting the appropriate DVD template (some examples of which were described with reference to step 2010 of FIG. 20). The assets for the DVD may comprise, for example, the media files and the audio track previously determined. The assets may also include any still pictures, subtitles, or other content to be included on the DVD. For example, the template may say:

Opening Menu create one button pointing to program point 10 play background music audio Z until button selected pause Point 10 play video Y

Step 2130 may comprise modifying the template for a specific DVD by inserting particular files into the template. For example, the above template may be modified by inserting "disc123/slotsvideo/video.mpg" for the variable Y, and "disc123/menumusic/music.audio" for variable Z.

In step 2135, a DVD disc image is determined for the DVD. As would be understood by one of ordinary skill in the art of DVD production, a DVD disc image is the logical structure for the DVD or directory structure with the files in the proper LOGICAL location. Typically, a directory structure comprises a top level directory which includes menu files, a video directory and an audio directory. The video directory has a file for each chapter, etc. However, the data on the disc itself may be physically spread out over various physical locations on the disc (a practice referred to as fragmentation). Step 2135 may comprise, for example, copying the media files determined in process 1200 into the correct logical structure.

In step 2140, an ISO (International Standards Organization) image (or bit-by-bit structure) is determined for the DVD, based on the standard being used. As would be understood by one of ordinary skill in the art of DVD production, an ISO image defines the actual layout of the individual bytes of the files. Files may be interlaced (e.g., 100 bytes of video may be followed by 10 bytes of audio so a laser reading the disc can play them together) and consecutive files may be physically consecutive in the ISO disc image (unlike the DVD disc image). It should be noted that step 2135 may be performed by a first program and step 2140 may be performed by a second program, as is true for all steps of processes described herein.

In step 2145, the DVD ISO image is recorded onto the DVD. Recording the ISO image may comprise transferring the information onto a DVD. For example, in one embodiment recording a DVD may comprise stamping the DVD. In another embodiment, recording information onto a DVD or transferring information onto a DVD may comprise burning the information onto the DVD. For example, DVD-R or DVD+R burners may use relatively high-powered lasers to darken inks inside a recordable DVD media to simulate the pits of traditional mass-produced DVDs. Examples of such technologies are readily available, such as DVD recorders from Plextor™ or Panasonic™. In some of these embodiments, the DVD recording device may have multiple recording devices and a robotic mechanism for disc movement into and out of the drives. Examples of this technology include Rimage's Protoge Plus™, or Microtech's™ product lines.

In step 2150 a label is printed for the DVD. This may involve, for example, determining a graphics image and printing it onto the label or DVD itself. The label may further include unique information such as a unique disc identifier or the session identifier. In some embodiments, the label may include an indication of the game and/or casino represented in the video presentation of the DVD.

In step 2155 the DVD is inserted into packaging. The DVD may be packaged such that tampering with the DVD (e.g., unauthorized opening of the DVD) is visible or otherwise easily discernable. Further, the DVD may be packaged in anti-tampering material, Step 2155 (or another step of process 2100) may further include storing an indication (e.g., in a DVD production queue database 535) that the DVD has been completed and is ready for shipment. The time and I or date on which the production of the DVD was completed may also be stored. The DVD may then be transported to an appropriate destination (e.g., shipped along with many other DVDs created in a similar manner to a casino that ordered the DVDs).

Figure 22:
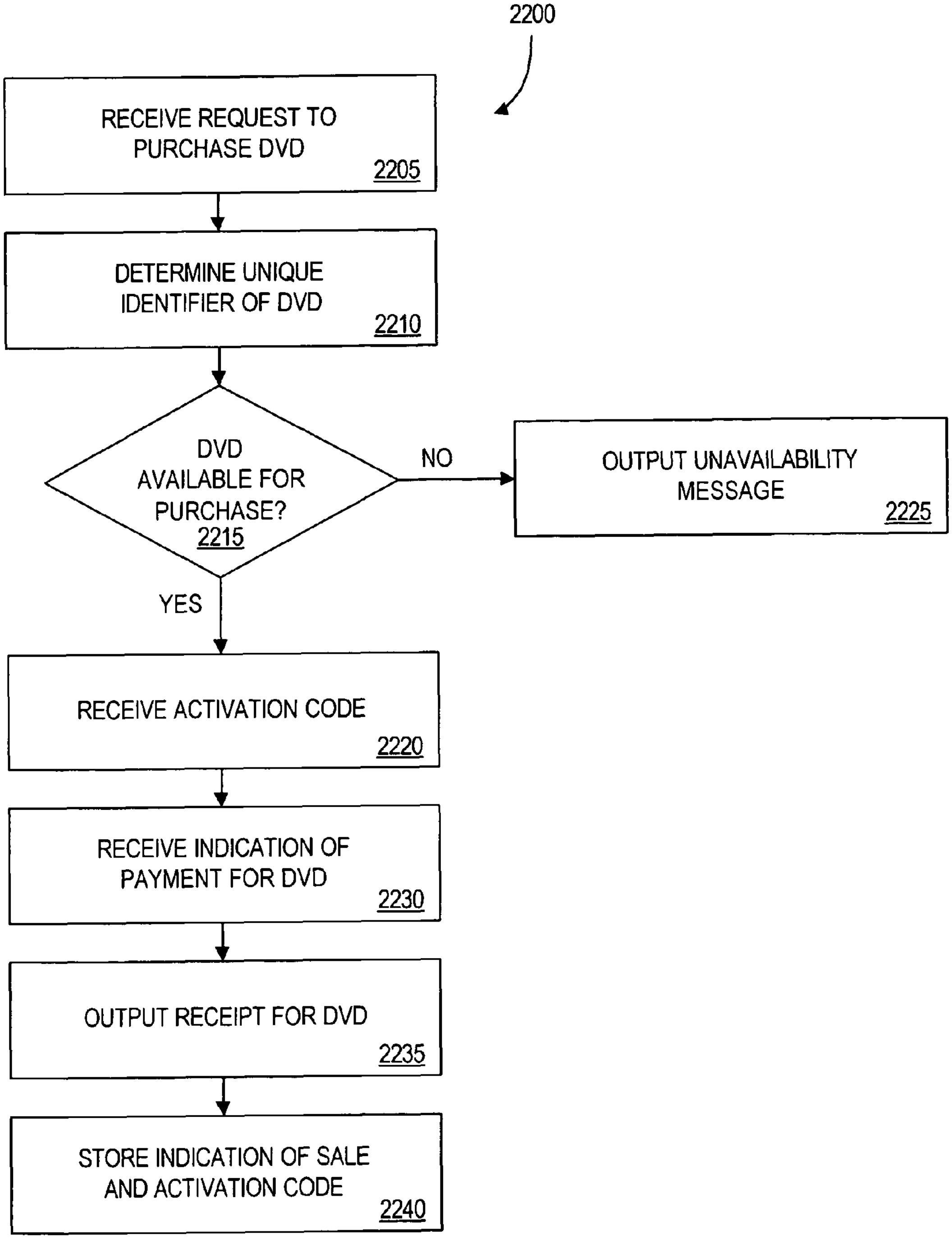
FIG. 22 is a flowchart of an example process for storing an indication of a sale of a DVD, in accordance with some embodiments described herein.

Referring now to FIG. 22, illustrated therein is a process 2200 for facilitating the purchase of a DVD or a session in another remotely viewable form. The process 2200 may be performed, for example, by POS 320.

In step 2205, a request to purchase a DVD is received. For example, in one embodiment a player may select, from a display, a DVD that has recorded thereon a video presentation based on outcomes previously generated by a GD. Alternatively, the player may request that the casino attendant provide a DVD from behind a casino counter. The player may request to purchase the selected DVD. Step 2205 may comprise, for example, receiving from a casino attendant into POS 320 an indication that a new transaction for the purchase of such a DVD is to be initiated. In another embodiment, step 2205 may comprise receiving a request that a DVD be generated on behalf of the player. In this latter embodiment, the request may include an indication of parameters (and values thereof) defining a session based on which a video presentation is to be created and recorded onto the DVD. For example, a player may specify a game, wager amount per game play, number of game plays, number of depicted players, and price for the session and resultant DVD.

In step 2210, a unique identifier of the DVD is determined. For example, a unique disc identifier on the packaging of a DVD (or, in some embodiments, on the DVD itself) may be entered via a bar code scanner or keyboard. In embodiments in which the request for the DVD comprises a request that a DVD be generated on behalf of a player, step 2210 may comprise determining or assigning a unique identifier for the DVD to be created. For example, a unique DVD identifier may be generated based on a program or algorithm or a previously generated but as yet unassigned DVD identifier may be retrieved from a database of available DVD identifiers. In one embodiment, step 2210 may comprise determining a session identifier of a session associated with the DVD previously created or the DVD to be created.

In step 2215, it is determined whether the DVD is available for purchase. For example, a database such as available DVDs database 1000 of FIG. 10 may be accessed and it may be determined whether the status of the DVD is set to "available," or other information associated with the DVD may be retrieved, based on the unique identifier determined in step 2210, that allows a determination of whether the DVD is available for purchase. In one embodiment, POS 320 accesses such information and determines the availability of the DVD for purchase. In other embodiments, POS 320 transmits an indication of the unique identifier to another device (e.g., CS 305), which determines the availability of the DVD for purchase and transmits an indication of the availability to POS 320. In embodiments in which the request to purchase a DVD is a request for a DVD to be created, step 2215 may comprise determining whether a session as defined in the request of step 2205 may be created (e.g., whether the requested combination of parameters and values thereof are approved or approvable).

If the DVD is not available for purchase, a message indicating the unavailability of the DVD for purchase is output in step 2225. For example, such a message may be output to a casino attendant (who may communicate the message to the player requesting to purchase the DVD) and/or directly to the player requesting to purchase the DVD. Otherwise, the process 2200 continues to step 2220.

In step 2220, an activation code is received. The activation code may comprise, for example, a code provided to a player upon a legitimate purchase of a DVD, to be used by the player as subsequent proof of the purchase and/or to activate a video presentation recorded on the DVD. In some embodiments, the activation code may simply comprise a unique transaction identifier generated or otherwise determined by POS 320. In other embodiments, an activation code may be distinct from a transaction identifier. In some embodiments, a unique activation code may be generated at the time of a purchase of a DVD (e.g., using an algorithm created for this purpose). In other embodiments, an activation code may be selected from a list of previously generated and available activation codes. In some embodiments, an activation code may be encrypted. In some embodiments, the activation code associated with the DVD at the time of purchase of the DVD may be stored in a record of a database associated with the DVD (e.g., in association with the disc identifier and/or other unique identifier already associated with the DVD).

It should be noted that, in some embodiments, an activation code may be determined and associated with a particular DVD during the manufacturing process.

In step 2230, an indication of payment for the DVD is received. For example, an operator of POS 320 may indicate an amount and form of payment received for the DVD, as is known in the art of POS operations. In some embodiments, step 2230 may comprise first retrieving the price of the DVD (e.g., from a database, such as available DVDs database 1000, or by scanning or otherwise determining a price indicated on the DVD or packaging thereof).

In step 2235, a receipt for the DVD is output. Some examples of such a receipts are illustrated in FIGS. 23-26 (described in detail below). For example, POS 320 may cause a receipt to be printed. In some embodiments, the receipt for the DVD may be e-mailed to the player or provided to the player in another electronic form. In some embodiments, the activation code may be included on the receipt. A copy of the receipt may be retained by the casino or other entity selling the DVD to the player.

In step 2240, an indication of the sale of the DVD is stored, along with the activation code. For example, a database such as available DVDs database 1000 of FIG. 10 may be accessed and the current date and time may be stored in the date sold field. The activation code now associated with the DVD may also be stored in the record of such a database. The status of the DVD may be set to "purchased" or another similar status.

Figure 23:
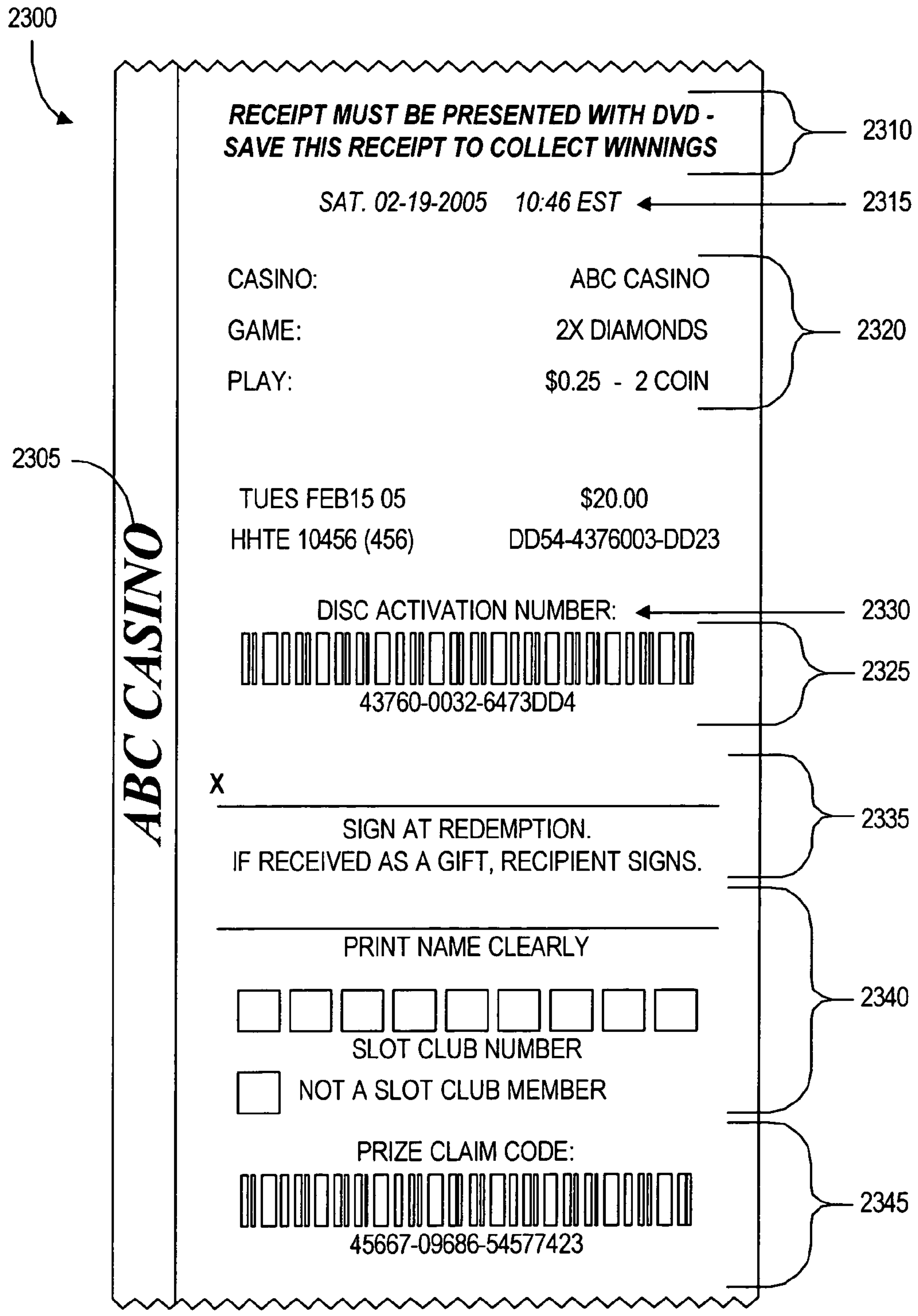
FIG. 23 is an example of a receipt that may be output upon a purchase of a DVD, in accordance with some embodiments described herein.

FIG. 23 illustrates an example of a receipt 2300 that may be provided to a purchaser (e.g., to a player upon a purchase of a DVD by the player). The receipt 2300 includes a name of a casino (in area 2305) that may indicate the casino at which the DVD was purchased, the casino at which the DVD may be redeemed, and/or the casino at which the session upon which the outcomes represented on the DVD were generated.

Area 2310 includes an example printed message informing the player that the receipt 2300 must be presented in order for the corresponding DVD to be redeemed, as is consistent with some embodiments described herein. The receipt 2300 also includes (in area 2315) an indication of the date and time at which the DVD was purchased.

Area 2320 of the receipt includes an indication of session information describing various parameters (and values thereof) defining the session upon which the DVD video presentation is based. For example, the example session information indicated on receipt 2300 includes the name of the casino ("ABC CASINO"). For instance, the name may refer to, for example, a casino at which the DVD was purchased, at which the DVD may be redeemed and/or at which the outcomes represented on the DVD were generated. The example session information further includes the game for which the outcomes represented on the DVD were generated ("DOUBLE DIAMOND"), and an indication of the wager per game play ("25¢-2 COIN") posted for each game play represented on the DVD. Of course, different and/or additional session information may be indicated on such a receipt.

The receipt 2300 also includes additional data (in area 2325) that may comprise encoded information and/or human readable information corresponding to the DVD and/or session (e.g., a redemption value, POS and/or casino attendant associated with the sale, session and/or DVD type, price of the DVD, etc.). In some embodiments, as indicated in area 2330, a disc activation number may appear on the receipt 2300 in bar code and/or human readable form. The disc activation number may comprise, for example, a disc activation code as described herein.

The receipt 2300 also includes a signature line (in area 2335) that may comprise a line on which a player may be required to sign her name upon redeeming a DVD (e.g., as a measure preventing the player from claiming that the player has not redeemed the DVD and/or to discourage the player from attempting to re-use the receipt to again redeem the DVD). One or more other lines and/or boxes may be included (e.g., as depicted in area 2340) to be filled in by a casino attendant and/or a player upon a DVD being redeemed. For example, information relating to the authorization of the redemption, the date and/or time of the redemption, a slot club membership number of a player, an indication of whether the purchaser is a member of a slot club, and/or the signature of the purchaser and/or casino attendant facilitating the redemption may be filled in.

The receipt 2300 further includes a prize claim code (in area 2345). The prize claim code may comprise, for example, a barcode and/or a serial number that corresponds to a location to find pertinent information stored in a database. For example, the barcode may be scanned to obtain a prize claim code that may be a pointer to a record of a database that stores an indication of the redemption value of the DVD. In some embodiments, the prize claim code may comprise a disc identifier and/or a session identifier, as these are described herein.

According to one embodiment, as discussed in this disclosure, a ticket (e.g., ticket 3305 FIG. 33) may be provided to a player as a proof of purchase and/or to use to redeem a payment associated with a DVD or other tangible medium. For example, a TITO ticket (measuring 2.5"×6"; or approximately 6.35 cm×15.24 cm) or other medium similar in appearance to conventional cashless gaming tickets may be printed and provided to a player (e.g., upon the player's purchase of a DVD). In one example, the provided receipt is identical in size to a standard cashless gaming ticket and includes a barcode (e.g., a prize claim code). One or more such tickets may be provided to a player (e.g., being associated with identical or different redemption values or portions of a total redemption value of a set of purchased outcomes) for redeeming payment(s). Similarly, in some embodiments, different players associated with the same purchased product (e.g., a DVD) may receive identical or different tickets.

In one embodiment, unlike conventional cashless gaming tickets, a ticket provided as a receipt might not indicate an associated prize or redemption amount in text (in contrast to the example ticket 3305). Players may redeem winnings by inserting such tickets into a GD, kiosk, or other device configured to receive such tickets (e.g., employing TITO technology). For example, a GD may read or otherwise receive a barcode printed on a ticket and look up associated information to verify, for example, that a DVD was legitimately purchased and/or whether an attempt had been made previously to redeem a DVD. Some examples of such functionality are discussed with respect to process 2700. As discussed in this disclosure, in some embodiments one or more players must be registered or otherwise associated with a receipt, voucher, or purchased product. In such embodiments, a redemption process may include requiring a redeemer to provide some type of identification at the device at which the redeemer presents the ticket. For example, a player may be prompted to insert a player tracking card at a kiosk or GD in order to verify that the player is associated with a particular ticket.

In one embodiment, a player who purchases a DVD may return to the casino at which the DVD was purchased. By presenting any or all of a (i) a disc identifier, (ii) activation code, (iii) receipt and/or (iv) valid photo identification, the player may be able to redeem the DVD for the redemption value of the DVD (typically the end credit meter balance of the session on which the DVD video presentation was based). The player may, for example, collect a redemption value of a DVD from one or more of (i) a casino attendant operating a computer device (e.g., POS 320 or CPD 325), (ii) a kiosk operable to facilitate the redemption of DVDs (e.g., by receiving a session identifier and/or other relevant information via an input device, accessing a database, and determining a final session balance or redemption value associated with the DVD) (iii) a GD, and (iv) another device. A redemption value may be provided to a player, for example, in the form of cash, voucher, gaming credit, or any other form. In some embodiments, players may be given an incentive to return to a casino to redeem DVDs (e.g., casinos may recognize that drawing customers back to their property may lead to increased gambling activity and thus increased revenues). For example, if a player is due a final session balance of $63.25, the player may be offered an amount more than the final session balance (e.g., an additional $10) to redeem the DVD at the casino (e.g., rather than having a check for the redemption value of the DVD mailed to the player).

In one embodiment, a player may redeem a DVD without returning to the casino at which the DVD was purchased. For example, a player may contact a casino after viewing a video presentation (e.g., via postal mail, phone, fax, e-mail, a form of a casino Web page, etc.) and indicate a session identifier, disc identifier, activation code and/or some other information (e.g., a home phone number) by which a casino may determine a final session balance or other redemption value due to the player. In one embodiment, the player may be given an opportunity to specify whether the player prefers to be mailed a check, to have funds transferred in some electronic manner (e.g., funds are transferred electronically to a player's financial account) or to have the redemption value provided to the player in some other manner.

In some embodiments, a player may not contact a casino after purchasing a session. In one such embodiment, if a player is owed a final session balance based on the purchased session, the casino may wait a predetermined period of time after the purchase of the DVD associated with the session. If this period of time (e.g., 30 days) elapses and no contact is received from the player (e.g., the player does not return to the casino to redeem the DVD), the casino may automatically issue any funds owed to the player (e.g., by mailing a check to a provided address or storing the funds in a financial account associated with the player).

In some embodiments, although a redemption value greater than zero may correspond to a session purchased or provided to a player and a price may be associated with the session, the player may have not yet paid the price at the time he requests the redemption value. Accordingly, in some embodiments, the price of the session may be deducted from the redemption value. If the redemption value is greater than the price, the player may be paid the difference. If however, the redemption value is less than the price, the player may be paid nothing.

In some embodiments, a session may end with a negative balance (e.g., at the end of the session, the sum of wagers deducted from a starting credit meter balance exceeds a sum of payouts added to the starting credit meter balance). In some embodiments, such negative balances may be treated similarly to a balance of zero credits; in other words, the redemption value of the session may be zero.

It should be noted that, in various embodiments, a player may have an opportunity to redeem a DVD without having watched the video presentation recorded on the DVD in its entirety (or at all). For example, a player may purchase a DVD containing a video presentation, but may not have a chance to watch the video presentation before his next trip to the casino. In some embodiments, such a player may be allowed to redeem the DVD irrespective of the failure to watch the video presentation. However, in other embodiments, a player may not be allowed to redeem a DVD unless the player provides a special code output upon (e.g., during) the conclusion of a video presentation recorded on the DVD (e.g., an alphanumeric code or password is displayed during or after a final game play result is depicted).

Figure 27:
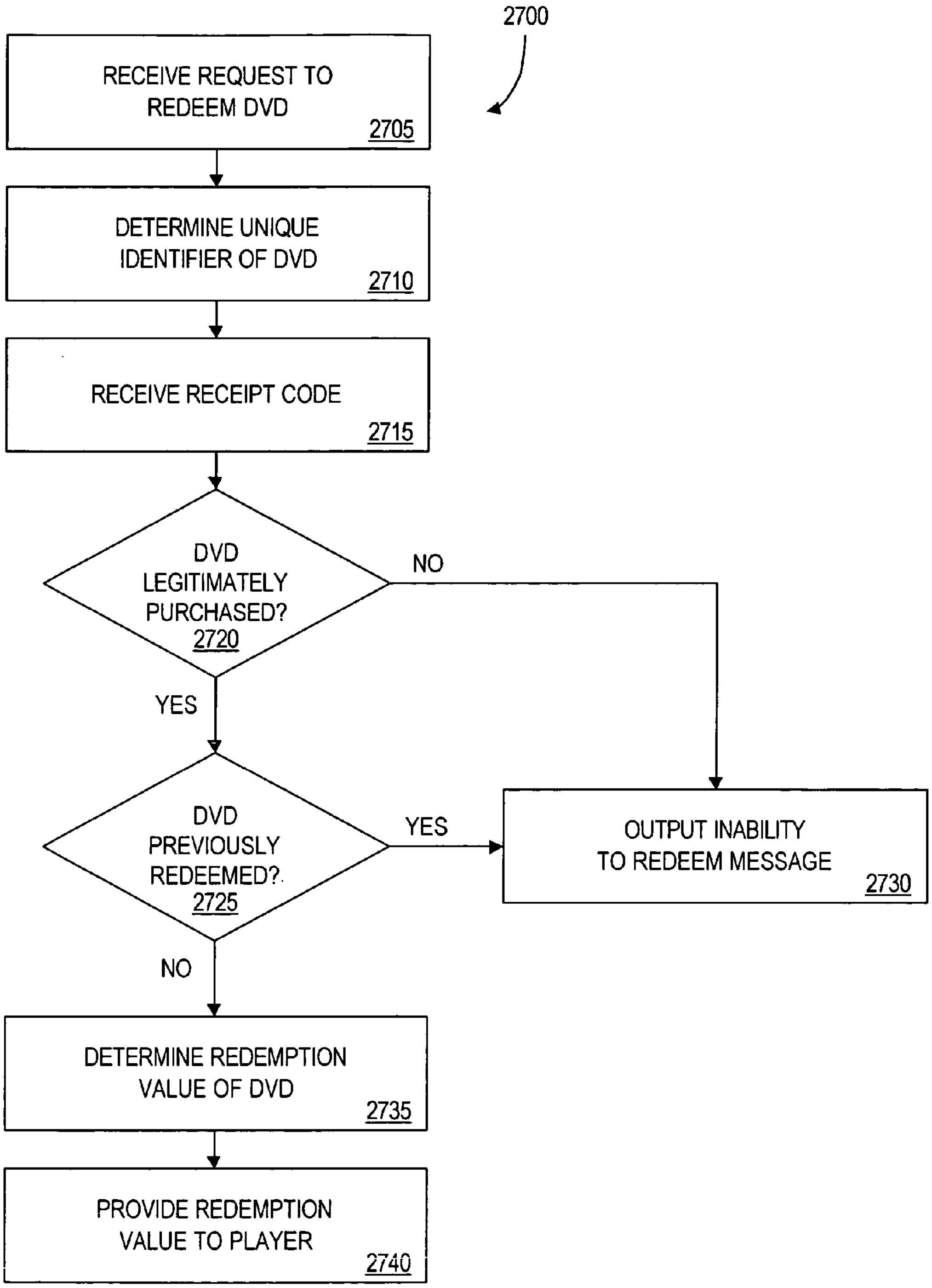
FIG. 27 is a flowchart of an example process for providing a payment corresponding to a DVD redemption value, in accordance with some embodiments described herein.

In some embodiments, as described with respect to FIG. 27, a DVD or other tangible medium may only be presented for redemption once, may only one have one associated redemption value, and/or may be redeemed by only one person (e.g., having a valid receipt or activation code corresponding to the DVD).

In other embodiments, as described further below, a DVD or other tangible medium may have multiple associated redemption values and/or more than one player may be eligible to receive a redemption value associated with a plurality of outcomes. In one example, at least two of the redemption values associated with the same DVD may differ from one another. In some embodiments, a DVD may be redeemed more than once (e.g., corresponding redemption value(s) may be provided on different occasions). For example, a DVD may be redeemed multiple times by a single customer, or may be redeemed by different customers (e.g., in respective transactions). In one embodiment, a DVD may be associated with and/or may be redeemable by more than one individual. For example, a DVD may be redeemed/redeemable by any one or more of a plurality of players of the DVD.

Figure 24:
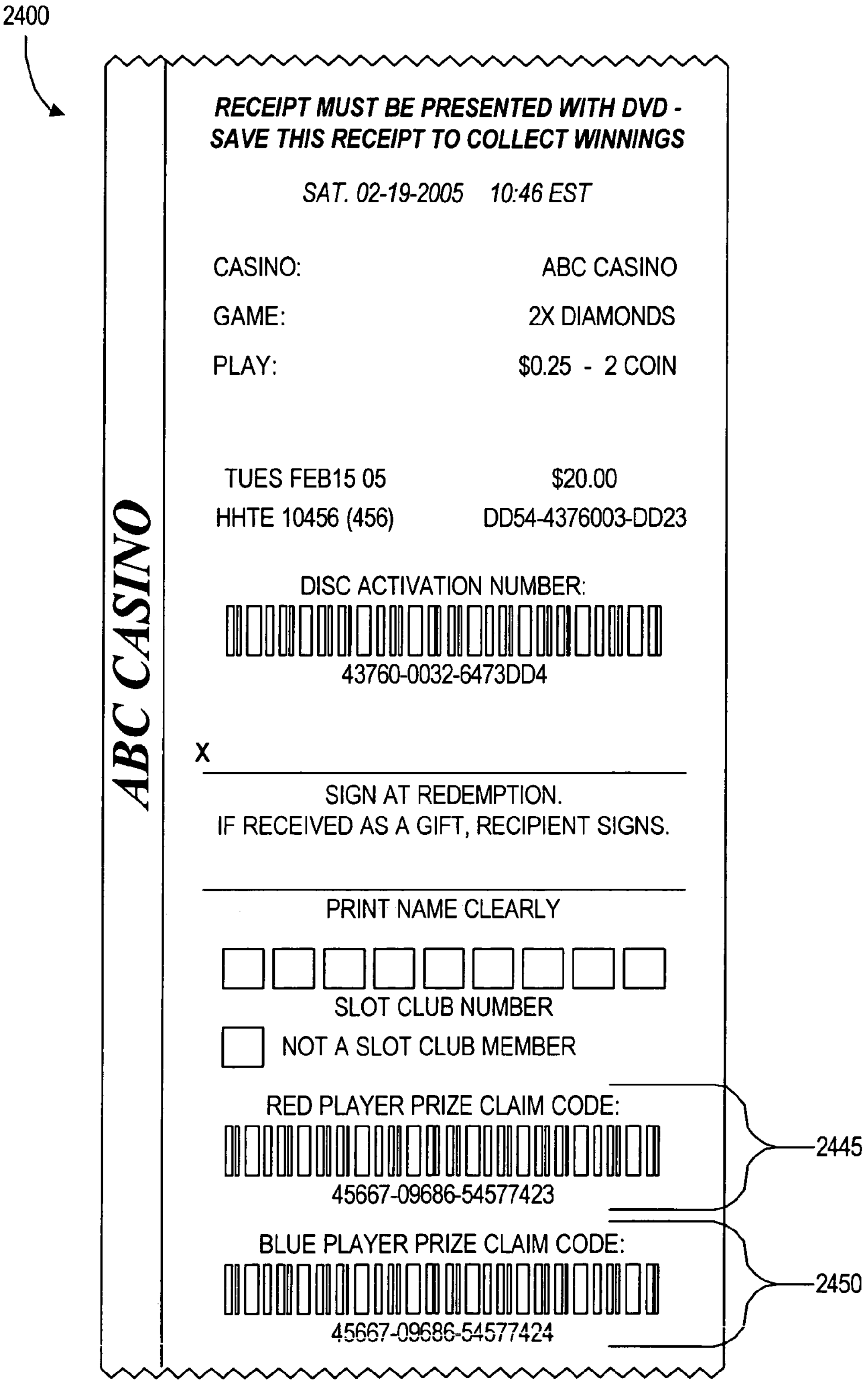
FIG. 24 is an example of a receipt that may be output upon a purchase of a DVD, in accordance with some embodiments described herein.

FIG. 24 illustrates an example of a receipt 2400 that may be provided to a purchaser (e.g., to a player upon a purchase of a DVD by the player). The receipt 2400 is almost identical to the example provided in FIG. 23, except that it includes two prize claim codes (areas 2445 and 2450) for a "RED" player and a "BLUE" player, respectively. Thus, in accordance with some embodiments, a receipt, DVD, and/or plurality of outcomes may be associated with more than one code for redeeming a prize and/or with more than one player. Although only prize claim codes are depicted in receipt 2400, various other additional or alternative information may be provided for indicating that more than one player may be associated and/or that more than one redemption may be made with respect to the purchased product (e.g., DVD). For example, player identifiers may be provided (e.g., where players are registered upon or after purchase of a DVD) in addition to or instead of a claim code.

Figure 25:
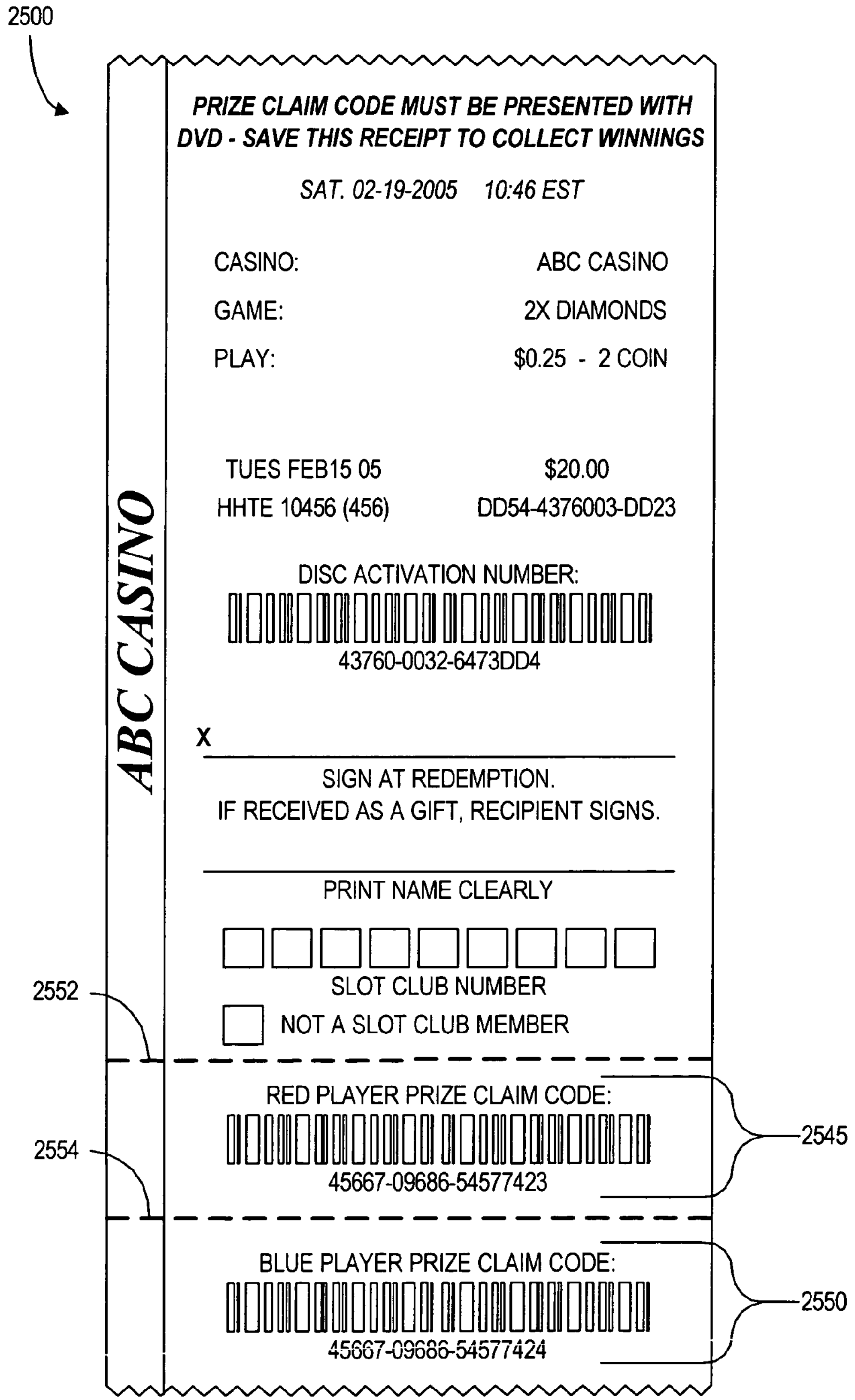
FIG. 25 is an example of multiple receipts that may be output upon a purchase of a DVD, in accordance with some embodiments described herein.

FIG. 25 illustrates an example of a receipt 2500 that may be provided to a purchaser (e.g., to a player upon a purchase of a DVD by the player). The receipt 2500 is almost identical to the example provided in FIG. 24, except that it includes two prize claim codes (areas 2545 and 2550) on respective portions of the receipt 2500 that may be easily separated from one another and/or from the receipt 2500 using the perforations 2552 and 2554. In this way, claim codes may be conveniently detached and distributed to the plurality of players playing a particular DVD. Of course, as discussed above with respect to receipt 2400, any of various other types of information may be included or substituted for on the detachable portions. In fact, in some embodiments, each portion may include all of the same information and each may resemble the receipt 2300 of FIG. 23 (with the exception, e.g., of any player-specific information, such as a prize claim code or player identifier). In this way, more complete receipts may be separated and provided to individual players of the associated plurality of players.

Figure 26:
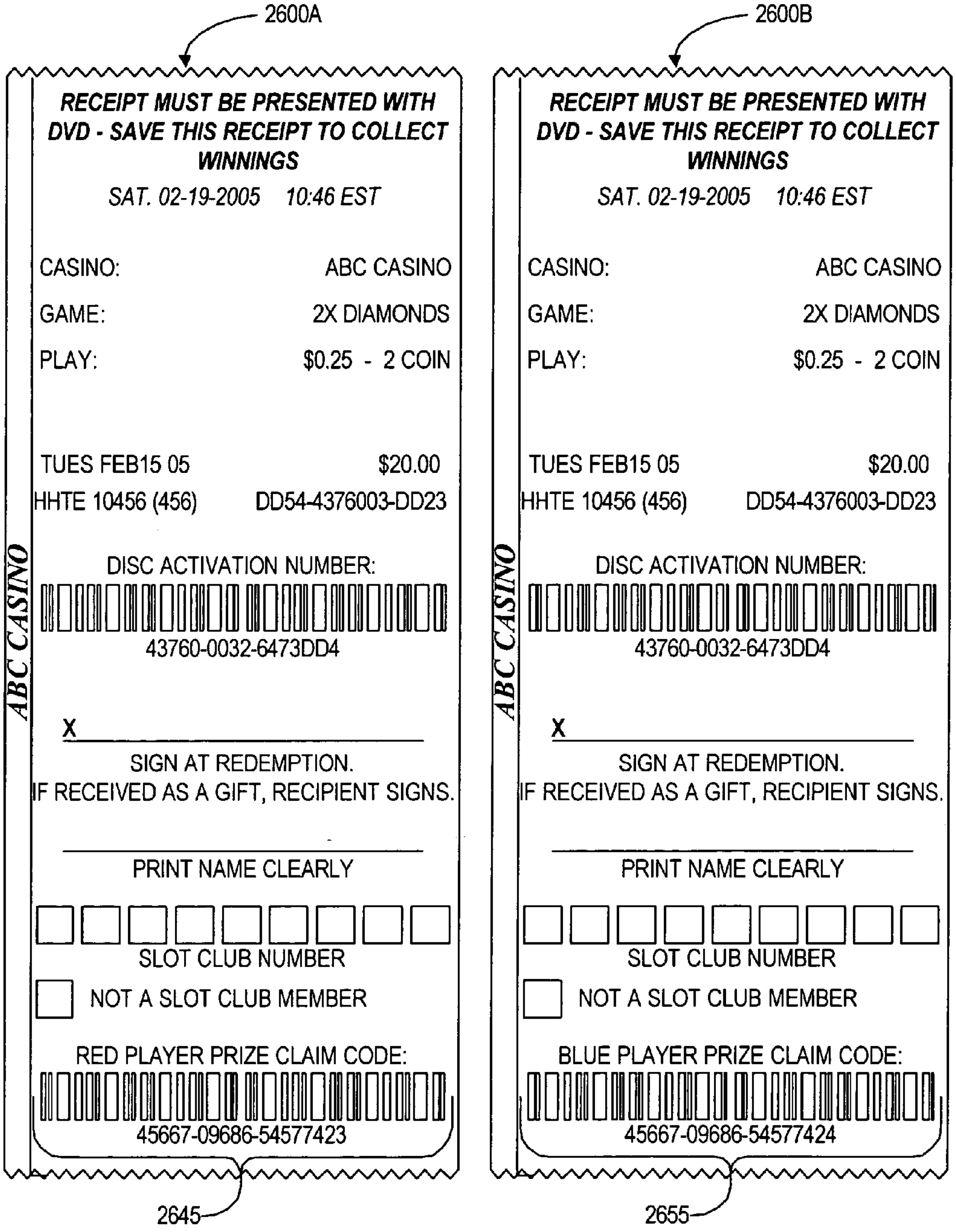
FIG. 26 is an example of another receipt that may be output upon a purchase of a DVD, in accordance with some embodiments described herein.

FIG. 26 illustrates an example of a receipt 2600A and a receipt 2600B that may be provided for a plurality of players associated with a purchased plurality of outcomes. The receipts 2600A and 2600B may be virtually identical, with the exception, e.g., of any player-specific information, such as a prize claim code or player identifier. In the example receipts 2600A and 2600B, the prize claim codes differ for the "RED" and "BLUE" players (2645 and 2655, respectively).

In some embodiments where multiple indications of a prize claim codes, e.g. printed on separate or separable receipts are provided, the prize claim codes may be identical. In this way, each player may have a valid copy of the only prize claim code.

Referring now to FIG. 27, illustrated therein is a flowchart of an example process 2700 for redeeming a DVD. The process 2700 may be performed, for example, at a POS 320.

In step 2705 a request to redeem a DVD is received. For example, a player may approach POS 320 and provide the DVD to be redeemed (and/or packaging and/or receipt or other documentation thereof) and request the redemption value of the DVD to be provided to the player. In another example, a player may contact a casino or other entity that facilitates the redemption of purchased DVDs in another manner (e.g., via telephone, e-mail, the Internet, postal mail, etc.) to request the redemption of a DVD.

In step 2710, a unique identifier of the DVD is determined (e.g., based on information provided in the request to redeem the DVD). For example, a disc identifier located on packaging of the DVD may be scanned in or typed in by a casino attendant (in such embodiments a player may be required to provide the DVD, or at least the packaging thereof, when redeeming the DVD).

In step 2715, a code is received. For example, a casino attendant may scan or type in the code. In one example, a receipt code (e.g., an activation code printed on the receipt) may be received. In another example, a unique receipt identifier uniquely identifying the receipt and/or transaction in which the receipt was issued is received. That is, in some embodiments a player may be required to provide (e.g., to a casino attendant) a receipt (or copy thereof) for the purchase of a DVD when requesting to redeem the DVD. In some embodiments in which the code received in step 2715 is an activation code, the activation code for a DVD may have been provided to a player in a manner other than being printed on a receipt (e.g., it may have been provided to a player via e-mail, via another printed document, verbally, etc.). Accordingly, in some embodiments in which an activation code is required to redeem a DVD, step 2715 may comprise receiving the activation code in any manner desired and practicable and not necessarily via a receipt (in which case a receipt may or may not be required to redeem the DVD).

In step 2720, it is determined whether the DVD has been legitimately purchased. For example, a database or other memory structure storing information about DVDs previously purchased may be accessed. For example, the available DVDs database 1000 of FIG. 10 may be accessed and it may be verified that the disc identifier and activation code correspond to one another in the database and, further, that the status of the DVD corresponding to the disc identifier is currently "purchased." In one embodiment, POS 320 or another device performing the redemption process (e.g., a kiosk of a casino) may communicate with a device storing such information (e.g., CS 305). In one embodiment, the POS 320 or other device performing the redemption process may be operable to determine whether the DVD was legitimately purchased by accessing such a database and verifying the information received in steps 1305-1315. In another embodiment, the POS 320 or other device performing the redemption process may forward the information received in steps 1305-1320 to another device (e.g., CS 305) storing information useful in verifying the legitimate purchase of the DVD and determine that the DVD was legitimately purchased upon receiving an authorization message or indication from this other device.

If it is determined that the DVD was not legitimately purchased, a message indicating an inability to redeem the DVD is output in step 2730. For example, a message indicating that the system is "unable to confirm previous purchase" may be output (e.g., to a player attempting to redeem the DVD and/or to a casino attendant facilitating the redemption process, who in turn may communicate this information to the player) and the redemption of the DVD may be denied. Otherwise, the process 2700 continues to step 2725.

In step 2725, it is determined whether the DVD has previously been redeemed. This step may be performed to prevent "double dipping" or an attempt by a player to redeem a DVD more than once. For example, an appropriate database may be accessed (e.g., such as the available DVDs database 1000 depicted in FIG. 10) to determine whether the status of the subject DVD is set to "redeemed" or to another status indicating that the DVD has previously been redeemed (or if a previous successful redemption of the DVD is otherwise stored in a memory). In one embodiment, POS 320 or another device performing the redemption process (e.g., a kiosk of a casino) may communicate with a device storing such information (e.g., CS 305). In one embodiment, the POS 320 or other device performing the redemption process may be operable to determine whether the DVD has previously been redeemed by accessing an appropriate database and confirming whether information stored in the database indicates that the DVD has previously been redeemed. In another embodiment, the POS 320 or other device performing the redemption process may forward the information received in steps 1305-1320 to another device (e.g., CS 305) storing information useful in determining whether a DVD has previously been redeemed and determine that the DVD has not previously been redeemed upon receiving an authorization message or indication from this other device. In some embodiments, the determinations of steps 2720 and 2725 may be performed in a single step and/or by a single device.

If it is determined that the DVD has already been redeemed, a message indicating an inability to redeem the DVD is output in step 2730. For example, a message indicating "previously redeemed" or another appropriate indication may be output (e.g., to a player attempting to redeem the DVD and/or to a casino attendant facilitating the redemption process, who in turn may communicate this information to the player) and the redemption may be denied. Otherwise, the process 2700 continues to step 2735.

In step 2735, the redemption value of the DVD is determined. For example, a record of a database associated with the DVD may be accessed and the redemption value may be read from the database. In some embodiments, the redemption value may be encoded on the DVD itself and/or packaging thereof and may be read therefrom (e.g., in addition to or in lieu of accessing a database storing such information).

In step 2740, the redemption value is provided to a player. As described, a redemption value may be provided to a player in many different forms and in a variety of different manners. For example, cash may be handed to the player by a casino attendant or dispensed from a kiosk. In another example, a cashless gaming receipt that may be redeemed at a casino booth or be used for wagering at a GD may be provided, the value of the receipt being based on the redemption value. In yet another example, a check may be mailed to a player. In another example, an electronic and/or financial account associated with the player may be credited based on the redemption value. In some embodiments, a redemption value may correspond to a physical prize to be provided to the player (e.g., a coupon, piece of jewelry, discount booklet, gift certificate or other tangible item). In such embodiments, step 2740 may comprise authorizing a casino attendant to provide the prize to the player. Step 2740 may further comprise storing an indication of the successful redemption of the DVD in a memory (e.g., a status field of the available DVDs database 1000 of FIG. 10 may be set to "redeemed"), to prevent the player from redeeming the DVD a second time. Alternatively, such a step of storing an indication of the successful redemption of a DVD may be a distinct step of process 2700.

6. Additional Description of Some Embodiments Related to a Plurality of Players

Various gambling games involve play between a plurality of players, or at minimum, a social setting in which a plurality of players participate. For example, in various games such as poker (e.g., Texas Hold 'Em) or bingo, play is competitive. For instance, players may play against each other such that only one or more players of a group of players may win a particular game, hand, round, and so on, while one or more other players may lose. In other games such as roulette or craps, players may play against the house, or may wager on events or actions of a third party. In such games, one player's win may not necessarily constitute another player's loss, but play of such games is nonetheless commonly thought of as a social experience (e.g., multiple players "ride a hot streak" of a craps table together). Further, Applicants recognize that there may be a need for further gambling games offering competitive play (or the simulation of competitive play) or other styles of multiplayer or social play to patrons.

Accordingly, in some embodiments, systems, apparatus, and methods are contemplated for producing and/or providing game discs that depict game play by a plurality of players. For example, methods are contemplated for representing simultaneous or concurrent play of a game, hand, round, or the like, by two or more players.

In some embodiments, an outcome for a player is generated for a game, hand, round, or the like, in which the outcome depends on another outcome that was previously determined for the same game, hand, or round. The previously determined outcome may have been for a different player. For example, a first outcome may correspond to an initial hand of cards dealt to a first player from a standard deck of cards, and a second outcome may correspond to an initial hand of cards dealt to a second player from the same deck, after the first player's initial hand was dealt.

In some embodiments at least one actual player (a person) is associated with at least one respective simulated player depicted on a game disc. In some embodiments, each of a plurality of players is associated with a respective simulated player of a game disc.

In some embodiments, a game disc (or other tangible medium) may be provided to and/or for play by a plurality of players (e.g., one or more players may purchase and/or view game play results on a game disc). In such embodiments, the game disc may depict play of a game by one or more players. For example, the game disc may provide only one set of indications of game results associated with a depicted "LUCKY LUKE" player, or may provide multiple sets of indications of game results (e.g., a first set associated with a "RED" player and a second set associated with a "BLUE" player).

In some embodiments, one or more players legitimately may claim winnings associated with the same game disc(s).

In some embodiments, methods and systems are provided for (i) determining one or more winning players associated with a game disc (e.g., a multiplayer game disc), and/or (ii) determining an amount of winnings associated with one or more winning players of a game disc.

In some embodiments, methods and systems are provided for indicating (e.g., to a viewer), based on one or more specified rules or guidelines, (i) one or more winning players, and/or (ii) an amount of winnings associated with one or more winning players.

In some embodiments, one or more media files may be created, identified and/or stored on a game disc or other tangible medium for indicating game results and/or final session balances associated with one or more players for a single game disc. For example, a database of media files may be accessed in a manner such that desired files may be retrieved, encoded into a proper format, and stored on a DVD). For instance, when creating a game disc in a DVD format one or more media files may be identified and encoded (e.g., as an MPEG-2 file), such that audio/video may be read, decoded and/or output by an appropriate device.

In some embodiments, systems, apparatus, and methods are contemplated for producing game discs (or for providing indications of game results in any other manner described herein) enabling multiplayer play.

In some embodiments, a game disc may comprise a plurality of sets of indications of game results, each set associated with a particular player. As described further herein, players might be identified by a particular number, color, position, icon, graphic, and/or in any other manner. For example, a first set of indications of game results may be associated with a first player (e.g., a first series of slot machine spins belong to a "RED" player), and a second set of indications of game results may be associated with a second player (e.g., a second series of slot machine spins belong to a "BLUE" player).

In one embodiment, a multiplayer game disc may indicate game results and/or final session balances associated respectively with one or more players of the multiplayer game disc.

According to one embodiment, one or more multiplayer game discs may be provided to a plurality of players, and only one or more players of the plurality may claim winnings or a portion of winnings associated with the one or more discs. The determination(s) of which player(s) of the plurality may claim any portion of winnings may be based, for example, on the indications of game results associated with the players (e.g., a "RED" player may win or lose based on an associated set of indications of game results).

In some embodiments, one or more players in a group may compete for one or more prizes indicated by one or more game discs. For example, such game discs may include indications of game results (e.g., in a video presentation as described in this disclosure) that may be associated with individual players. For example, a "two-player" slot machine-themed game disc may be created, such that one set of reels may be associated with a first player (e.g., a "RED" player) and a second set may be associated with a second player (e.g., a "BLUE" player). At the end of the disc (e.g., at the end of a video presentation of slot machine spins for the players), the player with the highest credit balance may be determined to be a winner (and may therefore be entitled to a prize, as will be described). Various such embodiments are contemplated and some examples are described in this disclosure.

Various methods of (i) generating game results and (ii) determining indications of game results based on the generated game results are contemplated with respect to discs associated with a plurality of players. For example, in some embodiments, a plurality of gaming sessions may be simulated or otherwise executed (e.g., two sessions), such that the results of the sessions may then be associated with a single game disc (e.g., a two-player game disc).

A plurality of automated gaming sessions may be executed according to various parameters, as described herein. For example, as discussed with respect to step 105 of process 100, a GD may be programmed to execute one million sessions defined by a set of particular parameters (and values thereof).

In one embodiment, a reference run (e.g., of a plurality of sessions) may be executed such that a batch of slot machine-themed game discs may be created based on the session result data. For example, one million automated sessions may be simulated or otherwise executed. The sessions may be simulated (e.g., by a computer device comprising software that simulates or models game play of various gaming devices, as described) according to the following exemplary parameters: (i) a particular slot machine model with particular active pay combinations and probabilities is chosen (computer software models a popular "Big Purple Martians" slot game), (ii) a particular wager amount per game play is chosen (e.g., such that consistently, 25¢ will be bet per spin), (iii) a particular starting balance is chosen (e.g., 80 credits of 25¢ each), and (iv) a particular session duration and/or one or more terminating conditions are identified (e.g., game play will continue until 500 spins are executed or a credit balance reaches zero, whichever comes first). Accordingly, one million gaming sessions may be simulated such that one million individual final session balances may then be determined.

Indications of game results (e.g., representative outcomes) may then be determined in association with one or more multiplayer game discs based on the final session balances indicated by the reference run. For example, it may be determined that 500,000 two-player slot machine-themed game discs may be created based on the one million final session balances determined by the reference run. Thus, each disc created according to this example process may comprise a plurality of sets of indications of game results (e.g., two sets), each set having a respective indicated final session balance (e.g., two separate final session balances are indicated). Each final session balance may then be associated with a particular player, such that one or more winning players may be determined (as described further herein).

Of course, various other methods of generating game results and/or final session balances are contemplated. For example, rather than use a computer device with software for simulating game play (e.g., AS 310), one or more actual GDs may be used, as described in this disclosure. Further, in some embodiments, rather than arrive at a final session balance by means of simulating or otherwise executing a game session, a final session balance may be randomly determined in some other manner (e.g., a random number is generated between a range of random numbers indicating final session balances).

Indications of game results may then be determined based on the generated game results and/or final session balances of the batch run of sessions. For example, in some embodiments, as described in this disclosure, actual game results or outcomes may be considered when determining indications of game results. For example, a game disc or DVD may indicate a record of the actual outcomes determined in an associated reference run. For example, a two-player game disc may indicate two final session balances, each associated with a particular slot machine session, and each slot machine session may indicate game results as they were actually achieved.

In other embodiments, alternate indications of game results (e.g., representative outcomes) may be determined as described herein (e.g., rather than display an outcome-by-outcome record of game results, different indications of game results are selected that ultimately indicate a desired final balance). It should be noted that, in some embodiments, it may be desirable to determine alternate indications of game results in association with discs depicting play by multiple players. For example, it may be desirable to indicate game results from two separate sessions simultaneously or concurrently (e.g., two sets of reels, one for a first player and one for a second player, spin side-by-side or adjacent to each other in some other manner), such that the representation of the sessions can be assured to conclude at the same time. For example, if during an executed run a first session reaches a balance of zero credits before 500 game plays have elapsed (thus terminating play) and a second session concludes with a positive credit balance after 500 game plays, alternate indications of game results may be determined in association with a first session such that the first and second sessions may conclude at the same time if indications of game results thereof are output concurrently.

As discussed in this disclosure, in some embodiments a plurality of game sessions (e.g., or a reference run) may be simulated or executed in advance, such that the results and/or final session balances thereof may be considered when creating game discs (e.g., multiplayer game discs). For example, a pool of one million final session balances may then be used to create multiplayer game discs (e.g., 500,000 two-player game discs; 250,000 four-player game discs, and so on). Thus, in some embodiments, a first and second session of game results may ultimately be associated with a single game disc for multiple players, even though the two sessions may be simulated or otherwise executed at different times or in an otherwise individual manner. For instance, during a reference run, a computer simulates a first session, and once the first session is complete, simulates the second session, and so on.

Thus, in accordance with some embodiments, when creating a game disc associated with more than one player and/or more than one session, final session balances and/or actual game results associated with a plurality of previously-generated sessions may be (i) determined randomly (e.g., two particular final session balances are selected at random from a pool of one million final session balances associated with a reference run), or (ii) selected according to various other methodologies (e.g., two final session balances are identified and selected consecutively from a database of stored final session balances). It should be noted that it may be preferred (but not required) that the same applicable session parameters be used when simulating or otherwise executing each of the plurality of sessions (e.g., such that for a game disc presenting two simultaneous slot machine sessions, each session starts with the same credit balance, has the same wager amount per game play, and so on).

The generation of the results for respective player sessions may be performed generally independently for some types of games, in particular where no outcome for one player or session is necessarily dependent on any outcome determined for another player or session. For instance, in games such as keno, roulette, or slots, the play of a first player does not necessarily affect the game results and/or payouts achieved by a second player, and the generation of respective game results and determination of respective indications of game results may be performed generally independently.

However, in other types of casino games described further herein, play (or existence) of a first player may affect the game results and/or payouts achieved by a second player. Accordingly, in some embodiments, when simulating or otherwise executing a plurality of game sessions, the game results and/or final session balances of which may later be used to create one or more multiplayer game discs, such sessions may be simulated or executed in a concurrent and/or dependent manner, such that the play (or existence) of a first player may appropriately affect the game results and/or payouts achieved by a second player in accordance with the particular rules of the game.

For example, in the game of bingo, a first and second player must be playing at the same time (e.g., in the same game or drawing) in order to accurately determine a winner between the two players (e.g., in order to determine which player achieves a particular pattern first, both player's cards must be compared to the same set of randomly-drawn numbers). Thus, in some embodiments, when generating game results, such as by simulating or otherwise executing a plurality of gaming sessions of a reference run, a plurality of players may be considered. In other words, when creating multiplayer game discs for casino games wherein the play (or existence) of a first player affects the payouts and/or game results achieved by a second player, simulations of such games may approximate a multiplayer environment, such that payouts and/or game results may be determined in an appropriate manner.

According to some embodiments, a computer device (e.g., AS 310, a GD) of the present invention may comprise software for simulating a plurality of sessions of a multiplayer game such as bingo. For example, such a software program may be configured to simulate one million sessions of a game of bingo, according to various parameters, including but not limited to (i) a number of players per game (e.g., four players per game), (ii) a session duration, such as a number of games per session (e.g., 25 games per session), (iii) one or more specified game types or play patterns per session (e.g., 12 games will be standard "bingo" games, five games will be for a pattern of "four corners," five games will be for an "x-shape" pattern, three games will be for a "blackout" pattern, and so on), (iv) payouts associated with one or more game types or patterns (e.g., achieving a blackout always pays 40 credits; or, in another example, achieving an "X" pattern in balls 10 drawn or fewer pays a first amount of credits, whereas achieving an "X" pattern in 11-14 balls pays a second, lesser amount of credits; and so on), (v) a manner in which the numbers indicated by cards of one or more players may be determined (e.g., in association with each column of a bingo card, five numbers within a particular range may be randomly determined; from this, an entire card of numbers may be established for a particular player, and this card may be used repeatedly from game-to-game throughout a session, or a new card may be randomly determined in such a manner for each game of the session), (vi) a starting credit balance associated with one or more players (e.g., zero credits), (vii) a wager amount per game play associated with one or more players (e.g., each player wagers a $1 credit per game), (viii) an indication of whether or not a credit balance may go negative, and if so, how far negative it may go (e.g., negative without limit).

Accordingly, a multiplayer bingo game may be simulated in this regard, as numbers (commonly represented in physical fashion by balls in a hopper) may be randomly determined or drawn and matched against a plurality of player cards to determine one or more winning players and/or payout amounts such one or more winning players may have achieved. For example, a first player (represented by a first card comprising randomly determined numbers) may win a first game by being the first to achieve a particular pattern, thereby potentially winning an amount of credits (e.g., the size of the payout relative to the number of balls drawn), whereas a second player may win a second game by being the first to achieve a particular pattern, and so on. Thus, as such simulated players may lose credits through wagering and/or win credits through game play, credit balances associated with the players may change, such that at the end of the simulated session, a final session balance may be associated with each simulated player (e.g., a first simulated player has achieved a final session balance of three credits, a second simulated player has achieved a final session balance of −10 credits, a third simulated player has achieved a final session balance of 77 credits, and so on).

In some embodiments, a plurality of final session balances may be determined by simulating a particular session of a reference run, in which each final session balance is associated with (or will be associated with) a particular simulated player. It should of course be noted, however, that other means of generating game results and/or determining final session balances of such a multiplayer bingo game may be utilized (e.g., a hopper device with physical balls is used, etc.). Some other ways of determining outcomes and balances are discussed in this disclosure. Further, as described herein, single-player versions of such a bingo product are contemplated.

As discussed above, multiplayer game discs may be created (e.g., indications of game results may be determined and stored on a game disc) based on the game results achieved and/or final session balances. For example, in some embodiments, actual game results achieved during such sessions of reference runs may be utilized (e.g., as described, such game results are stored in a physical and/or electronic manner, such that they may be accessed or otherwise considered when determining indications of game results), such that associated game discs may depict an outcome-by-outcome and/or game-by-game record of what transpired during an associated session of a reference run.

In other embodiments, as discussed in this disclosure, alternate indications of game results (e.g., representative outcomes) may be determined. For example, a simulated session of a reference run may indicate that after a series of 25 bingo games, a first player finishes with a balance of three credits, a second player finishes with a balance of −10 credits, a third player finishes with a final session balance of 77 credits, and a fourth player finishes with a balance of 15 credits. Accordingly, alternate indications of game results may be determined, so long as the indications ultimately depict the appropriate final balances in association with one or more players, for example.

In some embodiments, as described further herein, a payout associated with a multiplayer game disc may be provided only to a player with the highest final credit balance (e.g., in a "winner-take-all" or "pays best player only" multiplayer game disc). Accordingly, in some embodiments, representative outcomes may be determined so as to depict an exact final session balance in association with the highest final session balance achieved during the simulated multiplayer session (e.g., referencing the above example, the third player who finished with a balance of 77 credits), while alternate indications of game results determined in association with the other simulated players may ultimately depict any final balance less than the highest final session balance of the simulated multiplayer session. For example, so long as a four-player game disc having a "pays best player only" redemption process indicates that the third player wins 77 credits, the game disc may depict that the other three players have won any amount of credits that is less than 77, such final balance amounts being irrelevant considering that only the player with the highest balance is entitled to any winnings for that particular game disc.

Some additional description of various methods of (i) generating game results (e.g., simulating or otherwise executing one or more single-player or multi-player game sessions), (ii) determining one or more final session balances (e.g., a plurality of final session balances, each associated with a particular simulated player), and/or (iii) determining indications of game results based on the game results and/or final session balances (e.g., specific methods for determining alternate indications of game results), are described in this disclosure with respect to other casino games.

Thus, some embodiments may comprise providing indications of game results in association with an automated session that has been simulated or otherwise executed with respect to a multiplayer casino game. In some embodiments, such indications of game results may be provided via a game disc (e.g., a DVD). Of course, in other embodiments, such indications of game results may be provided in some other manner (e.g., transmitted electronically via the Internet, transmitted electronically to a mobile computing device, viewable via a software application, and so on). For purposes of facilitating description, however, several embodiments of providing such indications of game results via a game disc in DVD format will now be described.

Various methods for storing indications of game results on a medium such as a DVD have been described herein. For example, one or more computer devices described herein (e.g., AS 310) may access one or more appropriate media files from a database (e.g., media file database 525), and encode the DVD such that the one or more media files may be viewable when the DVD is inserted into an appropriate reader device. Thus, in some embodiments, it may be desirable to create media files that, when viewed by a plurality of players, indicate game results and/or credit balances associated with a plurality of players. For example, various text, graphics, indicia, coloring, positioning or other techniques may be utilized such that a clear visual association may be made between one or more indications of game results and an associated player. For example, a four-player slot machine-themed game disc may display a game screen comprising four sections or quadrants, one for each player, such that each section or quadrant displays a particular set of reels, which may be animated so as to present indications of previously-generated game results. Further, each section may comprise a credit balance meter associated with a particular player, such that players may track and compare their results.

Various methods are contemplated for creating a visual association between one or more indications of game results and a particular player. Following are some examples of elements that may be associated with a particular player and/or one or more indications of game results: (i) a particular color (e.g., a blue background appears behind cards dealt to a first player, a red background appears behind cards dealt to a second player); (ii) a particular number (e.g., Player #1, Player #2, etc.); (iii) a particular position (e.g., the left player vs. the right player); (iv) a particular name or other text (e.g., “Bob” vs. “Frank”); and (v) a particular avatar, character or other image (e.g., a cartoon character resembling an oil tycoon represents a first player, a cartoon character of a dog represents a second player, and so on).

In various embodiments, a plurality of such media files indicating multiplayer game results may be generated and/or stored by a GD and/or other computer device (e.g., AS 310) of the present invention. However, it is understood that unlike with many single-player games for which conventional gaming devices may be widely available for use (e.g., when creating a single-player, slot machine-themed game disc, the same media file output by a conventional video slot machine may be utilized as an indication of a game result when creating a game disc), it is possible that such conventional devices may not yet be available for the purposes of borrowing elaborate, multiplayer animations of game results. Accordingly, in some embodiments, as described, a software program of the present invention may serve to generate and/or store such desired media files depicting particular game results.

Thus, in some embodiments, one or more media files may depict a plurality of indications of game results in a substantially simultaneous manner, with a first indication associated with a first player, a second indication associated with a second player, and so on. For example, a media file may be created or otherwise retrieved, and the media file may depict (i) four bingo cards, each associated with a particular player, as well as credit balances and other applicable data; (ii) a drawing of a ball from an animated hopper, the ball revealing a particular number, and (iii) the daubing of one or more of the bingo cards based on the number drawn, such that a square of one or more cards may be marked appropriately.

Thus, in some embodiments, one or more players viewing such a multiplayer game disc may view a plurality of indications of respective game results that are output in a substantially simultaneous manner. Of course, as described further herein, games other than slots and bingo are contemplated, such that players may similarly view a plurality of blackjack hands, a plurality of Pai-Gow Poker hands, and so on.

In some embodiments, a game disc (or any other manner of providing such indications of game results) may be formatted such that indications of game results associated with particular players may be provided in a manner other than simultaneously. For example, in one embodiment, such indications of game results may be stored on a multiplayer game disc such that they may be viewed alternately or successively (e.g., when the disc is played, one or more indications of game results associated with a first player are output after one or more indications of game results associated with a second player are output).

In some embodiments, players may utilize a menu screen of a DVD (or, similarly, a menu of a software application or Web site) for selecting options for how game results (for any number of players are provided. In some embodiments in which one or more sessions of a multiplayer game are simulated or otherwise executed, indications of game results associated with particular players may be separated and viewed individually (e.g., separate media files are stored as separate chapters). For example, a player may select an option such that only indications of game results associated with a particular player are output (e.g., a menu option for “View Player #1’s game results” is selected, such that a particular chapter is accessed). In one example, several of such chapters or tracks may be available, each associated with a particular player, such that players may view individual sets of indications of game results as desired.

Various methods are contemplated for determining one or more winning players and/or an amount of winnings associated with one or more winning players in association with a game disc (e.g., a multiplayer game disc). For example, in some embodiments, one or more winning players and/or an amount of winnings associated with one or more winning players may be determined in association with a particular multiplayer game disc according to various criteria associated with game play, game results and/or a final session balance.

For example, in some embodiments, one or more players of a multiplayer game disc may be entitled to claim an exact final balance as indicated by a game disc. In one embodiment, each player of a multiplayer game disc may be entitled to claim any winnings associated with the particular player. For example, a final session balance associated with a first player as indicated by a credit meter may be 70 credits, such that the first player may be entitled to 70 credits, whereas a final session balance associated with a second player as indicated by a credit meter may be 35 credits, such that the second player may be entitled to claim 35 credits.

In another embodiment, only players who achieve a credit balance above and/or below a particular threshold may be entitled to claim winnings as indicated by a game disc (e.g., any players who win more than 40 credits may be entitled to keep them). Of course, as described, in some embodiments, a credit balance associated with one or more players may be allowed to go negative (e.g., such that any balance below zero credits may pay nothing, though a player may owe nothing other than a purchase price of a game disc).

In some embodiments, only one or more players of a multiplayer game disc may be entitled to claim an amount of winnings. For example, in some embodiments, only the player achieving the highest final session balance may be entitled to an amount of winnings. In one example, a first player may achieve a final balance of 31 credits and a second player may achieve a final balance of 47 credits, and therefore the second player may claim 78 credits (e.g., in a "winner-take-all" disc, the total amount of winnings from both players may be claimed by the player with the highest balance). In another example, a first player may achieve a final balance of 31 credits and a second player may achieve a final balance of 47 credits, and therefore the second player may claim only his winnings of 47 credits, whereas the second player may claim nothing (e.g., the game disc "pays best player only"). Thus, a variety of embodiments are contemplated wherein one or more players may claim an amount of credits/winnings as indicated by a multiplayer game disc.

It should be noted that the manner in which one or more players may claim winnings associated with a game disc may affect the pricing of a game disc sold for a flat rate (or a flat rate remote gaming contract/session offered in any other manner described herein). For example, a "winner-take-all" multiplayer game disc may be generally more expensive for a casino to offer than a multiplayer game disc that "pays best player only." Thus, in some embodiments of the present invention, an average cost of providing various types of such game discs or remote gaming contracts/sessions may be calculated by means of mathematical simulation. For example, according to a computer simulation, if 10,000,00 multiplayer reference sessions are executed according to certain parameters, it may be determined that the average amount of winnings indicated by such multiplayer game discs may be $29.94 (e.g., on average, one player or a combination of players are paid $29.94). Accordingly, such costs may be considered when determining a flat rate price for such discs. For example, such a multiplayer game disc may then be sold at a flat retail price of $39.99, insuring a long-run profit based on mathematical simulation (e.g., though some discs may pay players more or less than $29.94, on average an operator will make $10.05 profit on each disc sold). Various methods of determining such flat rate prices based on associated costs (e.g., estimated costs or simulated "contract costs") that may be useful in some embodiments described in this disclosure are described in Applicant's commonly-owned, co-pending U.S. application Ser. No. 10/001,089, filed Nov. 2, 2001, entitled "GAMING DEVICE FOR A FLAT RATE PLAY SESSION AND METHOD OF OPERATING SAME," and U.S. Provisional Application No. 60/637,338 filed Dec. 17, 2004, entitled "GAMING DEVICE OFFERING A FLAT RATE PLAY SESSION AND METHODS THEREOF," the entirety of which are incorporated herein by reference for all purposes.

In some embodiments, the number of players associated with (or who potentially may be associated with) a multiplayer game disc may also be considered when determining a flat retail price for such a game disc (or multiplayer remote gaming contract/session provided in some other manner). For example, in some embodiments, such game discs may be priced so as to facilitate or encourage the even division of a retail price among a plurality of purchasers. In other words, in some embodiments, game discs may be priced such that a group of players may equally split the purchase cost of such a disc, such that each player may stand an equal chance to benefit from any winnings the disc may offer.

Thus, in one example, a rule for determining pricing associated with a flat-rate multiplayer game disc may be that the retail price must be equally divisible by a number of players associated with the disc (e.g., a number of players depicted on the disc), as well as greater than a determined average cost of providing the disc (e.g., if a plurality of four-player bingo sessions are simulated such that an average cost of $29.94 is determined, the disc may be sold for an even $40). Such pricing methodology may work particular well in conjunction with a "winner-take all" or "pays best player only" format, in that essentially, one of the players may be guaranteed to win, and therefore there may be significant incentive to split the cost of the disc.

In one example, each of four friends may agree to provide $10 toward the purchase of a four-player game disc with a guaranteed payout, knowing that one of them will win a payout as indicated by a final session balance associated with a particular player (e.g., the "RED" player's final credit balance is the highest, and therefore he wins). Each of the stakeholders in this example multiplayer game disc may is taking a risk (i) that the player may not achieve the highest final session balance, and (ii) that the highest final session balance may indicate an amount of winnings that is greater or less than $10.

However, in other embodiments, an amount of winnings associated with such a game disc may be not be equivalent to one or more final session balances indicated by the disc. Various such examples are contemplated. In one example, one or more players may be entitled to claim an amount of winnings that is based on one or more final session balances, but not equivalent to one or more final session balances. For example, in some embodiments, one or more winning players, such as the player with the highest final balance, may be entitled to claim a predetermined, fixed amount of winnings (e.g., the winner of each disc gets $30). Such an embodiment may be advantageous in an environment wherein discs are priced and/or marketed such that a retail price may be split by a plurality of sub-purchasers. For example, a four-player disc may be priced at $40, and offer a $30 guaranteed payout to one winning player. Thereby, four players may split the cost of the multiplayer disc, each player with a chance to triple his "wager" (e.g., his $10 contribution toward the total purchase cost).

In one embodiment, a predetermined prize or payout associated with a game disc may be determined based on a retail price and a number of players. Such embodiments are not limited to game discs associated with multiple players. For example, in some embodiments, a rule for determining a prize amount may be that the prize amount must be greater than the retail price of the game disc divided by the number of players, but not less than the retail price. For example, if a four-player game disc is sold for $40, a prize amount associated with the game disc may be determined, according a semi-random measure similar to a prize matrix used in an instant lottery system, to be between $11 and $39. In other embodiments, such a prize amount may be determined randomly given such constraints (e.g., between $11 and $39).

In another embodiment, one or more final balance amounts may be compared to a table illustrating various amounts of winnings in association with various final balance amounts or ranges of final balances. For example, one or more players finishing with a final session balance of 40 credits or fewer may win nothing, whereas one or more players finishing with a final session balance between 40 and 80 credits may be entitled to claim $10 in winnings, and so on.

In yet another embodiment, one or more winning players may be entitled to one or more further game plays and/or game results. For example, the player with the highest final credit balance may be entitled to an additional 50 slot machine spins, which may have been previously generated such that indications thereof may be stored on a game disc, or which a player may execute in some other fashion (e.g., by returning to a casino).

In some embodiments, a minimum and/or maximum payout amount may be associated with a game disc. Of course, such embodiments are not limited to game discs associated with multiple players. In one example, a session of a reference run may indicate that no player of a multiplayer session finished with a balance of higher than $5.75, but the player who finished with the highest balance may still be entitled to claim a "minimum prize" of $10. In some embodiments, such a minimum prize level may be determined based on a retail price associated with a game disc and/or number of players associated with a game disc (e.g., if a four-player game disc is sold for $40, a minimum prize amount may be $11, or slightly greater than one fourth of the cost).

In some embodiments, as described, one or more "standby" indications of game results otherwise unavailable to a player may be "unlocked" or otherwise made available for viewing if a player fails to attain a final session balance equivalent to a minimum payout amount (e.g., if a minimum disc payout amount is $10, and the highest a particular player achieves is $5.75, "standby" indications of game results may be output until the player reaches the predetermined minimum balance of $10).

Of course, such embodiments featuring minimum game disc payout or prize amounts may be used in conjunction with single-player game discs. It should also be noted that, in some embodiments, providing even a small minimum payout amount in association with each game disc may be beneficial for a casino in that players may return to a property to redeem such discs, and thereby gamble more while at the property. In some embodiments, such a minimum payout amount may be tested so as to determine an amount at which an acceptable percentage of discs are returned. For example, if it is determined that a significantly larger percentage of players redeem discs associated with a minimum payout of $1.25 than discs associated with a minimum payout of $1, it may be beneficial for a casino to offer a slightly large minimum payout amount to gain traffic within the casino.

In still further embodiments, a determination of (i) a whether or not one or more players is a winning player, and/or (ii) an amount of winnings associated with one or more players may be based on various other measurable criteria (other than credits won) indicated by a game disc (or other manner of remotely viewing previously-generated game results).

For example, in addition or as an alternative to considering one or more final session balances when making such determinations, one or more of the following measures may be used: (i) one or more symbols or indicia attained or collected by a player (e.g., a winning player is the player with the highest total arrived at by adding the player's credit balance and a number of lemon symbols achieved); (ii) one or more particular game results achieved (e.g., a first player achieves seven "Plum-Plum-Plum" outcomes, whereas a second player achieves three; a first player achieves four pushes in a game of Blackjack, whereas a second player achieves eight; a first player achieves 104 winning outcomes, irrespective of any associated payout amounts, whereas a second player achieves 137); (iii) a percentage of credits won, game results achieved, and/or game indicia achieved or collected when divided by a number of game plays (e.g., a first players "winning percentage" is 42%, whereas a second player's winning percentage is 31%); and so on. Of course, it should also be appreciated that any combination of the above-described methods may be employed. Further, determining the costs of providing multiplayer game discs characterized by such rules for determining winning players and/or amounts of winnings may be simulated in a manner described above (e.g., by simulating the generation of a sufficiently large number of such discs, an average cost is calculated, such that a flat price may be determined that considers the average cost).

Thus, several methods are contemplated by which one or more players may learn (i) which players are winning players for a particular game disc (or discs), and (ii) amounts of winnings that one or more players may be entitled to claim. For example, such may be evident to one or more players viewing such a multiplayer game disc (e.g., it is clear that at the disc's conclusion, a first player wins 74 credits and a second player wins nothing, as such may be indicated by the disc). In other embodiments, players may utilize other resources in making such determinations. For example, indications of which players are winning players and/or amounts of winnings associated therewith may be made available via a network such as the Internet (e.g., a player may provide an identifier associated with a multiplayer game disc, such that the player may view such information). In further embodiments, such information may be encoded or otherwise printed on a purchase receipt of the present invention (e.g., such that a player need not watch a game disc, but rather may ascertain winnings by viewing a ticket or other type of receipt).

Various methods are contemplated whereby players may redeem or claim winnings associated with one or more multiplayer game discs. Several such methods will now be described in some detail.

In some embodiments, a multiplayer game disc may be purchased that may be viewed by a plurality of players. For example, a four-player, slot machine-themed game disc may be purchased by a first individual for $40, who may then receive $10 each from three friends, such that each of the four individuals may have equally contributed to toward the purchase price of the multiplayer disc (e.g., each player spent $10). The four individuals may then view the disc (e.g., four friends simultaneously watch a television set connected to a DVD player), such that one or more winning players and/or an amount of winnings may be determined (e.g., after a predetermined number of 500 spins have been indicated, the depicted "Player #4" attains the highest credit balance, and thus is entitled to claim his credit balance of 189 credits).

In some embodiments, only one player may be entitled to claim an amount of winnings (e.g., in a "disc pays best player only" or "winner-takes-all" format). Thus, in some embodiments, a player may redeem such a game disc in any manner described previously. For example, a player may provide a code or identifier associated with a game disc, such as code or identifier indicated by a game disc (e.g., a barcode and/or text imprinted upon the non-readable side of the disc), game disc packaging (e.g., a barcode and/or text imprinted upon liner material inserted into a jewel case), a purchase receipt (e.g., a barcode and/or text imprinted upon the receipt), a ticket, and so on.

In one example, a group of players collectively purchasing and/or viewing a multiplayer game disc may agree to provide a winning player with such necessary materials (e.g., the winner gets to hold on to a purchase receipt, such that the next time the winner is in a casino or other location where the receipt may be redeemed, the winner may present the receipt and claim a prize). Thereby, a winning player may present an appropriate identifier or code when claiming such a prize. An amount of winnings payable to such a player may be determined in a variety of manners as described herein (e.g., a casino representative scans a barcode or otherwise enters a code or identifier using a casino personnel device, and a database such as the session databases of FIGS. 7A and 7B is accessed so as to determine an amount of winnings associated with the game disc).

In some embodiments, such materials may be designed so as to facilitate such redemption. For example, in some embodiments, one or more purchase receipts provided in conjunction with the sale of a multiplayer game disc may comprise a plurality of codes or identifiers (e.g., a plurality of bar codes), each barcode associated with a particular player. For example, if a four-player game disc is sold, a single receipt may comprise four barcodes (e.g., which may be separated by perforation such that they may be detached and distributed), each labeled in association with a particular player (e.g., adjacent to a barcode is text indicating "Player #1").

In another example, four separate purchase receipts may be issued, each one in association with a particular player. Thus, in some embodiments, various methods are contemplating for providing a plurality of identifiers or codes which players may then use when redeeming winnings associated with a multiplayer game disc (e.g., one or more such receipts may be required during redemption).

In an alternate embodiment, one or more players purchasing such a game disc may provide various information (e.g., name, address, etc.) when purchasing such a disc, such that the information may be recorded (e.g., in association with the purchased disc and/or session(s) thereof). Accordingly, when redeeming an amount of winnings associated with such a disc, one or more players may provide (e.g., by requirement) a form of identification (e.g., for verifying that the player is associated with the purchase and/or disc and is authorized to redeem winnings). In some embodiments, such a form of identification (e.g., a driver's license, a player tracking card number) may be utilized when determining an amount of winnings payable to a player (e.g., a database is accessed based on a driver's license number).

In some embodiments, more than one player may be entitled to claim an amount of winnings associated with a multiplayer game disc. For example, a four-player game disc may pay the "best two players" (e.g., the players with the two highest final session balances may claim those balances), and thus two or more players may desire to claim winnings associated with a single game disc. Accordingly, in some embodiments, a total amount of winnings (e.g., the sum of the first player's winnings and second player's winnings) may be provided to any player presenting one or more codes and/or indicia (e.g., a barcode, a numeric "Prize Claim Code," etc.). In other embodiments, as described, each player must present a code and/or identifier (e.g., barcode) associated with the player in particular (e.g., the actual player who selected or was assigned to simulated "Player #1" presents his barcode, the actual player associated with simulated "Player #2" presents his barcode), such that a final session balance associated with the particular player may be accessed (e.g., scanning of a barcode prompts a casino personnel device of the present invention to access a database and determine an amount of winnings payable to a particular player). Of course, alternative methods other than presenting barcodes when redeeming such winnings are contemplated (e.g., players call a particular phone number and provide such a code, provide such a code in another electronic manner, and so on).

Thus, various embodiments are contemplated whereby one or more players may view a multi-player game disc, determine which players are winners, and then redeem an amount of winnings associated with the one or more winning players.

Several embodiments or features described herein may help assure the fairness of claims to winnings stemming from multiplayer play. For example, if a first player purchases for $40 a four-player game disc, and then three other players provide the first player with $10 each (e.g., such that each of four players divide the cost of the disc evenly), all four players may be entitled to their own particular receipt, barcode and/or other material by which they may claim winnings (e.g., some other substrate bearing a code or identifier). Players might not provide such sub-payments before being provided with such materials (e.g., players of a multiplayer disc may simply provide sub-payments in exchange for such materials, with which they may claim any winnings they are due, as indicated by the game disc).

In another example, a game disc may comprise a tamper-evident seal adhered to a readable side of the game disc, such that the disc may not be viewed while the seal is attached (e.g., the seal is opaque and prevents an optical laser from reading the disc). In this manner, a player might not provide payment in conjunction with a multiplayer disc (e.g., payment to a friend to split the cost of a disc, payment at a casino) if a seal has been removed.

For example, in some embodiments, actual players may choose an associated simulated player before a multiplayer disc is viewed (e.g., a first player chooses "Player #3" as indicated by the disc), such that the actual player may be entitled to any winnings earned by a simulated player of the disc. Thus, such a tamper-evident seal may be removed in the company of all players to ensure that no single player has viewed the disc preemptively (e.g., such that a first player determines that the simulated "Player #3" is the correct simulated player to choose). Of course, it should be noted that in arrangements where the purchase price of such a multiplayer game disc is divided by a plurality of players, such players may be friends or acquaintances, and therefore may not be likely to attempt to defraud other players (e.g., it may be unlikely that a player steals a purchase receipt from the player's friend and attempts to claim such winnings).

It should also be noted that, in some embodiments, it is envisioned that such multiplayer game discs may be purchased, viewed and/or redeemed by only one player (e.g., a player may simply enjoy cheering for two sets of slot machine reels rather than one set, and therefore may purchase a multiplayer game disc as opposed to a game disc marketed for single-player play).

In some embodiments, a first game disc may be associated with a first player, and a second game disc may be associated with a second player. One or more winning players may then be determined based on the game results and/or final session balances indicated by the discs. For example, a first video poker disc associated with a first player may indicate a final session balance of 74 credits, whereas a second video poker disc associated with a second player may indicate a final session balance of 104, and therefore the second player may be entitled to redeem an amount of credits (e.g., 104 credits if the disc offers a "pays best player only" payout format; 178 credits if the disc offers a "winner-take-all" payout format).

Thus, in accordance with one or more embodiments, a first game disc may be associated with a second game disc. For example, a first game disc may be associated with a second game disc such that, as described above, whether or not the first game disc may be redeemed for a prize may depend on (i) a final session balance and/or game results of the second game disc and/or (ii) a final final session balance and/or game results of the first game disc.

Of course, it should be appreciated that only one player might purchase, view and/or redeem such discs. In other embodiments, a multiplayer disc may be "shared" or divided by a number of actual players less than the number of simulated players represented by the disc. For example, if the disc is a four-player disc, two players may share the disc (e.g., a first player and a second player agree that the first player will take the results of simulated "Player #1" and simulated "Player 3," and the second player will take the results of simulated "Player #2" and simulated "Player 4").

Some examples of multiplayer versions of wagering games provided in accordance with some embodiments are now discussed with respect to FIGS. 28-32. It will be understood that such examples are not limiting, and that methods, apparatus, and systems of the present invention may be modified, for example, to provide single-player versions of any such games.

Figure 28:
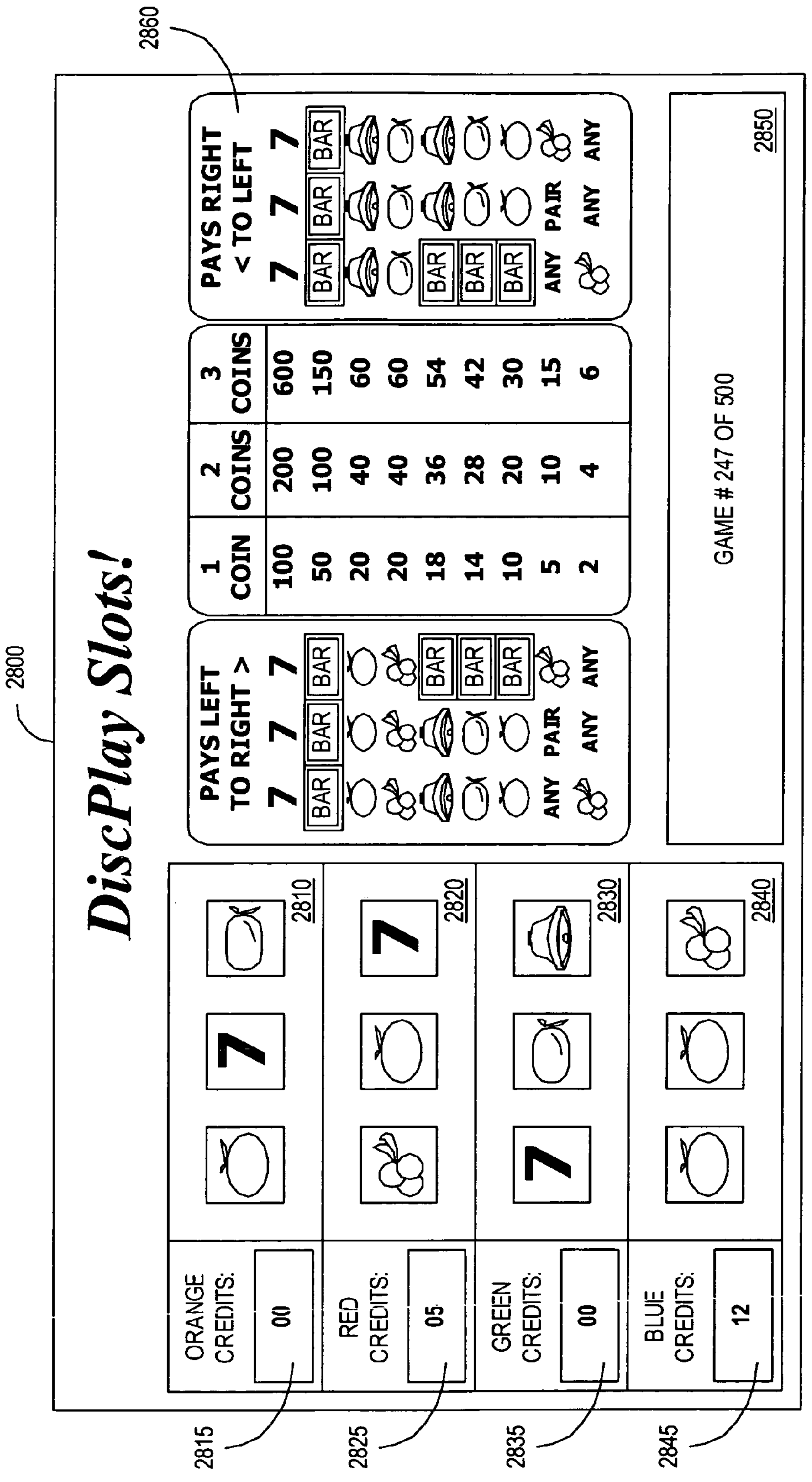
FIG. 28 is an example presentation that may be output in accordance with some embodiments related to slot machine games.

Referring now to FIG. 28, an example presentation 2800 of a four-player, slot machine-themed game disc is depicted. Example game results for a slot machine game are depicted for respective "ORANGE," "RED," "GREEN," and "BLUE" players. For instance, depicted indicia 2810, 2820, 2830, and 2840 show representative outcomes for corresponding slot machine spins for the respective players. Similarly, displayed credit meters 2815, 2825, 2835, and 2845 indicate the respective credit meter balances for each of the four players. Paytable 2860 provides information about the rules and payouts available for the game. Game information 2850 indicates how many games of the session have been presented to the players.

Figure 29:
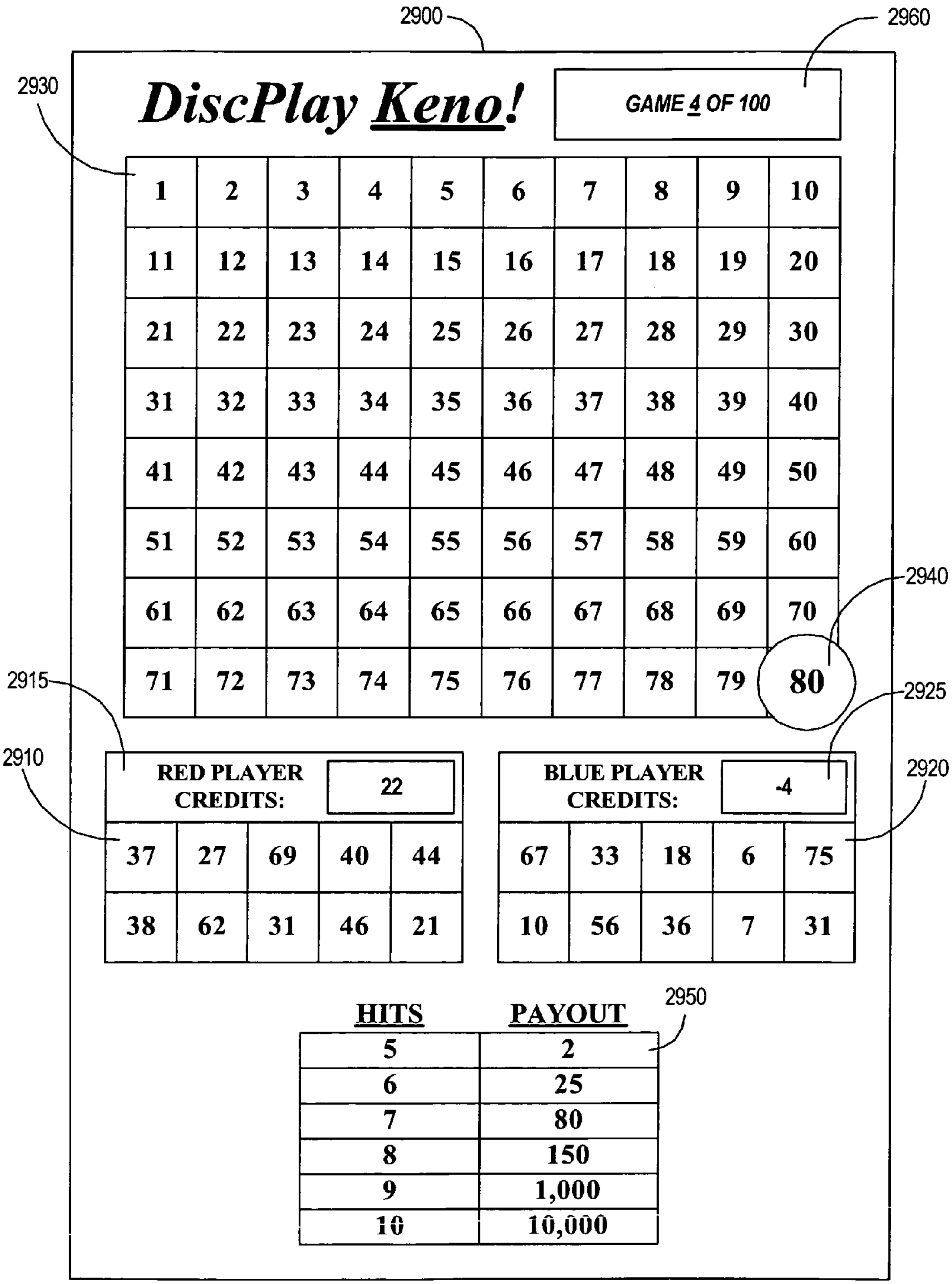
FIG. 29 is an example presentation that may be output in accordance with some embodiments related to keno games.

Referring now to FIG. 29, an example presentation 2900 of a two-player, keno-themed game disc is depicted. Example player numbers for a represented keno drawing are depicted for respective "RED" and "BLUE" players. For instance, depicted indicia 2910 and 2920 show the respective sets of keno numbers for each player. The table 2930 indicates the pool of keno numbers from which the drawing is made, and the current drawn number 2940 indicates the most recently drawn number (e.g., "80"). The displayed credit meters 2915 and 2925 indicate the respective credit meter balances for each of the two players. Paytable 2950 provides information about the rules and payouts available for the game. Game information 2960 indicates how many games of the session have been presented.

Figure 30:
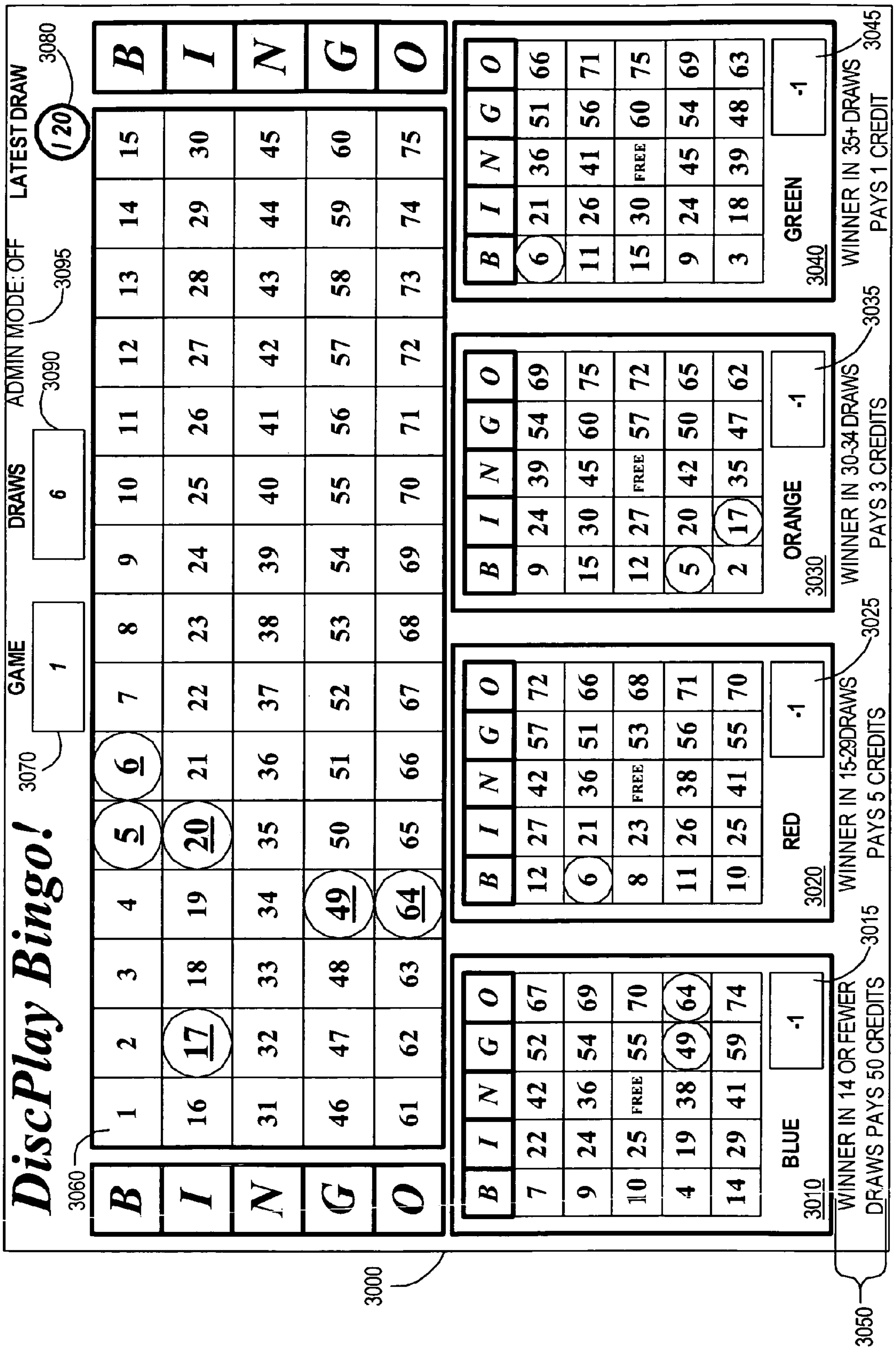
FIG. 30 is an example presentation that may be output in accordance with some embodiments related to bingo games.

Referring now to FIG. 30, an example presentation 3000 of a four-player, bingo-themed game disc is depicted. Example player cards for a represented keno drawing are depicted for respective "ORANGE," "RED," "GREEN," and "BLUE" players. For instance, depicted indicia 3010, 3020, 3030, and 3040 show the respective player bingo cards for each player. The displayed credit meters 3015, 3025, 3035, and 3045 indicate the respective credit meter balances for each of the four players. The table 3060 indicates the pool of bingo numbers from which the drawing is made, indicates the numbers that have been drawn, and the last drawn number 3080 indicates the most recently drawn number (e.g., "80"). Payout information 3050 provides information about the rules and payouts available for the game. Game information 3070 indicates how many games of the session have been presented, and draw number 3090 indicates how many numbers have been drawn in the current game. Admin mode 3095 indicates, for example, that the administration mode is set to off.

Figure 31:
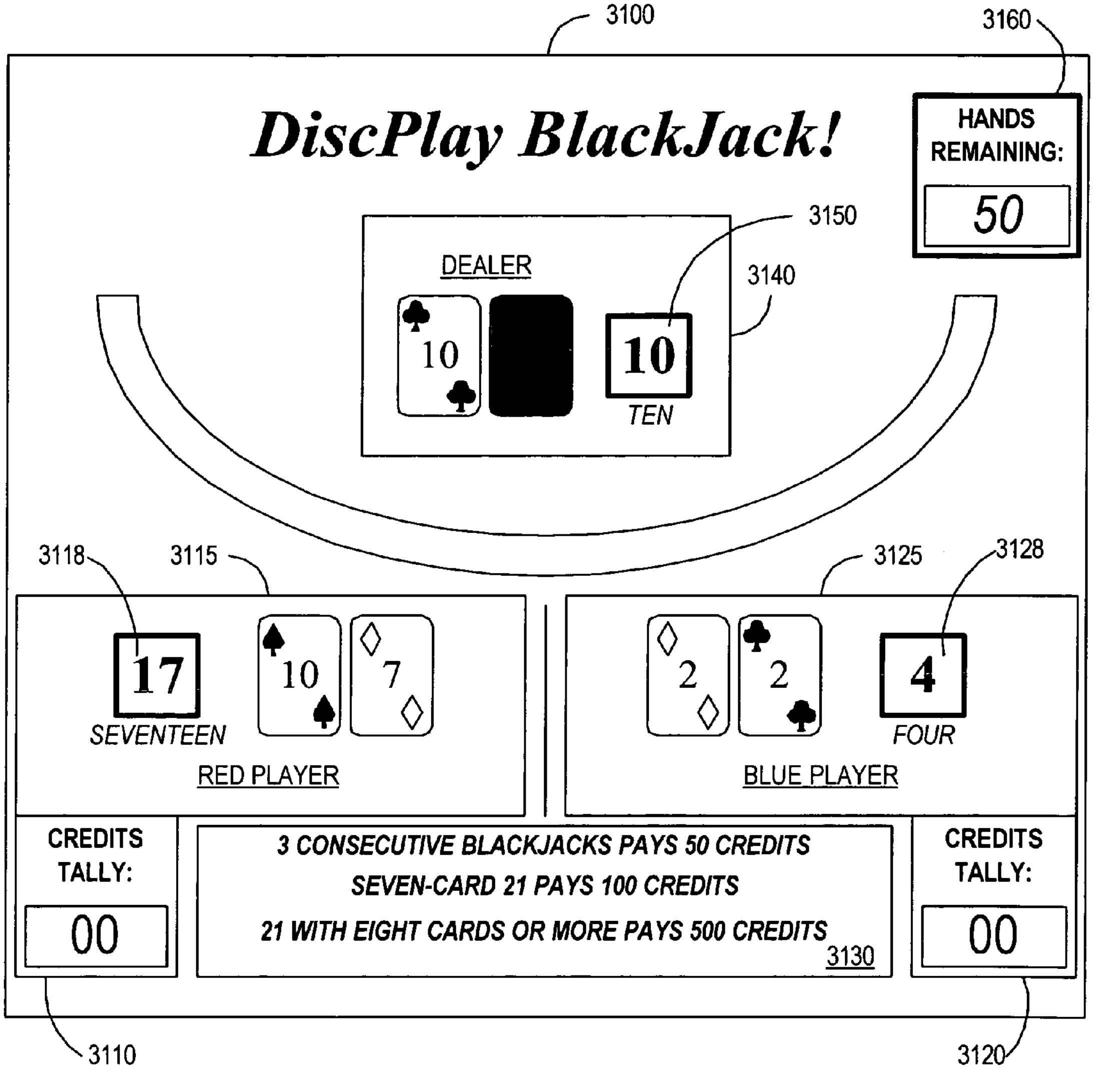
FIG. 31 is an example presentation that may be output in accordance with some embodiments related to blackjack games.

Referring now to FIG. 31, an example presentation 3100 of a two-player, blackjack-themed game disc is depicted. Example player hands for a represented initial hand are depicted for respective "RED" and "BLUE" players. Credit meters 3110 and 3120 indicate respective credit balances for each player. Hands 3115 and 3125 show the respective hands for each player, and counts 3118 and 3128 indicate the respective count for each hand. Similarly, dealer hand 3140 indicates the dealer's hand and 3150 indicates the dealer's (known) count. The table 3130 indicates the pool of keno numbers from which the drawing is made, and the current drawn number 3140 indicates the most recently drawn number (e.g., "80"). Paytable 3130 provides information about the rules and payouts available for the game. Game information 3160 indicates how many hands remain to be presented.

Figure 32:
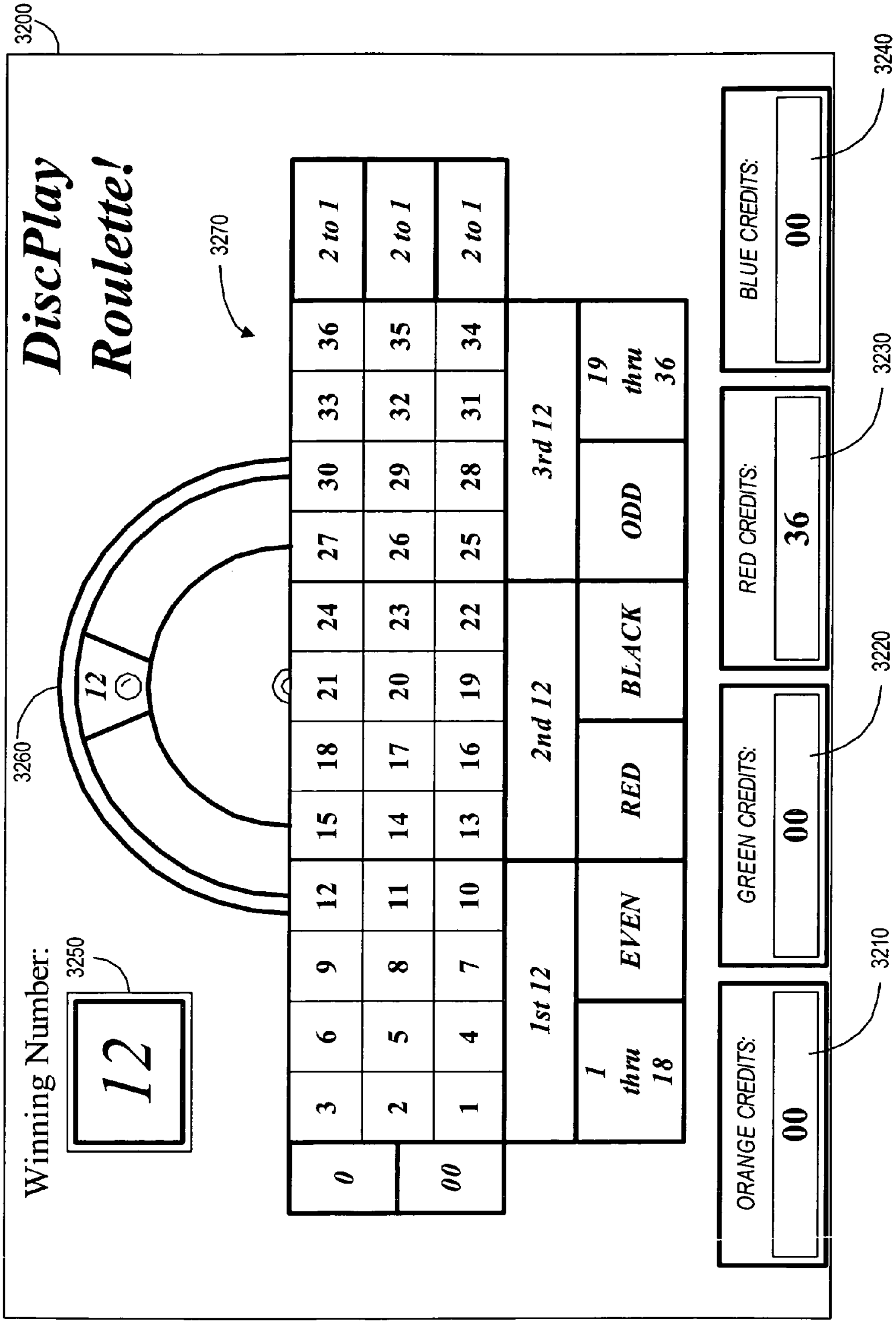
FIG. 32 is an example presentation that may be output in accordance with some embodiments related to roulette games.

Referring now to FIG. 32, an example presentation 3200 of a four-player, roulette-themed game disc is depicted. Example player cards for a represented keno drawing are depicted for respective "ORANGE," "RED," "GREEN," and "BLUE" players. The displayed credit meters 3210, 3220, 3230, and 3240 indicate the respective credit meter balances for each of the four players. The betting table 3270 indicates the possible bets that may be made. No bets are depicted in the presentation 3200, but it will be readily understood that an indication of particular wagers by respective players may be presented (e.g., using media files as described herein). The winning number 3250 indicates the last winning number from the simulated roulette spin. Wheel 3260 depicts one example of a roulette wheel and the last winning number. Of course, it will be readily understood that a represented roulette wheel may be presented as spinning and an animated ball coming to rest at a particular number. Further, although only one number ("12") is indicated, it will be understood that as much graphical detail may be provided as deemed desirable and practicable.

7. Additional Description of Some Embodiments

As described, in various embodiments, players may purchase a game disc (e.g., from a casino), such that indications of previously-generated game results may be viewed remotely (e.g., away from a gaming device and/or computer device which generated the results). Winnings associated with the game results may then be claimed by players (e.g., as players return to a casino and present a game disc, and/or associated packaging, purchase receipts, and so on).

Various embodiments described herein have considered processes for generating game results and outputting indications of game results via one or more game discs, wherein the game results indicate play of a slot machine game (e.g., a game comprising randomly determined symbols of a plurality of reels). However, it should be appreciated that due to the popularity of other casino games, including games such as poker, craps, roulette, blackjack, and so on, it may be desirable to produce game discs indicating game results of such other casino games, even if game results of such games are not traditionally output in an electronic manner within a casino (e.g., as in a game such as roulette).

Various gambling games offered by a casino may be categorized or divided into different groups or types. While examples for producing game discs (or remotely providing indications of game results in some other manner described herein, such as electronically via a network) in association with each of these games in specific will be provided, it is worth describing briefly the basic differences between these groups or types, and generally how these differences might lead to different procedures or methods when producing such discs.

For example, various casino games, such as slot machines, may require little from the player in terms of strategic decision-making or skill. For example, a player playing a slot machine at a casino might have a limited number of decisions to make—whether or not to pull a handle or press a spin button, whether or not to increase or decrease a wager amount, whether or not to activate a particular payline, and so on. Further, such decisions may have little or no impact on the game result that is achieved, and thus may not be considered strategic decisions or skill-based decisions (though some players might confuse choosing a particular bet amount as a skill-based decision). For example, a randomly-determined slot machine outcome of "Bar-Bar-Bar" may occur regardless of whether the player wagers a certain amount, and so on. Decision-making with respect to other casino games, such as roulette or keno, may occur in a similar fashion-the decisions a player makes (e.g., which numbers or groups of numbers to bet on in roulette; which numbers to select or an amount of numbers to select in keno) may determine whether or not a player achieves a payout (e.g., if the numbers selected match the drawn numbers), but may ultimately have no effect on a randomly-determined game result (e.g., the winning number of a roulette wheel spin, the winning numbers drawn in a keno game). Accordingly, in some embodiments, in association with non-skill-based casino games, automated sessions may produce game results that may be used for determining game disc content (e.g., media files indicating actual or alternative game results), and as described, the sessions may be simulated or otherwise executed in accordance with various parameters. Thus, various types of parameters may be applicable to the simulation or execution of such non-skill-based games: (i) a type of game, including probability and payout structures for game results thereof; (ii) a number of game plays to be executed and/or one or more conditions for terminating a session; (iii) wagering parameters (including either a fixed wager amount per game play, or a variable wager amount per game play according to various rules, as described further herein); (iv) a starting credit balance; and so on. Of course, other parameters (e.g., a number of active paylines, etc.) are contemplated.

However, it is understood that various other such casino games may require further decisions from players, such as games that involve skill-based strategic decisions. For example, as is understood with respect to various casino games including but not limited to Blackjack and video poker, a player may influence a game result by deciding whether to hit or stand, discard one or more cards, and so on (e.g., such games can be said to have a "perfect basic strategy" for hit stand decisions, discarding cards, and so on). Accordingly, when simulating or otherwise executing one or more automated sessions in association with such games involving skill-based strategic decisions, various parameters may be considered, such as any of the parameters described herein with respect to non-skill-based games (e.g., wager amount per game play, termination conditions, etc.), as well as parameters that automatically govern such strategic decisions. For example, as will be described further herein, during a simulated Blackjack game of a reference run a players hit/stand decisions may be made according to rules for perfect basic strategy.

Thus, game discs may be offered in conjunction with various types of casino games, in both single-player and multi-player formats, and associated gaming sessions/contracts (e.g., reference sessions) may be executed according to various parameters.

According to some embodiments of the present invention, it is contemplated that, in conjunction with various casino games, a game disc may be provided so as to facilitate or accompany play of a card-based game. A variety of such examples are contemplated.

In some embodiments, single-player and/or multiplayer Texas Hold'em-themed game discs may be available. For example, in some embodiments, such a game disc may indicate one or more community cards available to one or more players. For example, in some embodiments, a Texas Hold'em-themed game disc may offer a plurality of sets of community five cards (e.g., 100 sets of five cards), such that one or more players may view such community cards indicated by a game disc, though such one or more players may additionally utilize physical player cards.

In some embodiments, players may themselves provide such physical cards. For example, one or more players may use a standard deck of 52 physical playing cards, such that player cards may be provided via the deck. For example, a plurality of players (e.g., four players) may each be dealt two cards from the deck, and these players may compare these physical cards to the community cards indicated by a game disc. For example, a game disc may first depict three community cards (e.g., "the flop"), after which players may bet between themselves (e.g., using physical chips), such that the game disc may either be manually paused during such betting or may incorporate a pause in output of such community cards itself (e.g., a media file is elongated so as to depict the flop for a period of time that allows betting to occur). Players may then similarly be shown the fourth (e.g., "turn" card) and fifth (e.g., "river" card) community cards, such that a winning player may be determined based on the physical player cards and community cards indicated by the game disc. In alternate embodiments, three separate chapters of a DVD may be used, one to depict a flop, a second to depict a turn card, and a third to depict a river card, such that players may use an input device such as a remote control to indicate that various media files are to be output (e.g., when the players are done betting after the flop, one player presses the "Enter" button of a DVD).

It should of course be noted that, in some embodiments wherein players may use physical cards with the have provided as player cards, that redundancy may occur between player cards and community cards (e.g., a physical deck yields an "Ah" to a player, and an "Ah" is depicted in accordance with a particular set of community cards). Accordingly, various rules may be devised for such circumstances. For example, players may agree that if such redundancy were to occur, a redundant player card may turn into a "wild" card. In another example, both cards may remain the same (e.g., such that a player might use two "Ah"s when forming a hand).

In some embodiments, players may use physical cards provided in conjunction with such a game disc. For example, a package of pre-sorted physical playing cards may be provided. For example, one or more shrink-wrapped packages of cards may be pre-sorted and provided in conjunction with a Texas Hold'em-themed game disc. For example, a four-player game disc may indicate 35 rounds of Hold'em (e.g., 35 sets of community cards), and accordingly shrink-wrapped packages, each comprising 70 cards (e.g., 35 pairs of player cards), may be provided to each of four players (e.g., the packages indicate "Player #1's Cards," "Player #2's Cards," and so forth). Thus, one or more such players may view such cards (e.g., two at a time, in a particular sequence, as designated by packaging) so as to determine player hands in conjunction with community cards indicated by a game disc. There may be various benefits to such an embodiment of providing pre-sorted physical cards. For example, such embodiments may eliminate a situation wherein physical player cards may be redundant in light of community cards indicated by a game disc. Various methods for collating and/or sorting groups of cards according to various sequences are known in the art; some exemplary methods are described in U.S. Pat. No. 6,267,648 to Johnson and U.S. Pat. No. 6,403,908 to Stardust, and thus the entirety of each are herein incorporated by reference for all purposes.

Thus, in some embodiments, sets of community cards may be randomly determined (e.g., game results are generated by a gaming device and/or computer device) and indications thereof may be stored on a game disc (or provided in some other manner). In some embodiments, bonuses may be made available based on the community cards indicated by such a Texas Hold'em-themed game disc. For example, in some embodiments, as such sets of community cards are determined (e.g., game results are generated by a gaming device and/or computer device), a pay schedule may be accessed so as to determine payout amounts associated with such sets of cards (e.g., a set of five community cards all of the same suit pays a jackpot, and so on). Accordingly, such game discs may indicate such payout amounts (e.g., indications of game results are stored on the disc, such that if a certain set of community cards is achieved awarding a payout, a credit balance indicated by a game disc may increase). Such payouts may then be claimed in a manner described herein (e.g., a player present a purchase receipt encoding a total payout amount associated with all such bonus payouts of the Texas Hold'em-themed game disc). In this manner, players may play a card game such as Texas Hold'em (e.g., players wager with their own money), though a game disc may provide an opportunity for further payouts (e.g., such that a group of friends may prefer to play such a game with using a game disc as opposed to without, as there is a chance to win a jackpot).

It should of course be understood that in some embodiments, a game disc may be offered in conjunction with a game such as Texas Hold'em poker, and the game disc may indicate all cards (e.g., player cards and community cards) such that no physical player cards may be necessary. For example, one or more sessions may be executed in advance such that game results may be determined (e.g., a simulation is run according to various rules and/or algorithms for determining betting strategies, and so on), and game discs created and provided based on the game results and/or final contract balances as described (e.g., four players watch a multiplayer Texas Hold'em-themed game disc, the disc featuring four avatars each representative of a player, the avatars receiving player cards and wagering as is customary in such a game).

In some embodiments, a game disc may be provided so as to facilitate, compliment or present a game of baccarat.

In some embodiments, a baccarat-themed game disc may comprise indications of previously generated game results. For example, in some embodiments, one or more sessions of a game of baccarat may be simulated or otherwise executed by a gaming device and/or computer device. For example, a software program of a computer device may simulate a session of a plurality of rounds of baccarat according to various parameters, including but not limited to: (i) a number of players; (ii) a starting credit balance associated with one or more players; (iii) a wager amount per game play associated with one or more players (e.g., fixed or variable); (iv) an indication of whether or not a credit balance may go negative, and if so, any limitations associated therewith; (v) rules for dealing cards to one or more players and/or a dealer (e.g., based on stored rules for dealing cards according to conventional baccarat play); (vi) a betting strategy or protocol associated with one or more players (e.g., a player consistently places wagers on a "player" side; wagers vary randomly between "player," "banker" and "tie"; and so on); (vii) a number of rounds to be played or some other condition for terminating a session; and so on. In this manner, game results may be generated in association with a game of baccarat (e.g., during a first round, a player wagers $1 on a player side, and the player achieves a hand of "2h-7c" for a score of 9, whereas a banker achieves a hand of "10d-3s" for a score of 3, and thereby the players doubles his $1 bet for achieving a score closer to 9). Thus, indications of such game results may then be determined based on the game results and/or final session balances achieved, as described (e.g., one or more media files are selected presenting animations of various baccarat hands), and the indications may then be provided via the game disc (e.g., one or more media files are encoded on a DVD in MPEG-2 format), such that a player might view such indications of game results to learn of any winnings, which the player may claim as described herein.

Alternately or additionally, a game of baccarat may be played using physical cards, and a game disc may serve as an electronic record of the cards. For example, in some embodiments, a plurality of pre-sorted cards may be provided to players. For example, a session of a reference run may dictate a particular sequence of cards in association with one or more players and/or a dealer. Accordingly, based on this sequence, one or more packages of (e.g., shrink-wrapped) pre-sorted cards may be provided to players based on the game result data associated with the session of the reference run. For example, physical cards may be sorted based on such an electronic record of a sequence of cards (e.g., as described in U.S. Pat. No. 6,267,648 to Johnson and U.S. Pat. No. 6,403,908 to Stardust, which have been incorporated by reference for all purposes). Accordingly, players may play a game of baccarat using the provided physical cards (e.g., dealing the cards in an indicated order). Various methods are contemplated for assisting such dealing (e.g., when sorting pre-packaged cards, "spacer cards" are placed in between hands). Additionally, a game disc may be provided, such that the game disc may indicate such hands (e.g., using the same game result data, indications of game results are determined and stored on the game disc). In this manner, players may play a "scripted" game of baccarat using physical cards (e.g., the game results have previously been determined in a random manner), though an electronic record of such a game may additionally be made available so as to verify that the game was executed properly. Thus, in some embodiments, players may purchase (e.g., for a flat price), a game disc indicating previously-generated game results of a baccarat game, as well as one or more packages of physical cards sorted so as to recreate the game results generated therein.

A variety of other games may be offered in a manner such that indications of previously-generated game results are provided to one or more remote players (e.g., encoded and stored on a DVD). For example, such games may include, but are not limited to: Pai Gow Poker (e.g., two players compete against a dealer, hands are arranged according to perfect basic strategy, players earn bonus payouts by collecting certain cards, players may place free side bets with a certain frequency up to a certain wager amount, etc.), Sic Bo (e.g., one or more players place fixed or varied wagers on one or more combinations of dice, winning combinations of dice are determined randomly, players might be paid bonuses if various combinations of dice occur in sequence from one throw to the next, and so on), It should be noted that a player and/or casino agent may input parameters (and values thereof) desired for a session via many various means (e.g., as alternatives to using one or more of a GD 315, POS 320 or a CPD 325). For example, a kiosk, set top box of hotel room TV, a Web page interface, a handheld casino device, a cellular telephone or landline telephone may be used to input such information. Further, any and all such means may be used by a player to input payment for a session or DVD. For example, a player selecting a DVD from a display in his hotel room may use a set top box of the TV in his room to enter a financial account identifier to provide payment for the DVD. In another embodiment, the price of the DVD may automatically be charged to the players hotel room bill upon it being determined (e.g., during a cleaning of his room) that the DVD as been taken from the display.

In some embodiments in which outcomes are generated at a GD by a casino attendant (e.g., on behalf of a particular player), players may not be present to view the generation of outcomes at the GD. Accordingly, substantially lavish graphical presentations (or, for example, the spinning of mechanical reels) that typically accompany the generation of outcomes may not be necessary. In fact, in some embodiments, without a need to entertain players at the time the outcomes are generated, graphic presentations or accompanying mechanical reel spins may either be (i) expedited considerably (e.g., a video display screen outputs 1,000 consecutive animations of spinning reels in the course of a few minutes), (ii) presented in an alternate fashion (e.g., a display screen simultaneously depicts 1,000 symbol arrays), and/or (iii) abandoned altogether (e.g., outcomes are generated and stored or output as described elsewhere herein, but not presented in a conventional visual fashion).

Accordingly, a GD consistent with one or more embodiments may comprise a special "session outcome generation" mode accessible only by authorized persons (e.g., by casino attendants, and not by players). In such a session outcome generation mode, a GD may be capable of rapidly generating outcomes pursuant to a session characterized by certain parameters. For example, upon receiving instructions defining one or more parameters (and values thereof) of a session from a casino attendant, a GD may use a random number generator to rapidly generate a plurality of random numbers, which may correlate to outcomes as specified by a probability database, an exemplary tabular representation of which is depicted by FIG. 15. It should be appreciated that other methods of generating outcomes are known in the art and need not be detailed further herein.

As stated, in some embodiments, such a mode of operation may only be made available to authorized persons. Thus, in some embodiments, a process of authorizing a GD to enter a session outcome generation mode (e.g., as performed by a GD 315 or CS 305) may comprise granting access to such a mode of operation.

Access to such a mode of operation may be granted in a variety of manners. For example, in one or more embodiments, a GD may be configured to receive an access code from a casino attendant.

For example, a casino attendant may actuate an input device of a GD (e.g., by pressing a button or an icon of a touch-sensitive display screen) requesting to access such a mode of operation. Upon receiving such an input, a GD or other device in communication with the GD (e.g., CS 305) may be configured to output a request to receive an access code or to cause such a request to be output to the player. The casino attendant may then use an input device to enter an access code. For example, the casino attendant may enter a numeric or alphanumeric code via a keypad or touch-sensitive display screen. The casino attendant may have received such a code when receiving an instruction to execute the session at the GD (e.g., the access code may be provided to the casino attendant via a CPD, along with an instruction to execute the session). In some embodiments, an access code may be provided to one or more casino attendant for use in executing sessions on GDs and may not be unique to a particular session. In some embodiments, an access code may be unique to a GD while in other embodiments it may not be. An access code may be determined or generated, for example, by CS 305.

In some embodiments, a process for authorizing a GD to enter a session outcome generation mode may comprise determining whether a received access code is valid. For example, in one or more embodiments, a database (not shown) maintained by a GD or other device in communication therewith (e.g., CS 305) may contain a list of valid access codes, such that when an access code is received, it may be compared to the list to determine whether or not it is valid. In some embodiments, access codes may expire (e.g., upon one use, so as to prevent repeated fraudulent access), and accordingly, a device (e.g., a GD 315) may be configured to write to such a database (e.g., so as to eliminate a record of an access code, such that it may not be considered valid if received thereafter or to update a status of an access code to reflect its use and/or expiration).

Of course, various other methods of determining whether a user should be granted access to such a mode of operation are contemplated. For example, in one embodiment, a casino attendant desiring to access such a session outcome generation mode may simply insert or otherwise provide a card or identifier (e.g., in the form of a plastic magnetic stripe-based card similar to a player tracking card, a smart card, etc.). Upon receiving the card or identifier, a device (e.g., GD) may determine whether or not access should be granted to the session outcome generation mode. For example, a card reader device may read a magnetic stripe to determine whether a valid access code is encoded thereon. In another example, a reader device may access a memory of a smart card to determine whether a valid code is stored in memory thereon.

In other embodiments, authorized users may be granted access to such a session outcome generation mode via biometric means. For example, in some embodiments, a GD may comprise iris or retinal scanning means, voice detection means, and so on.

In still further embodiments, a GD may electronically receive a signal indicating that a session outcome generation mode is to be entered. For example, a server device (e.g., CS 305) may transmit an instruction or signal to a GD 315 instructing that a session is to be executed. Such an instruction may include an indication of the parameters of the session (and values thereof). In another embodiment, such an instruction or signal may originate from a CPD 325 or other computing device. For example, a casino attendant stationed at a location within a casino receives a request from a player to execute a session on his behalf, and the casino attendant uses a CPD or other computing device to transmit an instruction or signal that instructs the GD to execute the session. It should be noted that, in some embodiments wherein such electronic instructions or signals requesting the execution of a session are received, an accompanying access code or other means of authentication or verification may or may not be required.

In some embodiments wherein a session may be executed by a casino attendant or other authorized user interfacing with a GD, a program stored within a GD may, upon receiving a valid request to access a session outcome generation mode, cause various component devices (e.g., output devices) to reconfigure, such that an authorized user may facilitate the execution of the session. For example, upon entering a session outcome generation mode, a display device (e.g., a touch-sensitive display screen) may be configured to output a menu screen offering selectable options that would facilitate a user (e.g., a casino attendant) executing a session (e.g., on behalf of a particular player). FIG. 34 depicts an exemplary illustration such a menu screen.

Such selectable options may in essence allow a user to configure parameters associated with a session (i.e., to input values for each relevant parameter). For example, after entering a valid access code, a casino attendant may be presented with the menu screen and begin to configure various parameters of a session before having the GD execute the session, using a menu interface depicted by FIG. 34.

In some embodiments, a physical, non-electronic record of desired session parameters may be received from a player purchasing a session. For example, a player may have filled out a paper form, selecting (e.g., marking with a writing instrument) various session parameter values (e.g., wager amount per game play, number of game plays, etc.). In another example, a casino attendant operating a computing device (e.g., CPD 325) may issue a printed record of session parameters. In either case, a casino attendant may use such a physical record of session parameters for the purposes of entering desired session parameter values when configuring a GD for executing a session.

For example, when instructed to execute a particular session (e.g., identified by a unique session identifier), a casino attendant may be provided with such a physical form indicating associated parameters and values thereof. The casino attendant may then locate (e.g., using GD database 800) the one or more GDs on which the session is to be executed. In some embodiments, the one or more GDs may be identified by the player purchasing the session (e.g., the player may have specified a particular GD, a type of GD, a characteristic of a GD, etc.). After locating the GD and accessing a session outcome generation mode, the casino attendant may read from the paper form, and enter session parameter values using a menu interface.

Referring now to FIG. 33, illustrated therein are three distinct examples 3305, 3310 and 3315, of tickets that may be printed by a GD, each ticket having an indication of a result of a session printed thereon. A ticket such as one of the three depicted in FIG. 33 may be printed, for example, for auditing purposes, placed in a DVD jewel case for a player to use to redeem a payment associated with the DVD, and/or used to provide an indication to a device (e.g., AS 310) of one or more outcomes of a session, the latter for purposes of creating a video representation of the outcomes for recording onto a DVD. Such tickets are referred to as "session results tickets" herein, as they typically store an indication of one or more results (e.g., payouts, sum of payouts) of a session.

Of course, a session results ticket may store an indication of other information associated with a session as well, such as an indication of one or more parameters defining a session and/or values thereof. Examples of such other information include, without limitation, (i) an end credit meter balance of the session; (ii) a price of the session; (iii) a beginning credit meter balance for the session; (iv) a number of outcomes generated for the session; (iv) a player (or players) associated with the session; (v) a casino attendant associated with the session; (vi) a time and/or date at which the session was initiated and/or completed; (vii) a gaming device at which the session was conducted; (viii) a game for which the outcomes of the session were generated; (ix) a casino at which the ticket was generated and/or is redeemable; (x) a number of players associated with the session; and (xi) a unique session identifier associated with the ticket.

In one embodiment of a session results ticket that is printed for a three-reel slot machine game, each outcome of a three-reel slot machine game, as well as corresponding payout information, appears as text. On example of such a ticket is illustrated as ticket 3315 in FIG. 33. Using conventional TITO tickets (measuring 2.5"×6"; or approximately 6.35 cm×15.24 cm) and TITO ticket printing technology, text regarding a substantial number of outcomes may be printed on a ticket in this manner. Several of such tickets may be used as necessary (e.g., a program stored within the memory of a GD instructs a printer device to print 20 tickets, each with 50 game results of a 1,000 spin session). Exemplary paper tickets suitable for use according to such embodiments are sold by Slot-Tickets.com™ of Memphis, Tenn. Of course, other methods of printing an indication of outcomes of a session are contemplated. For example, rather than print an indication of a limited number of outcomes on a small, conventional ticket, a GD may comprise a roll of receipt paper similar to those known and used in common retail systems, such that an indication of a substantially large number of outcomes may be printed on one contiguous piece of paper (e.g., which may be tom off by a casino attendant or other authorized person after printing is complete). Such printing may occur at any time during or after the execution of a session. A printed record of a result of a session may not only be desired by players (who may view the record at a later time), but also may be filed or stored by a casino or other entity for auditing purposes (e.g., regulations may require that such printed records exist).

In some embodiments, an authorized person (e.g., casino employee) may specify that a GD print a conventional "cash-out ticket" indicating a balance of credits and/or currency at the conclusion of the execution of a session.

In one or more embodiments, an indication of a result of a session may be printed in an encoded or encrypted form or a form that is readable by a device but not easily discernable by a person. For example, a high-density barcode (e.g., see "video ticket" 3310) may encode a result of a session. Such encoded data may then be used to render a video presentation of outcomes, which may be viewed remotely by a player who has purchased a DVD on which outcomes representative of the result of the session are recorded. For example, text, numerals or other symbols or indicia stored within a session database (e.g., a series of outcome identifiers) may be encoded such that they are represented graphically by a barcode such as a high-density barcode.

In some embodiments, various parameters or settings of a GD and/or session may be set to "default" (e.g., a GD automatically prints a cashout ticket, video ticket and game result ticket upon the conclusion of an executed session). In some embodiments, an authorized person (e.g., a casino employee executing the session or causing the GD to execute the session) may alter one or more of these parameters from the default sessions. In other embodiments, such an authorized person may not be authorized to alter certain settings.

In some embodiments, an entity (e.g., an operator of AS 310) may determine session result data from a session results ticket. For example, if the session results ticket includes an indication of a session result encoded in barcode form, the session result may be determined by scanning a barcode of a session result ticket (e.g., the bar code of example session results ticket 3315). Such a barcode may encode, for example, a session identifier, a series of outcome identifiers and one or more associated GD identifiers.

In one embodiment, a device (e.g., AS 310) may comprise software to create a video representation of outcomes for recording onto a DVD based on session result data, such as may be determined from a session results ticket. For example, AS 310 may receive session result data associated with a session in a manner such that AS 310 need not communicate via an electronic network with a casino for purposes of obtaining such session result data, but may rather be operable to receive session result data via session result tickets. The AS 310 may be further operable to assemble video representations of outcomes based on such tickets and supply such video representations (e.g., in the form of DVDs on which such video representations are recorded) to players and/or casinos for subsequent sale to players.

Referring now to FIG. 34, illustrated therein is a menu 3400 that may be presented to a person (e.g., a player and/or casino attendant) for entering values of parameters to define a session. Such a menu may be utilized, for example, by a player who desires to order a DVD of outcomes. A player may define a session of outcomes to be generated via such a menu. In another example, such a menu may be utilized by a casino attendant who is directing a gaming device to generate a plurality of outcomes for a session (either on behalf of a particular player or prior to any player ordering or purchasing such a session). The menu 3400 may be displayed, for example, via a GD, kiosk, CPD, or other device.

As illustrated, in some embodiments a variety of parameters may be configured to define a session. For example, a wager amount per game play (actual or average) may be selected or indicated. In another example, a duration of the session (e.g., in terms of number of game plays, time, or ending event) may be selected or indicated. In yet another example, a speed with which outcomes are to be generated, played back and/or represented may be selected. In yet another example, a number of payout combinations or particular payout combinations to be active for the session may be selected or indicated. In yet another example, an option for displaying the generated outcomes may be selected (e.g., such an option may only be available if the session is being defined by a casino attendant but not if it is being defined by a player, as this would spoil the player's enjoyment of subsequently viewing the outcomes via a DVD). In yet another example, an option for storing the results may be selected (such an option may, in some embodiments, include several options for how (e.g., on what medium, on what device, as each is generated vs. once all are generated, etc.) the outcomes are to be stored. In yet another example, an option for printing a ticket or receipt indicative of the result of the session (e.g., a session results ticket) may be selected. Of course, other types of parameters may be presented and defined (e.g., a GD or type of GD on which the session is to be executed, a game for which the outcomes are to be generated, a time at which the session is to be executed, a strategy to be employed in making decisions during game play, etc.).

Once a session is defined via the menu 3400, the person defining the session may indicate a confirmation that the session is to be executed. Such a confirmation may, in some embodiments, cause a GD to immediately or substantially immediately execute the session in accordance with the parameter values indicated via the menu 3400. In other embodiments, such a confirmation may cause the session to be scheduled or entered into a queue, for subsequent execution by a GD (e.g., upon an availability of an appropriate GD).

It should be understood that in some embodiments a value for a particular parameter (e.g., number of game plays defining a session) may be selected from a menu of pre-defined choices while in other embodiments a value may be entered without selecting from pre-defined choices (e.g., person can select any number of game plays or any number within a pre-defined range of numbers).

For example, turning again to FIG. 34, the casino attendant may select a wager amount of 750 per game play and a session or contract duration of 1,000 game plays. The casino attendant may then select a speed setting. A speed setting may govern the rate at which outcomes are generated during the session. For example, if a casino attendant selects a "real time" option, outcomes may be automatically generated at a substantially conventional pace (as they normally would in a standard mode of operation, taking several seconds to reveal each outcome). In another example, a casino attendant may select an option that multiplies the standard rate of outcome generation by some factor (e.g., outcomes will be generated "ten times faster"). In yet another example, a casino attendant may select an option that specifies a rate per unit time at which outcomes may be generated (e.g., "100 spins per minute"). In yet another example, a casino attendant may select an option that "instantly" or substantially instantly generates results for all game plays associated with a session. It should be understood that many if not all GDs possess the processing power to generate thousands if not hundreds of thousands of random numbers in as little as one second, facilitating the rapid or seemingly "instant" generation of such game results.

Various other parameters for a session may also be configured. For example, a casino attendant may specify one or more active pay combinations associated with a session (e.g., "BAR-BAR-BAR" is active, though "DOUBLE JACKPOT" is not).

Further, a casino attendant may configure various display options associated with the execution of the session. As stated, without the need to entertain a player (who may not be present for execution of one or more game plays associated with a session), graphic presentations or other visual accompaniments commonly employed by GDs may either be (i) expedited considerably (e.g., a video display screen outputs 1,000 consecutive animations of spinning reels in the course of a few minutes), (ii) presented in an alternate fashion (e.g., a display screen simultaneously depicts 1,000 symbol arrays), and/or (iii) abandoned altogether (e.g., outcomes are generated and stored or output as described elsewhere herein, but not presented in a conventional visual fashion). Accordingly, a casino attendant may have an opportunity to select various display options. For example, in one embodiment, a casino attendant may select an option such that graphics, animations, sounds, the spinning of mechanical reels, etc. may be eliminated entirely. In another embodiment, a casino attendant may indicate that the GD should simultaneously display a plurality of game results at the same time (e.g., 50 hands of 5-card stud poker are displayed at once). In another embodiment, a casino attendant may specify the amount of time that one or more game results should be presented before another game result or set of game results are presented (e.g., simultaneously display 50 outcomes of a 5-reel, video slot machine for 10 seconds, then display the next set of 50).

In further embodiments, a casino attendant may (i) select whether or not game results are to be stored and/or transmitted electronically, and/or (ii) identify a manner in which game results are to be stored and/or transmitted electronically. For example, by pressing an icon of a touch-sensitive display screen, a casino attendant may indicate that all game results associated with a session should be stored electronically in a session database (e.g., such as session database 425 or active sessions database 435).

In one embodiment, a casino attendant may specify a location to which game results are to be transmitted electronically (e.g., CS 305 and/or AS 310, etc.). In one embodiment, a casino attendant may indicate that gaming results are to be stored on a smart card currently inserted into a reader device in communication with the GD generating the outcomes for the session (e.g., such that a smart card may be associated with a session, and the results stored thereon such that they later may be accessed for auditing, accounting or any other purposes). Such storage or transmission may occur at any time during or after the execution of a session (e.g., game results are individually stored as they are generated; game results are stored in RAM while they are being generated, then written to ROM and erased from RAM; and so on).

In one example of executing a session in accordance with defined parameters, a number of game plays may then be executed in accordance with the configured parameters. For example, 1,000 game plays of a three-reel slot machine at a wager amount of 75¢ per game play may be executed using an "instant" speed option, such that outcomes and associated payout amounts are generated as rapidly as possible. Visual indications of such game results may then, if desired, be output via a display device (e.g., a casino attendant may optionally "scroll" through screens simultaneously depicting 100 outcomes each, after they have been generated). Further, the result of the session may be output as described herein (e.g., a session results ticket may be printed and/or an indication of the session result may be transmitted to another device). It should be noted that, in some embodiments, the execution of a plurality of game plays (i.e., generation of outcomes) may occur in a substantially automatic manner. For example, once a person requests that a session be executed, the outcome generation for the session may occur without further input from the person. For example, it may not be required for the person to actuate a "spin" button or other game play initiation mechanism in association with each game play; rather, the GD may be configured to execute game plays without interaction from the person. Further, a GD may be configured to execute a game play without deducting a wager amount from a credit balance, or by deducting a wager amount from a credit balance, even if the balance is "negative" or "zero," and so on. Examples of some such methods are described in commonly-owned U.S. application Ser. No. 10/635,986, filed Aug. 7, 2003, entitled "SYSTEM AND METHOD FOR REMOTE AUTOMATED PLAY OF GAMING DEVICES"; U.S. application Ser. No. 10/636,520, filed Aug. 7, 2003, entitled "SYSTEM AND METHOD FOR COMMUNICATING GAME SESSION INFORMATION"; and U.S. Pat. No. 6,012,983, filed Dec. 30, 1996, entitled "AUTOMATED PLAY GAMING DEVICE"; the entirety of each are incorporated by reference herein for all purposes.

Thus, in some embodiments, a person such as a casino attendant or player may configure a GD such that it executes a session in accordance with one or more embodiments described herein. In other embodiments, a GD may be configured to execute a session without receiving input from a person.

As stated, in some embodiments of the present invention, a gaming device may be configured to execute a plurality of game plays on the player's behalf while the player is not present. Accordingly, as described, a gaming device may be configured to operate in a "remote contract" mode wherein a plurality of outcomes may be generated relatively rapidly.

Further, in some embodiments and as described with respect to FIG. 34, a casino attendant may (i) select whether or not game results are to be printed (e.g., using a "TITO" device), and/or (ii) identify a manner in which game results are to be printed. For example, by pressing an icon of a touch-sensitive display screen, a casino attendant may indicate that all game results associated with a session should be printed using a TITO device. Further, a casino attendant may configure a manner in which such gaming results are to be printed.

Thus, in some embodiments, a GD may receive one or more signals or instructions from a separate device (e.g., a server such as CS 305, a second GD, a CPD, etc.), which may indicate (i) that a session should be executed, and (ii) parameters (and values thereof) associated with the session. For example, a five-reel, nine-payline video slot machine located on the floor of a casino may receive a signal indicating that the device should generate 1,000 spins, with nine paylines activated and 25¢ wagered per spin. The device may then execute the session as described above (e.g., use the random number generator to generate the outcomes) and output the session result data as described herein. Various methods of receiving such signals or instructions are contemplated. For example, a communications port may receive a transmission via any communications protocol described herein (e.g., a server sends such a signal to a GD using a BOB or other appropriate protocol). Thus, in some embodiments, it may not be necessary for a casino attendant to interface with a GD to execute a session. In some embodiments, a casino attendant may later visit a GD on which a session has been executed to retrieve printouts, session result data, etc.). In other embodiments, session result data may be transmitted electronically, as described herein, and a casino attendant need not be involved in the transmission of the session result data.

In some embodiments in which a player may request a session and a DVD of the session may be created in response thereto, a casino may receive a request to execute a session at a first time, and execute the session at a later time. For example, so long as a player has agreed to such a condition, a casino may receive a request to execute a session from the player, and the session may be executed whenever the casino deems most appropriate, so long as the execution occurs no later than a specified time after the request was received (e.g., the casino has up to 48 hours to execute the session).

Thus, in one or more embodiments, a casino may determine a level of gaming device utilization before executing a session (whether the session is executed on behalf of a particular player or not). For example, in one embodiment, a session may be executed when it is determined that there is sufficient capacity for the session. For example, it may be determined that enough slot machines located on the floor of a casino are not currently being utilized, such that occupying one slot machine for the purposes of facilitating a session will not result in a shortfall of GD capacity that is deemed unacceptable by a casino. In one embodiment, GD utilization data may be stored in a GD database, an exemplary data structure of which is depicted by FIG. 8. For example, a GD database may indicate a "device status" associated with a GD, which may describe whether the particular GD is currently "in use" or "not in use." A variety of methods of monitoring GDs to detect such utilization are contemplated (e.g., detecting game play activity, detecting the insertion of a player tracking card or contract card, detecting the presence of a player using a sensor device, monitoring GDs with video cameras, polling the GDs, etc.), such that in some embodiments, a server device (e.g., CS 305) may track GD utilization in a substantially automatic manner (e.g., a server detects use and writes to a centrally-stored GD database). In one embodiment, a percentage utilization metric may then be calculated with respect to all GDs within a casino (e.g., 37% of all machines are in use). Accordingly, in some embodiments, a session may or may not be executed depending on a determined percentage utilization metric (e.g., if a percentage utilization metric is above a certain threshold, no sessions are to be executed). In one embodiment, historic GD utilization data may be considered when determining whether or not a session is to be executed (e.g., on average, slot machine utilization from 12 p.m. until 6 p.m. on Wednesdays has been 23% at Casino A). In this manner, a casino can effectively load balance the execution of sessions against the utilization of its casino floor, thus executing sessions at times when doing so is preferable.

In some embodiments in which a session is executed on behalf of a particular player and in response to a player request for the session, a player may request that a session be executed on a particular GD and/or GD of a particular type. Accordingly, in one embodiment, utilization data for GDs may be accessed (e.g., by a casino attendant using a CPD or by CS 305) to determine whether such a GD is available. If the desired GD is available, the session may be executed (e.g., by dispatching a casino attendant to execute the session). In some embodiments, session may only be executed if the desired GD has not been in use for some predefined period of time (e.g., 30 minutes), and/or if it is a certain time/date (e.g., no sessions may be executed on weekends or weeknights between 7 and 11 p.m.). In some embodiments, a server or other computing device (e.g., CS 305) may continuously, substantially continuously, periodically or on another basis monitor the availability of one or more GDs, and should a previously utilized GD that a player has requested for a session become available, the session may be executed. For example, (i) a casino attendant may be dispatched to the GD (e.g., a signal is sent to a CPD, indicating the available GD's location, session parameters (and values thereof), and so on). In another example, a signal or instruction may be sent to the GD such that the session is executed. In some embodiments, a signal or instruction may be sent to a GD even when the GD is in use and the GD may be programmed to execute the session in accordance with the instruction at the first appropriate time or simultaneously while allowing the use of the GD by a player in a conventional manner.

Referring now to FIG. 35, illustrated therein is an example embodiment 3500 of a record of a database, storing an indication of payouts determined by a gaming device for a session. As described, in some embodiments it may be unnecessary and/or undesirable to store an indication of the set of indicia representing each outcome of a session. However, it may be desirable to store an indication of payouts determined for the session and, in some embodiments, the order in which the payouts were determined. For example, a probability database, payout database (or a database that combines features of a probability database and payout database, as described above with reference to FIG. 18), may be used by a GD to determine a payout for each game play of a session. The GD or another device may then store an indication of each payout and, in some embodiments such as the one illustrated in FIG. 35, the indication of the payouts. A device (e.g., AS 310) may then use the payout data to create a video representation of the payouts. For example, the AS 310 may select, for each payout indicated in record 3500, a media file that corresponds to the payout. For example, the first payout, which is indicated as "0", the AS 310 may select a media file that comprises a set of indicia representing an outcome that corresponds to zero credits being won as a result of the game play.

The record 3500 includes a number of fields, including (i) a gaming device identifier field 3505 that stores an identifier of a GD on which the payouts were determined; (ii) a data type field 3510 that indicates the type of data stored in the record (e.g., in some embodiments different types of data, such as an indication of a set of indicia comprising an outcome, may be stored); and (iii) an indication of payouts field 3515 that stores an indication of each payout generated for a session (each payout corresponding to a particular game play of the session) and the order in which the payouts were generated. Of course, additional or different data may be stored in such a record. For example, an indication of a game (e.g., in addition to or in lieu of the gaming device identifier) for which the payouts were determined may be stored. In another example, an indication of a time and/or date of the session and/or each individual payout may be stored in yet another example, an indication of a verification of the software used to generate the payouts may be stored (e.g., a hash function technique may be used to verify the authenticity and integrity of the software may be performed at the beginning of each session and an indication of the result of such an authentication process may be stored in the record).

In yet another example, an identifier that identifies a respective player associated with one or more of the individual payouts may be stored. For instance, one or more payouts may be associated with one player, and one or more other payouts may be associated with a different player.

Turning again to a description of a video presentation that may be recorded onto a DVD, in some embodiments one or more of several features may additionally be made available to players when viewing a video presentation. Some of these features are described below.

In some embodiments, a counter feature may inform players how many outcomes of a session have been depicted in prior segments of a video presentation and/or how many outcomes remain in subsequent segments of a video presentation. For example, at a particular frame of a video presentation, an outcome or game play meter may display that there are 322 (e.g., of 500) outcomes depicted in subsequent segments of the video presentation. Such an outcome countdown meter may be a graphic overlaid onto frames or sections of frames of the video presentation.

In some embodiments, players may sort outcomes depicted in a video presentation by various criteria and view the video presentation accordingly. For example, players may select an option to "view all winning results" or "view all losing" results. In another example, a player may select an option to "view all remaining results in order of my payouts, from highest to lowest." Accordingly, in an embodiment wherein players view outcomes via a Web interface, a database or other memory structure (e.g., a session database) may be accessed in response to such requests (or may be utilized in creating video presentations configurable based on such requests) and may thus comprise additional fields for payout data, such that players requesting to view results based on payout amounts may do so (e.g., such that a server may receive such a request, access a session database to determine an appropriate media file, and output the media file).

In some embodiments, players may be able to control the speed at which a video presentation is output. For example, in one embodiment, a player may view a video presentation recorded onto a DVD. The disc may contain three different media files associated with each game play number: one media file depicting a rendering of the game play result at a normal speed, a second media file depicting a rendering of the game play result at a rapid speed, and a third media file depicting a rendering of the game play result at a slow speed. Thus, the player may, using an input device of a DVD player (or personal computer), select a "fast-forward" option, such that one or more game play results of a session may then be output at a more rapid pace (e.g., upon receiving the input, the DVD player accesses the "rapid" version of each requested game play number). In an embodiment wherein players elect an option to review a plurality of game play results at a time (e.g., without requiring further input, 50 animations (each depicting a spin of a slot machine) are seen in sequence), such a fast-forward and "slow motion" features may be useful (e.g., such that players may, for instance, rapidly scroll through sets of outcomes). In another example of a speed option that a player may control, a player may select an option to enable or disable to "spinning" of animated reels, such that if the option is disabled, the player may see only the final resolution of the spin (e.g., the resulting symbol array) without a longer animated introduction.

Further, in some embodiments, players may be able to review video presentations they have already viewed. For example, a player watching a video presentation of a video poker session may select an option to "replay last hand" (such an input triggering a DVD to revert to a previous chapter, a software application to replay the most recently-viewed animation, a server to access a media file in association with a particular game play number, and so on). Further, players may similarly review a plurality of game play results in such a manner (e.g., "replay last twenty spins"). In a further embodiment, a purchaser of a session may use an input device of a DVD player or DVD remote control to "rewind" a video presentation (such an embodiment may be particularly effective when a player chooses a mode that displays a plurality of game play results in succession without requiring further input).

In one or more embodiments, various triggers may cause the output of a video presentation to be temporarily suspended or paused. For example, a video presentation may be temporarily suspended or paused upon the occurrence of a payout over a threshold amount of coins (e.g., payouts over 100 coins). More specifically, in one example, a media file encoded on a DVD depicting a slot machine spin yielding a payout of 1,000 coins may contain an extended pause at the end of the file during which there is no animation (or, alternately, added animation such as fireworks or other graphics may appear). In one embodiment, a media file depicting an outcome corresponding to a payout of at least a certain magnitude may be of a longer duration, thus effectively including a pause or other image designed to draw the player's attention to the payout. In one embodiment in which a pause is employed, an input may be required from a player before the video presentation continues from a point at which it was paused (e.g., such that the player must acknowledge the win). In this manner, players may be less likely to miss the results that yielded large payout amounts. In some embodiments, a pause may be employed after the display of each outcome.

In some embodiments, players may also optionally configure various display parameters for video presentations. Similarly to the display parameters described with respect to FIG. 3A (e.g., wherein a casino attendant may set display parameters before executing a session), purchasers of sessions may have the opportunity to select a variety of display options for viewing a video presentation based on the session, which display options may alter such parameters as (i) the number of outcomes displayed on the screen at once, (ii) the size of the outcomes displayed on the screen, (iii) the "skin," appearance or theme of various indicia (e.g., a player chooses an "ice age" theme as opposed to a "treasure hunt" theme), and so on.

In some embodiments, a game play result that has been used to generate a video presentation may comprise a "bonus round" or other point in which a decision from a player is typically required (e.g., a draw video poker game typically requires a player to decide which cards to hold in a given initial hand of cards). Commonly, some GDs offer entrance to a bonus round upon the occurrence of a triggering condition, such as the receipt of a bonus-triggering outcome (e.g., "Bonus-Bonus-Bonus"). In some cases, such bonus rounds occurring on GDs may require no additional input or choice from a player. For example, a player may achieve a bonus-triggering outcome, and accordingly a display screen may depict an animated sequence that resolves in a number of additional "bonus" credits that the player has won. In some embodiments, such non-interactive bonus presentations may be incorporated into video presentations (e.g., during a video presentation of a reeled slot machine game, after the reels spin and depict a bonus-triggering outcome, the video presentation depicts an animated bonus sequence and reveals an amount of bonus credits).

In other cases, players interfacing with GDs on a casino floor may be presented with several choices or options during a bonus round or other point in a game (e.g., upon an initial hand of cards being dealt to a player in a video poker game). For example, upon achieving a bonus-triggering outcome, several choices may be output to a player (e.g., a touch-screen depicts three boxes from which a player may choose one). A bonus payout amount may then be based on the player's choice.

However, as described, some embodiments of the present invention comprise the execution of sessions of outcomes without the presence of a player to make such decisions. This may be handled in several manners. For example, in one embodiment, a player may authorize an agent (e.g., casino attendant) to make such decisions on his behalf (e.g., such that when executing a session, the agent may use a touch-sensitive display screen or other input device of a GD to make a selection in a bonus game or to decide which cards of a hand of cards to hold and which to discard). In another embodiment, a GD may be programmed such that, when operating in a session outcome generation mode (e.g., a DVD outcome generation mode), such selections (e.g., in a bonus round or other point of a game play) may be made randomly or based on a predetermined strategy. For example, if there are three choices associated with a bonus game, a CD may be programmed to generate a random number between one and three to determine an outcome/payout of the bonus round or to select the left-most choice).

In some embodiments, a player may select a strategy as a value of a parameter in defining a session to be executed on behalf of the player. In some embodiments in which DVDs of sessions are mass produced prior to any request for a session being received from a player, a description of a DVD available for purchase may include a description of a strategy used in executing the session, to make decisions on behalf of a player. This may be true for sessions of video poker games or other games typically involving player decisions. For example, a session for a draw video poker game may be executed using a perfect strategy or near-perfect strategy in deciding which cards to hold for a given initial hand.

In some embodiments, video presentations that present such bonus rounds or other decisions may offer no interactivity to viewers. For example, a video presentation depicts three boxes, one of which is highlighted/selected during the video presentation without receiving player input, such that a payout amount is subsequently revealed. In other embodiments, players may have a perceived influence over such bonus round outcomes or other decisions (e.g., players may be given an opportunity to "select a box" using an input device, though the result may already have been determined before the player's selection and, for example, assigned to all options the player may choose). It should again be noted that such players watching video presentations at remote locations may have no actual influence over associated game play results, as any game play may have previously occurred (e.g., in a legal jurisdiction).

In some embodiments, a progressive "win" may occur during the execution of a session. Such a progressive win achieved during a session being executed may be handled in a variety of manners.

For example, in one embodiment in which a session is being executed on behalf of a particular player, the player may be instantly notified of the progressive win (e.g., the player is called before he is even provided with video presentation). In other embodiments, the player may not be notified, but rather may learn of such a progressive win by watching a video presentation.

In some embodiments, a pool of funds dedicated to paying out progressive wins may be decreased and/or reset immediately after a progressive "win" occurs during the execution of a session, or soon thereafter. However, in other embodiments, such a pool may not be decreased and/or reset until a player claims winnings.

In other embodiments, execution of sessions may not be permitted on GDs offering progressive jackpots.

Progressive jackpot wins may be processed in a different manner in embodiments in which sessions are executed for a mass production process in which the sessions are not being executed on behalf of any particular player but are rather being produced to be later offered for sale. Such embodiments may be referred to as pre-packaged DVD embodiments herein. For example, a pre-packaged DVD may comprise an outcome corresponding to a progressive win, though the disc may remain unsold for a period of time. Accordingly, in some such embodiments, though a progressive "win" occurs once the session is executed, a progressive jackpot pool may not be decreased until the DVD is sold, and/or until a player who eventually purchases the DVD attempts to redeem the DVD.

In some embodiments, various steps may be taken to prevent or discourage fraudulent purchase of pre-packaged DVDs. For example, because game play results have already been generated at the time of purchase, a casino may attempt to disguise the redemption values of such DVDs (e.g., such that players and casino employees may not figure out a way to "beat the system" by purchasing DVDs which they may know or suspect to correspond to large redemption values). For example, when generating a cashout ticket or otherwise outputting session result data associated with a session on which a resultant DVD will be based, no final session balance may be indicated or may only be indicated in an encrypted form (e.g., such that a casino attendant or other person with an opportunity to view the cashout ticket or other session result data may not be privy to whether the session has resulted in a relatively large aggregate).

Additional measures may be taken to prevent casino employees or other persons in a position of becoming aware or otherwise gaining access to session result data associated with a session (whether it be a session for a pre-packaged DVD or a session executed on behalf of a particular player). For example, in one embodiment, no session result ticket may be output. In another embodiment, a casino attendant administering a session or otherwise having an opportunity to gain access to session result data may not be allowed to view game play results using a display screen of a GD or otherwise.

In some embodiments, a third party may administer the creation of video presentations. For example, a casino attendant may execute a session using a GD, such that afterwards a cashout ticket (that does not indicate a final session balance, but is printed nonetheless for auditing purposes) and a game video ticket are output. The casino attendant may then provide the game video ticket to the third party. The third party (e.g., AS 500 or operator thereof) may then scan a barcode of the game video ticket and produce a pre-packaged DVD based on the information encoded on the game video ticket. In this manner the final session balance associated with the DVD may not be known by a casino at the time it is provided to a player. In some embodiments, at the time a DVD is given to the casino by the third party, a payout code may additionally be provided. For example, in some embodiments, players having purchased sessions or DVDs created based thereon may fail to claim winnings (e.g., redeem the DVD for the redemption value) that they are due. Accordingly, in some embodiments, a casino may be responsible for providing such payouts to players, though to prevent fraud, casinos may not learn of a final session balance associated with a session until after an associated video presentation has been provided to a player. For example, thirty days after a DVD has been sold to a player, a casino may provide the payout code to the third-party, which may inform the casino of a final session balance due to the player.

In some embodiments, multiple players may remotely receive session results generated by a GD (e.g., a GD located within casino premises).

For example, in some embodiments, a GD may be configured to periodically generate batches of outcomes (e.g., 50 spins of a three-reel, three-payline video slot machine). Such batches of outcomes may be thought of as "scheduled sessions," as players may be given an opportunity to purchase in advance the right to receive game play results generated during such sessions. In some embodiments, such scheduled sessions may (i) be scheduled to occur at predetermined intervals (e.g., every five minutes), (ii) comprise a predetermined number of game plays (e.g., fifty game plays), and/or (iii) have a session identifier or session number associated therewith. Accordingly, a player may purchase or wager on a session occurring at a specific time (e.g., the player wagers on session number S-1905515, which occurs at 5:15 p.m. tomorrow).

For example, players may visit a central location within a casino and indicate a desire to wager on one or more upcoming scheduled sessions. In some embodiments, players prepay a flat-rate price when wagering on an upcoming scheduled session. For example, when wagering on a session, a player may indicate a denomination of credits (e.g., $1.00, 25¢, 5¢, 1¢, etc.). The denomination of credits and number of game plays within the scheduled session may determine a price associated with the session. For example, for a session of 50 slot machine spins at 50¢ per spin, a player might pre-pay a $25 price. However, for the same session, a second player may indicate a credit denomination of 5¢, and thereby prepay only $2.50. Thus, when a 10-credit win occurs in the session, the first player may receive a payout of $5.00, whereas the second player may receive a payout of only 50¢. In further embodiments, players may place wagers on several paylines of a slot machine session at once (thereby effectively increasing the number of game play results to be received, and therefore the price). For example, certain players of a scheduled session may benefit from having all three paylines "activated" (though such an activation would serve to increase the price), whereas other players may only wager on one payline (for a lower cost).

Accordingly, once a price is determined in association with the session, players may provide payment before the scheduled session begins. For example, a player may provide a payment to a casino attendant or kiosk. Once payment is received in association with one or more scheduled sessions, a player may watch, from a remote location, as game play results are generated once the scheduled session begins.

In one embodiment, a casino may set aside one or more GDs of a particular theme or game brand for "scheduled sessions." In one example, the GD is a five-reel, nine-payline video slot machine. The device may be configured to automatically initiate fifty spins, each spin lasting about three seconds, once every five minutes.

As such game play results are generated, they may be output such that they may be viewed by players remotely. A variety of methods of outputting such outcomes are contemplated. For example, in one embodiment, a video feed may be taken from the slot machine, such that the feed may be broadcast over the Internet, or over a cable television channel. In another embodiment, session result data may be output to a centrally accessible database, such that a Web site maintained by the casino may be configured to rapidly interpret the data and translate the data into visual presentations of outcomes that may be viewed by players over the Internet. In another embodiment, stored audio and/or video files commonly output by the GD's display screen may be output to a server device, such that players may access the files over the Internet. A variety of such methods of transmitting game play results from a GD such that associated audio and/or video files may be rendered over the Internet are contemplated.

When viewing such game play results, various status information may also be made available to players, such as (i) a number of coins or other indication of value won by the player, (ii) a number of coins or other indication of value won by other players who may have bet on the same scheduled session (e.g., though bet on different paylines), and so on.

In some embodiments, a GD configured to generate such game play results for scheduled sessions (or for sessions as described elsewhere herein) may additionally be configured to generate game play results for local players interfacing with the GD. Several such examples are contemplated.

For example, in one or more embodiments, a GD may appear as a standard GD, and to a local user, may operate in a similar fashion to a GD that is not also generating game play results for use in scheduled sessions. For example, a local user may utilize the GD in a conventional manner, providing wager amounts, executing game plays, viewing results, and so on. However, concomitantly, such a GD may generate game play results for use in a scheduled session. For example, a processor of such a GD may be configured to generate local and session game play results at once. In another example, a program stored within the memory of the GD may instruct the GD to generate session game play results only when local game play results are not being generated (e.g., each time there is a 5-second lull between the initiation of game plays by a local user, the GD generates one or more outcomes for a session).

In some embodiments, session game play results may be output (e.g., by a display device) locally much as local results are. For example, in one or more embodiments, a GD may be configured to utilize separate display areas—one for local game play results, and one for session game play results. For example, a GD may possess a "local" display screen as well as a "session" display screen, the latter for depicting game play results that remote players have wagered on.

Of course, it should be understood that in some embodiments, players need not view the execution of one or more game plays in association with such scheduled sessions in real-time. For example, game play associated with a scheduled session may be executed before the session is scheduled to be "broadcast" to players who may have wagered on the session (e.g., game play results are stored in a database).

Further, in some embodiments, a player may utilize computer software (e.g., of a home computer) to interpret and output results from a plurality of scheduled sessions that the player has wagered on. For example, such software may aggregate the results of multiple sessions which the player may not have had a chance to watch, such that the player may learn of wins, losses, a current balance, and so on.

Settlement of such scheduled sessions may occur in a manner similar to those described previously with respect to sessions. For example, a player may return to a casino and present one or more of a receipt, scheduled session identifier or photo identification. A final balance owed to the player may then be determined (e.g., a device such as POS 320 may access session result data associated with the session, and based on the wagers previously placed by the player, determine a redemption value for the session).

Additional Embodiments

In some embodiments, players may be allowed to alter session parameters after a session has been executed (but, e.g., prior to the player viewing the results of the session). For example, in one embodiment, a player may return to a jurisdiction where gambling is legal (e.g., return to a casino) and request that various parameters be altered. For example, a player may have originally purchased a session for 1,000 spins of a slot machine at a wager amount of 25¢ per spin. After going home and watching 500 spins, the player may return to the casino and request that a wager amount per game play be increased to 50¢. Accordingly, it may be determined that the price associated with the session may need to be altered as a result of the alteration to the wager amount parameter, such that the player may either need to make an additional payment or be owed a refund. Further, the player may then be provided with a new video presentation (e.g., such that elements of the video presentation effected by the player's changes to the parameters of the session (such as payout indications and changes to a credit balance meter, in the present example) may be reflected). In another example, a player may return to a casino and forfeit a number of game plays associated with an executed session. For example, a player may have purchased a 1,000-spin session, and may have viewed only 500 spins of the video presentation based on the session. The player may then return to the casino and forfeit the final 500 spins; in doing so, the player may agree to forfeit any payouts associated with such spins, though he may be provided with (i) payouts resulting from the first 500 spins, and/or (ii) a refund for the second 500 spins that the player did not receive the benefit of. In some embodiments, players may be charged a fee to forfeit a portion of a previously purchased session in such a manner.

In some embodiments, a first and second casino may be part of the same "session network." Accordingly, a player may enter a first casino and purchases a session and/or a DVD based on the session. The player may then enter a second casino and (i) collect a redemption value associated with the session and/or DVD; and/or (ii) alter one or more parameters associated with the session. Thus, in some embodiments, devices of a first casino and second casino may communicate with one another (e.g., so as to read from and/or write to one or more databases).

Some embodiments may not include an AS 310. For example, a server (e.g., CS 305), GD (e.g., GD 310) and/or CPD 325 may be operable to perform steps described herein as primarily performed by AS 310.

In further embodiments, a Web site maintained by a casino property (or third party) may function to (i) receive requests to view session results (e.g., from remote players), (ii) retrieve session results (e.g., from a session database), and (iii) output a video presentation based on the session results. Accordingly, in one or more embodiments, the creation of a video presentation may ultimately be performed as a Web site interprets stored session result data and outputs animations accordingly. Such embodiments may be advantageous in that session result data may be output in a variety of manners (e.g., an outcome of "Bar-Bar-Orange" may just as easily be shown as any other outcome with a comparable payout amount, such that a variety of different game symbol appearances may be substituted for the "Bar" and "Orange" symbols), so as to accommodate players who request different visual themes associated with game plays executed as part of a session. Such an embodiment may enable, for example, a player purchasing a session at a casino, logging on to a home computer, and choosing several different slot machine "skins" for which to view session results.

It cannot be over-emphasized that the use of DVD or game disc as an example media on which session result information may be recorded, to allow remote viewing of outcomes of the session, is intended as an example only and should not be taken as limiting in any aspect. Thus, for example, although a sale of game disc (e.g., an encoded DVD) is described in detail with reference to FIG. 22, a similar process may be performed for a sale of a session in another remotely viewable form. For example a sale of access to session results available online (e.g., wherein a player may be provided with an activation code that allows the player to access a video presentation online) is also contemplated. In another example, a sale of a CD-ROM, VHS tape, floppy disc, flash memory, memory stick, dedicated portable device for viewing video presentations, and paper-based flip-through book that illustrates the outcomes of a session may also be sold in a similar manner. In other words, the format or media via which the video presentation is provided to a player is not limited to a DVD or other type of disc. In another example, the redemption of a DVD as described with reference to FIG. 27 is not intended to limit the redemption of a session result to be via a DVD or disc form. For example, in one embodiment a player may provide a CD-ROM including a video presentation thereon and redeem the CD-ROM for the redemption value associated with the session. In another example, a player having viewed a video presentation online may be provided with a code or other means of collecting a redemption value associated with the session upon which the video presentation is based. Any practicable method of outputting a video presentation to a player such that a player may purchase plurality of outcomes and view them remotely at the player's convenience is contemplated.

C. CONCLUSION

While various embodiments have been described herein, it should be understood that the scope of the present invention is not limited to the particular embodiments explicitly described. Many other variations and embodiments would be understood by one of ordinary skill in the art upon reading the present description.

What is claimed is:

1. A method comprising:

deploying an electronic gaming device adapted to produce outcomes for a wagering game comprising an internal computerized random number generator at a gaming establishment;

generating a first random number with the random number generator to create a first outcome;

generating a second random number with the random number generator to create a second outcome, wherein the second outcome is independent of the first outcome;

creating a first session for a first virtual player using the first outcome and the second outcome;

generating a third random number with the random number generator to create a third outcome;

generating a fourth random number with the random number generator to create a fourth outcome, wherein the fourth outcome is independent of the third outcome;

creating a second session for a second virtual player using the third outcome and the fourth outcome;

interrelating the first session with the second session as part of a virtual multiplayer game;

recording the first session and the second session onto a tangible medium; and selling the tangible medium to one real player.

2. The method of claim 1 wherein the electronic gaming device comprises a slot machine.

3. The method of claim 1 wherein the tangible medium comprises a DVD.

4. The method of claim 1 wherein the third outcome is dependent on the first outcome.

5. The method of claim 4 wherein the wagering game comprises poker and the first outcome and the third outcome represent hands of poker drawn from a single deck.

6. The method of claim 1 wherein deploying comprises positioning the electronic gaming device in an area of the gaming establishment such that one real player may use the electronic gaming device to play the wagering game.

7. An electronic gaming device comprising:

an internal computerized random number generator at a gaming establishment; and a control system adapted to:

produce outcomes for a wagering game using an internal computerized random number generator;

generate a first random number with the random number generator to create a first outcome;

generate a second random number with the random number generator to create a second outcome, wherein the second outcome is independent of the first outcome;

create a first session for a first virtual player using the first outcome and the second outcome;

generate a third random number with the random number generator to create a third outcome;

generate a fourth random number with the random number generator to create a fourth outcome, wherein the fourth outcome is independent of the third outcome;

create a second session for a second virtual player using the third outcome and the fourth outcome;

interrelate the first session with the second session as part of a virtual multiplayer game;

record the first session and the second session onto a tangible medium; and sell the tangible medium to one real player.

8. A non-transitory computer readable medium comprising software with instructions to:

produce outcomes for a wagering game using an internal computerized random number generator;

generate a first random number with the random number generator to create a first outcome;

generate a second random number with the random number generator to create a second outcome, wherein the second outcome is independent of the first outcome;

create a first session for a first virtual player using the first outcome and the second outcome;

generate a third random number with the random number generator to create a third outcome;

generate a fourth random number with the random number generator to create a fourth outcome, wherein the fourth outcome is independent of the third outcome;

create a second session for a second virtual player using the third outcome and the fourth outcome;

interrelate the first session with the second session as part of a virtual multiplayer game; and record the first session and the second session onto a tangible medium: and sell the tangible medium to a real player.

* * * * *

UNITED STATES PATENT AND TRADEMARK OFFICE

CERTIFICATE OF CORRECTION

PATENT NO. : 8,047,908 B2
APPLICATION NO. : 11/391843
DATED : November 1, 2011
INVENTOR(S) : Jay S. Walker et al.

It is certified that error appears in the above-identified patent and that said Letters Patent is hereby corrected as shown below:

IN THE CLAIMS:

In Claim 1, column 116, line 17, replace “one” with --a--.

In Claim 6, column 116, line 29, replace “one” with --the--.

In Claim 7, column 116, line 35, replace “an internal computerized” with --the--.

In Claim 7, column 116, line 56, replace “one” with --a--.

In Claim 8, column 118, line 2, delete “and”.

In Claim 8, column 118, line 4, replace the “:” with --;--.

Signed and Sealed this
Thirty-first Day of January, 2012

David J. Kappos
*Director of the United States Patent and Trademark Office*